United States Patent [19]
Egami et al.

[11] Patent Number: 6,018,694
[45] Date of Patent: Jan. 25, 2000

[54] CONTROLLER FOR HYBRID VEHICLE

[75] Inventors: Tsuneyuki Egami, Gamagori; Hiroshi Fujita, Kariya; Keiichiro Banzai, Toyota; Takeshi Sawada, Chiryu; Hiroya Tsuji; Kazuyoshi Obayashi, both of Kariya; Hiroaki Kajiura, Nagoya; Masahiro Seguchi, Oobu; Toyoaki Kurita, Kariya, all of Japan

[73] Assignee: Denso Corporation, Kariya, Japan

[21] Appl. No.: 09/049,114

[22] Filed: Mar. 27, 1998

Related U.S. Application Data

[63] Continuation-in-part of application No. PCT/JP97/02653, Jul. 30, 1997.

[30] Foreign Application Priority Data

| Jul. 30, 1996 | [JP] | Japan | 8-200259 |
| Sep. 10, 1996 | [JP] | Japan | 8-239380 |
| Sep. 12, 1996 | [JP] | Japan | 8-241862 |
| Sep. 18, 1996 | [JP] | Japan | 8-246228 |
| Nov. 22, 1996 | [JP] | Japan | 8-311870 |
| Feb. 25, 1997 | [JP] | Japan | 9-040601 |
| Feb. 25, 1997 | [JP] | Japan | 9-040602 |
| Feb. 25, 1997 | [JP] | Japan | 9-040603 |
| Jul. 11, 1997 | [JP] | Japan | 9-186732 |

[51] Int. Cl.⁷ ........................... B06L 11/00
[52] U.S. Cl. ................. 701/102; 701/110; 701/114; 701/22; 180/65.2; 180/65.4
[58] Field of Search .................. 701/102, 110, 701/114, 22, 24, 84; 180/65.1, 65.2, 65.4; 318/139, 148

[56] References Cited

U.S. PATENT DOCUMENTS

| 4,305,254 | 12/1981 | Kawakatsu et al. | 701/102 |
| 4,335,429 | 6/1982 | Kawakatsu | 364/424 |
| 5,264,764 | 11/1993 | Kuang | 180/65.4 |
| 5,778,997 | 7/1998 | Setaka et al. | 180/65.2 |
| 5,786,640 | 7/1998 | Sakai et al. | 180/65.2 |
| 5,789,881 | 8/1998 | Egami et al. | 180/65.4 |

FOREIGN PATENT DOCUMENTS

| 0743208 | 11/1996 | European Pat. Off. . |
| 0743209 | 11/1996 | European Pat. Off. . |
| 0743210 | 11/1996 | European Pat. Off. . |
| 0743211 | 11/1996 | European Pat. Off. . |
| 0743212 | 11/1996 | European Pat. Off. . |
| 0743213 | 11/1996 | European Pat. Off. . |
| 0743214 | 11/1996 | European Pat. Off. . |
| 0743215 | 11/1996 | European Pat. Off. . |
| 0743216 | 11/1996 | European Pat. Off. . |
| 0743217 | 11/1996 | European Pat. Off. . |
| 44 07 666 | 9/1995 | Germany . |
| 55-127221 | 10/1980 | Japan . |
| 58-130704 | 8/1983 | Japan . |
| 59-37241 | 2/1984 | Japan . |
| 7135701 | 5/1995 | Japan . |
| 7298408 | 11/1995 | Japan . |
| 861193 | 3/1996 | Japan . |
| 898319 | 4/1996 | Japan . |
| 8294205 | 11/1996 | Japan . |
| 9266601 | 10/1997 | Japan . |

*Primary Examiner*—Willis R. Wolfe
*Assistant Examiner*—Hieu T. Vo
*Attorney, Agent, or Firm*—Pillsbury Madison & Sutro LLP

[57] ABSTRACT

A gas-sparing vehicle is achieved by a control system for a hybrid vehicle equipped at least with: a hybrid engine which includes at least a first rotary electric unit for deciding the rpm of the engine and a second rotary electric unit for deciding the driving force of the vehicle and which has power converting means connected to the output shaft of the engine; and electricity storing means. In one embodiment, a hybrid controller 16 controls the drive of a first rotary electric unit 2000 according to a startup torque command value which is decided based on the rpm of an engine at the time of engine startup and which decreases as the rpm increases; it also determines that the complete explosion in an engine 1 has occurred when the startup torque command value falls below a predetermined complete explosion judgment value.

58 Claims, 76 Drawing Sheets

FIG. 39
(a)
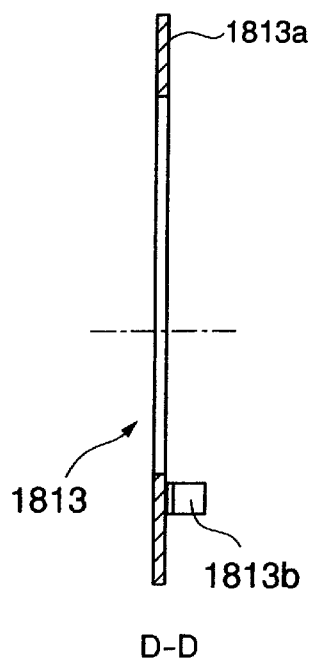
D-D
(b)
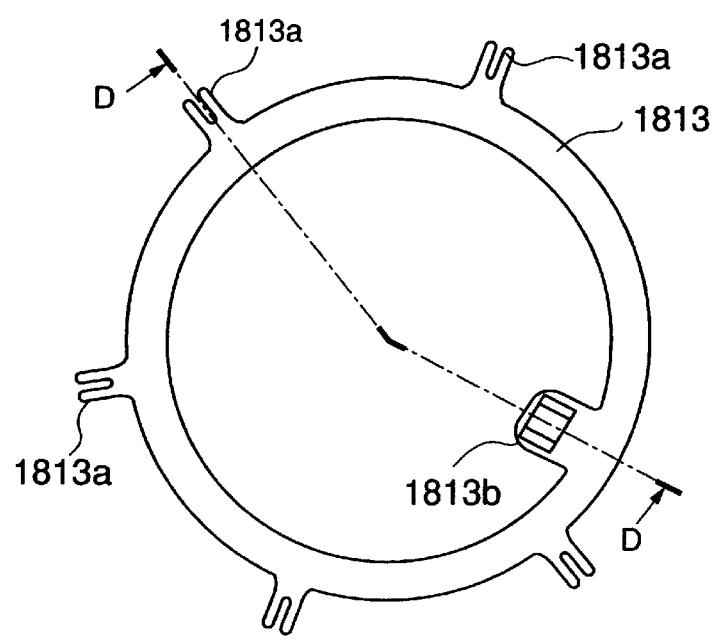

CONTROLLER FOR HYBRID VEHICLE

This is a continuation-in-part of application PCT/JP97/02653 filed Jul. 30, 1997.

BACKGROUND OF THE INVENTION

1. Field of the Invention

The present invention relates to a controller or system for a hybrid vehicle which is provided with at least: a hybrid engine which includes an engine having an intake air volume regulating means for adjusting the volume of air to be taken into a combustion chamber and an electronically controlled fuel injector, a first rotary electric unit for determining the number of revolutions of the engine and a second rotary electric unit for determining the driving force of a vehicle, and a power converting means connected to the output shaft of the engine; and an electricity storing means.

2. Description of the Related Art

Hitherto, Japanese Unexamined Patent Publication No. 7-135701 has disclosed an apparatus which is equipped with an engine, a first motor, a second motor, and a gear unit composed of a first, second, and third rotary elements, which enables the engine to be operated at a maximum efficiency point by controlling the number of revolutions of one of the first motor and the second motor to determine the engine rpm and by controlling the torque of the other to determine the driving power of a vehicle, and which makes it possible to use the generated torque of the engine to be used directly as the driving power of the vehicle, thus permitting the generated energy of the engine to be transmitted with high efficiency.

Further, according to the specification of German Patent Application No. 4407666, a configuration has been disclosed; wherein the inner rotor of a first motor and the rotor of a second motor are directly coupled, the outer rotor of the first motor is driven by an engine, and the inner rotor and the outer rotor of the first motor are electromagnetically coupled to generate electricity thereby to electromagnetically transmit the output torque of the engine, and the power generating energy of the first motor can be used to enable the second motor to assist in torque, thus permitting highly efficient transmission of the generated energy of the engine. These hybrid vehicles are provided with a power transmitting means having two rotary electric units between the engine and the drive system thereby to make it possible to operate the engine at the maximum efficiency point and they are also adapted to transmit energy electrically and mechanically or electromagnetically at the same time to maintain high energy transmitting efficiency even if a traveling condition changes.

In the hybrid type vehicle disclosed in Japanese Unexamined Patent Publication No. 7-135701, the motor torque of one of the first motor and the second motor is controlled so that the engine reaches at a constant speed at the maximum efficiency point, and the torque of the other one of the first motor and the second motor is controlled according to the lift of an accelerator. Hence, excessive engine torque may occur, depending on the traveling condition of the hybrid type vehicle or the capacity of a battery, and if it occurs, then the engine is driven on an optimum efficiency line and the driving conditions is set according to the vehicle speed or the capacity of the battery. However, since the output of the engine is transmitted to a traveling load, the output required for travel may be generated by the engine. If the engine output is decided by the vehicle speed, then a problem arises in that an insufficient engine output results when climbing up a slope, while excess engine output results when traveling down a slope.

Further, in the control unit described above, only the configuration thereof has been disclosed in that an rpm command is issued to the first motor and a torque command is issued to the second motor in accordance with the lift of the accelerator and the engine rpm; the signals for engine control and the transmission of information are unclear. In the specification of the German Patent Application No. 4407666, only the configurations of the engine and the motors have been disclosed; the control of the engine and the motors has not been disclosed.

In the hybrid type vehicle described above, since the first motor is connected to the engine, the engine can be started up by the first motor. This is advantageous in that a starter motor for starting the engine can be omitted. There is, however, a disadvantage in that, when a predetermined torque is generated at the time of starting up the engine by the first motor, the first motor is rotated by the engine until combustion in the engine takes place and the startup process is completed; hence, the torque balance between the engine and the first motor is disturbed.

In such a case, the controlled torque of the first motor and the generated torque of the engine interfere with each other, and continued torque control will cause an excessive rise in the engine rpm by the torque of the first motor. This will consequently cause the engine rpm to overshoot at the completion of the startup, leading to uncomfortable startup. In addition, more electric energy than necessary will be drawn out of the electricity storing unit in order to generate the torque at the first motor, resulting in deteriorated energy efficiency. The problem can be controlled to a minimum if the complete explosion at the time of engine startup can be accurately detected and the engine can be properly controlled according to the startup state. In other words, a failure to accurately detect complete explosion will make the problem worse.

SUMMARY OF THE INVENTION

The present invention has been made with a view toward solving the problem with the prior art described above, and it is an object of the present invention to achieve and provide a complicated control system for the hybrid vehicles.

Furthermore, it is an object of the present invention to provide a controller for a hybrid vehicle which permits accurate judgment of the complete explosion in an engine at the time of starting up a hybrid vehicle employing a power transmitting means so as to enable efficient engine startup.

To fulfill the foregoing object, according to the present invention set forth in claims 1 and 3, a hybrid controller calculates a vehicle driving torque command value for a hybrid vehicle in accordance with the operation information on at least an accelerator pedal or a brake pedal and a shift lever, calculates a vehicle driving power demand value according to the vehicle driving torque command and the vehicle speed of the hybrid vehicle, and issues the vehicle driving power demand value to an engine controller. The engine controller calculates an engine rpm command value for outputting the vehicle driving power demand value at maximum efficiency in accordance with the characteristics of the engine which have been stored beforehand, calculates the adjustment amount of an intake air volume regulating means, controls the intake air volume regulating means in accordance with the adjustment amount, controls an electronically controlled fuel injector in accordance with the intake air volume of the engine which has been determined at least based on the control result of the intake air volume regulating means, and issues an engine rpm command value to the hybrid controller.

The hybrid controller calculates a first torque command value for a first rotary electric unit in accordance with the information on the engine rpm command value and the engine rpm, calculates a second torque command value for a second rotary electric unit in accordance with the first torque command value and the foregoing vehicle driving torque command value, and issues the first and second torque command values to an inverter. The inverter controls the torques of the first and second rotary electric units. Thus, the number of revolutions of the first rotary electric unit is controlled in exact accordance with the engine rpm command value; hence, the operation of the engine can be maintained at an engine operating point at which the fuel consumption and emission of the engine determined by the engine controller can be maintained in a best condition, permitting highly efficient engine operation.

Moreover, according to the foregoing operation, the vehicle driving torque is the sum of the torque generated at the first rotary electric unit and the torque generated at the second rotary electric unit, and it is controlled in exact accordance with the vehicle driving torque command value of the hybrid vehicle based on the operation information on the accelerator pedal and the brake pedal. At this time, the torque generated at the first rotary electric unit is balanced with the output torque of the engine and the output torque of the engine is electromagnetically transmitted as a part of the vehicle driving torque, thus permitting efficient transmission.

Furthermore, according to the aforesaid configuration set forth in claim 2, a small, lightweight power converting means can be provided. This enables the vehicle to be made lighter and the system efficiency to be improved.

In addition, according to the invention set forth in claim 4, a charge state detecting means detects overcharge or overdischarge of an electricity storing means due to a control error or the like during driving, and at least one of the following corrections is made so as to eliminate the energy going into or out of the electricity storing unit: the vehicle driving torque command value is corrected according to the charge state of the electricity storing means, the vehicle driving power demand value supplied to the engine controller is corrected, or the engine rpm command value received from the engine controller is corrected. Hence, the weight of the mounted electricity storing unit can be controlled to a minimum, permitting a reduced weight of the vehicle and higher system efficiency. Moreover, since there will be no overcharge or overdischarge of the electricity storing means, there will be no malfunction of the traveling vehicle, meaning that efficient driving is always ensured as long as engine fuel is supplied.

According to the system set forth in claim 5, a terminal voltage VB of the electricity storing means is detected, and at least one of the following corrections is made so as to maintain the terminal voltage of the electricity storing means at a predetermined voltage: the vehicle driving torque command value is corrected, the engine rpm command value supplied to the engine controller is corrected, or the engine rpm command value received from the engine controller is corrected. Hence, the transient flow of energy into or out of the electricity storing unit can be controlled to a minimum and the steady flow of energy into or out of the electricity storing unit can be eliminated, enabling the weight of the mounted electricity storing unit to be controlled to a minimum and the weight of the vehicle to be accordingly reduced with resultant higher system efficiency. Moreover, since there will be no overcharge or overdischarge of the electricity storing means, there will be no malfunction of the traveling vehicle, meaning that efficient driving is always ensured as long as engine fuel is supplied.

According to the system set forth in claim 6, when a vehicle is driven under high load in such a case as starting the vehicle or climbing a slope and energy is brought out transiently from the electricity storing means, the voltage for keeping the electricity storing unit fully or almost fully charged is maintained. Therefore, such a problem as the failure to fully provide the expected driving performance due to insufficient driving power of the vehicle will no longer arise.

Further, according to the system set forth in claim 7, a temperature detector detects the temperature of or in the vicinity of the electricity storing means, and the terminal voltage VB of the electricity storing means is corrected according to the detected temperature. This makes it possible to prevent the overcharge of the electricity storing means when the temperature is low or to prevent the overdischarge thereof when the temperature is high, thus preventing deterioration in the performance of the electricity storing unit.

To solve the aforementioned problem, according to the present invention, there is provided a controller for a hybrid vehicle which is applied to a hybrid vehicle provided with an engine, power converting means which is connected to the engine and which includes a first rotary electric unit for deciding engine rpm and a second rotary electric unit for deciding the driving force of the vehicle, an inverter for driving the first and second rotary electric units, and an electricity storing unit electrically connected to the inverter: wherein the output torque of the engine is controlled according to vehicular drive information such as the operational information on, for example, an accelerator pedal or brake pedal and a shift lever; the torque command values for the first and second rotary electric units are calculated according to the torque control amount of the engine and the target rpm of the engine corresponding to the characteristics of the engine; and the respective rotary electric units are controlled according to the calculated torque command values.

In such a configuration, the rpm of the first rotary electric unit is controlled according to the target rpm of the engine. This makes it possible to maintain the operation of the engine at an engine operating point, where the best fuel economy and emission control is obtained, according to the characteristics of the engine, thus permitting highly efficient engine operation. Moreover, in the configuration, the vehicle driving torque is the sum of the torque generated at the first rotary electric unit and the torque generated at the second rotary electric unit; it is properly controlled according to vehicular drive information. At this time, the torque generated at the first rotary electric unit is balanced with the output torque of the engine, and the output torque of the engine is electromagnetically transmitted as a part of the vehicle driving torque. This allows highly efficient energy transmission to be achieved.

The invention set forth in claim 56 is characterized in that the drive of the first rotary electric unit is controlled according to the startup torque command value which is decided by the engine rpm and which decreases as the rpm increases at the time of starting up the engine (startup controlling means). Further, it is determined that complete explosion has taken place in the engine when the aforesaid startup torque command value is lower than a predetermined complete explosion judgment value (complete explosion determining means).

In other words, the invention is characteristic in that the startup torque command value decreases as the engine rpm increases; driving the first rotary electric unit according to the startup torque command value allows the combustion startup state of the engine to be sequentially reflected in the startup torque command value. Hence, recognizing that the startup torque command value is below the predetermined complete explosion judgment value permits the complete explosion in the engine to be accurately determined, resulting in improved smoothness of engine startup. Furthermore, the engine can be started up by a minimum of energy. As a result, it is possible to fulfill the main object of the invention to accurately judge the complete explosion of the engine at the time of starting up the hybrid vehicle which employs the power transmitting means composed of the first and second rotary electric units so as to ensure efficient engine startup.

According to the invention set forth in claim 57, the foregoing complete explosion determining means determines that complete explosion has taken place when the state, wherein the startup torque command value is below the predetermined complete explosion judgment value, has continued for a predetermined time. This enables further accurate judgment of the complete explosion in the engine.

According to the invention set forth in claim 58, the torque command value of the second rotary electric unit is set such that the absolute value of the sum thereof and the startup torque command value used by the startup controlling means is the predetermined value or less. In this case, setting the absolute value of the sum of the torque command values of the first and second rotary electric units to the predetermined value or less means to restrict the value of the sum to an extremely small range including "0" and accordingly means that the engine is started up without generating a vehicle driving force.

The configuration described above makes it possible to maintain good torque balance between the engine and the rotary electric units at the time of engine startup, enabling stable vehicle behavior. As a result, such an inconvenience, in which the torque of the first rotary electric unit (first motor) acts as a reaction force on the driving shaft of the vehicle to cause the vehicle to move forward or backward or the engine rpm to go up excessively at the completion of the engine startup, can be controlled.

BRIEF DESCRIPTION OF THE DRAWINGS

These objects and features will become more readily apparent from the following detailed description taken in conjunction with the accompanying drawings in which:

FIG. 39(a) is a sectional view of a conductor 1813 of FIG. 36;

FIG. 39(b) is a front view of the conductor 1813 of FIG. 36 taken at the line D—D in FIG. 39(b);

DETAILED DESCRIPTION OF THE EMBODIMENTS OF THE INVENTION

The best mode for carrying out the invention will be described by some embodiments. A first embodiment of the hybrid vehicle controller in accordance with the present invention will be explained in conjunction with FIG. 1 through FIG. 22. Briefly speaking, the control system for a hybrid vehicle of this embodiment is equipped with: an engine; a power transmitting means (power converting means) including a first rotary electric unit which is coupled to the engine and which determines engine rpm, and a second rotary electric unit for determining the driving force of a vehicle; an inverter for driving the first and second rotary electric units; and an electricity storing unit electrically connected to the inverter. The control system is further provided with an engine controller which conducts the fuel injection control of the engine and a hybrid controller which issues a command on the torque control amount (a vehicle driving power demand value Pv*) to the engine controller and which controls the drive of the inverter. The control system controls the output torque of the engine according to the vehicle operation information such as the information on the operation of, for example, an accelerator pedal, brake pedal, and shift lever and it also controls the values of the torques generated by the first and second rotary electric units according to the then torque control amount (the vehicle driving power demand value Pv*; vehicle driving torque command value Mv*) and a target engine rpm (engine rpm command value Ne*) matched to the characteristics of the engine. The * configuration of the control system will now be described in detail with reference to the accompanying drawings.

Figure 1:
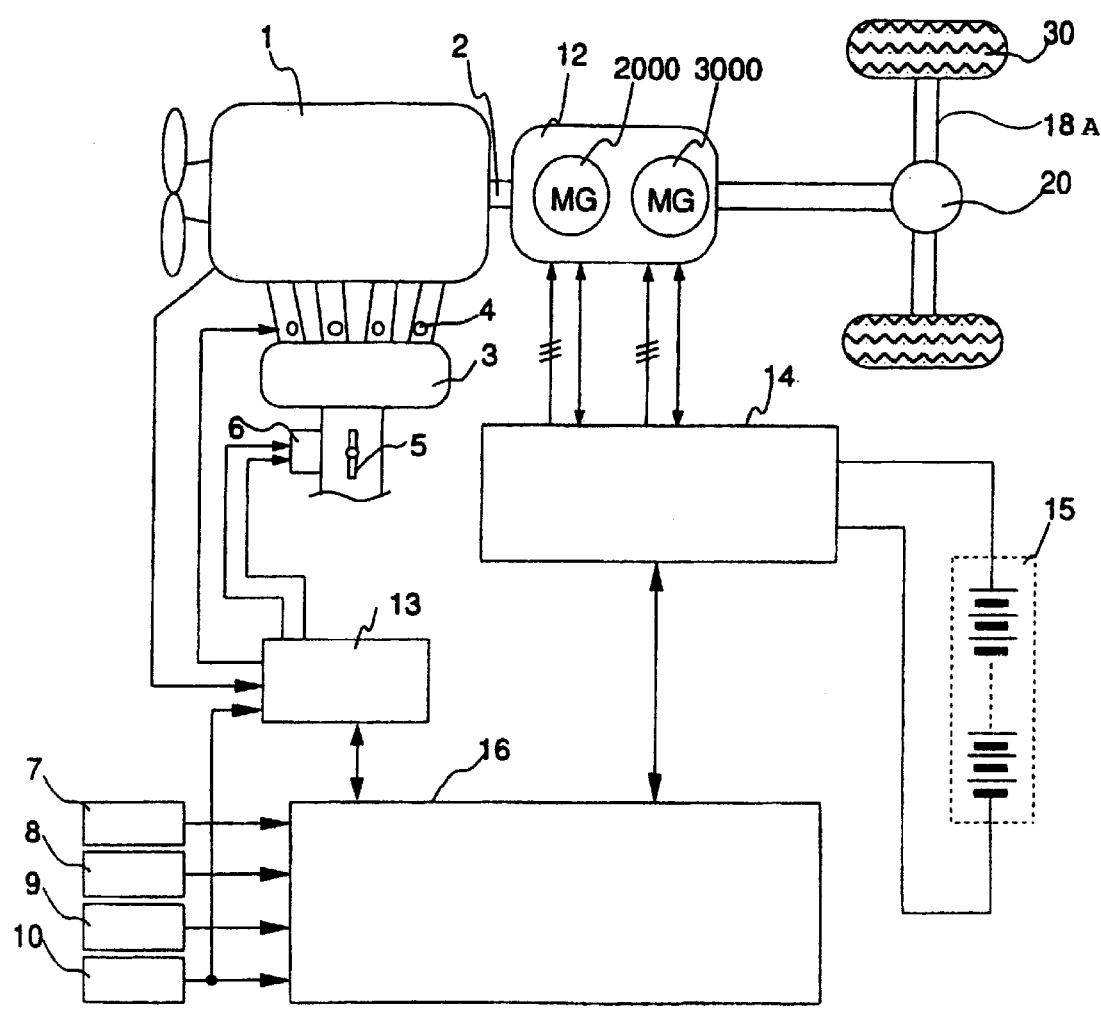
FIG. 1 is a general block diagram of a hybrid vehicle which is a first embodiment of the present invention.

FIG. 1 is a block diagram showing the outline of the hybrid vehicle control system in this embodiment; an engine 1 in the drawing is constituted by a 4-cylinder, 4-stroke gasoline internal-combustion engine. The engine 1 is provided with an output shaft 2; this output shaft 2 is coupled to a power transmitting means 12 which will be discussed later. Provided on an inlet pipe 3 of the engine 1 are publicly known fuel injection solenoid valves 4 which are independently installed for individual cylinders. The inlet pipe 3 is also provided with a throttle valve 5; the opening/closing of the throttle valve 5 is controlled by a throttle actuator 6 making up an intake air volume regulating means.

The system shown in the drawing is further equipped with the following group of sensors. Specifically, an accelerator pedal, not shown, which is operated by a driver is provided with a publicly known accelerator sensor 7. The sensor 7 issues an accelerator lift signal, which corresponds to the depression of the accelerator pedal, in terms of a voltage signal. A brake pedal, not shown, which is operated by the driver is provided with a publicly known brake sensor 8. The brake sensor 8 issues a brake signal, which corresponds to the depression of the brake pedal, in terms of an ON/OFF signal. A shift switch 9 detects a plurality of shift positions; in this embodiment, it outputs in parallel shift signals such as parking (P), reverse (R), neutral (N), and drive (D) in terms of ON/OFF signals. A start switch 10 is built in a publicly known iG key switch which is not shown; it issues ON/OFF signals corresponding to the presence or absence of start.

A power transmitting means 12 is equipped with a first rotary electric unit 2000 and a second rotary electric unit 3000; the detailed description of the configuration thereof will be given later. The output of the power transmitting means 12 is sent to right and left vehicular driving wheels 30 via a publicly known differential gear device 20 and an axle 18A.

An engine controller 13 receives the vehicle driving power demand value Pv* to be generated by the engine 1 for driving the vehicle from a hybrid controller 16 which will be described later and it drives the throttle actuator 6 according to the received value. The engine controller also controls the time for holding fuel injection solenoid valves 4 open according to the signal of an engine operation state sensor, not shown, which is mounted on the engine 1, and it further determines the ignition timing of an ignition system, not shown, to drive the ignition system. The combustion state of the engine 1 is controlled by controlling the fuel injection and the ignition described above. Furthermore, the engine controller 13 issues the engine rpm command value Ne*, which has been calculated therein so as to operate the engine 1 according to the vehicle driving power demand value Pv*, to the hybrid controller 16.

The inverter 14 is a unit driving the first rotary electric unit 2000 and the second rotary electric unit 3000; it controls output torques Mm1 and Mm2 of the first rotary electric unit 2000 and the second rotary electric unit 3000, respectively, according to first and second torque command values Mm1* and Mm2* which are the torque command values of the first rotary electric unit 2000 and the second rotary electric unit 3000, respectively, and which are received from the hybrid controller 16, and it also supplies revolution information Nm1 and Nm2 of the first rotary electric unit 2000 and the second rotary electric unit 3000, respectively, to the hybrid controller 16. An electricity storing unit 15 is composed of cells and it is connected to the inverter 14.

The hybrid controller 16 functions to carry out general control of the hybrid vehicle; it is connected to the group of sensors mentioned above, namely, the accelerator sensor 7, the brake sensor 8, the shift switch 9, and the start switch 10. And the hybrid controller 16 calculates the vehicle driving power demand value Pv* according to the accelerator lift signal, the brake signal, the shift signal, and the start signal received from those sensors and it sends the Pv* value to the engine controller 13. The control unit 16 also receives the engine rpm command value Ne* transmitted from the engine controller 13. Further, the hybrid controller 16 is connected to the inverter 14; it calculates the first and second torque command values Mm1* and Mm2*, which are the torque command values of the first rotary electric unit 2000 and the second rotary electric unit 3000, respectively, and sends the calculated values to the inverter 14 and it also receives the revolution information Nm1 and Nm2 of the first rotary electric unit 2000 and the second rotary electric unit 3000, respectively, from the inverter 14.

Further in this control system, a current detector 17 serving as a charge state detecting means is provided between the inverter 14 and the electricity storing unit 15. the current detector 17 detects the current flowing through the electricity storing unit 15 and transmits the detection result to the inverter 14.

The details of the configuration of the power transmitting means 12 will now be described in conjunction with FIG. 2.

The power transmitting means 12 is connected to the engine 1 and it is made integral with the differential device 20 in this embodiment. The power transmitting means 12 incorporates the first rotary electric unit 2000 which adjusts the input/output rpm and the second rotary electric unit 3000 which adjusts the input/output torque, and a deceleration transmitter 4000 which decelerates and transmits an output. In this embodiment, a joint between the engine 1 and the power transmitting means 12 and a joint or the like between the differential unit 20 and the driving wheels 30 are omitted. The output shaft 2 of the engine 1 is rotated and driven as the engine 1 is driven and it transmits the output to an input shaft 2001 of the power transmitting means 12 via a joint, etc. which are not shown.

The power transmitting means 12 has a first rotor 2010 integrally provided on the input shaft 2001, a second rotor 2310, and a stator 3010 which corresponds to a stationary part. The stator 3010 is constructed by a winding 3011 and a stator core 3012 for producing a rotating magnetic field. The first rotor 2010 also has a winding 2011 and a rotor core 2012 for producing a rotating magnetic field; it receives electric power from outside via a brush holder 2610, a brush 2620, slip ring 2630, and a lead section 2660 provided via an insulator 2650 made of molding or the like inside a shaft 2213. The second rotor 2310 is provided with a hollow rotor yoke 2311 and magnets 2220 which are disposed at equal intervals to produce N- and S-poles on the inner peripheral surface thereof; the rotor core 2012 and the winding 2011 make up the first rotary electric unit 2000. The second rotor 2310 is provided also with magnets 2420 which are disposed at equal intervals to produce N- and S-poles on the outer peripheral surface of the hollow rotor yoke 2311; the stator core 3012 and the winding 3011 make up the second rotary electric unit 3000. The magnets 2220 and 2420 provided on the inner surface and the outer surface, respectively, of the rotor 2311 are secured to the second rotor 2310 as necessary by ring 2225 and 2425 or the like.

The rotor yoke 2311 of the second rotor 2310 is rotatably provided on housings 1710 and 1720 via rotor frames 2331 and 2332 and bearings 2510 and 2511. And the first rotor 2010 is rotatably provided on the rotor frames 2331 and 2332 of the second rotor 2310 via the shaft 2213 and bearings 2512 and 2513. One end of the second rotor 2310 extends outside toward the engine 1 from a housing 2710 via a rotor frame 2332; a serration 1332a is formed on the distal end thereof and it meshes with a small gear 4010 of the deceleration transmitter 4000. Further, the shaft of the small gear 4010 is joined to a differential gear unit 11 via a gear 4020 secured to the fixing section of the engine or the like. A gear 4020 meshes with a large gear 4100 formed on a differential gear box 4110 provided in the differential gear unit 11; it decelerates the torque from the power transmitting means 12 and transmits it to the driving wheels 30 via differential gears 4120 and 4130. A series of these gears are configured such that they are disposed in the gap between the engine 1 and the side surface of the housing 1710 of the power transmitting means 12 as shown in FIG. 2. In other words, the distal end of the shaft 2213 which receives a torque toward the power transmitting means 12 from the engine 1 and the distal end of the rotor frame 2332 corresponding to the output shaft for outputting the torque toward the load output end from the power transmitting means 12 are disposed on the same side so as to reduce the size of the power transmitting means 12.

Reference numerals 2911 and 2912 denote rotation sensors composed of publicly known resolvers; they detect rotational positions θ1 and θ2 and rpms Nm1 and Nm2 of the first rotor 2010 and the second rotor 2310, respectively, as the revolution information on the first rotary electric unit 2000 and the second rotary electric unit 3000, using the stator 3010 as the reference. Reference numeral 1730 denotes a cover case which houses the brush holder 2610 and the rotation sensor 2911.

The configuration of the engine controller 13 will now be described in conjunction with FIG. 3.

Figure 3:
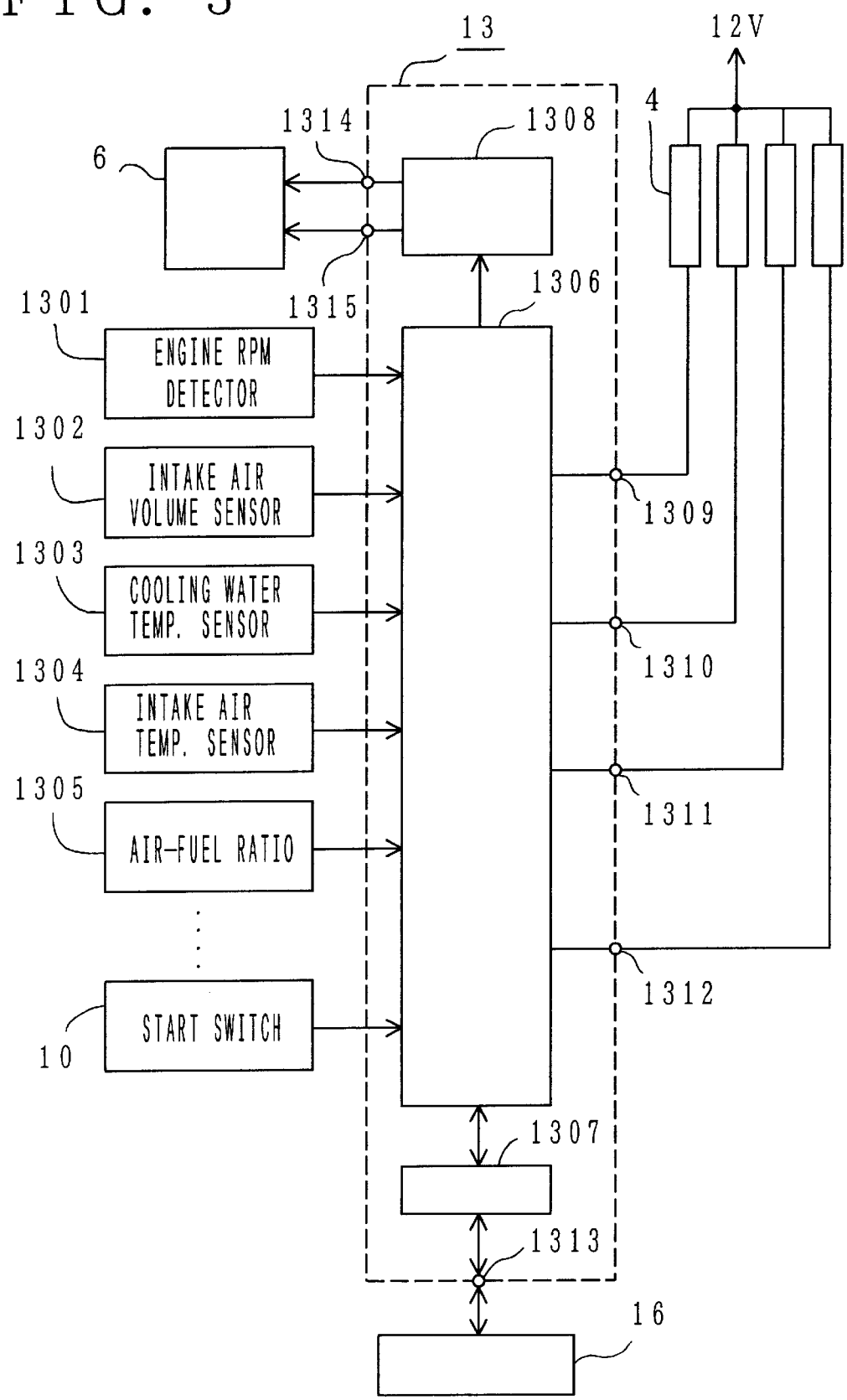
FIG. 3 is a block diagram of an engine controller 13 in the present invention.

In FIG. 3, reference numeral 1301 indicates a revolution detector of the engine 1. The revolution detector is publicly known although the details thereof are not illustrated; it issues 12 pulses of angular signal and 1 pulse of reference signal each time a crankshaft, not shown, of the engine 1 makes one turn. Reference numeral 1302 indicates a publicly known intake air volume sensor; although the details thereof are not illustrated, the intake air volume sensor is provided on the inlet pipe 3, and the vane opening thereof changes according to the volume of air taken into the engine 1. The changes in the vane opening are detected by a potentiometer, and the volume of air introduced into the engine 1 is detected in terms of an air volume signal indicative of the volume per unit time.

Reference numeral 1303 denotes a publicly known thermistor type cooling water temperature sensor which is mounted on the engine 1; it detects the temperature of the cooling water of the engine 1 as resistance and outputs a cooling water temperature signal. Reference numeral 1304 indicates a publicly known thermistor type intake air temperature sensor; it is provided on the intake air volume sensor 1302 and it detects the temperature of the air taken into the engine 1 as resistance and issues the detection result in terms of an intake air temperature signal. Reference numeral 1305 denotes a publicly known air-fuel ratio sensor which is provided on an exhaust pipe assembly (not shown) of the engine 1; it issues the air-fuel ratio of exhaust in terms of voltage as an air-fuel ratio signal. The signals of these sensors and the start signal of the start switch 10 are connected to the engine controller 13. Reference numeral 1306 indicates a control unit having the same configuration as that of a publicly known engine controller; it is constituted primarily by a microcomputer and the driving circuit of the fuel injection solenoid valve 4, and it generates a valve opening signal for the fuel injection solenoid valve 4 in accordance with the angle signal and reference signal of the engine rpm detector 1301, the air volume signal of the intake air volume sensor 1302, the cooling water temperature signal of the cooling water temperature sensor 1303, the intake air temperature signal of the intake air temperature sensor 1304, and the air-fuel ratio signal of the air-fuel ratio sensor 1305. Reference numeral 1307 denotes a communication circuit; it is, for instance, a publicly known circuit which permits a start-stop synchronization communication, and it is connected to the control unit 1306.

Reference numeral 1308 denotes a publicly known throttle actuator driving circuit connected to the control unit 1306 and the throttle actuator driving circuit is connected to an intake air volume regulating means 6 via terminals 1314 and 1315. Reference numerals 1309, 1310, 1311, and 1312 indicate the output terminals of the engine controller 13; the output terminals are connected to the output of the valve opening signal of the control unit 1306 and further connected to the fuel injection solenoid valve 4. Reference numeral 1313 indicates a communication terminal of the engine controller 13; the communication terminal is connected to the hybrid controller 16.

The configuration of the control program stored in the control unit 1306 of the engine controller 13 will now be described with reference to FIG. 4 and FIG. 5.

Figure 4:
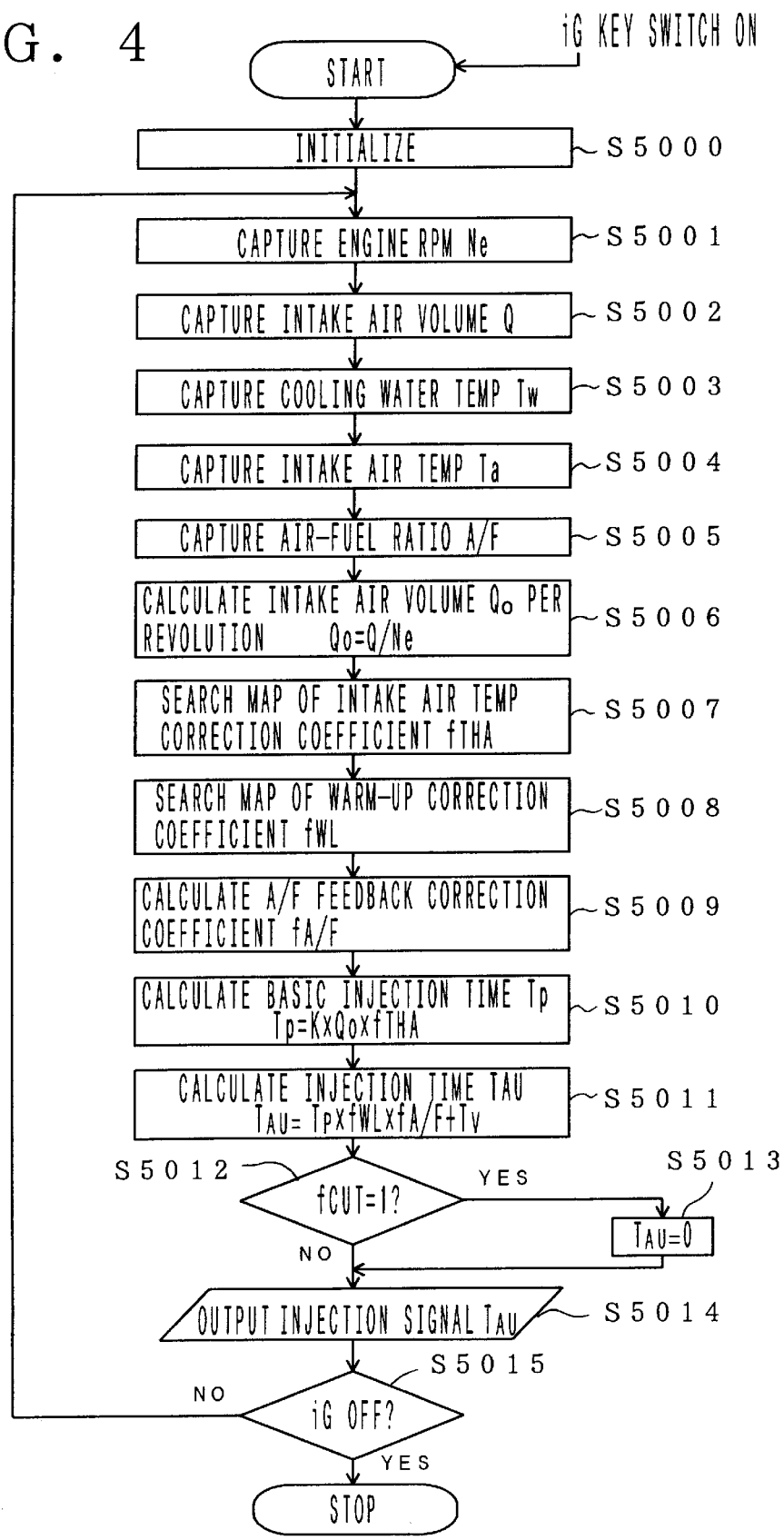
FIG. 4 is a flowchart illustrative of a main program of the control carried out by the engine controller 13.

The program shown in FIG. 4 is a main program which is initiated when the IG key switch is turned ON. In FIG. 4, step S5000 initializes the I/O port built in the control unit or sets the variable area of a RAM, and a stack pointer.

In step S5001, the engine rpm Ne is captured and stored in the variable area of the RAM built in the control unit 1306. Next, in step S5002, intake air volume Q is captured and stored in the variable area of the RAM built in the control unit 1306. Then, in step S5003, cooling water temperature Tw is captured and stored in the variable area of the RAM built in the control unit 1306. Next, in step S5004, intake air temperature Ta is captured and stored in the variable area of the RAM built in the control unit 1306. In step S5005, air-fuel ratio A/F is captured and stored in the variable area of the RAM built in the control unit 1306. In step S5006, intake air volume Qo per revolution is calculated from the engine rpm Ne captured in step S5001 and the intake air volume Q captured in step S5002, and it is stored in the variable area of the built-in RAM. In step S5007, the intake air temperature correction coefficient map, which has been stored in the table area of the ROM built in the control unit 1306, is searched for an intake air temperature correction coefficient fTHA according to the intake air temperature Ta captured in step S5004. The intake air temperature correction coefficient map is a publicly known one shown in FIG. 5; it is provided with the coefficients for converting the intake air volume detected by the intake air volume sensor 1302 to the mass per unit time in the form of a one-dimensional map.

Subsequently, in step S5008, based on the cooling water temperature Tw captured in step S5003, a warm-up correction coefficient map is searched for a warm-up correction coefficient fWL. The warm-up correction coefficient map is a publicly known one shown in FIG. 7; it is provided with the warm-up correction coefficient fWL for the cooling water temperature Tw of the engine 1 in the form of a one-dimensional map. In step S5009, an A/F feedback correction coefficient fA/F is calculated according to the air-fuel ratio A/F captured in step S5005. The calculation is a publicly known one; a detailed description thereof will be omitted. In step S5010, a basic injection time Tp is calculated from the intake air volume Qo per revolution determined in step S5006 and the intake air temperature correction coefficient fTHA determined in step S5007 (Tp=K·Qo·fTHA). Coefficient K used for the calculation is the constant which determines the relationship between the valve opening time and the fuel injection amount of the fuel injection solenoid valve 4. Subsequently, in step S5011, an injection time TAU, which is the valve opening time of the fuel injection solenoid valve 4, is calculated according to the basic injection time Tp determined in the foregoing step, the warm-up correction coefficient fWL, and the A/F feedback correction coefficient fA/F. Reference character Tv denotes an invalid injection time; it is a lag attributable to the time constant of the fuel injection solenoid valve 4 and does not contribute to the fuel amount. In step S5012, the system determines the state of a flag fCUT indicating whether fuel should be cut off; if it determines that the fuel should be cut off (fCUT=1) (YES), then it resets the fuel injection time TAU to zero, or if it determines that the fuel should not be cut off (fCUT=0) (NO), then it goes to step S5014. In step S5014, based on the injection time TAU determined in step S5011, the system generates and issues an injection signal for driving a fuel injection solenoid valve 3. In step S5015, the system checks the state of the IG key switch; if it finds that the IG key switch has been turned ON (NO), then it goes back to step S5001 to repeat the foregoing operation, or if it finds that the IG key switch has been OFF (YES), then it terminates the program.

Figure 5:
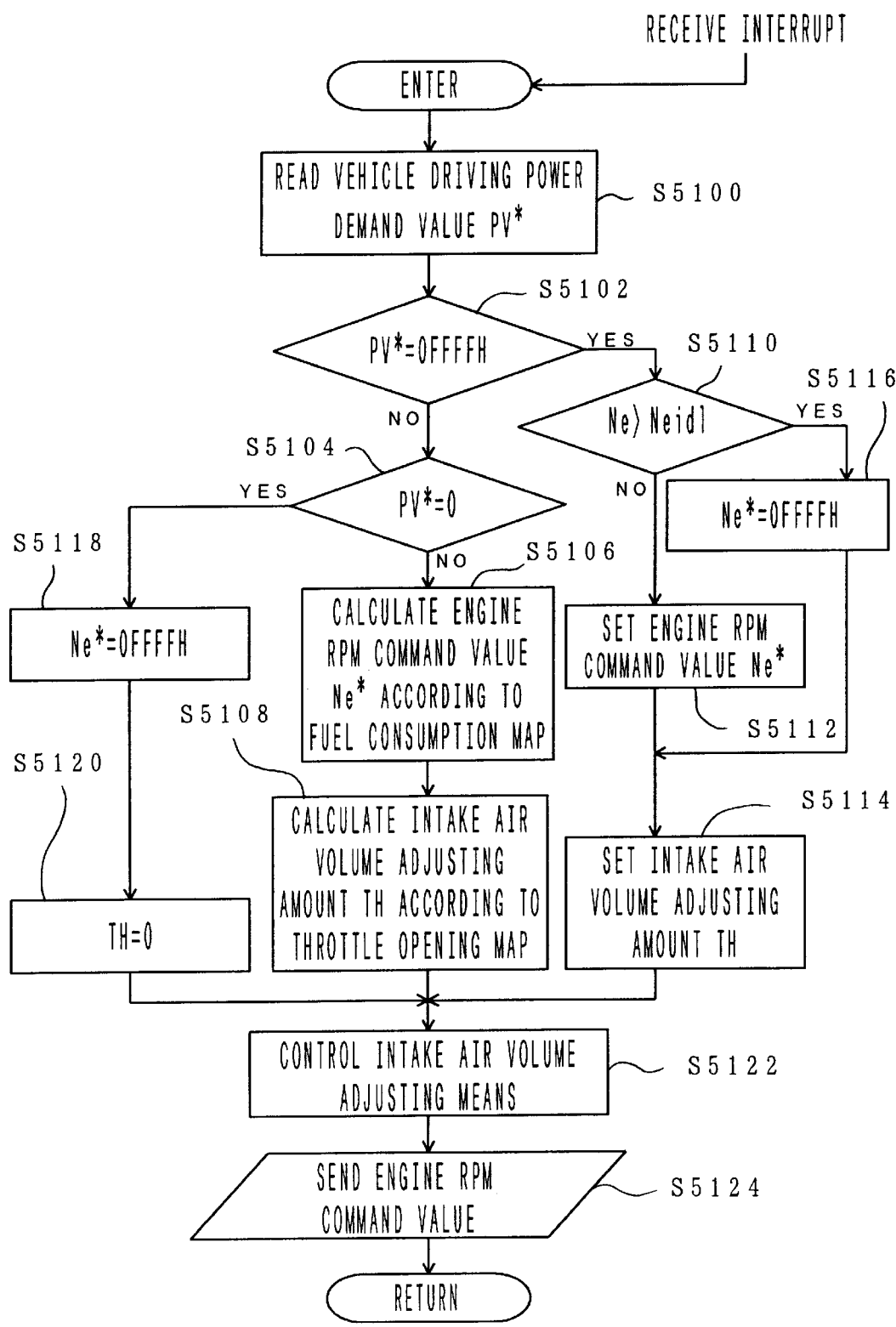
FIG. 5 is a flowchart illustrative of an interrupt program of the control carried out by the engine controller 13.
Figure 6:
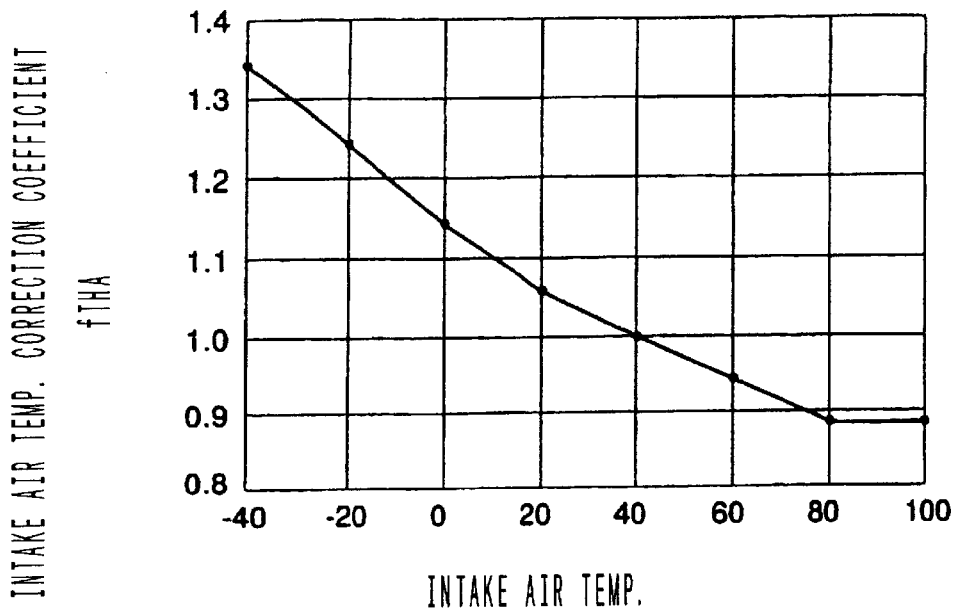
FIG. 6 is a characteristic chart of an intake air temperature correction coefficient fTHA incorporated in the engine controller 13.
Figure 7:
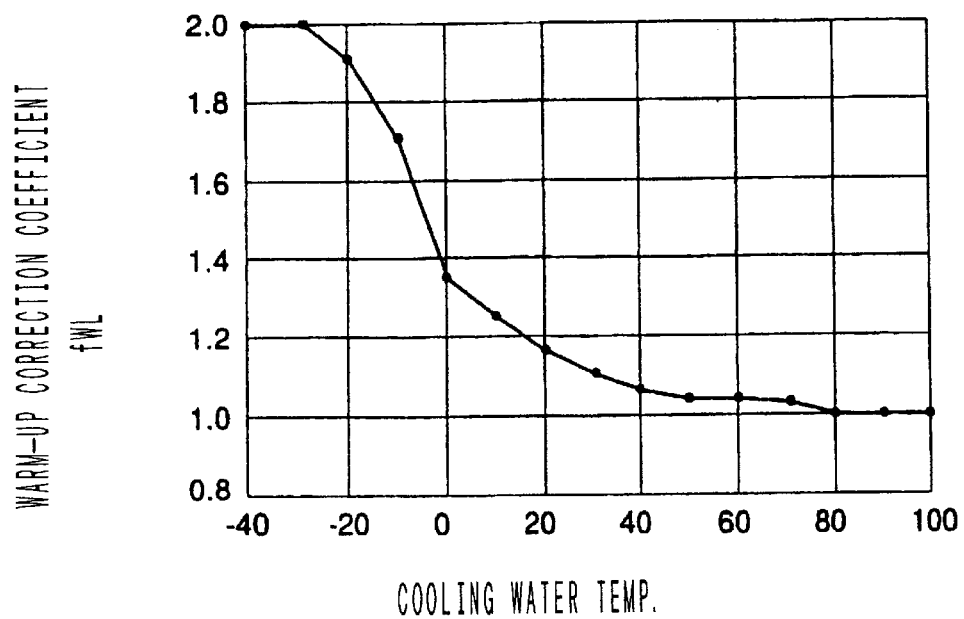
FIG. 7 is a characteristic chart of a warm-up correction coefficient fWL incorporated in the engine controller 13.

The program shown in FIG. 5 is an interrupt program which is initiated when the communication circuit 1307 receives communication data. In step S5100, the vehicle driving power demand value Pv* transmitted from the hybrid controller 16 connected via the communication terminal 1313 is read in. In the next step S5102, the system judges the vehicle driving power demand value Pv* transmitted from the hybrid controller 16; if the data is 0FFFFH, then it determines that the program is being initiated and proceeds to step S5110. Incidentally, the data "0FFFFH" is used as the data indicating that the engine is being started up.

In step S5110, the system determines whether the engine 1 is idling on combustion by checking whether the engine rpm Ne is higher than a predetermined idling rpm Neidl; if it determines that the engine is not idling (NO), then it proceeds to step S5112 where it sets the engine rpm command value Ne* at a start-up speed NeSTA. If the system decides in step S5110 that the engine is idling (YES), then it goes to step S5116 where it sets the 0FFFFH data for the engine rpm command value Ne*, then proceeds to S5114. In step S5114, the system sets a throttle opening θTH at the engine start-up to zero to implement idling, and it resets an adjusting amount TH of the intake air volume regulating means 6 to zero before it proceeds to step S5122.

If the judgment result given in step S5102 indicates that the data is not 0FFFFH (NO), then the system determines that the program is not being initiated, and proceeds to step S5104. In step S5104, the system judges whether the vehicle driving power demand value Pv* is zero; if the judgment result indicates that the value is zero (YES), then the system proceeds to step S5118 where it sets the 0FFFFH data for the engine rpm command value Ne* and sets the throttle opening θTH to zero in step S5120, then proceeds to step S5122. If the judgment result in step S5104 is negative, then the system decides in the following step S5106 the operating point of the engine 1 according to the fuel consumption map of the engine 1 stored beforehand to calculate the engine rpm command value Ne*. The fuel consumption map has been stored in the form of a two-dimensional map which shows the fuel consumption (g/kWh) of the engine 1, with an engine output torque Me and the engine rpm Ne being the parameters, according to the characteristics shown in FIG. 8. Specifically, once the engine output torque Me* is decided, the engine operating point at which the best fuel economy is obtained (point C in FIG. 8), and the rpm can be obtained as the engine rpm command value Ne*.

Figure 9:
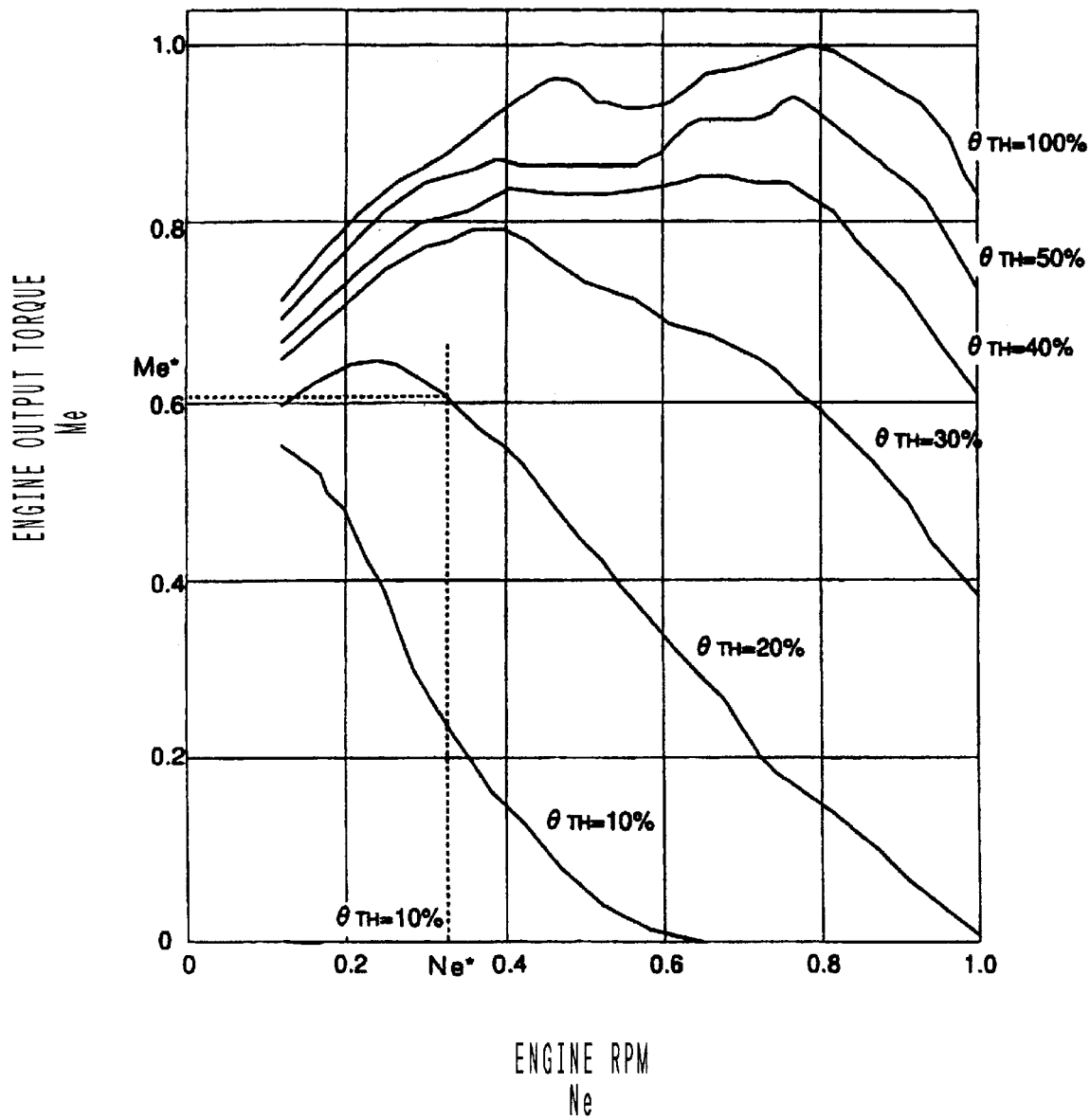
FIG. 9 is a characteristic chart illustrative of the target value of the throttle opening determined by the engine controller 13.

Further, in step S5108, the throttle opening θTH for the foregoing engine operating point is determined from the throttle opening map, and the adjusting amount TH of the intake air volume regulating means 6 which has been determined beforehand is calculated. The throttle opening map is prepared according to the characteristics of the engine 1 shown in FIG. 9. In FIG. 9, the engine rpm on the axis of abscissa is normalized at the maximum speed of the engine 1, while the engine output torque on the axis of ordinate is normalized at the maximum output torque of the engine 1. The throttle opening θTH of the engine 1 has been stored in the form of a two-dimensional map, with an engine output torque Me and the engine rpm Ne being the parameters thereof. Hence, in step S5108, based on the engine rpm command value Ne* and the engine output torque command value Me* determined in step S5106, a target throttle opening value θTH* is determined and the intake air volume adjusting amount TH is calculated from the target throttle opening value θTH*. The target throttle opening value θTH* is converted to the intake air volume adjusting amount TH according to the characteristic of the intake air volume regulating means 6 which has been determined in advance.

Next, in step S5122, the intake air volume regulating means 6 is controlled according to the intake air volume adjusting amount TH determined in step S5106 or step S5114. Further, in the next step S5124, the engine rpm command value Ne* determined in step S5106 or step S5112 is supplied to the communication circuit 1307 so as to transmit it to the hybrid controller 16. After completion of the processing described above, the system goes back to the main program before the interrupt program was started.

The configuration of the inverter 14 will be described in conjunction with FIG. 10.

Figure 10:
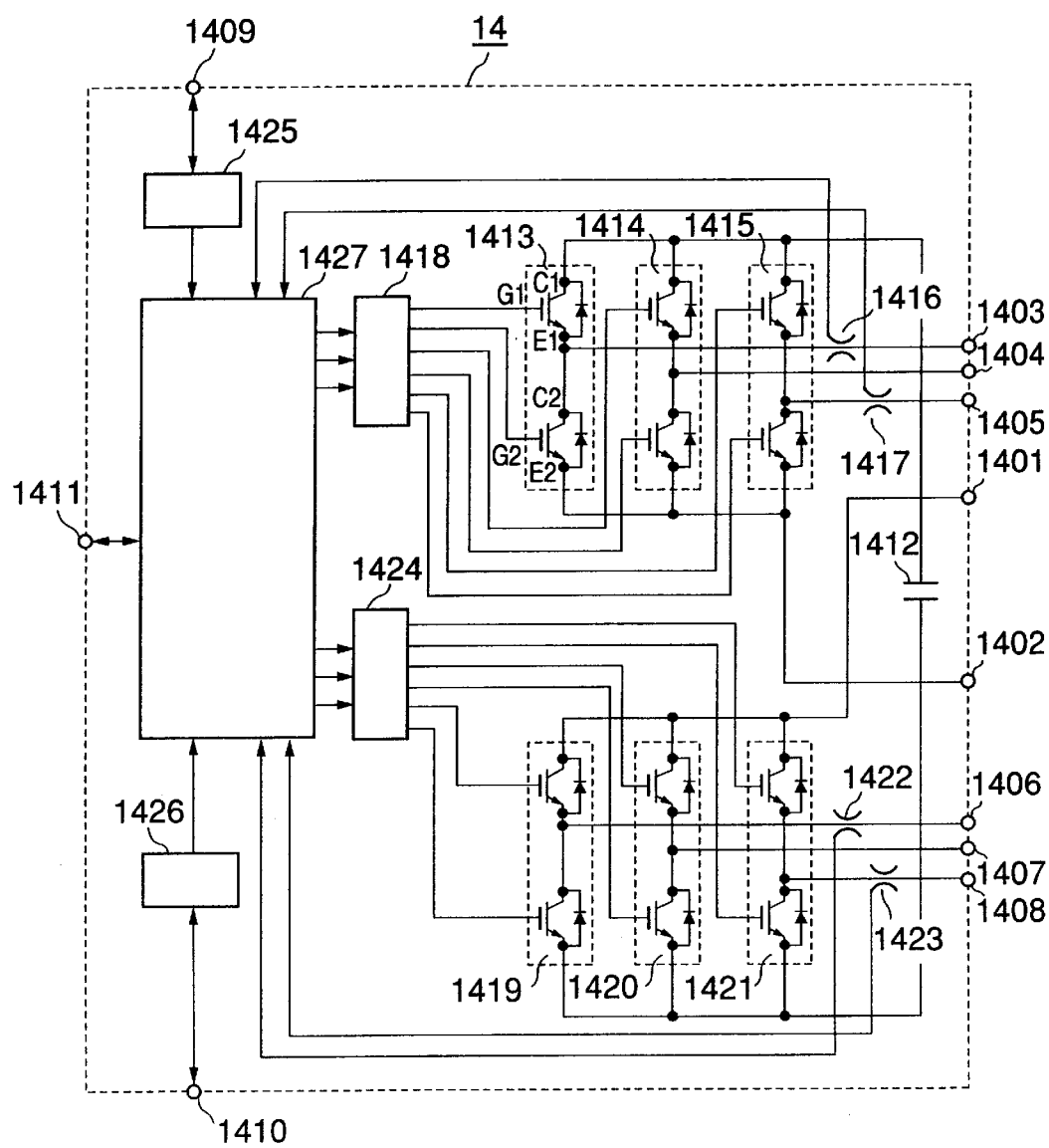
FIG. 10 is a block diagram of an inverter 14 in the present invention.

In FIG. 10, reference numerals 1401 and 1402 denote the main power input terminals connected to the positive terminal and the negative terminal of the electricity storing unit 15; and reference numerals 1403, 1404, and 1405 denote the output terminals from the inverter 14 and they are connected respectively to the windings of the U-phase, V-phase, and W-phase included in the first rotary electric unit 2000. Likewise, reference numerals 1406, 1407, and 1408 denote the output terminals from the inverter 14 and they are connected to the windings of the U-phase, V-phase, and W-phase included in the second rotary electric unit 3000. Reference numeral 1409 indicates the terminal for the connection with the rotation sensor 2911 built in the power transmitting means 12, and reference numeral 1410 indicates the terminal for the connection with the rotation sensor 2912 built in the power transmitting means 12; they are respectively used for energizing signals and rotor position signals (sin signals and cos signals), and they have a differential composition. Reference numeral 1411 indicates a communication terminal for the communication with the vehicular power source control unit 13; it is configured so as to permit the publicly known serial communication connection. Reference numeral 1412 denotes an input capacitor which is connected between the input terminals 1401 and 1402.

Reference numerals 1413, 1414, 1415, 1419, 1420, and 1421 denote publicly known IGBT modules, each of which includes two IGBT devices and two flywheel diodes. Terminal C1 of the IGBT module 1413 is connected to the input terminal 1401, a terminal E2 is connected to the input terminal 1402, and a terminal C2 and a terminal E1 are connected to the output terminal 1403 so as to drive the U-phase winding of the first rotary electric unit 2000.

As in the case of the IGBT module 1413, the IGBT modules 1414 and 1415 are configured to drive the V-phase winding and the W-phase winding Of the first rotary electric unit 2000 as illustrated. The IGBT modules 1419, 1420, and 1421 are configured as illustrated to drive the U-phase winding, the V-phase winding, and the W-phase winding of the second rotary electric unit 3000. Reference numerals 1416, 1417, 1422, and 1423 denote publicly known current sensors; they are, for example, clamp type or non-contact type employing Hall elements, and they respectively detect the currents flowing through the terminals 1403, the terminal 1405, the terminal 1406, and the terminal 1408 and output the detection results in terms of voltage signals. Reference numeral 1418 denotes a publicly known gate driver which drives the gates of the IGBT elements incorporated in the IGBT modules 1413, 1414, and 1415. Reference numeral 1424 denotes a publicly known gate driver which drives the gates of the IGBT elements incorporated in the IGBT modules 1419, 1420, and 1421.

Reference numeral 1425 indicates a signal processor of the rotation sensor 2911 included in the power transmitting means 12; although the details thereof are not given, it issues a sinusoidal energizing signal of approximately 7 kHz through the terminal 1409, receives the rotor position signal (sin signal and cos signal) from the rotation sensor 2911 through the terminal 1409 to determine the position of the rotor, and outputs it in a 10-bit parallel mode. Reference numeral 1426 also indicates a signal processor of the rotation sensor 2912 included in the power transmitting means 12; it receives the rotor position signal (sin signal and cos signal) from the rotation sensor 2912 through the terminal 1410 to determine the position of the rotor, and outputs it in the 10-bit parallel mode.

Reference numeral 1427 indicates a control unit which employs, for example, a publicly known single-chip microcomputer; it controls the first rotary electric unit 2000 in exact accordance with the first torque command value Mm1* by carrying out the publicly known vector control by the program stored in the built-in ROM according to the first torque command value Mm1*, which is the torque command value for the first rotary electric unit 2000 received through the terminal 1411, the rotor position of the first rotary electric unit 2000, which is the output of the signal processor 1425, and the current flowing through the U-phase winding and the W-phase winding of the first rotary electric unit 2000, which are the outputs of current sensors 1416 and 1417; it also controls the second rotary electric unit 3000 in exact accordance with the second torque command value Mm2* by carrying out the publicly known vector control by the program stored in the built-in ROM according to the second torque command value Mm2*, which is the torque command value for the second rotary electric unit 3000, the rotor position of the second rotary electric unit 3000, which is the output of the signal processor 1426, and the current flowing through the U-phase winding and the W-phase winding of the second rotary electric unit 3000, which are the outputs of current sensors 1422 and 1423.

Figure 11:
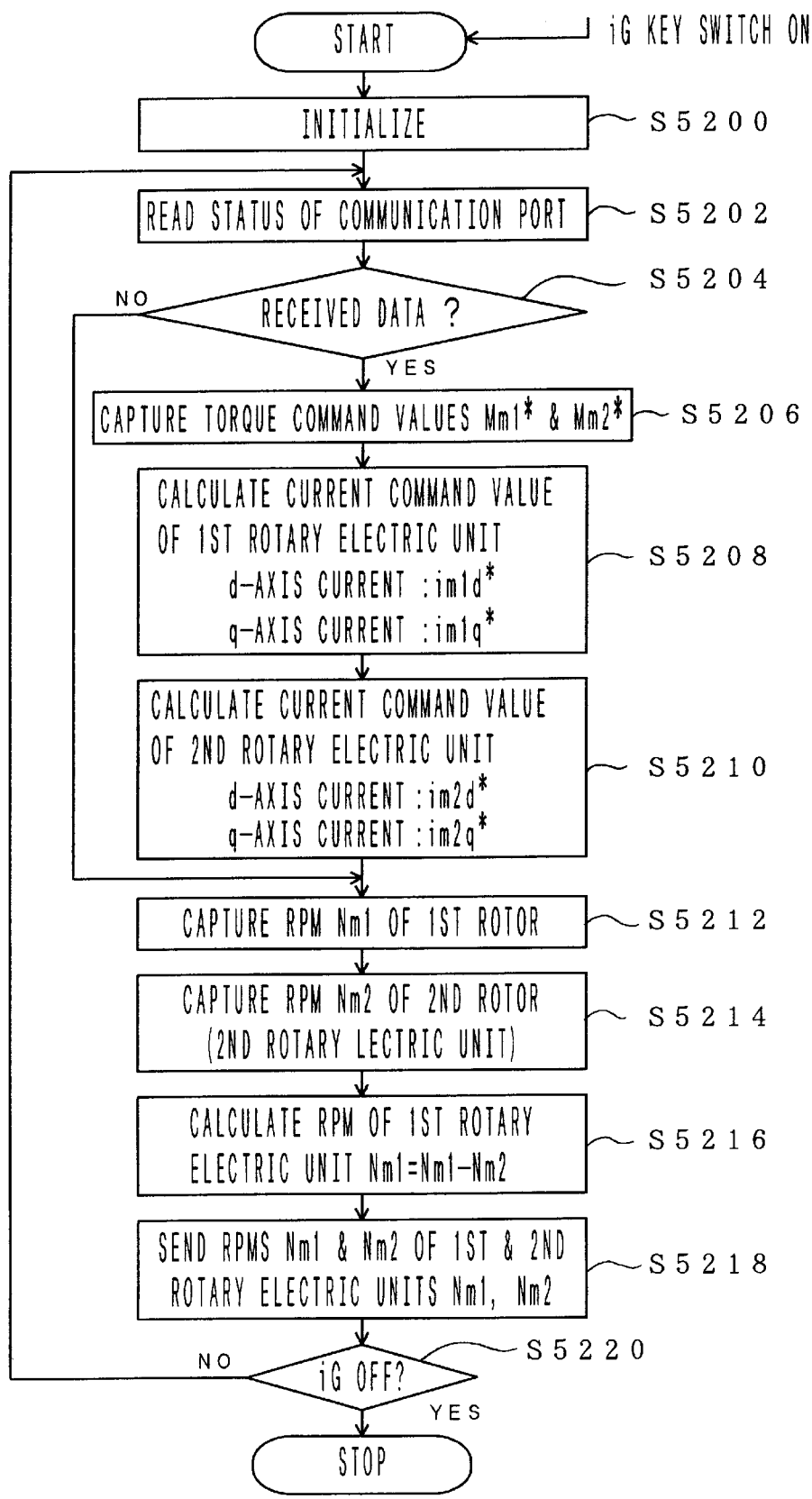
FIG. 11 is a flowchart illustrative of a main program of the control of the inverter 14.
Figure 12:
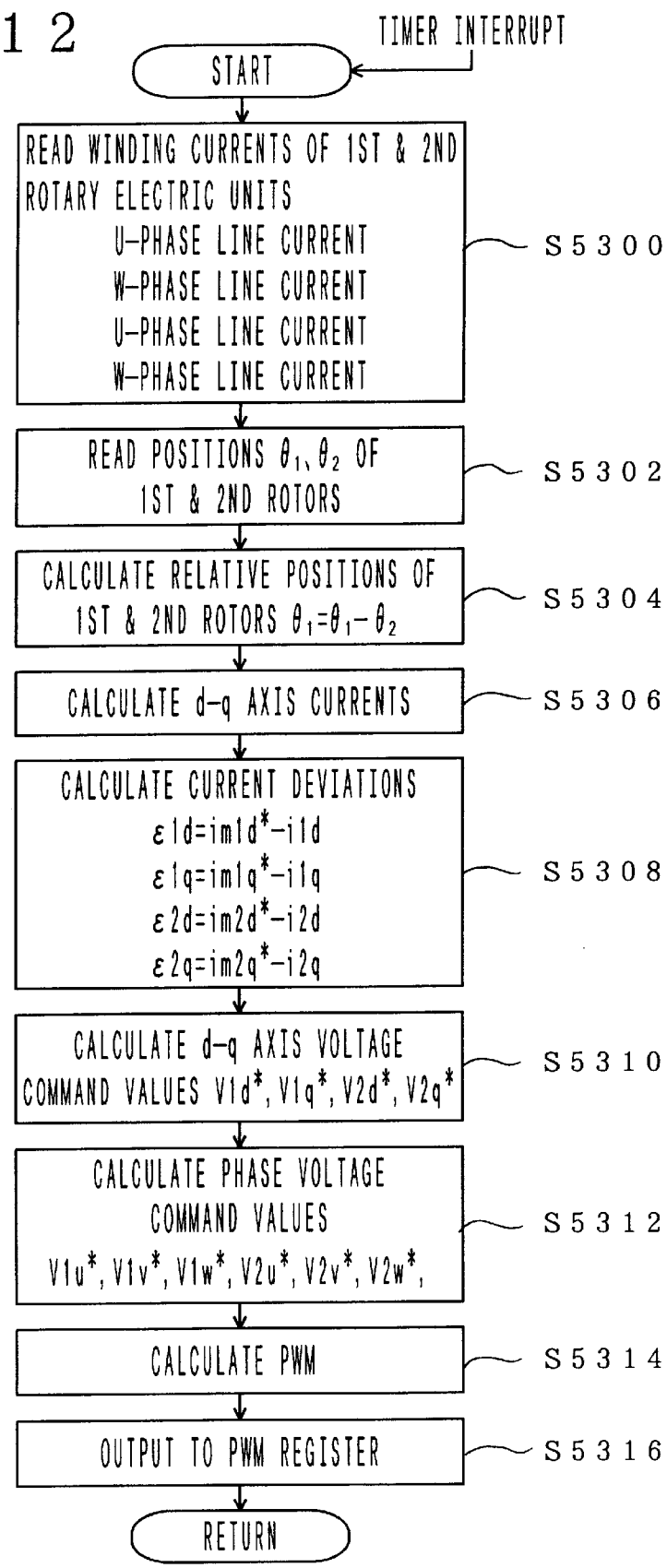
FIG. 12 is a flowchart illustrative of an interrupt program of the control of the inverter 14.

FIG. 11 and FIG. 12 show flowcharts illustrative of the configurations of the control programs stored in the built-in ROM of the control unit 1427; they show a main program and an interrupt program, respectively.

The main program shown in FIG. 11 is started when the iG key switch of a vehicle is turned ON. Step S5200 initializes the variable allotted to the RAM built in the control unit 1427 and the general registers of I/O ports or the like. In particular, ad-axis current command value im1d* and a q-axis current command value im1q* of the first rotary electric unit 2000, and a d-axis current command value im2d* and a q-axis current command value im2q* of the second rotary electric unit 3000, which will be discussed later, are initialized to zero.

In step S5202, the system reads the status of a communication port incorporated in the control unit 1427 and captures a flag indicating whether data has been received through the communication port. In step S5204, the system determines whether data has been received, and if no data has been received, then it proceeds to step S5212.

If data has been received, then the system proceeds to step S5206 where it captures the first torque command value Mm1* and the second torque command value Mm2*, which are the received data, and stores them in the variable area of the built-in RAM. Subsequently, in step S5208, based on the first torque command value Mm1* stored in step S5206, the d-axis current command value im1d* and the q-axis current command value im1q* which are the current components in the d-q axis coordinate system, the coordinates of which are established in the direction of the magnetic field of a publicly known rotor, not shown, and in the direction orthogonal thereto, are calculated as the command values of the currents to be supplied to the respective phase windings of the first rotary electric unit 2000. At this time, publicly known vector arithmetic operation is performed according to the first torque command value Mm1*, the rpm Nm1 of the first rotary electric unit 2000 which has been calculated in the previous processing (the calculated value in step S5216 to be described later), and a motor constant such as inductance L and primary resistance R of the first rotary electric unit 2000 stored in the ROM so as to determine the d-axis and q-axis current command values im1d* and im1q*.

In step S5210, based on the second torque command value Mm2* stored in step S5206, the d-axis current command value im2d* and the q-axis current command value im2q* which are the current components in the d-q axis coordinate system, the coordinates of which are established in the direction of the magnetic field of a publicly known rotor, not shown, and in the direction orthogonal thereto, are calculated as the command values of the currents to be supplied to the respective phase windings of the second rotary electric unit 3000. The d-axis and q-axis current command values im2d* and im2q* are also calculated by known vector arithmetic operation.

Subsequently, in step S5212, the rpm Nm1 of the first rotor 2010, which is the revolution information on the first rotary electric unit 2000, is captured from the signal processor 1425 and the data is stored in the built-in memory. In step S5214, the rpm Nm2 of the second rotor 2310, which is the revolution information on the second rotary electric unit 3000, is captured from the signal processor 1426 and the data is stored. In step S5216, the rpm of the first rotary electric unit is calculated. The first rotary electric unit is composed of the first rotor 2010 and the second rotor 2310, and the rpm Nm1 of the first rotor captured in step S5212 is the rpm based on the stator 3010; therefore, the rpm of the first rotary electric unit is determined from formula 1 below:

$$Nm1 = Nm1 - Nm2 \qquad \text{Formula 1}$$

In step S5218, the rpm Nm1 of the first rotary electric unit 2000 calculated in step S5216 and the rpm Nm2 of the second rotary electric unit 3000 captured in step S5214 are transmitted to the hybrid controller 16 through the output terminal 1411. Next, in step S5220, the system determines whether the iG key switch of the vehicle has been turned OFF; if it decides that the key switch has not been turned OFF, then it goes back to step S5202, or if it decides that the key switch has been turned OFF, then it terminates the program.

The configuration of the interrupt program will now be explained in conjunction with the flowchart shown in FIG. 12. The interrupt program is configured such that it is initiated at a timer interrupt at predetermined time intervals; in steps S5300, U-phase line current i1u and W-phase line current i1w of the first rotary electric unit 2000 and U-phase line current i2u and W-phase line current i2w of the second rotary electric unit 3000, which are the outputs of the current sensors 1416, 1417, 1422, and 1423, are read and stored in the variable area of the built-in RAM of the control unit 1427. Next, in step S5302, a rotor position θ1 of the first rotor 2010 in the first rotary electric unit 2000 and a rotor position θ2 of the second rotor 2310 in the second rotary electric unit 3000 are read and stored in the variable area of the built-in RAM of the control unit 1427. At this time, the rotor position θ2 of the second rotor 2310 is identical to the rotor position of the second rotary electric unit 3000.

Subsequently, in step S5304, the relative rotational position of the first rotor 2010 and the second rotor 2310 is calculated to provide the rotor position θ1 of the first rotary electric unit 2000 (θ1=θ1−θ2). In step S5306, based on the foregoing U-phase line current i1u and the W-phase line current i1w and the rotor position θ1, the three-phase AC current flowing through the windings of the first rotary electric unit 2000 is converted to a d-axis current i1d and a q-axis current i1q which are the current components in the d-q axis coordinate system, the coordinates of which are established in the direction of the magnetic field of a publicly known rotor, not shown, and in the direction orthogonal thereto. Based on the foregoing U-phase line current i2u and the W-phase line current i2w and the rotor position θ2, the three-phase AC current flowing through the windings of the second rotary electric unit 3000 is converted to a d-axis current i2d and a q-axis current i2q which are the current components in the d-q axis coordinate system, the coordinates of which are established in the direction of the magnetic field of a publicly known rotor, not shown, and in the direction orthogonal thereto.

Next, in step S5308, current deviations ε1d, ε2d, ε1q, and ε2q for the d-axis component and the q-axis component, respectively, are calculated according to the d-axis current command values im1d*, im2d* and the q-axis current command values im1q*, im2q*, and the d-axis current i1d, i2d and the q-axis current i1q, i2q which have been stored in the variable area of the built-in RAM of the control unit 1427.

Next, in step S5310, a d-axis voltage command value V1d* and a q-axis voltage command value V1q* which are the d-q axis components of the voltage to be applied to the first rotary electric unit 2000 are calculated according to the current deviations ε1d, ε1q calculated in step S5306 and the electrical constant of the first rotary electric unit 2000. Further, a d-axis voltage command value V2d* and a q-axis voltage command value V2q* which are the d-q axis components of the voltage to be applied to the second rotary electric unit 3000 are calculated according to the current deviations ε2d and ε2q calculated in step S5308 and the electrical constant of the second rotary electric unit 3000. In step S5312, phase voltage command values V1u*, V1v*, and V1w* of the three-phase AC are calculated from the d-axis voltage command value V1d* and the q-axis voltage command value V1q* of the first rotary electric unit 2000, and phase voltage command values V2u*, V2v*, and V2w* of the three-phase AC are calculated from the d-axis voltage command value V2d* and the q-axis voltage command value V2q* of the second rotary electric unit 3000. In step S5314, the phase voltage command values V1u*, V1v*, V1w*, V2u*, V2v*, and V2w* are subjected to the calculation of pulse width modulation (PWM) with, for example, 10-kHz modulation frequency. In step S5316, the calculation result given in step S5314 is supplied to a PWM register built in the control unit 1427 before the routine processing is terminated.

The configuration of the hybrid controller 16 will now be described with reference to FIG. 13. Reference numerals 1600, 1601, 1602, and 1603 denote the input terminals of the hybrid controller 16. The input terminal 1600 is connected to the accelerator sensor 7 to receive accelerator signals; the input terminal 1601 is connected to the brake sensor 8 to receive brake signals; the input terminal 1602 is connected to the shift switch 9 to receive shift signals; and the input terminal 1603 is connected to the start switch 10 to receive start signals. Reference numerals 1604 and 1605 denote the communication terminals of the hybrid controller; they are connected to the engine controller 13 and the inverter 14, respectively, to permit exchange information necessary for the control. Reference numeral 1610 indicates an analog signal input section constructed by a publicly known voltage amplifier circuit composed of an operational amplifier; it amplifies the voltage level to the accelerator signal received through the input terminal 1600 to a predetermined voltage level. Reference numeral 1620 denotes a digital signal input section constructed by a publicly known digital signal input circuit composed of a comparator or a transistor; it converts the brake signal received through the input terminal 1601, the shift signal received through the input terminal 1602, and the start signal received through input terminal 1603 to TTL-level signals.

Reference numeral 1630 denotes a control unit for conducting the control of the hybrid controller 16; it is constituted primarily by a publicly known signal-chip microcontroller and it includes a ROM where control programs and data are stored, a RAM required for arithmetic operation, an A/D converter for capturing analog signals, a serial communication function, etc. The control unit 1630 is connected to the analog signal input section 1610 and the digital signal input section 1620 to capture an accelerator lift ACC, a brake state BRK, a shift position SFT, and a startup state STA. Reference numerals 1640 and 1650 denote communication sections composed of communication buffer circuits; they share the same configuration. The communication section 1640 is provided between the control unit 1630 and the communication terminal 1604, and the communication section 1650 is provided between the control unit 1630 and the communication terminal 1605.

Figure 14:
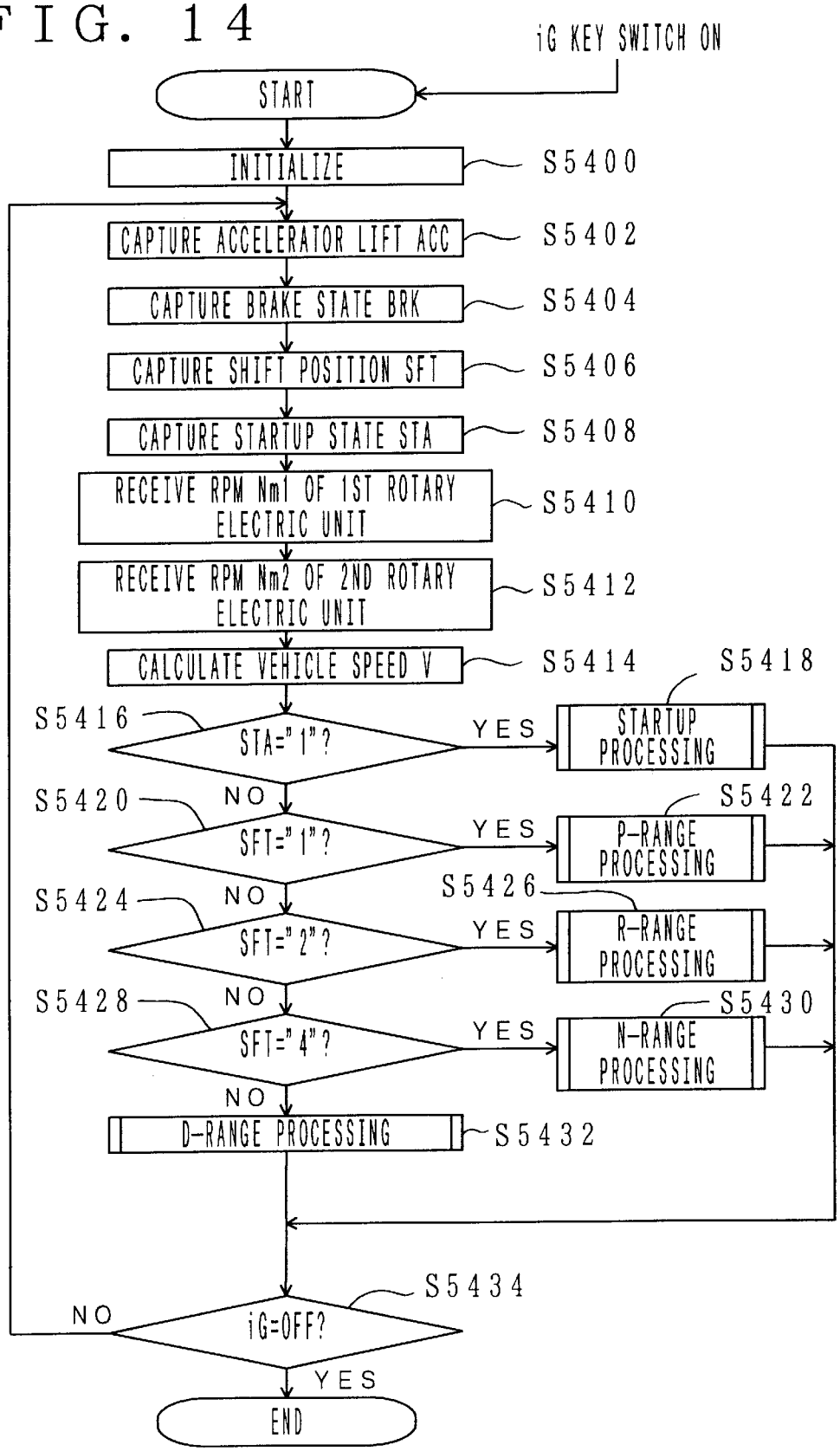
FIG. 14 is a flowchart illustrative of a main program of the hybrid controller 16.

The configuration of the control program stored in the ROM built in the control unit 1630 will now be described in conjunction with FIG. 14 through FIG. 19. FIG. 14 shows the main program, which is initiated when the iG key switch is turned ON. When the main program is started, initialization is implemented in step S5400. During the initialization, the initial statuses of the I/O ports and communication ports built in the control unit are set, the data in the variable area allotted to the RAM built in the control unit is initialized, and the stack pointers are initialized.

Next, in step S5402, the accelerator signal received from the analog signal input section 1610 is subjected to A/D conversion and the accelerator lift ACC is captured. In the following step S5404, the brake state BRK is captured from the brake signal received from the digital signal input section 1620. The logic of the brake state BRK is configured such that it is "1" when a brake is operated or "0" when the brake is not operated. In the following step S5406, the shift position SFT is captured from the shift signal received from the digital signal input section 1620. The shift position SFT is composed of a 4-bit parallel signal, the logic of which is configured such that it switches to "1," "2," "4," or "8" when the shift switch 9 is set to parking (P), reverse (R), neutral (N), or drive (D).

In the next step S5408, the startup state STA is captured from the start signal received from the digital signal input section 1620. The logic of the startup state STA is configured such that it switches to "11" when the iG key switch is turned ON, while it stays at "0" when the iG key switches stays OFF. In the next step S5410, the rpm Nm1 of the first rotary electric unit 2000 is received from the inverter 14 via the communication buffer 1650. Further in the next step S5412, the rpm Nm2 of the second rotary electric unit 3000 is received from the inverter 14 via the communication buffer 1640. In step S5414, vehicle speed V is calculated according to the rpm Nm2 by using formula 2:

$$V = C1 \times Nm2 \quad \text{Formula 2}$$

where C1 indicates a coefficient.

In the following step S5416, the system judges whether the startup state STA is "1": if it decides that the state is "1" (YES), which means that the engine is in the startup state, then it implements engine start processing in step S5418 and proceeds to step S5434. If the system decides that the startup state STA is "0" (NO) in step S5416, then it goes to step S5420. In step S5420, the system further judges whether the shift position SFT is "P"; if it finds that the shift position is "P" (YES), then it carries out the processing for the P range (parking) in step S5422, and proceeds to step S5434. If the system decides that the shift position is not "P" (NO) in step S5420, then it proceeds to step S5424.

In step S5424, the system judges whether the shift position SFT is "R": if it decides that the shift position is "R" (YES), then it carries out the processing for the R range (reverse) in step S5426 before proceeding to step S5434. If the system decides in step S5424 that the shift position is not "R" (NO), then it goes to step S5428. In step S5428, the system decides whether the shift position SFT is "N"; if it decides that the shift position is "N" (YES), then it implements the processing for the N range (neutral) in step S5430 before it advances to step S5434. If the system decides in step S5424 that the shift position is not "N" (NO), then it goes to step S5432. In step S5432, the system carries out the processing for the D range (drive forward) because the shift position SFT is "D"; then it proceeds to step S5434. In step S5434, the system determines whether the IG key switch has been turned OFF; if it determines that the IG key switch has not been turned OFF (NO), then the system goes back to step S5402 to repeat the aforesaid processing. If the system determines that the IG key switch has been turned OFF (YES), then the program is terminated.

The engine start processing in step S5418 in the program illustrated in FIG. 14 will now be described with reference to FIG. 15. The start processing sets the vehicle driving torque command value Mv* to 0 in step S5500. In the following step S5502, the vehicle driving power demand value Pv* is set to 0FFFFH (hexadecimal). In the following step S5504, the vehicle driving power demand value Pv* which has been set in step S5502 is transmitted to the engine controller 13. In the next step S5506, the engine rpm command value Ne* is received through the communication port connected to the engine controller 13.

In the next step S5508, the first and second torque command values Mm1* and Mm2* of the first and second rotary electric units 2000 and 3000, respectively, are calculated. This calculation is accomplished by calling up the sub-routine shown in FIG. 16. Further, in the next step S5510, the first and second torque command values Mm1* and Mm2*, which are the torque command values of the first and second rotary electric units 2000 and 3000, respectively, calculated in step S5508, are transmitted to the inverter 14 via the communication ports and the communication buffer 1650 incorporated in the control unit 1630.

The sub-routine called up in step S5508 will be described in conjunction with FIG. 16. In step S5600, the system determines whether the engine rpm command value Ne* received from the engine controller 13 is 0FFFFH. If the determination result is positive, then the system goes to step S5606 where it sets the first torque command value Mm1* to zero, and proceeds to step S5608.

If the determination result in step S5600 is negative, then the system proceeds to step S5602; in step S5602, the system calculates the speed deviation $\epsilon i$ of the current engine rpm Ne from the engine rpm command value Ne* according to formula 3:

$$\epsilon i = ((Ne^* - Ne) + C2 \times \epsilon i - 1)/(1 + C2) \quad \text{Formula 3}$$

where C2 denotes a preset coefficient, and i denotes the number of calculations.

Figure 2:
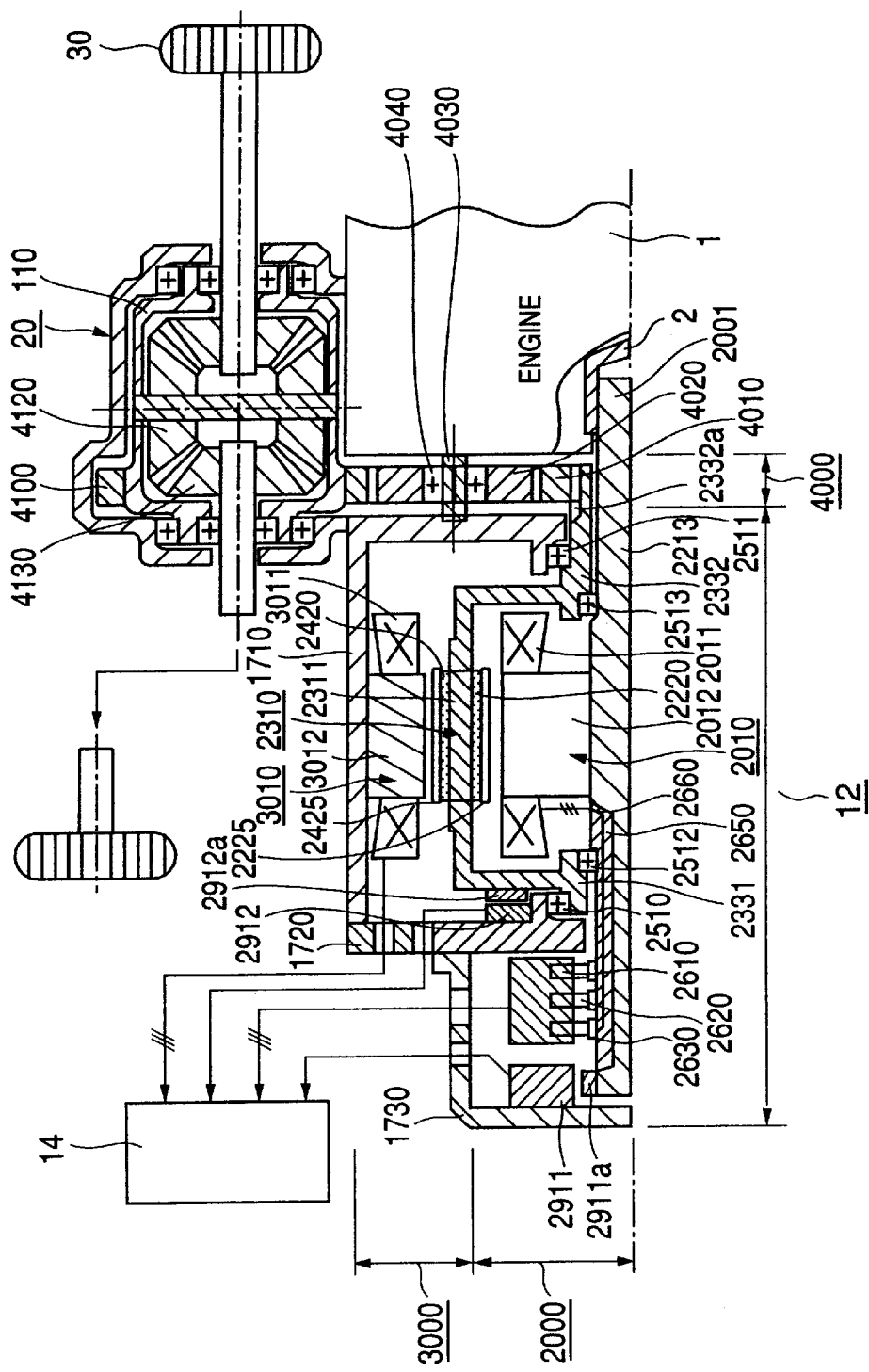
FIG. 2 is a block diagram of a power transmitting means 12 in the present invention.

In this case, the current engine rpm Ne is identical to that of the first rotor 2010 and the output shaft 2 of the engine 1 shown in FIG. 2; hence, it is determined by formula 4 according to the revolution speeds Nm1 and Nm2 of the first and second rotary electric units 2000 and 3000, respectively, which have been received from the inverter 14:

$$Ne = Nm1 + Nm2 \quad \text{Formula 4}$$

In the next step S5604, the first torque command value Mm1* to be applied to the first rotary electric unit 2000 is calculated according to formula 5:

$$Mm1^* = Mm1^* + K1 \times ei + K2 \times ei-1 + K3 \times ei-2 \quad \text{Formula 5}$$

where K1, K2, and K3 in formula 5 are coefficients.

Further in step S5608, the torque command value Mm2* to be applied to the second rotary electric unit 3000 is calculated according to formula 6, then the system goes back to the program wherein the sub-routine was called up.

$$Mm2^* = Mv^* - Mm1^* \quad \text{Formula 6}$$

The P-range processing in step S5422 in the program shown in FIG. 14 will now be described in conjunction with FIG. 17. In the P-range processing, the vehicle driving torque command value Mv* is set to 0 in step S5700. In the next step S5702, the vehicle driving power demand value Pv* is set to 0FFFFH (hexadecimal). In the following step S5704, the vehicle driving power demand value Pv* which has been set in step S5702 is transmitted to the engine controller 13. In the following step S5706, the engine rpm command value Ne* is received through the communication port connected to the engine controller 13. In the following step S5708, the first and second torque command values Mm1* and Mm2*, which are the torque command values of the first and second rotary electric units 2000 and 3000, respectively, are set to zero; and in the next step S5710, the first and second torque command values Mm1* and Mm2* are transmitted to the inverter 14 via the communication port and the communication buffer 1650.

Figure 18:
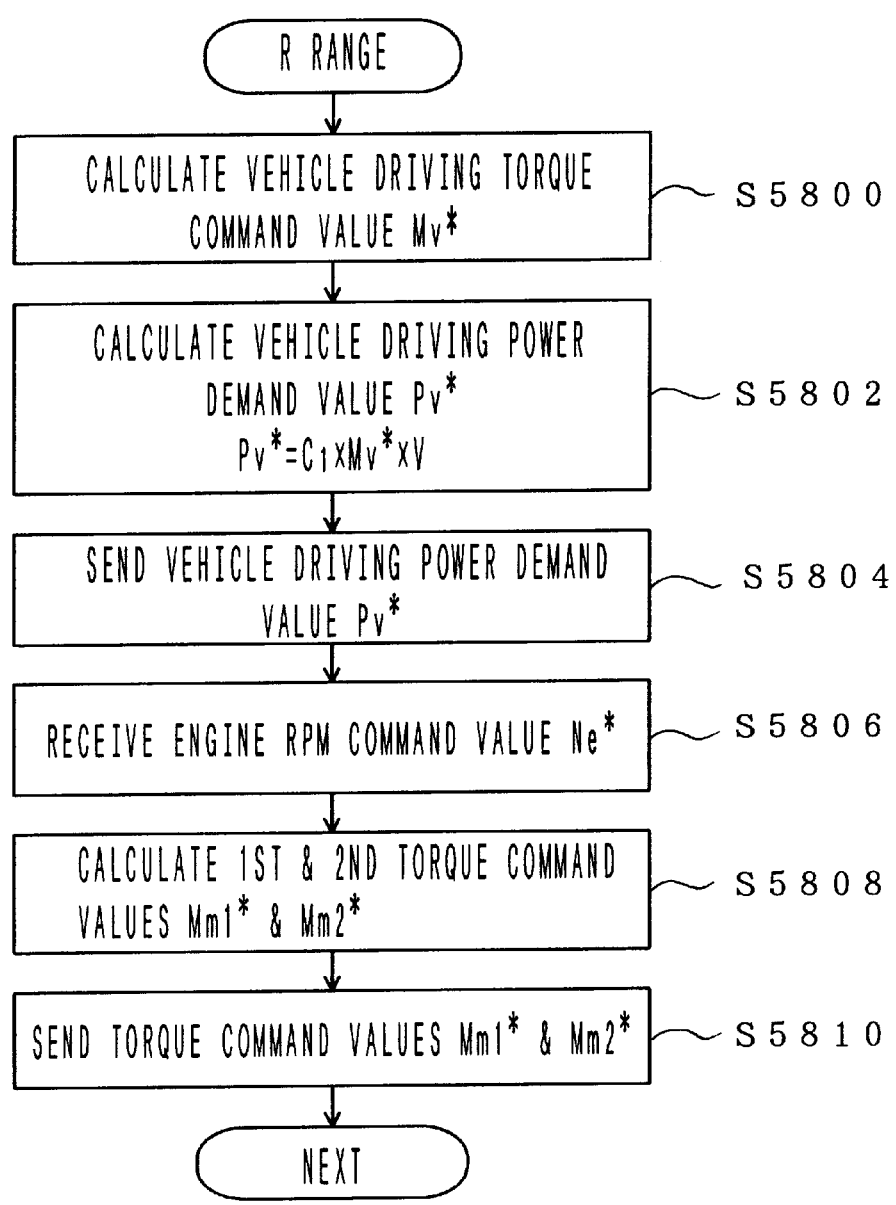
FIG. 18 is a flowchart illustrative of an R-range program of the hybrid controller 16.

The R-range processing in step S5426 in the program shown in FIG. 14 will now be described in conjunction with FIG. 18. In the R-range processing, the system first calculates the vehicle driving torque command value Mv* in step S5800.

Figure 21:
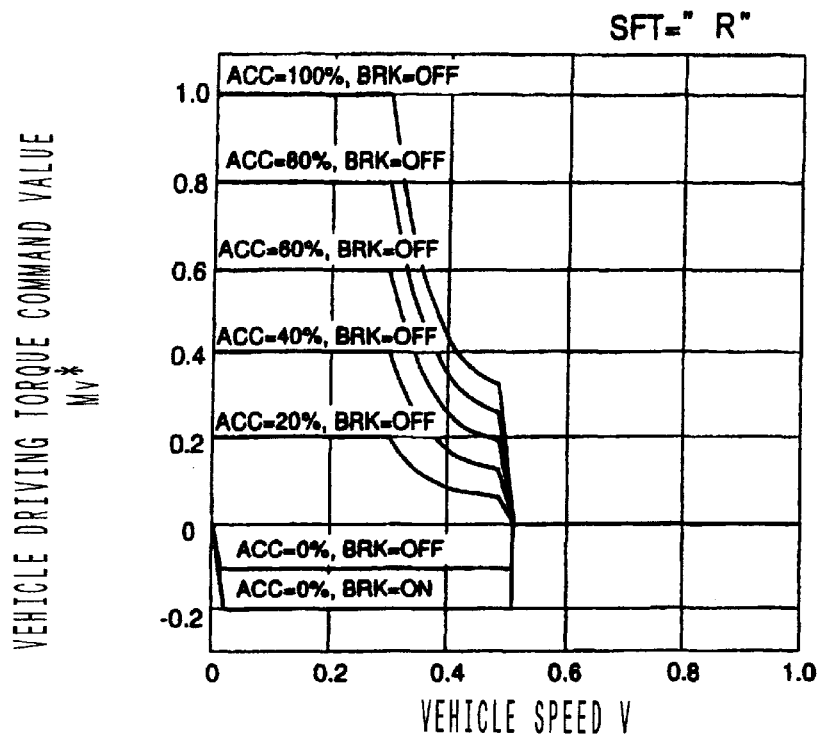
FIG. 21 is a characteristic chart illustrative of a vehicle driving torque command value determined by the hybrid controller 16.

The calculation is performed by searching a map by using the vehicle speed V, the accelerator lift ACC, the brake state BRK, and the shift position SFT as the input parameters. The map is stored in the ROM built in the control unit 1630; the map is configured according to the characteristic shown in FIG. 21. The characteristic illustrated in FIG. 21 is observed when the shift position SFT is the "R" range; it is the characteristic of the vehicle driving torque command value Mv* using the vehicle speed V, the accelerator lift ACC, and the brake state BRK as the parameters. The vehicle speed V in FIG. 21 is normalized at the maximum vehicle speed of the vehicle; the map to be stored is configured so that it is searched by the absolute value of the vehicle speed V.

In the next step S5802, the system calculates the vehicle driving power demand value Pv*. In this calculation, the vehicle driving power demand value Pv* is determined using the formula according to a coefficient Ca, the vehicle driving torque command value Mv*, and the vehicle speed V:

$$Pv^* = Ca \cdot Mv^* \cdot V$$

After that, in step S5804, the vehicle driving power demand value Pv* which has been set in step S5802 is transmitted to the engine controller 13. In the next step S5806, the engine rpm command value Ne* is received through the communication port connected to the engine controller 13. In the following step S5808, the first and second torque command values Mm1* and Mm2* which are the torque command values of the first and second rotary electric units 2000 and 3000 are calculated. This calculation is implemented by calling up the sub-routine of FIG. 16 as in the case of the start processing routine. In the following step S6010, the first and second torque command values Mm1* and Mm2* are transmitted to the inverter 14 via the communication port and the communication buffer 1650 built in the control unit 1630.

Figure 19:
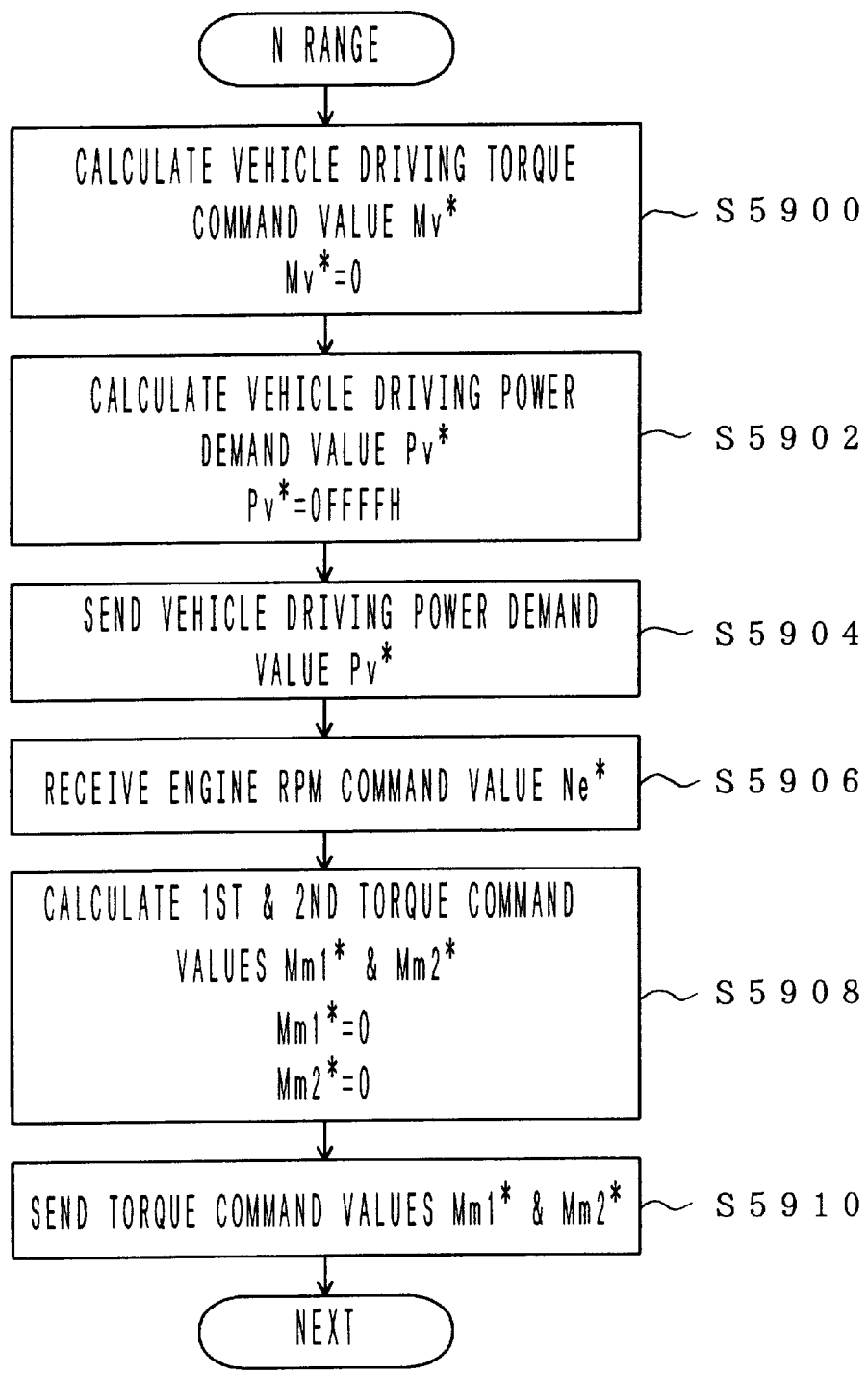
FIG. 19 is a flowchart illustrative of an N-range program of the hybrid controller 16.

The N-range processing in step S5430 in the program shown in FIG. 14 will now be described in conjunction with FIG. 19. In the N-range processing, the vehicle driving torque command value Mv* is set to 0 in step S5900. In the next step S5902, the vehicle driving power demand value Pv* is set to 0FFFFH (hexadecimal). In the following step S5904, the vehicle driving power demand value Pv* which has been set in step S5902 is transmitted to the engine controller 13. In the following step S5906, the engine rpm command value Ne* is received through the communication port connected to the engine controller 13. In the following step S5908, the first and second torque command values Mm1* and Mm2*, which are the torque command values of the first and second rotary electric units 2000 and 3000, respectively, are set to zero; and in the next step S5910, the first and second torque command values Mm1* and Mm2* are transmitted to the inverter 14 via the communication port and the communication buffer 1650.

Figure 22:
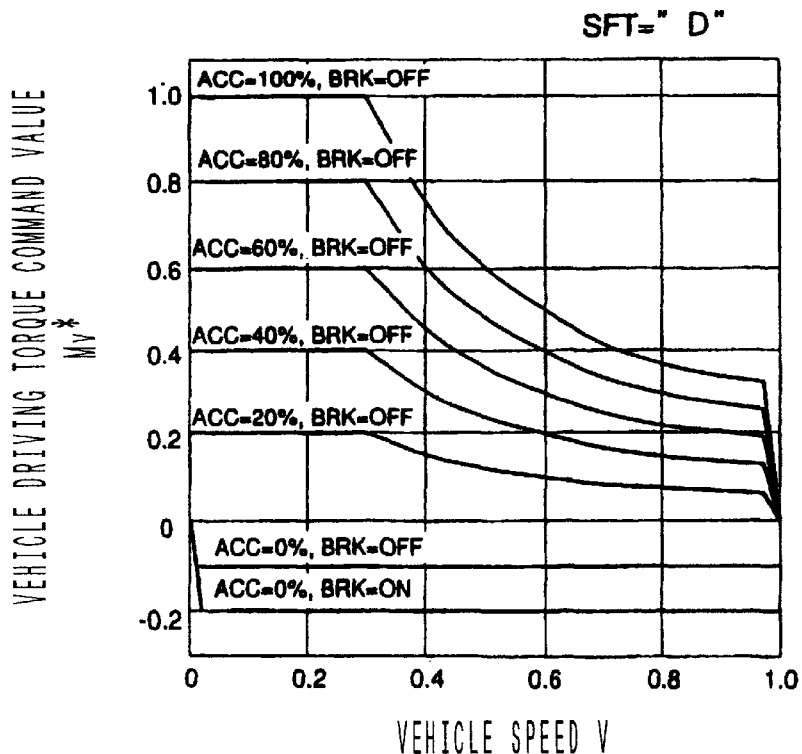
FIG. 22 is another characteristic chart illustrative of a vehicle driving torque command value determined by the hybrid controller 16.

The D-range processing in step S5432 in the program shown in FIG. 14 will now be described in conjunction with FIG. 20. In the D-range processing, the system first calculates the vehicle driving torque command value Mv* in step S6000. The calculation is performed by searching a map by using the vehicle speed V, the accelerator lift ACC, the brake state BRK, and the shift position SFT as the input parameters. The map is stored in the ROM built in the control unit 1630; the map is configured according to the characteristic shown in FIG. 22. The characteristic illustrated in FIG. 22 is observed when the shift position SFT is the "DI range; it is the characteristic of the vehicle driving torque command value Mv* using the vehicle speed V, the accelerator lift ACC, and the brake state BRK as the parameters, and it has the same configuration as that of FIG. 21. In the next step S6002, the system calculates the vehicle driving power demand value Pv*. In the following step S6004, the vehicle driving power demand value Pv* which has been set in step S6002 is transmitted to the engine controller 13. In step S6006, the engine rpm command value Ne* is received through the communication port connected with the engine controller 13.

In step S6008, the first and second torque command values Mm1* and Mm2* which are the torque command values of the first and second rotary electric units 2000 and 3000, respectively, are calculated. This calculation is implemented by calling up the sub-routine of FIG. 16 as in the case of the R-range routine. In the following step S6010, the first and second torque command values Mm1* and Mm2* are transmitted to the inverter 14 via the communication port and the communication buffer 1650 built in the control unit 1630.

The operation of the embodiment configured as described above will be explained. The description will be given to the startup state, the drive forward state, and the reverse drive state as the operation states. First, the startup state will be described. When an iG key switch, not shown, is turned ON, power is supplied from a 12-volt accessory battery, not shown, to the engine controller 13, the inverter 14, and the hybrid controller 16; and the programs stored in the built-in ROMs of the control unit 1306 in the engine controller 13, the control unit 1427 in the inverter 14, and the control unit 1630 in the hybrid controller 16 are initiated.

In the engine controller 13, the engine is not running and therefore no air is taken in, so that the intake air volume Q in step S5002 is zero; hence, the intake air volume Q0 per revolution calculated in step S5006 is zero. Therefore, the injection time TAU calculated in step S5011 will be only the invalid injection time Tv, so that even if the injection signal TAU is issued in step S5014, no fuel will be supplied to the engine 1 and the engine 1 stays at rest.

In the inverter 14, the program shown in FIG. 11 is initiated when the iG key switch is turned ON; in step S5200, the first and second torque command values Mm1*, Mm2* and the current command values im1d*, lm2d*, im1q*, and im2q* are initialized to zero. Immediately after the iG key switch is turned ON, there will be no communication with external equipment; hence, the determination result in step S5204 will be negative (NO) and the processing from step S5206 to step S5210 will not be implemented, and the torque control of the first and second rotary electric units carried out according to the flowchart of FIG. 12 is conducted with zero torque. In the program of FIG. 11, the rpms Nm1 and Nm2 captured in steps S5212 and S5214 are also zero, and the rpms Nm1 and Nm2 of the first and second rotary electric units which are transmitted to the outside in step S5218 are accordingly zero.

On the other hand, in the hybrid controller 16, the program of FIG. 14 is initiated and executed. The moment the start switch 10 is turned ON after the iG key switch is turned ON, the startup state STA captured in step S5408 is switched from "0" to "1." At this point, the engine 1 is not running and the first and second rotary electric units 2000 and 3000 are not running, either; therefore, the rpms Nm1 and Nm2 of the first and second rotary electric units which are received from the inverter in steps S5410 and S5412 are zero. In step S5416, however, the system determines that the startup state STA is "1" and the start processing of step S5418 is implemented. The program of FIG. 15 which shows the details of the start processing in step S5418 sets the vehicle driving torque command value Mv* to zero, sets the vehicle driving power demand value Pv* to 0FFFFH (hexadecimal), and sends it to the engine controller 13. 0FFFFH is the information for starting the engine 1 and it is not the absolute value of the vehicle driving power demand value itself. On the other hand, in the engine controller 13, the receive interrupt of FIG. 5 takes place, and the vehicle driving power demand value Pv* is received in step S5100 and a positive judgment result is given in step S5102; it is determined in step S5110 whether the engine rpm Ne is a predetermined idling speed Neidl or less until the engine starts to run on combustion. Since the engine 1 is not running at the startup, the system proceeds to step S5112 where it sets the engine rpm command value Ne* to an engine start speed NeSTA stored in the ROM beforehand, and sets the intake air volume adjusting amount TH to zero, then it goes to step S5122 where it controls the intake air volume regulating means 6 to fully close the throttle valve 5. Further, the system sends the engine start speed NeSTA to the hybrid controller 16.

Figure 15:
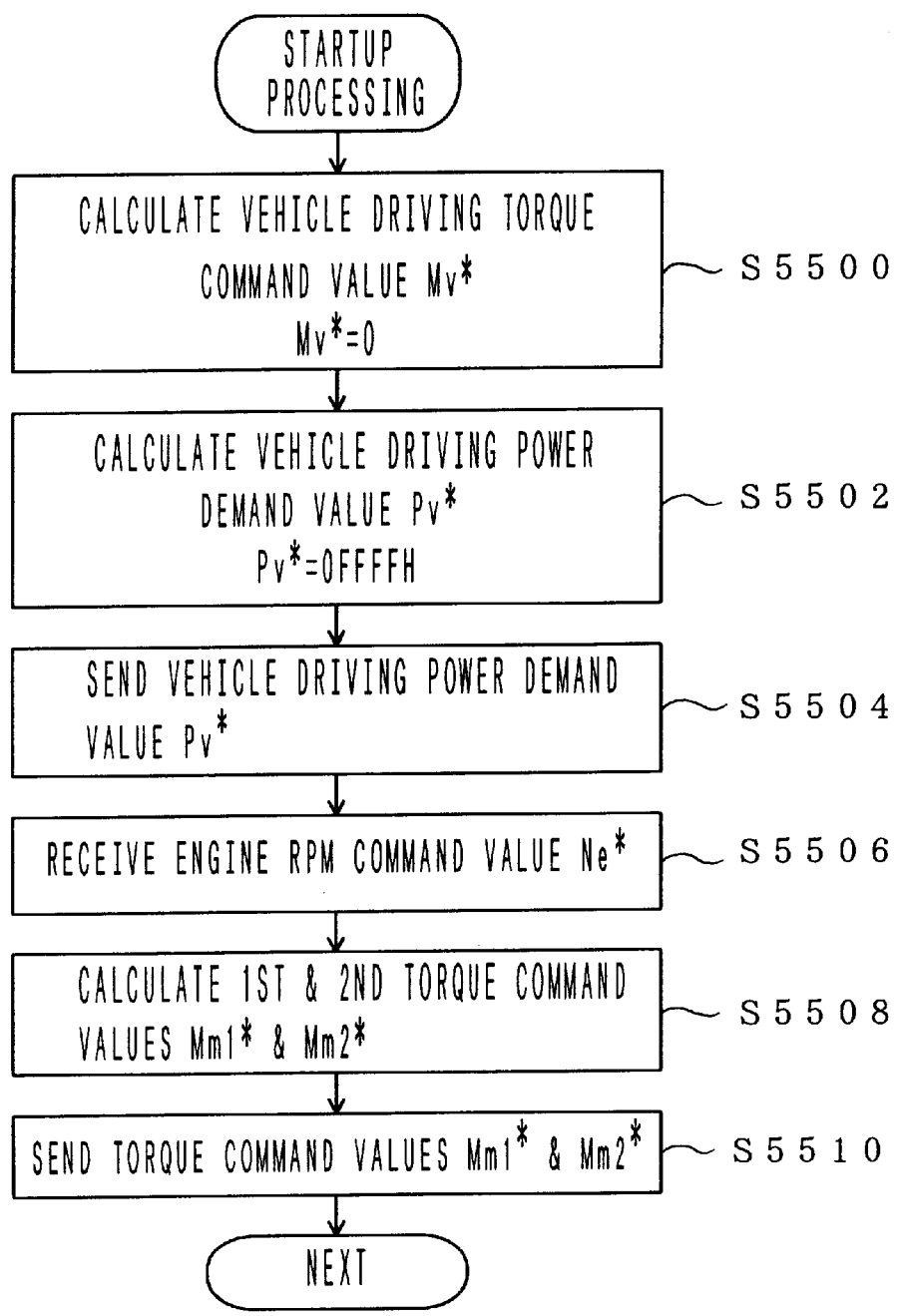
FIG. 15 is a flowchart illustrative of a starting program of the hybrid controller 16.

In the hybrid controller 16, according to the program of FIG. 15, the engine start speed NeSTA is received as the engine rpm command value Ne* in step S5506, and the first and second torque command values Mm1* and Mm2*, which are the torque command values of the first and second rotary electric units, respectively, are calculated in step S5508 according to the engine rpm command value Ne*, the vehicle driving torque command value Mv* which has been set to zero, and the rpm Nm1 of the first rotary electric unit received in step S5410. The calculation is implemented by calling up the sub-program shown in FIG. 16; the determined first and second torque command values Mm1* and Mm2* are transmitted to the inverter unit 14.

In the inverter unit 14, a positive determination result is given in step S5204 of the program shown in FIG. 11, and the first and second torque command values Mm1* and Mm2* are captured and stored in the memory in step S5206. Further, in step S5208, the publicly known vector calculation is carried out by using the first torque command value Mm1*, the rpm Nm1 of the first rotary electric unit calculated in step S5216 by the previous program execution, and the motor constants such as the inductance L and the primary resistance R of the first rotary electric unit stored in the ROM in order to calculate and store in memory the d-axis and q-axis current command values im1d* and im1q* as the current command values for energizing the first rotary electric unit 2000.

Further, in step S5210, the d-axis and q-axis current command values im2d* and im2q* are calculated as the current command values for energizing the second rotary electric unit 3000 and they are stored in memory. Based on the current command values im1d*, im1q*, im2d*, and im2q*, the inverter controls the first rotary electric unit 2000 and the second rotary electric unit 3000. This control is carried out by the program shown in FIG. 12. Further, the inverter 14 transmits the rpms Nm1 and Nm2 of the first rotary electric unit 2000 and the second rotary electric unit 3000, respectively, to the hybrid controller by the processing from steps S5212 to S5216.

Thus, the engine 1 is started by controlling the first rotary electric unit 2000 and the second rotary electric unit 3000; when the engine starts to run on combustion, a positive determination result is given in step S5110 in the program of FIG. 5, and 0FFFFH of the engine rpm command value Ne* is sent to the hybrid controller 16. In the hybrid controller 16, a positive determination result is given in step S5600 of the program of FIG. 6, and the first torque command value 4 Mm1* is set to zero. Therefore, if the start switch of the IG key switch is turned OFF under the condition, the engine idles with the vehicle at rest.

Figure 25:
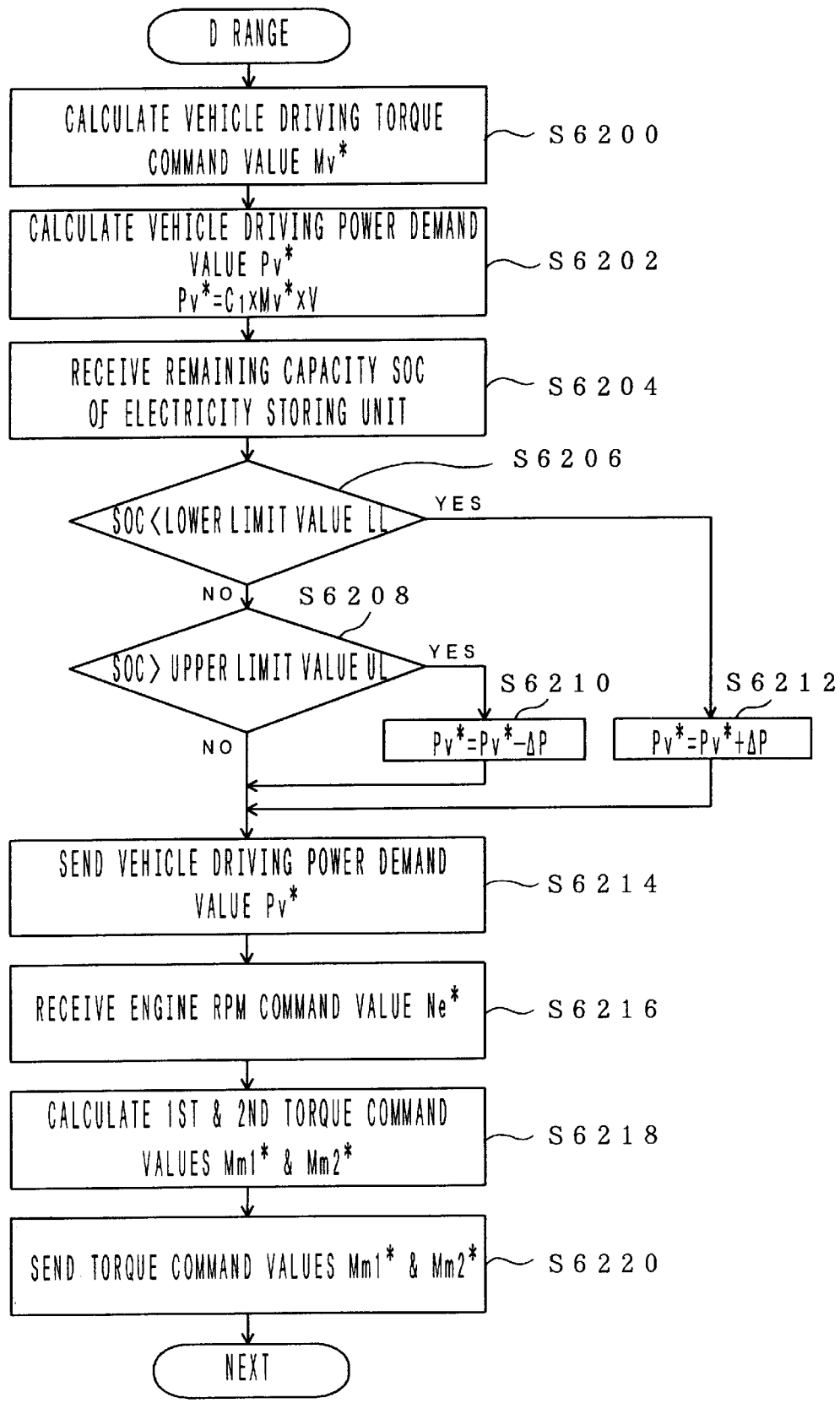
FIG. 25 is a flowchart illustrative of the D-range program of the hybrid controller 16.

The drive forward state will now be described. Setting the shift lever to the D range engages the drive forward state. When the shift lever is set to the D range, the shift position SFT captured by the hybrid controller 16 is switched to "8," and the D-range processing is implemented in step S5432 of the program of FIG. 14. The program shown in FIG. 25 gives the details of the D-range processing. At this time, if the accelerator lift ACC is zero, then the state is the same as that following the startup, but if the accelerator pedal is depressed, a large torque, 20%, is produced. In step S6002 in the D-range processing, the vehicle driving power demand value Pv* is calculated; when the vehicle is at rest, the vehicle speed v is zero, so that the vehicle driving power demand value Pv* is accordingly zero. This vehicle driving power demand value Pv* is sent to the engine controller 13.

On the other hand, the engine controller 13 receives the vehicle driving power demand value Pv* in step S5100 of FIG. 5; a negative determination result is given in step S5102 and a positive determination result is given in step S5104. Hence, the engine rpm command value Ne* decided in the engine controller 13 is 0FFFFH, and the intake air volume adjusting * amount TH becomes zero. Since the control is conducted with the intake air volume adjusting amount TH being zero, so that the engine 1 stays in the idling state. On the other hand, in the hybrid controller 16, since the vehicle is at rest and the engine 1 is running at the idling speed Neidl, the rpm Nm1 of the first rotary electric unit 2000 received in step S5410 is the same rpm Neidl as the engine rpm; the rpm Nm2 of the second rotary electric unit 3000 received in step S5412 is zero since the vehicle is at rest.

Figure 16:
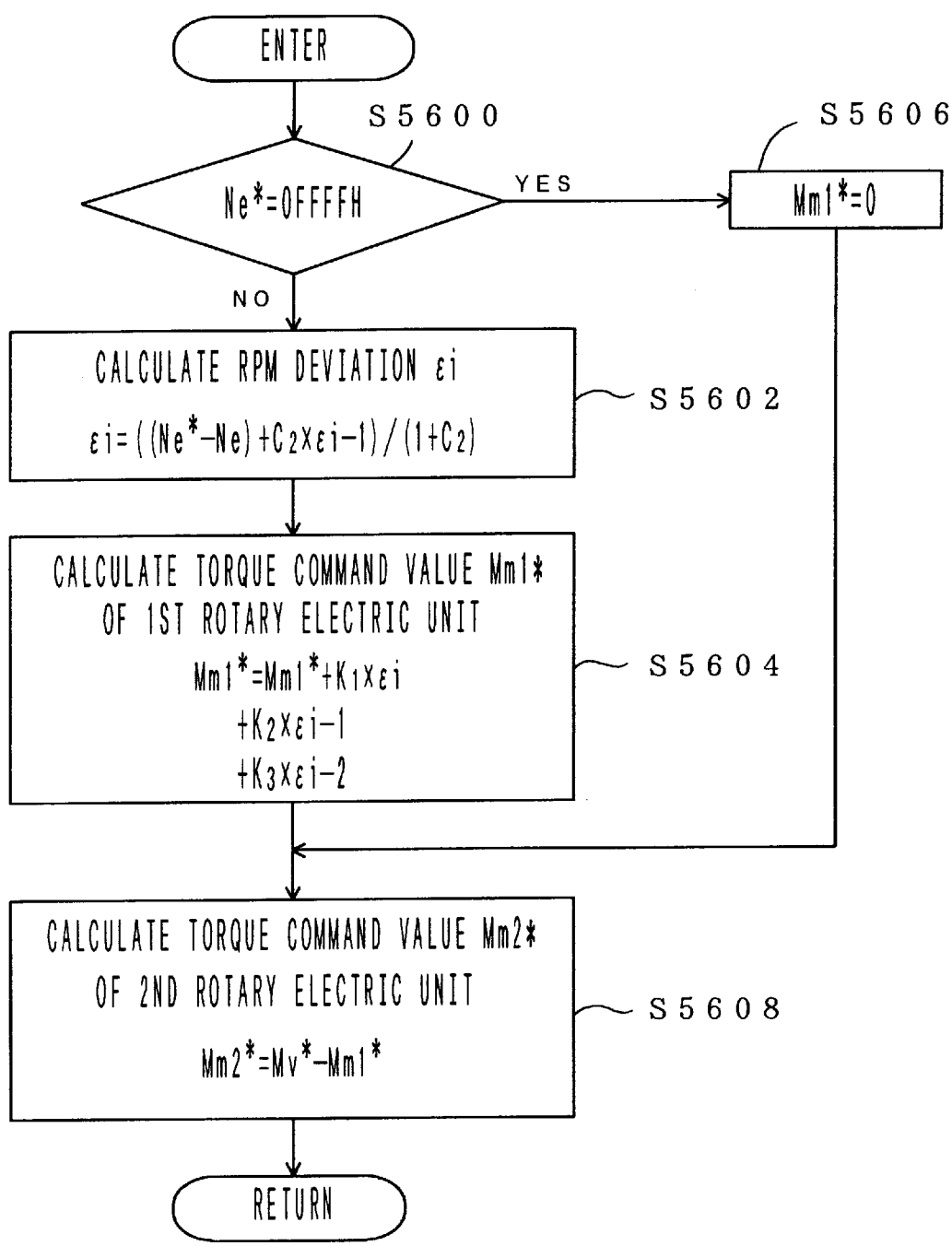
FIG. 16 is a flowchart illustrative of a sub-program of the hybrid controller 16.
Figure 20:
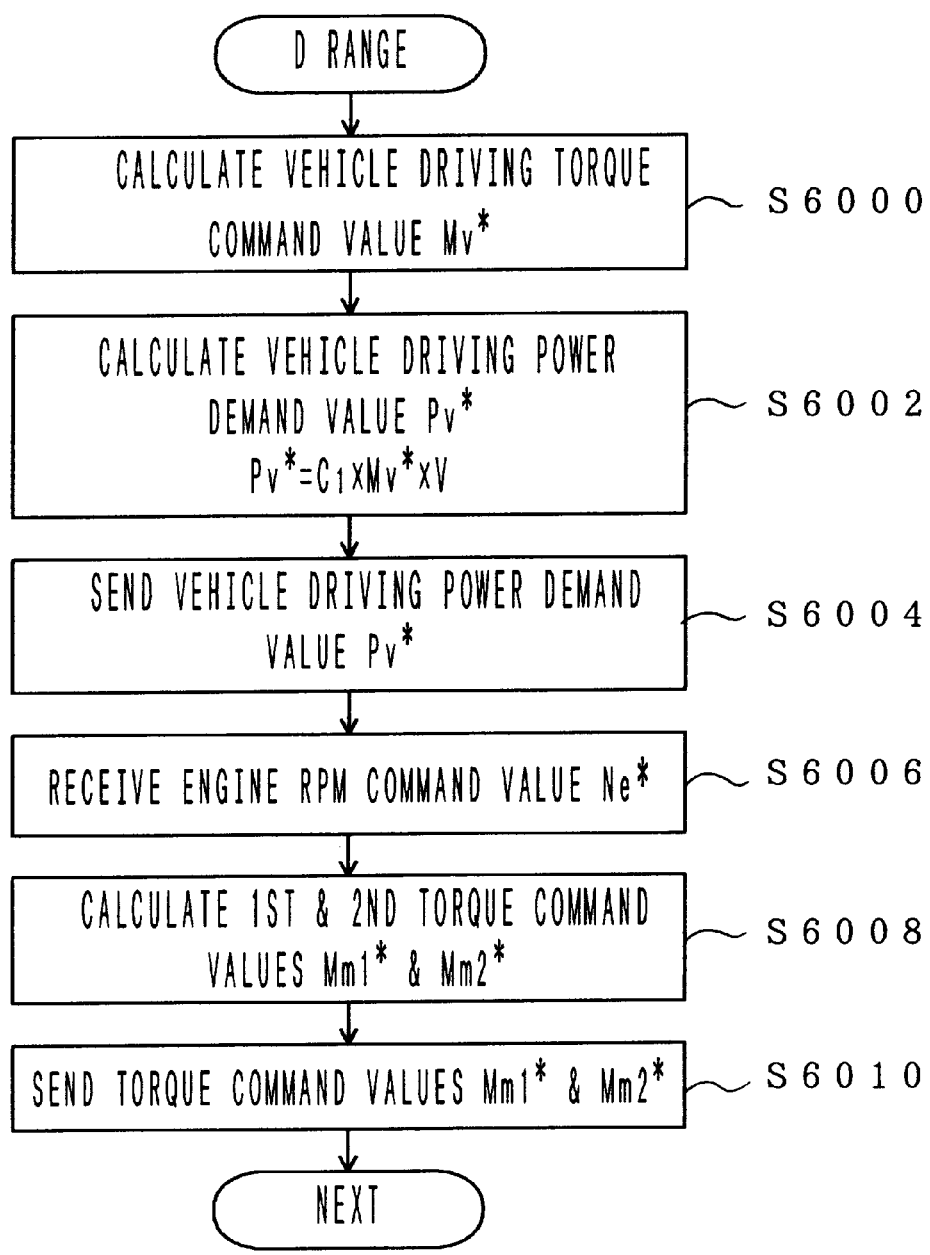
FIG. 20 is a flowchart illustrative of a D-range program of the hybrid controller 16.

Further, the engine rpm command value Ne* received from the engine controller 13 is 0FFFFH; therefore, in the sub-routine of FIG. 16 called up in step S6008 in the program of FIG. 20, a positive judgment result is given step S5600, and the first torque command value Mm1* is set to zero in step S5606, while the second torque command value Mm2* becomes identical to the vehicle driving torque command value Mv* in step S5608. These two torque command values Mm1* and Mm2* are transmitted to the inverter unit 14 and the inverter unit 14 controls the torques of the first and second rotary electric units 2000 and 3000; hence, the vehicle is started and accelerated only by the output torque of the second rotary electric unit 3000, with the engine 1 still in the idling state. When the vehicle starts and the vehicle speed V is generated, the vehicle driving power demand value Pv* calculated in step S6002 is no longer zero and the required value is transmitted e to the engine controller 13 in step S6004 according to the program illustrated in FIG. 20.

Figure 8:
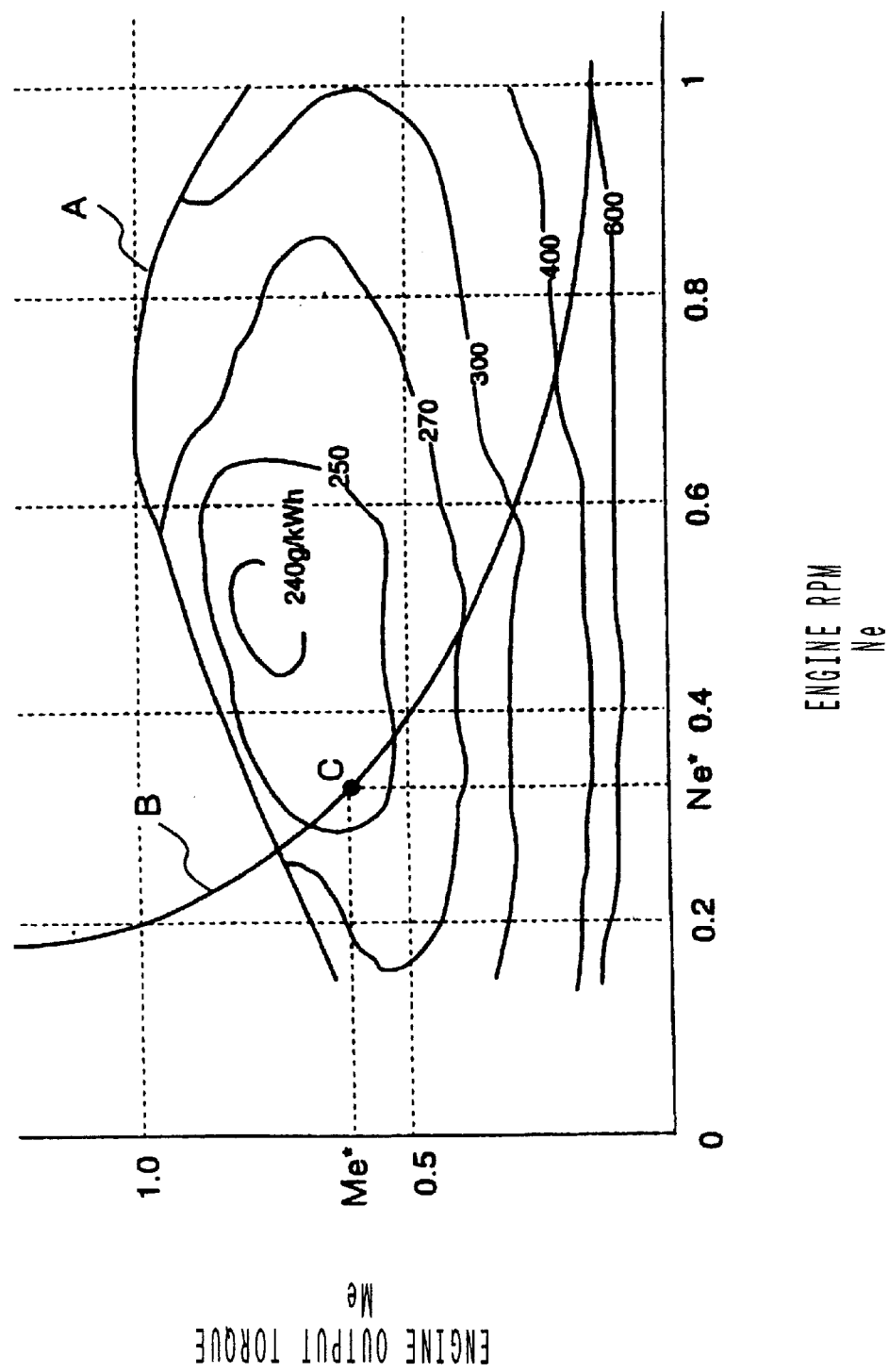
FIG. 8 is a characteristic chart illustrative of an engine operating point determined by the engine controller 13.

In the engine controller 13, the interrupt program shown in FIG. 5 is initiated when the receive interrupt takes place. And the vehicle driving power demand value Pv* is read and stored in memory in step S5100. Since negative judgment results are given in step S5102 and step S5104, the system proceeds to step S5106. In step S5106, the engine characteristic map shown in FIG. 8 is searched to decide the operating point (point C in FIG. 8) at which the highest output efficiency of the engine 1 is obtained for the vehicle driving power demand value Pv* (curve B in FIG. 8), and the engine rpm command value Ne* is determined to update the data stored in memory. Further, in step S5108, the engine characteristic map shown in FIG. 9 is searched to decide the target throttle opening value θTH* which is the opening of the throttle valve 5 for maintaining the operating point (point C in FIG. 8), and the intake air volume adjusting amount TH is calculated according to the target throttle opening value θTH* so as to update the data stored in memory. Further, the intake air volume regulating means 6 is controlled according to the intake air volume adjusting amount TH in step S5122, so that the engine 1 generates the output in exact accordance with the vehicle driving power demand value Pv*.

The moment the engine output is generated, the engine e rpm command value Ne* is sent to the hybrid controller 16 in step S5124. The engine rpm command value Ne* is increased in comparison with the current engine rpm Ne when, for example, the accelerator lift is increased by 20%. Next, based on the engine rpm command value Ne* received by the hybrid controller 16, the first and second torque command values Mm1* and Mm2*, which are the torque command values for the first and second rotary electric units, respectively, are calculated in step S6008 of the program shown in FIG. 20, and the first and second torque command values Mm1* and Mm2* are transmitted to the inverter unit 14, and the inverter unit 14 controls the torques of the first and second rotary electric units 2000 and 3000, respectively. At this time, the first torque command value Mm1* is calculated according to the program shown in FIG. 16. More specifically, the deviation εi of the engine rpm Ne, which has been obtained from the rpms Nm1 and Nm2 of the first and second rotary electric units received from the inverter unit 14, from the engine rpm command value Ne* which has been transmitted from the engine controller 13 and stored in memory is calculated in step S5602, and the first torque command value Mm1* which is the torque command value Mm1* of the first rotary electric unit 2000 is calculated in step S5604 by employing the publicly known calculation of the last deviation si-I and the deviation ei-2 before last. The first torque command value Mm1* is sent to the inverter unit E 14, and the inverter unit 14 carries out the torque control; hence, the engine 1 runs with the first rotary electric unit 2000 as a load. Since the engine 1 is outputting the vehicle driving power demand value Pv*, the first rotary electric unit 2000 generates electricity so as to balance with the power demand value.

When the first rotary electric unit 2000 generates electricity, the first rotor 2010 as the load of the engine 1 contributes to the electromagnetic force Mm1 together with the second rotor 2310; therefore, a reaction torque Mm1 of the torque produced by the engine 1 is transmitted to the second rotor 2310 and further to the deceleration transmitter 4000. The reaction torque is controlled so that it is equal to the first torque command value Mm1* which is the torque command value of the first rotary electric unit.

On the other hand, the second torque command value Mm2* which is the torque command for the second rotary electric unit is calculated by subtracting the first torque command value Mm1* from the vehicle driving torque command value Mv* according to formula 6 and it is applied to the inverter 14 so that the inverter unit 14 controls the torque of the second rotary electric unit. At this time, the torque control is carried out by employing the torque produced by the stator 3010 and the second rotor 2310 as the second command Mm2*; hence, the second rotor 2310 generates a combined torque of the first torque command value Mm1*, which is the torque command value of the first rotary electric unit, and the second torque command value Mm2*, which is the torque command of the second rotary electric unit. Specifically, the same torque as the vehicle driving torque command value Mv* is transmitted to the second rotor 2310 and further to the deceleration transmitter 4000. Thus, the vehicle is driven in exact accordance with the vehicle driving torque command value Mv*.

The then power balance will be discussed. A torque Me generated by the engine 1 is balanced with the torque Mm1 generated by the first rotary electric unit 2000.

$$Me=Mm1 \qquad \text{Formula 7}$$

Power Pe produced by the engine 1 is determined from the engine rpm Ne and the torque Me according to formula 8:

$$Pe=C \times Ne \times Me \qquad \text{Formula 8}$$

where C denotes a coefficient.

Power Pm1 generated by the first rotary electric unit 2000 is obtained from the rpm and the generated torque Mm1 of the first rotary electric unit 2000 according to formula 9:

$$Pm1=C \times Nm1 \times Mm1 \qquad \text{Formula 9}$$

where C denotes a coefficient.

The first rotor 2010 and the second rotor 2310 in the first rotary electric unit 2000 have the action-reaction relationship; therefore, the same torque as the torque Mm1 generated at the first rotor 2010 is produced at the second rotor 2310. Based on the fact that the power determined by the torque generated at the second rotor 2310 and the engine rpm Ne indicates the difference between the generated power Pe of the engine 1 and the generated power Pm1 of the first rotary electric unit 2000, formula 10 is derived from formula 4 and formula 7:

$$Pe-Pm1=C \times (Ne-Nm1) \times Me \qquad \text{Formula 10}$$

The power in formula 10 means that a part of the power output by the engine 1 is produced by the first rotary electric unit 2000 which generates electricity and the energy is converted to electricity, while at the same time, the generated torque Me of the engine 1 is electromagnetically transmitted between the first rotor 2010 and the second rotor 2310 constituting the first rotary electric unit 2000. Further, the second rotary electric unit 3000 is electrically operated to generate the torque calculated according to formula 6 thereby to generate the vehicle driving torque command value Mv* which is required for drive independently of the speed of the engine 1. At this time, if the energy converting efficiency of the first and second rotary electric units and the inverter 14 driving them is ignored, then the energy generated at the engine 1 can be transmitted to the travel driving system to implement drive forward by supplying the electric power generated by the first rotary electric unit 2000 to the second rotary electric unit 3000 without drawing out electric power from the electricity storing unit 15.

The reverse drive will now be described. Setting the shift lever to the BR" range engages the reverse drive mode. When the shift lever is set to the "R" range, the shift position SFT captured by the hybrid controller 16 is switched to "2" and the determination result given in step S5424 of the program shown in FIG. 14 is affirmative, causing the R-range processing of step S5426 to be implemented. The program of FIG. 18 shows the details of the R-range processing; it is the same program as that for the D-range processing of FIG. 20, and the description thereof will be omitted because it is identical to the D-range processing except that the direction of rotation of the second rotary electric unit 3000 is opposite and FIG. 21 is employed for the characteristic of the search map for the vehicle driving torque command value Mv* which is different from that of the D-range processing.

Figure 23:
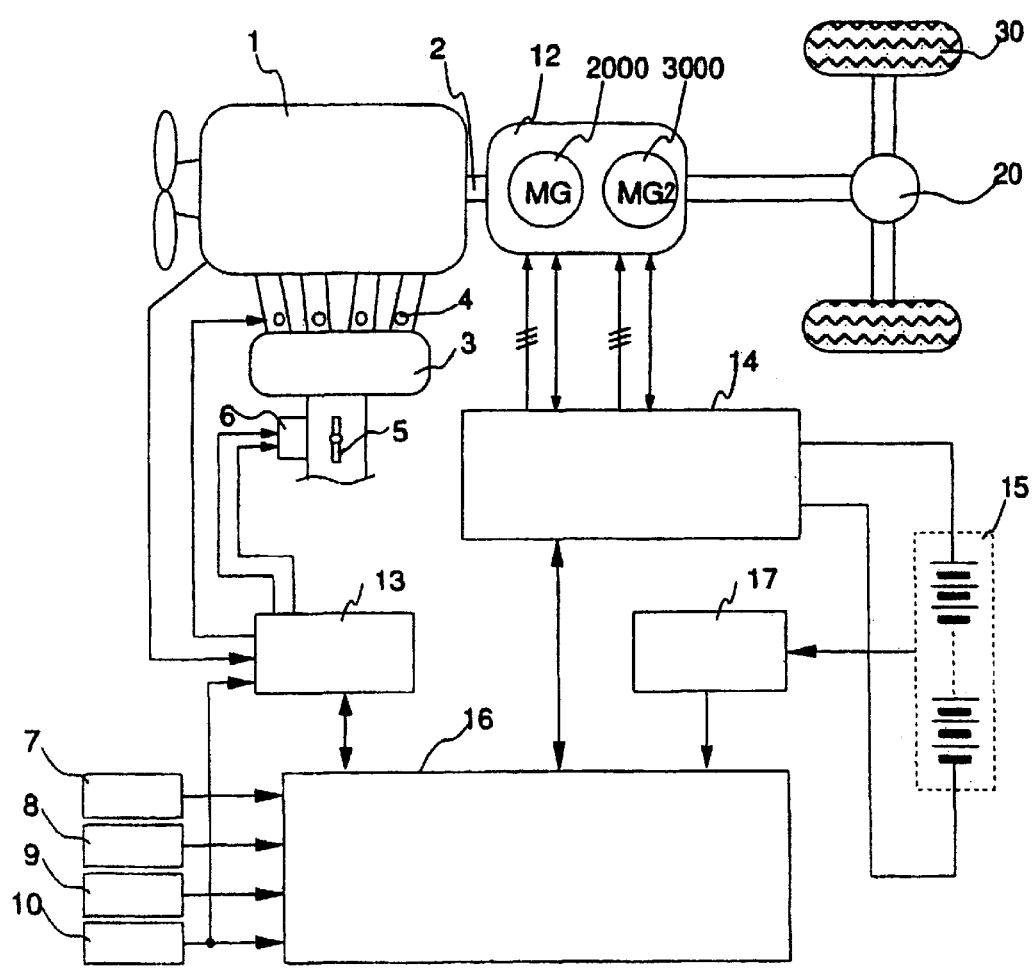
FIG. 23 is a general block diagram of a hybrid vehicle which is a second embodiment of the present invention.

A second embodiment of the hybrid unit in accordance with the invention, which considers the remaining capacity of the electricity accumulating unit, will now be described in conjunction with FIG. 23 through FIG. 26. FIG. 23 shows a schematic system configuration of the invention; like reference numerals as those of the first embodiment shown in FIG. 1 denote like components. In FIG. 23, a charge state detector 17 has been added as a charge state detecting means to the first embodiment; the charge state detector 17 detects a remaining capacity Soc of the electricity storing unit 15 and it is connected to the electricity storing unit 15. The charge state detector 17 calculates the remaining capacity SOC of the electricity storing unit 15 by a publicly known method primarily according to the current signal coming in and out of the electricity storing unit 15 which is detected by a publicly known current sensor, which is not shown, the terminal voltage signal of the electricity storing unit 15 which is detected by a publicly known voltage sensor, and the temperature signal of the electricity storing unit 15 which is detected by a publicly known temperature sensor, and it transmits the calculation result to the outside. The hybrid controller 16 is connected to the charge state detector 17 to receive the remaining capacity SOC of the electricity e storing unit 15.

Figure 24:
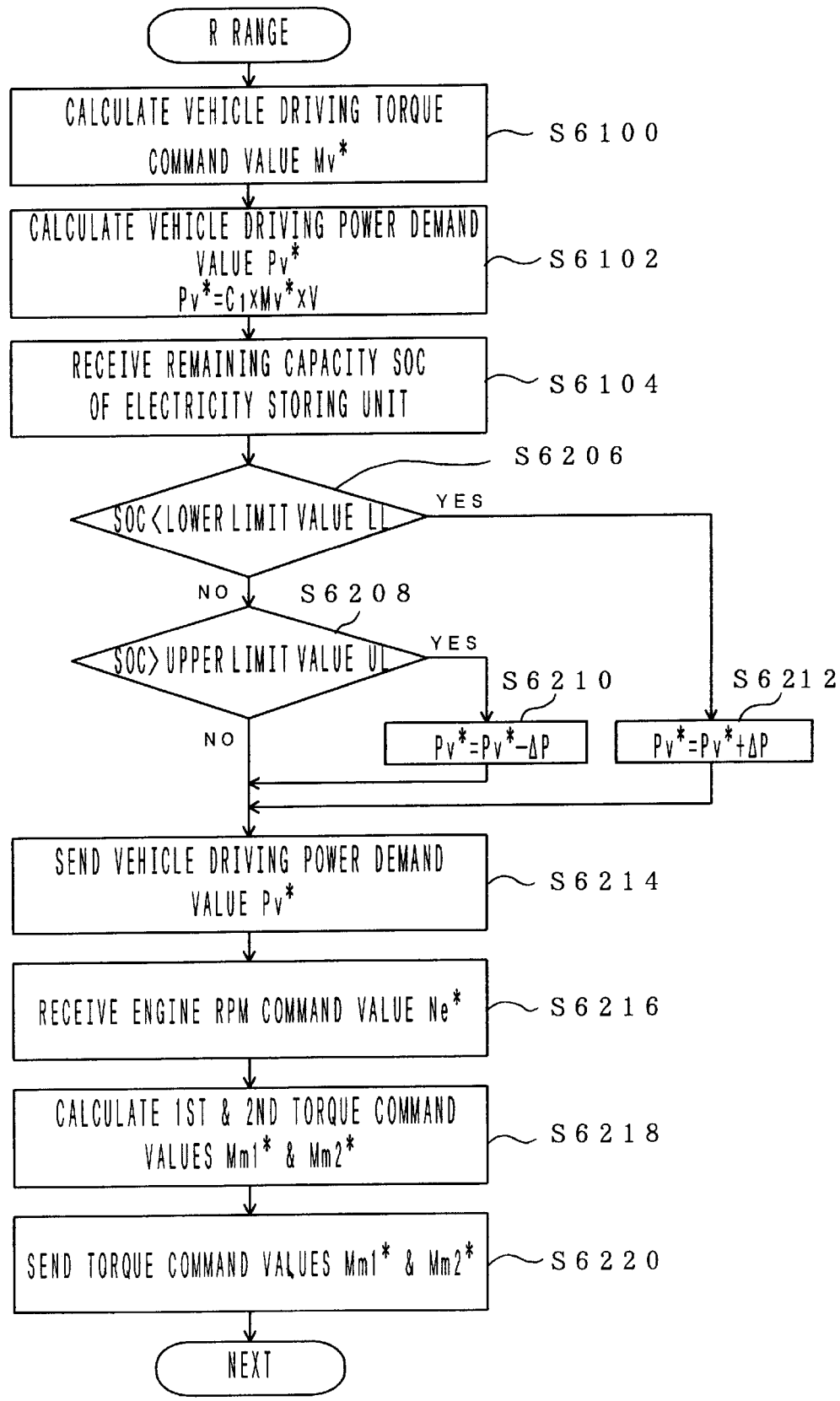
FIG. 24 is a flowchart illustrative of the R-range program of the hybrid controller 16.

The R-range processing of step S5426 in the program shown in FIG. 14 will now be described in conjunction with FIG. 24. In the R-range processing, the vehicle driving torque command value Mv* is first calculated in step S6100. This calculation is performed by searching a map by using the vehicle speed V, the accelerator lift ACC, the brake state BRK, and the shift position SFT as the input parameters. The map is stored in the ROM built in the control unit 1630; it is configured according to the characteristics shown in FIG. 21. In the next step S6102, the vehicle driving power demand value Pv* is calculated.

In step S6104, the remaining capacity SOC of the electricity storing unit 15 is received through the communication port connected to the charge state detector 17. In the next step S6106, the system decides whether the remaining capacity SOC of the electricity storing unit 15 is smaller than a lower limit value LL; if it decides that SOC is smaller than the lower limit value LL (YES), then it proceeds to step S6112, or if it decides that the remaining capacity SOC of the electricity storing unit 15 is larger than the lower limit value LL (NO), then it proceeds to step S6108. In step S6108, the system decides whether the remaining capacity SOC of the electricity storing unit 15 is larger than an upper limit value UL; if it decides that SOC is larger than the upper limit value UL (YES), then it proceeds to step S6110. In step S6108, if it decides that the remaining capacity SOC of the electricity storing unit 15 is smaller than the larger limit value UL (NO), then it proceeds to a next step S6114.

In step S6110, the vehicle driving power demand value Pv* which has been calculated in step S6102 is corrected according to formula 11.

$$Pv^* = Pv^* - \Delta P \qquad \text{Formula 11}$$

At this time, if the corrected vehicle driving power 40 demand value Pv* is negative, then the system sets the vehicle driving power demand value Pv* to zero, i.e., Pv*=0.

In step S6112, the vehicle driving power demand value Pv* which has been calculated in step S6102 is corrected according to formula 12.

$$Pv^* = Pv^* + \Delta P \qquad \text{Formula 12}$$

In formula 11 and formula 12, ΔP denotes a correction power which employs a value preset according to the type of the electricity storing unit.

In the next step S6114, the vehicle driving power demand value Pv* which has been corrected in step S6110 or step S6112 or the vehicle driving power demand value Pv* which has been calculated in step S6102 is transmitted to the engine controller 13. In the following step S6116, the engine rpm command value Ne* is received through the communication port connected to the engine controller 13. In step S6118, the first and second torque command values Mm1* and Mm2*, which are the torque command values for the first and second rotary electric units 2000 and 3000, respectively, are calculated. In the following step S6120, the first and second torque command values Mm1* and Mm2* are transmitted to the inverter 14 via the communication port built in the control unit 1630 and the communication buffer 1650.

The D-range processing of step S5432 in the program shown in FIG. 14 will now be described in conjunction with FIG. 25. In the D-range processing, the vehicle driving torque command value Mv* is first calculated in step S6200. The map is stored in the ROM built in the control unit 1630; it is configured according to the characteristics shown in FIG. 22. In the next step S6202, the vehicle driving power demand value Pv* is calculated.

In step S6204, the remaining capacity SOC of the electricity storing unit 15 is received through the communication port connected to the charge state detector 17. In the next step S6206, the system decides whether the remaining capacity SOC of the electricity storing unit 15 is smaller than the lower limit value LL; if it decides that SOC is smaller than the lower limit value LL (YES), then it proceeds to step S6212, or if it decides that the remaining capacity SOC of the electricity storing unit 15 is larger than the lower limit value LL (NO), then it proceeds to step S6208. In step S6208, the system decides whether the remaining capacity SOC of the electricity storing unit 15 is larger than the upper limit value UL; if it decides that SOC is larger than the upper limit value UL (YES), then it proceeds to step S6210. In step S6208, if the system decides that the remaining capacity SOC of the electricity storing unit 15 is smaller than the larger limit value UL (NO), then it proceeds to the next step S6214. In step S6210, the vehicle driving power demand value Pv* which has been calculated in step S6202 is corrected according to formula 13.

$$Pv^* = Pv^* - \Delta P \qquad \text{Formula 13}$$

At this time, if the corrected vehicle driving power demand value Pv* is negative, then the system sets the vehicle driving power demand value Pv* to zero, i.e., Pv*=0.

In step S6212, the vehicle driving power demand value Pv* which has been calculated in step S6202 is corrected according to formula 14.

$$Pv^* = Pv^* + \Delta P \qquad \text{Formula 14}$$

In formula 13 and formula 14, $\Delta P$ denotes a correction power which employs a value preset according to the type of the electricity storing unit.

In the next step S6214, the vehicle driving power demand value Pv* which has been corrected in step S6210 or step S6212, or the vehicle driving power demand value Pv* which has been calculated in step S6202 is transmitted to the Ad engine controller 13. In the following step S6216, the engine rpm command value Ne* is received through the communication port connected to the engine controller 13. In step S6218, the first and second torque command values Mm1* and Mm2*, which are the torque command values for the first and second rotary electric units 2000 and 3000, respectively, are calculated. This calculation is performed by calling up the sub-routine of FIG. 16 as in the case of the R processing routine. In the following step S6220, the first and second torque command values Mm1* and Mm2* are transmitted to the inverter 14 via the communication port built in the control unit 1630 and the communication buffer 1650.

The operation of the second embodiment in accordance with the invention which is configured as described above will now be described only in the part which is different from the operation of the foregoing first embodiment. The operation states will include the startup state, the forward drive state, and the reverse drive state.

First, the startup state is the same as that of the first embodiment, and the description thereof will be omitted. The forward drivestate will be described. Setting the shift lever to the "D" range engages the drive forward state. When the shift lever is set to the "D" range, the shift position SFT captured by the hybrid controller 16 is switched to "8" and the D-range processing is implemented in step S5432 of the program of FIG. 14. The details of the D-range processing are shown by the program of FIG. 25. At this time, when the accelerator lift ACC is zero, the state is the same as that following startup, but when the accelerator pedal is depressed, the vehicle driving torque command value Mv* calculated in step S6200 in the D-range processing increases with the accelerator lift ACC. This calculation is performed based on the characteristics shown in FIG. 22 which are stored in the data area of the ROM built in the control unit 1630. For example, when the accelerator lift ACC increases to 20% from the state where the vehicle is at rest, the vehicle driving torque command value Mv* reaches 20% of the maximum torque. The vehicle driving power demand value Pv* is calculated in step S6202 while the vehicle is at rest and the D-range processing shown in FIG. 25 is being carried out; since the vehicle speed v is zero when the vehicle is at rest, the vehicle driving power demand value Pv* is zero.

Then, it is determined whether the remaining capacity SOC of the electricity storing unit is larger or smaller than a predetermined lower limit value LL; if it is determined that the remaining capacity SOC is small (YES), then a correction is made to add the predetermined correction power $\Delta P$ to the vehicle driving power demand value Pv* as indicated by formula 14. The corrected vehicle driving power demand value Pv* is transmitted to the engine controller 13.

On the other hand, if the system decides that the remaining capacity SOC of the electricity storing unit 15 is larger than the predetermined lower limit value LL (NO), then it further determines whether the remaining capacity SOC of the electricity storing unit is larger or smaller than the predetermined upper limit value UL; the vehicle driving power demand value Pv* is zero, so that "vehicle driving power demand value Pv*=zero" is sent to the engine controller 13 regardless of the determination result.

The engine controller 13 receives the vehicle driving power demand value Pv* in step S5100 of FIG. 5, and a negative determination result is given in step S5102, while an affirmative determination result is given in step S5104. For this reason, the engine rpm command value Ne* decided by the engine controller 13 is 0FFFFH, and the intake air volume adjusting amount TH becomes zero. Since the control is carried out with the zero intake air volume adjusting amount TH, the engine 1 stays in the idle state. On the other hand, in the hybrid controller 16, the vehicle is at rest and the engine 1 is running at the idling speed; hence, the rpm Nm1 of the first rotary electric unit 2000 received in step S5410 is the same rpm, Neidl, as the engine rpm, and the rpm Nm2 of the second rotary electric unit 3000 received in step S5412 is zero since the vehicle is at rest.

Further, the engine rpm command value Ne* received from the engine controller 13 is 0FFFFH; hence, an affirmative determination result is obtained in step S6100 in the sub-routine of FIG. 16 which is called up in step S6218 in the program of FIG. 25 which is the detailed program of the D range in step S5432, the first torque command value Mm1* is set to zero in step S5606, and the second torque command value Mm2* becomes equal to the vehicle driving torque command value Mv* in step S5608. These two torque command values Mm1* and Mm2* are sent to the inverter unit 14; the torques of the first and second rotary electric units 2000 and 3000 are controlled by the inverter unit 14, so that the vehicle starts and accelerated only by the output torque of the second rotary electric unit 3000 with the engine 1 still idling.

When the vehicle starts, producing the vehicle speed V, the vehicle driving power demand value Pv* calculated in step S6202 in the program illustrated in FIG. 25 is no longer zero. Then, the system determines whether the remaining capacity SOC of the electricity storing unit is larger or smaller than the predetermined lower limit value LL; if it decides that the remaining capacity SOC is smaller (YES), then it makes a correction so that the predetermined correction power $\Delta P$ is added to the vehicle driving power demand value Pv* as indicated by formula 14, and it transmits the corrected vehicle driving power demand value Pv* to the engine controller 13. On the other hand, if the system decides that the remaining capacity SOC of the electricity storing unit is larger than the predetermined lower limit value LL (NO), then it further decides in the following step S6208 whether the remaining capacity SOC of the electricity storing unit is larger or smaller than the predetermined upper limit value UL; if it determines that the remaining capacity SOC is larger (YES), then it makes a correction so that the predetermined correction power ΔP is subtracted from the vehicle driving power demand value Pv* as indicated by formula 13, and it sends 40 the corrected vehicle driving power demand value Pv* to the engine controller 13. On the other hand, if the system decides that the remaining capacity SOC is smaller than the predetermined upper limit UL (NO), then the system does not add any correction to the vehicle driving power demand value; instead, it sends the vehicle driving power demand value Pv*, which has been calculated in step S6202, directly to the engine controller 13. The engine controller 13 starts the interrupt program shown in FIG. 5 upon receipt of an interrupt request, and it reads the vehicle driving power demand value Pv* in step S5100 and stores it in memory.

Further, negative determination results are given in step S5102 and step S5104; therefore, the system proceeds to step S5106. In step S5106, the system searches the engine characteristic map shown in FIG. 8 to locate the operating point (point C in FIG. 5) at which the engine 1 is able to output the vehicle driving power demand value Pv* (curve B in FIG. 5) with highest efficiency, decides the engine rpm command value Ne*, and updates the data stored in memory. Further, in step S1508, the system searches the engine characteristic map shown in FIG. 9 to decide the target throttle opening value θTH*, which is the opening of the throttle valve 5 for maintaining the operating point (point C in FIG. 5), and calculates the intake air volume adjusting amount TH according to the decided target throttle opening value θTH* to update the data stored in memory. The intake air volume adjusting amount TH is used to control the air volume regulating means 6 in step S5122, thus enabling the engine 1 to generate an output based exactly on the vehicle driving power demand value Pv*.

The moment the engine generates the output, the engine rpm command value Ne* is transmitted to the hybrid controller 16 in step S5124. The first and second torque command values Mm1* and Mm2*, which are the torque command values of the first and second rotary electric units are calculated in step S6218 of the program shown in FIG. 25 according to the engine rpm command value Ne* received by the hybrid controller 16, and the calculated first and second torque command values Mm1* and Mm2* are transmitted to the inverter unit 14 to control the torques of the first and second rotary electric units 2000 and 3000 by the inverter unit 14. The torque control of the first and second rotary electric units 2000 and 3000 is the same as that of the first embodiment, and the description thereof will be omitted.

If the energy converting efficiency of the first and second rotary electric units and the inverter 14 driving them is ignored, then the energy generated at the engine 1 can be transmitted to the travel driving system to implement drive forward by supplying the electric power generated by the first rotary electric unit 2000 to the second rotary electric unit 3000 without drawing out electric power from the electricity storing unit 15. If the energy converting efficiency of the first and second rotary electric units and the inverter 14 driving them cannot be ignored, then the electric power is drawn out from the electricity storing unit 15;; however, the hybrid controller 16 monitors the remaining capacity SOC of the electricity storing unit which has been calculated by the charge state detector 17, and it makes a correction by increasing the vehicle driving power demand value Pv* if the remaining capacity SOC is smaller than the predetermined value, or it makes a correction by decreasing the vehicle driving power demand value Pv* if the remaining capacity Soc is larger than the predetermined value. This enables the vehicle to travel forward without drawing out the electric power from the electricity storing unit 15.

Figure 26:
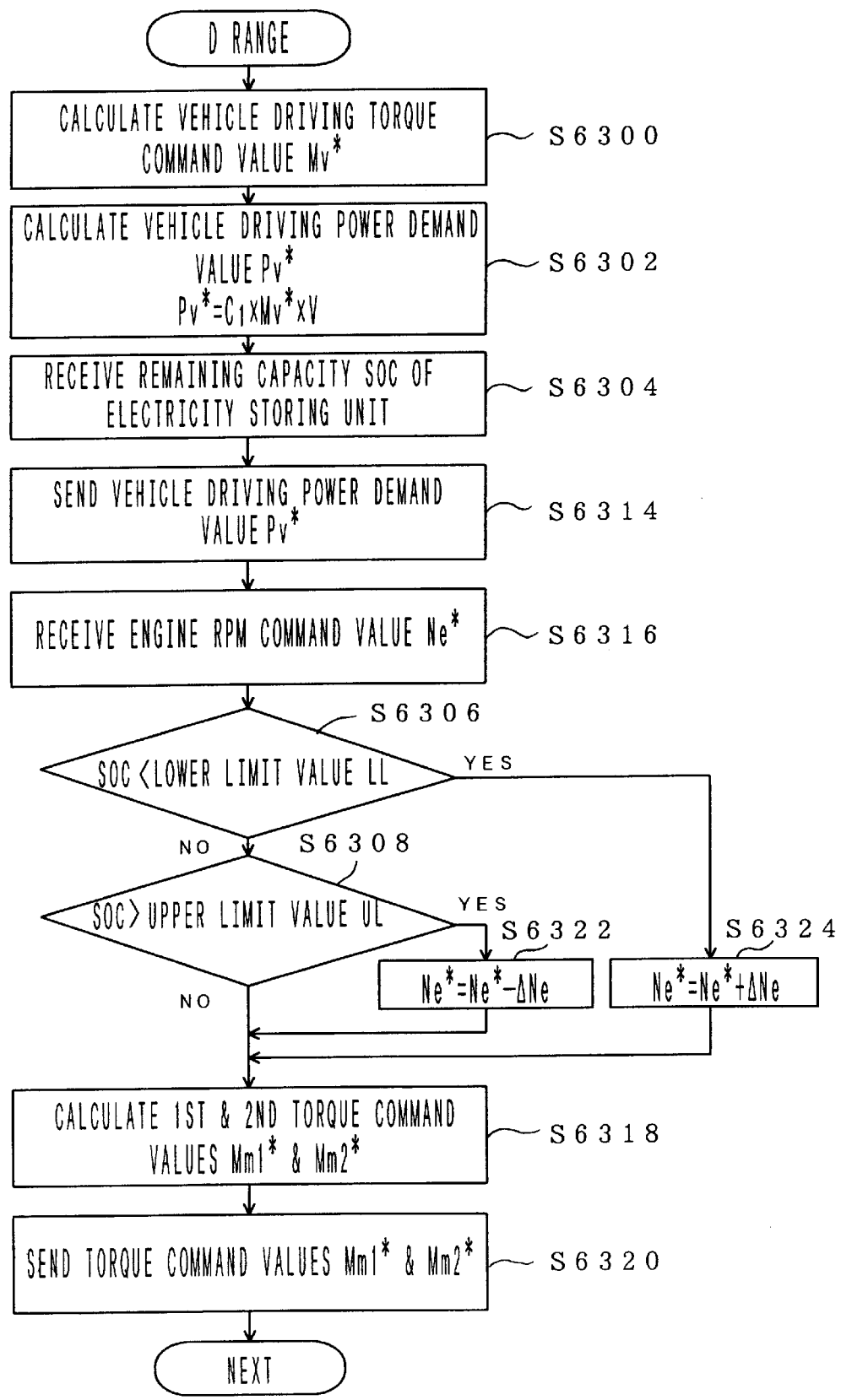
FIG. 26 is another flowchart illustrative of the D-range program of the hybrid controller 16.

In the D-range processing program, the correction for adding the corrective power to the vehicle driving power demand value has been made to keep the remaining capacity SOC of the electricity storing unit 15 in the predetermined range. The same operation can be implemented by making the correction by formula 15 given below according to the remaining capacity SOC of the electricity storing unit 15 as shown in FIG. 26.

$$Ne^* = Ne^* + \Delta Ne \quad \text{Formula 15}$$

$$Ne^* = Ne^* - \Delta Ne \quad \text{Formula 16}$$

The remaining capacity SOC of the electricity storing unit 15 is increased or decreased by running the engine 1 at a higher speed or a lower speed by a corrective rpm ΔNe with respect to the engine rpm command Ne* received from the engine controller 13; based on the corrected engine rpm command Ne*, the first and second torque command values Mm1* and Mm2* are calculated and sent to the inverter unit 14, and the inverter unit 14 controls the torques of the first and second rotary electric units 2000 and 3000. Hence, the same advantages can be obtained.

The reverse drive mode will now be described. Setting the shift lever to the "R" range engages the reverse drive mode. The program shown in FIG. 24 gives the details of the R-range processing. This program is the same program used for the D-range processing of FIG. 25; the procedure is the same as that of the D-range procedure except for the map shown in FIG. 21 which indicates a different characteristic of the search map of the vehicle driving torque command value Mv* from that for the D range; hence, the description thereof will be omitted.

Figure 27:
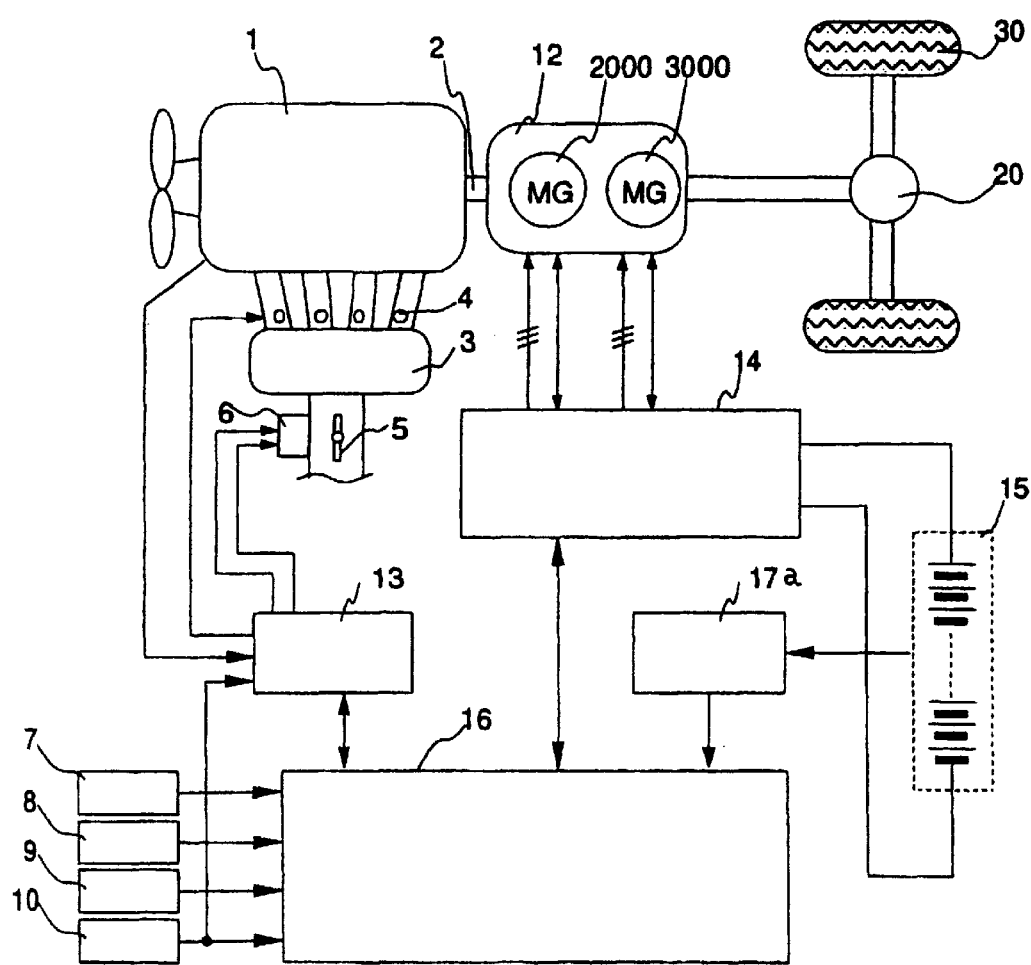
FIG. 27 is a general block diagram of a hybrid vehicle which is a third embodiment of the present invention.
Figure 28:
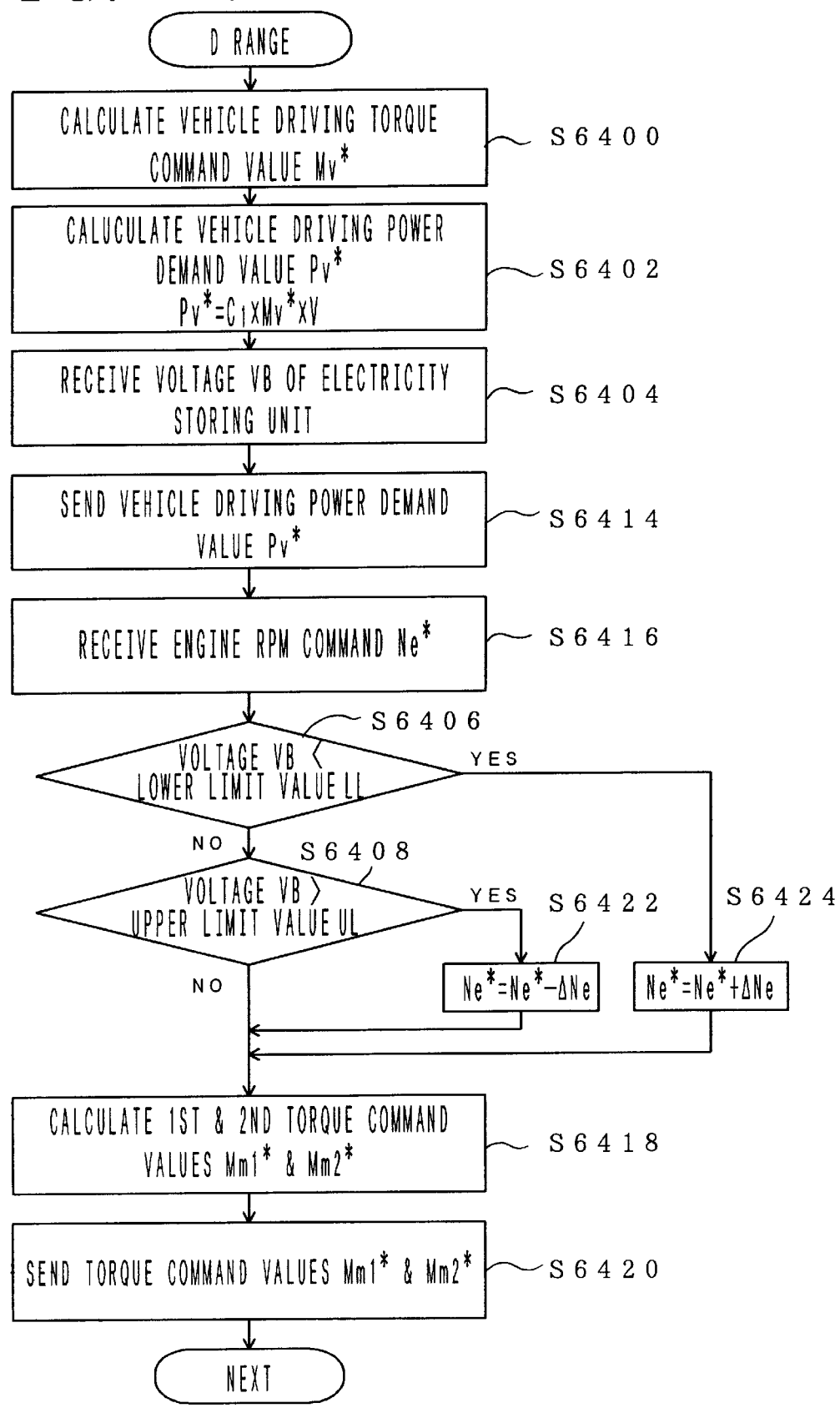
FIG. 28 is a flowchart illustrative of the D-range program of the hybrid controller 16 in the third embodiment.
Figure 29:
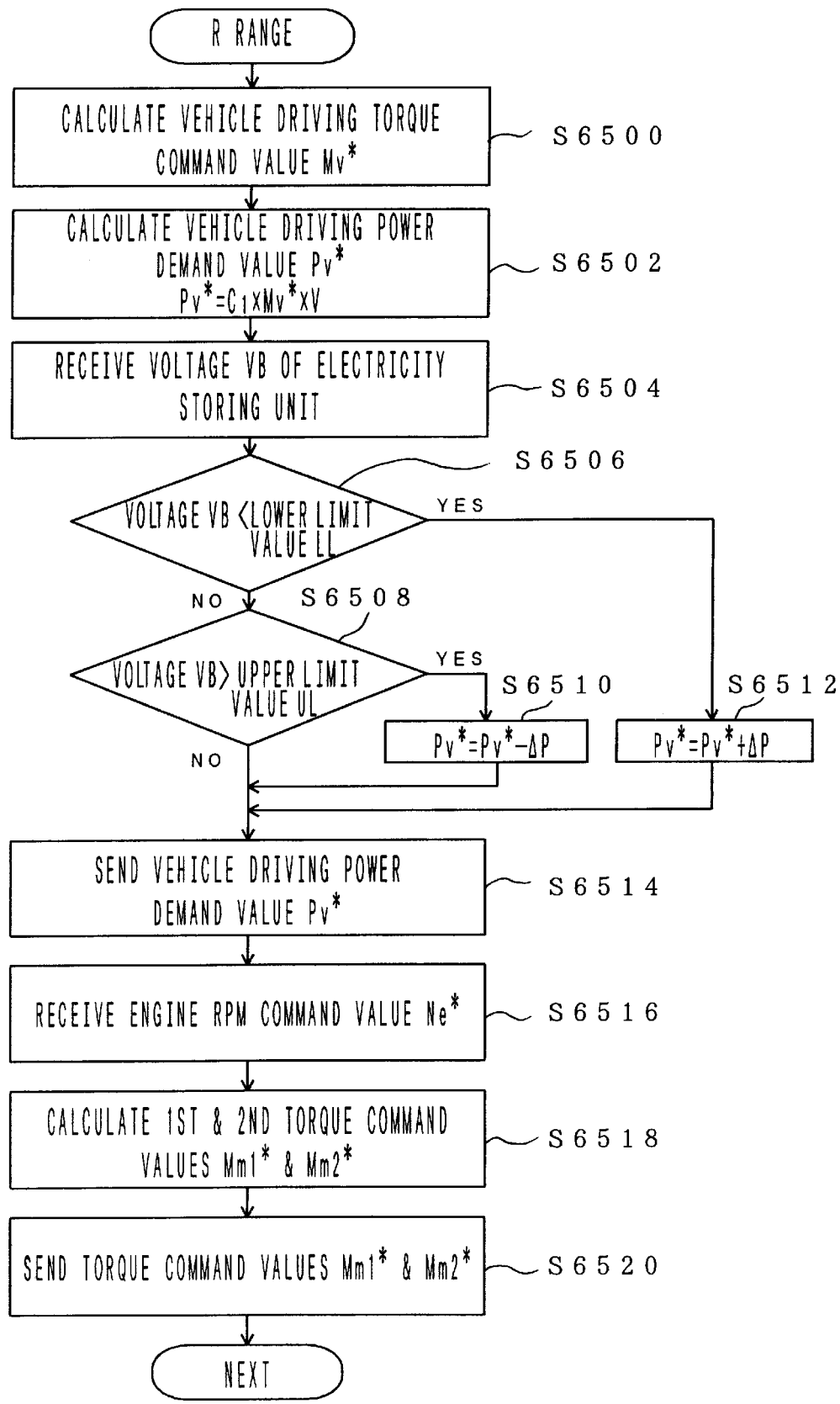
FIG. 29 is a flowchart illustrative of the R-range program of the hybrid controller 16 in the third embodiment.

Referring now to FIG. 27 through FIG. 29, a third embodiment of the hybrid unit in accordance with the invention will be described. In the third embodiment, the terminal voltage VB of the electricity storing unit 15 is detected and a correction is made based on the detected terminal voltage VB, while the second embodiment detects the remaining capacity SOC of the electricity storing unit 15 and makes corrections for the D-range and R-range processing according to the detected remaining capacity SOC. The correcting procedure is basically the same as that of the second embodiment, so a brief description will be given below.

In the schematic system configuration in accordance with the invention shown in FIG. 27, a voltage detector 17a is employed in place of the charge state detector 17 in the second embodiment; in the voltage detector 17a, the terminal voltage VB of the electricity storing unit 15 is detected by a publicly known voltage sensor, which is not shown, and it is transmitted outside.

The details of the D-range processing of the third embodiment illustrated in FIG. 28 which are basically different from the details of the D-range processing illustrated in FIG. 25 in the second embodiment will be described. When the accelerator pedal is depressed, the vehicle driving torque command value Mv* calculated in step S6400 in the D-range processing increases with the accelerator lift ACC. The calculation is performed according to the characteristics shown in FIG. 22 stored in the data area of the ROM built in the control unit 1630.

When the vehicle starts, producing the vehicle speed V, the vehicle driving power demand value Pv* calculated in step S6402 in the program illustrated in FIG. 28 is no longer zero. Then, the system determines whether the terminal voltage VB of the electricity storing unit is larger or smaller than the predetermined lower limit value LL; if it decides that the terminal voltage VB is smaller (YES), then it makes a correction so that the predetermined correction power ΔP is added to the vehicle driving power demand value Pv*, and it transmits the corrected vehicle driving power demand value Pv* to the engine controller 13. On the other hand, if the system decides that the terminal voltage VB of the electricity storing unit is larger than the predetermined lower limit value LL (NO), then it further decides in the following step S6408 whether the terminal voltage VB of the electricity storing unit is larger or smaller than the predetermined upper limit value UL; if it determines that the terminal voltage VB is larger (YES), then it makes a correction so that the predetermined correction power ΔP is subtracted from the vehicle driving power demand value Pv*, and it sends the corrected vehicle driving power demand value Pv* to the engine controller 13. On the other hand, if the system decides that the terminal voltage VB of the electricity storing unit is smaller than the predetermined upper limit UL (NO), then the system does not add any correction to the vehicle driving power demand value; instead, it sends the vehicle driving power demand value Pv*, which has been calculated in step S6402, directly to the engine controller 13.

The processing thereafter is the same as that of the second embodiment and the description thereof will be omitted.

The reverse drive mode will now be explained. The reverse drive mode will now be described. Setting the shift lever to the "R" range engages the reverse drive mode. The program shown in FIG. 29 gives the details of the R-range processing. This program is the same program used for the D-range processing of FIG. 28; the procedure is the same as that of the D-range procedure except for the map shown in FIG. 21 which indicates a different characteristics of the search map of the vehicle driving torque command value Mv* from that for the D range; hence, the description thereof will be omitted.

In the embodiments described above, the system shown in FIG. 2 has been referred to as the power transmitting means 12; however, the present invention can be applied even when the one shown in the specification of German Patent Application No. 4407666or Japanese Unexamined Patent Publication No. 7-135701is used. Likewise, the driving function of the intake air volume regulating means 6 has been built in the engine controller 13; however, the spirit of the invention remains unaffected even if it is separated from the engine controller 13.

Further, although the publicly known battery has been employed as the electricity storing unit 15, it may be replaced by a flywheel battery or the like or an electric double-layer capacitor or a combination thereof. As the engine 1, the series 4-cylinder gasoline internal-combustion engine has been employed; however, the number of cylinders has nothing to do with the present invention, and other type of internal-combustion engine may be used.

Furthermore, the publicly known start-stop synchronization communication means has been employed for the information transfer between the engine controller 13 and the inverter 14 and the hybrid controller 16; however, the use of other communication method does not affect the spirit of the invention.

Figure 30:
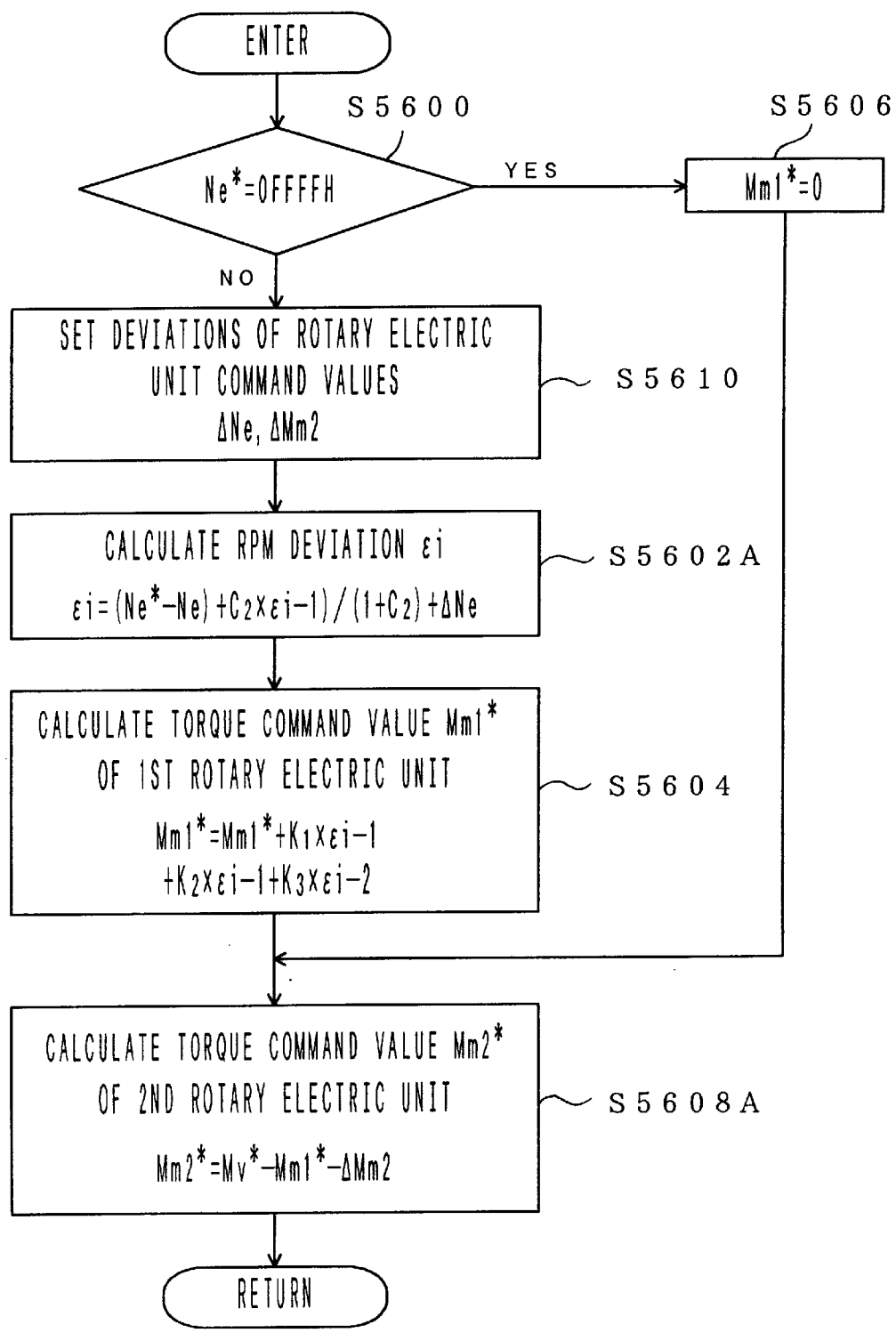
FIG. 30 is a flowchart illustrative of another example of the sub-program of the hybrid controller 16.

In the embodiments described above, as explained in conjunction with FIG. 16, the speed deviation $\epsilon i$ of the current engine rpm Ne from the engine rpm command value Ne* is calculated according to formula 3 in step S5602; however, the flowchart of FIG. 30 may be used in place of the flowchart of FIG. 16. More specifically, prior to step S5602A corresponding to step S5602, deviations ΔNe and ΔMm2 of the rotary electric unit command values are set in step S5610 by the technique which will be discussed later, and the speed deviation $\epsilon i$ is determined by performing the calculation based on the following formula 17 in step S5602A:

$$\epsilon i = ((Ne^* - Ne) + C2 \times \epsilon i - 1)/(1 + C2) + \Delta Ne \qquad \text{Formula 17}$$

Then, the torque command value Mm2* to be supplied to the second rotary electric unit 3000 is calculated by the following formula 18 before the system goes back to the program where the sub-routine was called up.

$$Mm2^* = Mv^* - Mm1^* - \Delta Mm2 \qquad \text{Formula 18}$$

Figure 31:
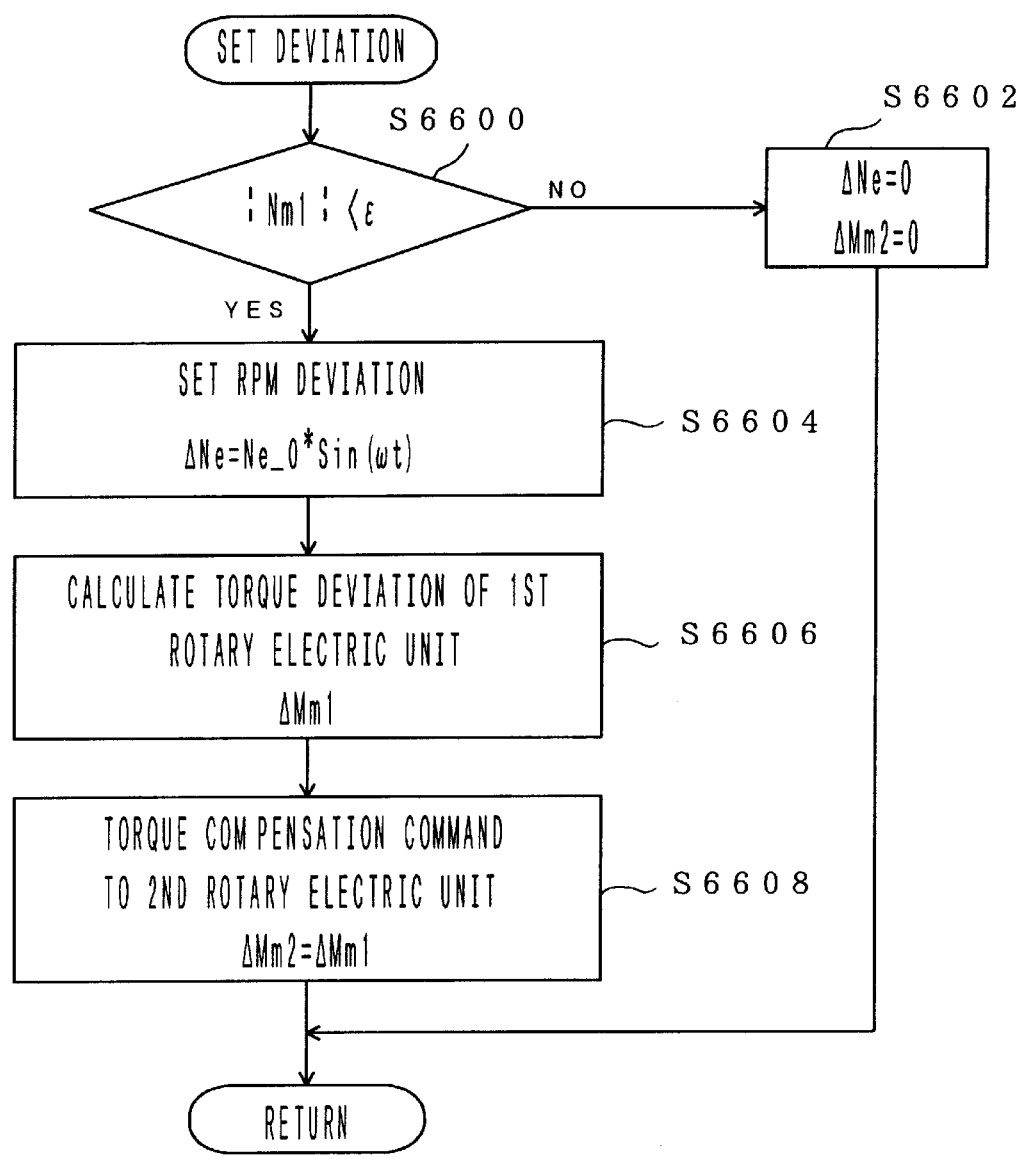
FIG. 31 is a flowchart illustrative of the processing C procedure for setting the deviation of a rotary electric unit command value in FIG. 30.

The method for setting the deviation in step S5610 will now be explained in conjunction with FIG. 31. When the deviation setting sub-routine is initiated, the system first decides in step S6600 whether the rpm of the first rotary electric unit is in the vicinity of zero. If the determination result is negative, then the system sets the deviation of the command value to zero in step S6602 and exits from the sub-routine. If the determination result in the step S6600 is affirmative, then the system sets the speed deviation in step S6604. In this case, the speed deviation is set sinusoidally in the vicinity of zero so that the rpm of the first rotary electric unit does not reach zero. Then, in step S6606, the torque change for generating the foregoing speed deviation is calculated. To be more specific, the torque change can be estimated according to formula 19 from the product of inertia J connected to the first rotary electric unit and the change in the rpm command value or the actual change in rpm dω1/dt.

$$\Delta Mm1 = J \times d\omega/dt \qquad \text{Formula 19}$$

Next, in step S6608, the system sets the command value deviation of the second rotary electric unit such that the change in torque caused by the first rotary electric unit is compensated for by the second rotary electric unit, then it exits from the sub-routine.

In this sub-routine, an arbitrary value may be offset in some cases instead of sinusoidally setting the rpm deviation. The change in torque can alternatively be estimated by using a motor constant from the current value of the first rotary electric unit as shown by formula 20. In the formula, the torque Mm1 is represented as the d- and q-axis current function; the values followed by asterisks indicate command values, while the values with no asterisks indicate actual values.

$$\Delta Mm1 = Mm1^*(im1d^*, im1q) - Mm1(im1d, im1g) \qquad \text{Formula 20}$$

It is also possible to estimate the change in torque from the current compensation amount based on the rpm feedback control of the first rotary electric unit as shown by formula 21.

$$\Delta Mm1 = Mm1/id1 \times Aid1 + Mm1/iq1 \times Aiq1 \qquad \text{Formula 21}$$

Figure 32:
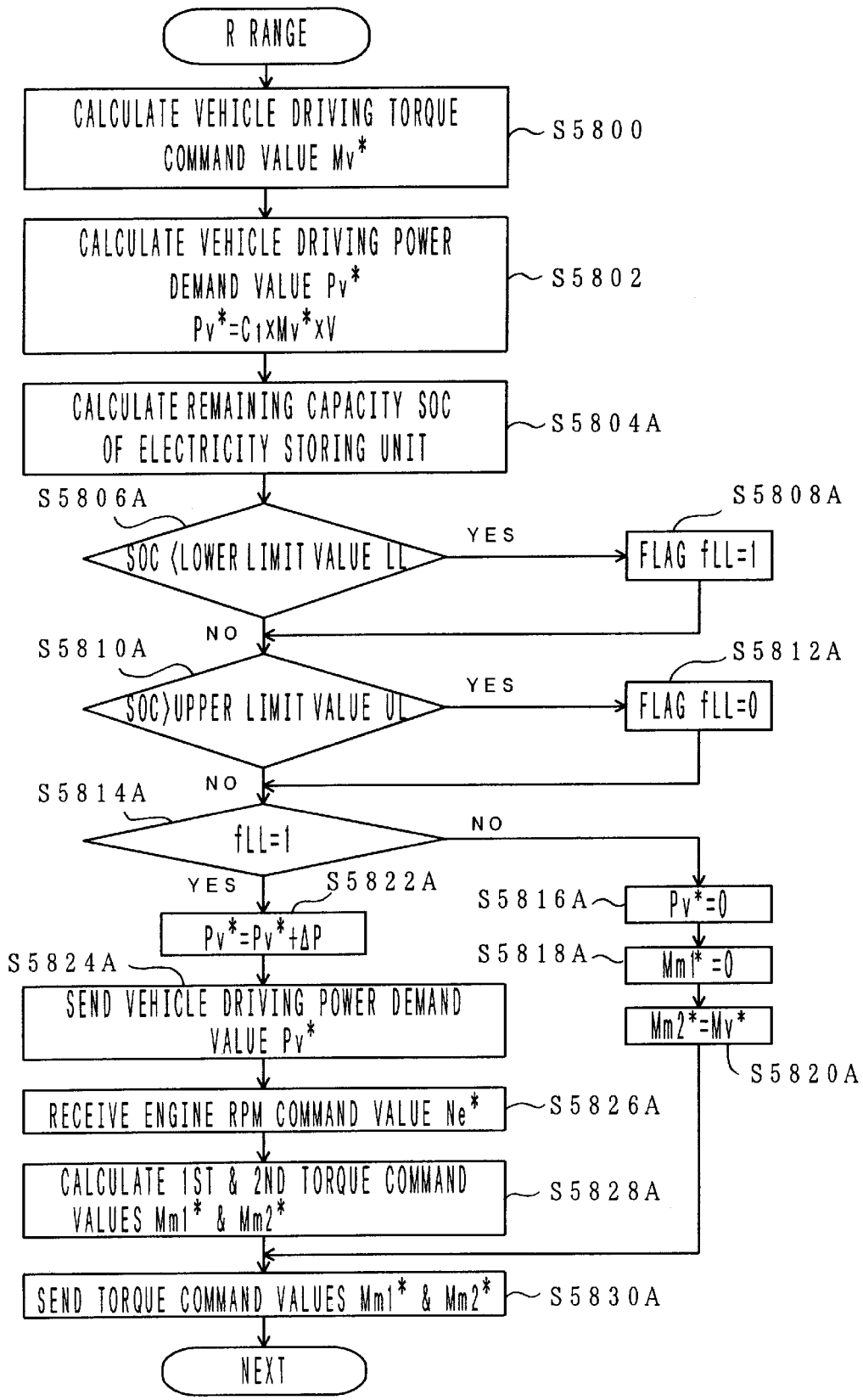
FIG. 32 is a flowchart illustrative of another example of the R-range program of the hybrid controller 16.

Next, regarding the R-range processing in step S5426 in the program shown by the flowchart of FIG. 14 in the first embodiment, an example of a modification which can be employed in place of the flowchart of FIG. 18 previously mentioned will be explained in conjunction with FIG. 32. In the R-range processing, as in the case of FIG. 18, the vehicle driving torque command value Mv* is calculated first in step S5800.

In the following step S5802, the vehicle driving power demand value Pv* is calculated. In the next step S5804A, the remaining capacity SOC of the electricity storing unit 15 is calculated. The remaining capacity SOC is calculated from the current coming in and out of the electricity storing unit 15 which is detected by a publicly known current sensor, not shown, the terminal voltage of the electricity storing unit 15 which is detected by a voltage sensor, not shown, and the temperature of the electricity storing unit 15 which is detected by a temperature sensor, not shown.

In the next step S5806A, the system determines whether the remaining capacity SOC of the electricity storing unit 15 is smaller than the lower limit value LL; if the system decides that it is smaller than the lower limit value LL (YES), then it sets, in step S5808A, a flag fLL to "1" which indicates that the remaining capacity SOC of the electricity storing unit 15 is smaller than the lower limit value LL and goes to step S5810A. If the system decides in step S5806A that the remaining capacity Soc of the electricity storing unit 15 is larger than the lower limit value LL (NO), then it proceeds e to the next step S5810A. In the step S5810A, the system determines whether the remaining capacity SOC of the electricity storing unit 15 is larger than the upper limit value UL; if the system determines that it is larger than the upper limit value UL (YES), then it sets the flag fLL to "0" in step S5812A and goes to step S5814A. If the system determines in step S5810 that the remaining capacity SOC of the electricity storing unit 15 is smaller than the upper limit value UL (NO), then it proceeds to the next step S5814A.

In step S5814A, the system determines whether the flag fLL is "1," and if the system determines that it is "1," then it decides that the remaining capacity SOC of the electricity storing unit 15 is larger than the lower limit value LL and proceeds to step S5816A; if the flag is not "1," then the system determines that the remaining capacity SOC of the electricity storing unit 15 is smaller than the lower limit value LL, and it goes to step S5822A.

In step S5816A, the system sets the vehicle driving power demand value Pv* to zero and it also sets the first torque command value Mm1* also to zero in the following step S5818A. The system substitutes the second torque command value Mm2* by the vehicle driving torque command value Mv* calculated in step S5800A, then it proceeds to step S5830A.

If the system proceeds to step S5822 after a negative determination result is given in step S5814A, then it adds a correction, which is based on formula 22, to the vehicle driving power demand value Pv* calculated in step S5802A.

$$Pv^* = Pv^* + \Delta P \qquad \text{Formula 22}$$

In formula 22, the value preset according to the type of the electricity storing unit is used for $\Delta P$.

In the next step S5824A, the vehicle driving power demand value Pv* which has been corrected in step S5822A is sent to the engine controller 13. In the following step S5826A, the engine rpm command value Ne* is received through the communication port connected to the engine controller 13. In the next step S5808A, the first and second torque command values Mm1* and Mm2* which are the torque command values of the first and second rotary electric units 2000 and 3000 are calculated. This calculation is performed by calling up the sub-routine of FIG. 16 as in the case of the start processing routine. In the following step S5830A, the first and second torque command values Mm1* and Mm2* are transmitted to the inverter 14 via the communication port built in the control unit 1630 and the communication buffer 1650.

The reverse drive mode in this embodiment will now be described. When the shift lever is set to the "R" range, the shift position SFT captured by the hybrid controller 16 is switched to "2" and the determination result given in step S5424 of the program shown in FIG. 14 is affirmative, causing the R-range processing of step S5426 to be implemented. The program of FIG. 32 shows the details of the R-range processing; first, the vehicle driving torque command value Mv* is calculated. This calculation is performed by searching a map equipped with the characteristics of FIG. 21 which is different from that of the map searched in the D-range processing. At this time, if the accelerator lift ACC is zero, then the state is the same as the one following the startup, but when the accelerator pedal is depressed, the vehicle driving torque command Mv* increases as the accelerator lift ACC increases. For example, when the accelerator lift ACC increases to 20% from the state where the vehicle is at rest, the vehicle driving torque command value Mv* reaches 20% of the maximum torque. The vehicle driving power demand value Pv* is calculated in step S5802 in the R-range processing; since the vehicle speed V is zero when the vehicle is at rest, the vehicle driving power demand value Pv* is zero.

The system has determined whether the remaining capacity SOC of the electricity storing unit 15 is larger or smaller than the predetermined lower limit value LL in the R-range processing and the determination result has been stored in terms of the flag fLL; therefore, if the remaining capacity SOC is sufficient, then the vehicle driving power demand value Pv* is set to zero and the result is sent to the engine controller 13. The engine controller is driven in the idle mode. Further, the system sets the first torque command value Mm1*, which is applied to the first rotary electric unit, to zero, and sets the second torque command value Mm2*, which is applied to the second rotary electric unit, to the vehicle driving torque command value Mv*. The first and second torque command values Mm1* and Mm2* are transmitted to the inverter unit 14, and the inverter unit 14 controls the torques of the first and second rotary electric units 2000 and 3000; therefore, the second rotary electric unit 3000 generates a torque equal to the vehicle driving torque command value Mv* and the vehicle travels backward only on the electric energy stored in the electricity storing unit 15.

Conversely, if the remaining capacity SOC of the electricity storing unit 15 is small and falls below the lower limit value LL, then a negative determination result is given in step S5814 of FIG. 32, and the predetermined corrective power $\Delta P$ is added to the vehicle driving power demand value Pv* as indicated by formula 22, and the corrected vehicle driving power demand value Pv* is sent to the engine controller 13.

The operation thereafter is the same as that of the D-range processing, so that the description thereof will be omitted. The engine 1 continues to output the corrective power $\Delta P$ for charging the electricity storing unit 15 until the remaining capacity SOC of the electricity storing unit 15 increases from the lower limit value LL and exceeds the e upper limit value UL. When the upper limit value UL is exceeded, the engine 1 is placed in the idle mode which has been described in conjunction with the aforesaid operation; the vehicle is driven by the second rotary electric unit 3000, the foregoing procedure is repeated, and the vehicle maintains the reverse drive mode.

The publicly known start-stop synchronization communication means has been employed for the information transfer between the engine controller 13 and the inverter 14 and the hybrid controller 16; however, the use of other communication method does not affect the spirit of the invention.

In the R-range processing program, the correction has been made to add the corrective power to the vehicle driving power demand value in step S5822A in order to increase the remaining capacity SOC of the electricity storing unit 15; however, the same operation can be accomplished by removing step S5822A and by making the correction indicated by formula 23 given below between step S5826A and step S5828A.

$$Ne^* = Ne^* + \Delta Ne \qquad \text{Formula 23}$$

The remaining capacity SOC of the electricity storing unit 15 is increased by increasing the output of the engine 1 by running the engine 1 at a higher speed by the corrective rpm ΔNe with respect to the engine rpm command Ne* received from the engine controller 13; based on the corrected engine e rpm command Ne*, the first and second torque command values Mm1* and Mm2* are calculated and sent to the inverter unit 14, and the inverter unit 14 controls the torques of the first and second rotary electric units 2000 and 3000. Hence, the same advantages can be obtained.

Figure 33:
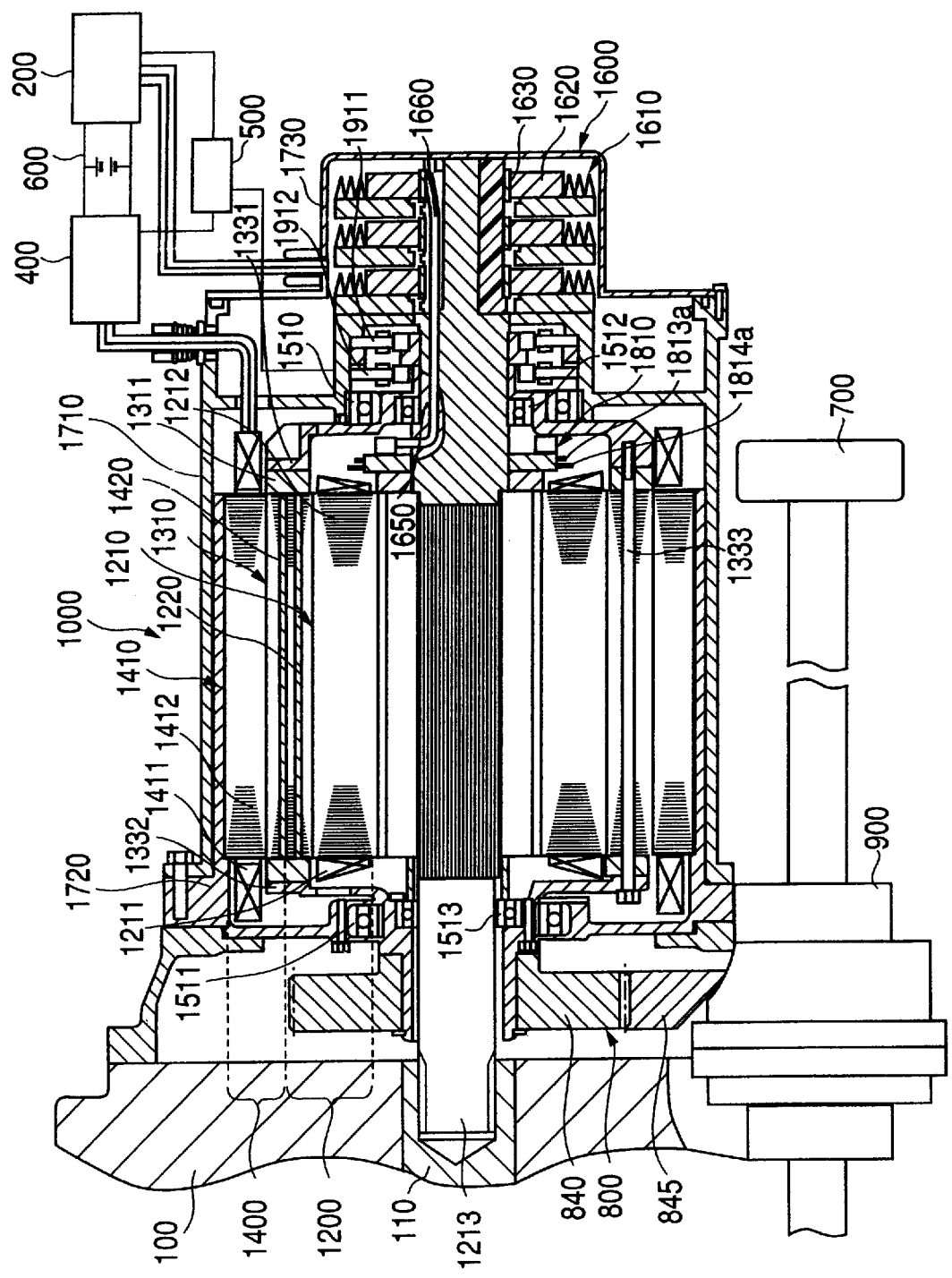
FIG. 33 is an axial sectional view illustrative of an embodiment of a load driving unit constituting a power converting means which has a first rotary electric unit and a second rotary electric unit of a hybrid vehicle controller in accordance with the present invention.
Figure 34:
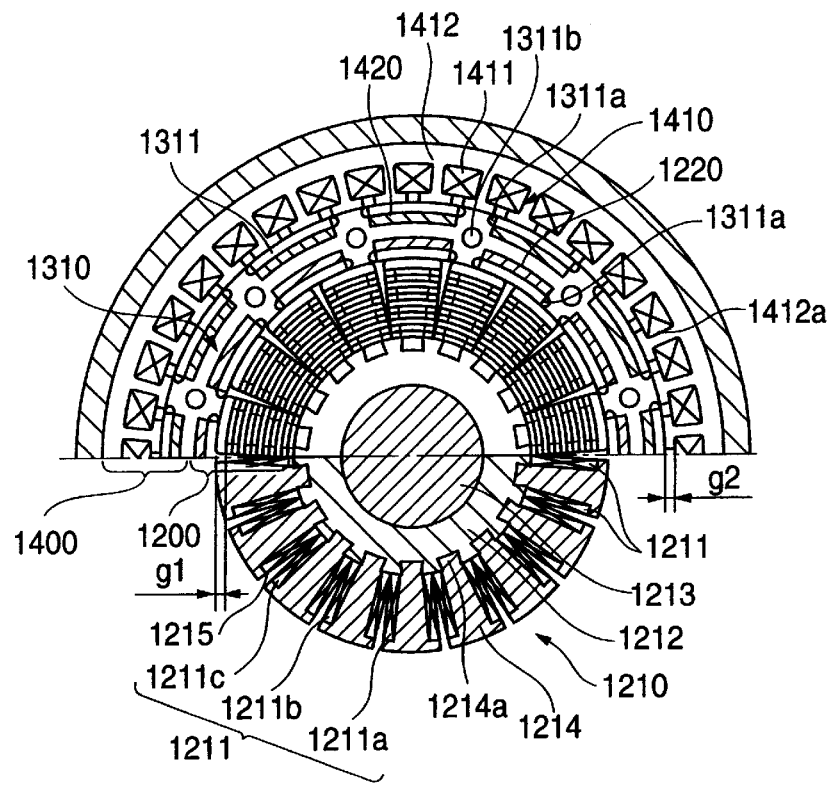
FIG. 34 is a radial sectional view of the unit of FIG. 33.

The load driving unit making up the first rotary electric unit 2000 and the second rotary electric unit 3000 according to the invention will now be described in conjunction with FIG. 33 through FIG. 45. The axial sectional view of the load driving unit is shown in FIG. 33, and the radial sectional view is shown in FIG. 34. Reference numeral 100 denotes an engine such as an internal-combustion engine which corresponds to the engine 1 in FIG. 1. Reference numeral 1000 denotes a load driving unit which functions as a torque-speed converter; it receives input power, which is defined by input torque and input rpm, from the engine 100, and it controls the output power, which is defined by output torque and output speed, to a desired value and supplies the desired value to a load composed of vehicular driving wheels, etc. The load driving unit 1000 includes: an rpm regulator 1200 which is comprised of a pair of coils and field poles for adjusting the rpms between the input and output shafts (corresponding to the first rotary electric unit 2000 in the present invention); and a torque regulator 1400 for adjusting the torques between the input and output shafts (corresponding to the second rotary electric unit 3000 in the present invention). Hereinafter, the load driving unit 1000, i.e. the torque-speed converter, will be referred to as "T-S converter."

Reference numeral 200 indicates a three-phase inverter which controls the supply of current to the rpm regulator 1200 of the T-S converter 1000. In the embodiment, the rpm regulator 1200 is composed of a three-phase AC rotary electric unit; the transfer of electric power between the rpm regulator 1200 and the inverter 200 is controlled by the switching operation of the inverter 200.

Reference numeral 400 indicates a three-phase inverter which controls the supply of current to the torque regulator 1400 of the T-S converter 1000. In the embodiment, the torque regulator 1400 is composed of a three-phase AC rotary electric unit; the transfer of electric power between the torque regulator 1400 and the inverter 400 is controlled by the switching operation of the inverter 400.

Reference numeral 500 denotes an ECU which controls the inverters 200 and 400 according to the internal information and external information received from rotation sensors 1911 and 1912, etc. provided on the T-S converter 1000.

Reference numeral 600 denotes a DC battery employed for a typical vehicle or the like. The inverters 200 and 400, the ECU 500, and the battery 600 constitute the power control circuit in the present invention.

Reference numeral 700 denotes a driving wheel composed primarily of a load output vehicle tire or the like. A joint and a decelerator (including a speed increaser), which are extensively used for typical vehicles driven by internal-combustion engines, and other components are provided between the engine 100 and the T-S converter 1000; however, they are not illustrated in the embodiment. Likewise, a decelerator 800, a differential gear 900, etc. are provided between the T-S converter 1000 and the driving wheel 700.

The details of the structure of the T-S converter 1000 will now be described.

An output shaft 110, which outputs rotational power, of the engine 100 is immediately connected to a shaft (the first shaft) 1213, which is positioned nearly at the center of the T-S converter 1000, via the joint, the decelerator (speed increaser), etc. which are not shown. In this embodiment, the output shaft 110 and the shaft 1213 are linearly disposed on the same axis; however, it is also possible to dispose the output shaft 110 and the shaft 1213 at an angle via a joint, etc. as necessary according to the mounting space of the vehicle. Provided on the shaft 1213 are a bearing which will be discussed later, a slip ring for supplying electric power, rotation sensors 1911 and 1912, etc. in addition to a first rotor 1210.

The T-S converter 1000 has: the first rotor 1210 which is the first rotor fitted and fixed on the shaft 1213; a second rotor 1310 which is the second rotor rotatably fitted on the first rotor 1210; and a stator 1410 in which the second rotor 1310 is rotatably fitted.

The stator 1410 is constructed by a three-phase winding (stator winding) 1411 and a stator core 1412 for producing a rotating magnetic field. The stator core 1412 is secured on the inner peripheral surface of an outer frame 1720; and the outer frame 1720 together with an outer frame 1710 fitted thereon make up the housing of the T-S converter 1000. These outer frames 1710 and 1720 are fastened and fixed onto the rear end surface of the engine 100.

The first rotor 1210 is composed of a three-phase winding (rotor winding) 1211 and a rotor core 1212 for producing a rotating magnetic field. The winding 1211 is able to supply or transmit electric power via a brush holder 1610, a brush 1620, a slip ring 1630, a lead portion 1660 provided via an insulator 1650 such as a molding in the shaft 1213, and a terminal assembly 1810. A cylindrical second rotor 1310 is installed around the first rotor 1210; it is relatively rotatably disposed coaxially with the first rotor 1210.

The second rotor 1310 has a cylindrical rotor yoke 1311; a field magnet (permanent magnet type field pole) 1220 is disposed on the side of the inner periphery thereof, and a field magnet (permanent magnet type field pole) 1420 is disposed on the side of the outer periphery thereof. The field magnet 1220 together with the rotor core 1212 and the winding 1211 make up the rpm regulator 1200, and the field magnet 1420 together with the stator core 1412 and the winding 1411 make up the torque regulator 1400. The field magnet 1220 is composed of a group of magnets which are arranged in the circumferential direction on the inner periphery of the second rotor 1310 at equal intervals with alternate polarities; the field magnet 1420 is composed of a group of magnets which are arranged in the circumferential direction on the outer periphery of the second rotor 1310 at equal intervals with alternate polarities.

The rotor yoke 1311 of the second rotor 1310 is rotatably supported by the outer frames (housings) 1710 and 1720 via a pair of bracket-shaped rotor frames 1331 and 1332 and bearings 1510 and 1511. The first rotor 1210 is rotatably supported by the rotor frames 1331 and 1332 of the second rotor The rotor frame 1332 of the second rotor 1310 is spline-fitted to a gear 840; the gear 840 is connected to the driving wheel 700 of the vehicle via a coupling gear 845 and a differential gear assembly 900 of the decelerator 800.

Reference numerals 1911 and 1912 denote rotation sensors which are respectively detect the rotational angle positions of the first rotor 1210 and the second rotor 1310. Reference numeral 1730 denotes the end cover which surrounds the brush holder 1610.

The first rotor 1210, the second rotor 1310, and the stator 1410 will now be explained in detail with reference to FIG. 34.

The first rotor 1210 is comprised of a rotor core 1212 which has a plurality of rotor teeth 1214 having T-shaped sections, on the outer periphery thereof, the rotor core 1212 being press-fitted in the shaft 1213. Each of the rotor teeth 1214 is wrapped with teeth windings 1211a, 1211b, and 1211c. The cylindrical rotor yoke 1311 is rotatably provided on the side of the outer periphery of the rotor teeth 1214 via an air gap gl; a plurality of magnet pieces 1220 are provided in the circumferential direction at equal intervals with alternate polarities on the side of the inner periphery thereof as previously mentioned. Formed in the circumferential direction on both ends of each of the magnets 1220 are openings 1311a for reducing the leakage of magnetic flux. The rotor yoke 1311 has through holes 1311b positioned between the respective magnets 1220; the rotor yoke 1311 is fastened to the rotor frames 1331 and 1332 on both sides by through bolts 1333 fitted in the through holes 1311b.

The magnetic flux of the field pole 1220 interlinks the windings 1211 to form a magnetic circuit. This constitutes the rpm regulator 1200 which adjusts the rpm of the load by controlling the current supplied to the windings 1211 through the inverter 200.

In the same manner, a plurality of magnets 1420 are provided in the circumferential direction on the side of the outer peripheral surface of the rotor yoke 1311 at equal intervals with alternate polarities. Formed in the circumferential direction on both ends of each of the magnets 1420 are openings 1311a for reducing the leakage of magnetic flux. The rest of the layout of the magnets 1420 is the same as that of the magnets 1220.

The stator 1410 is provided on the side of the outer periphery of the second rotor 1310 with predetermined air gap g2 therebetween. A plurality of slots 1412a for installing the winding (stator windings) 1411 are formed in the inner peripheral surface of the stator core 1412 of the stator 1410; the magnetic flux of the aforesaid field pole 1420 interlinks the winding 1411 to form a magnetic circuit. Thus, the torque regulator 1400 is constructed which regulates the torque of the load by controlling the current supplied to the winding 1411 through the inverter 400.

Figure 35:
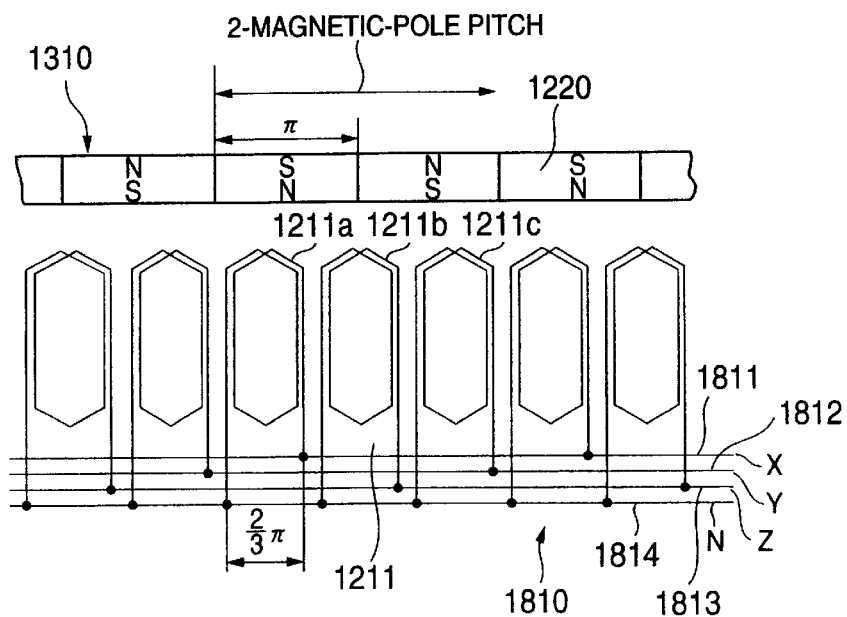
FIG. 35 is a wiring diagram illustrative of the wiring system of a three-phase winding 1211 of FIG. 33.
Figure 36:
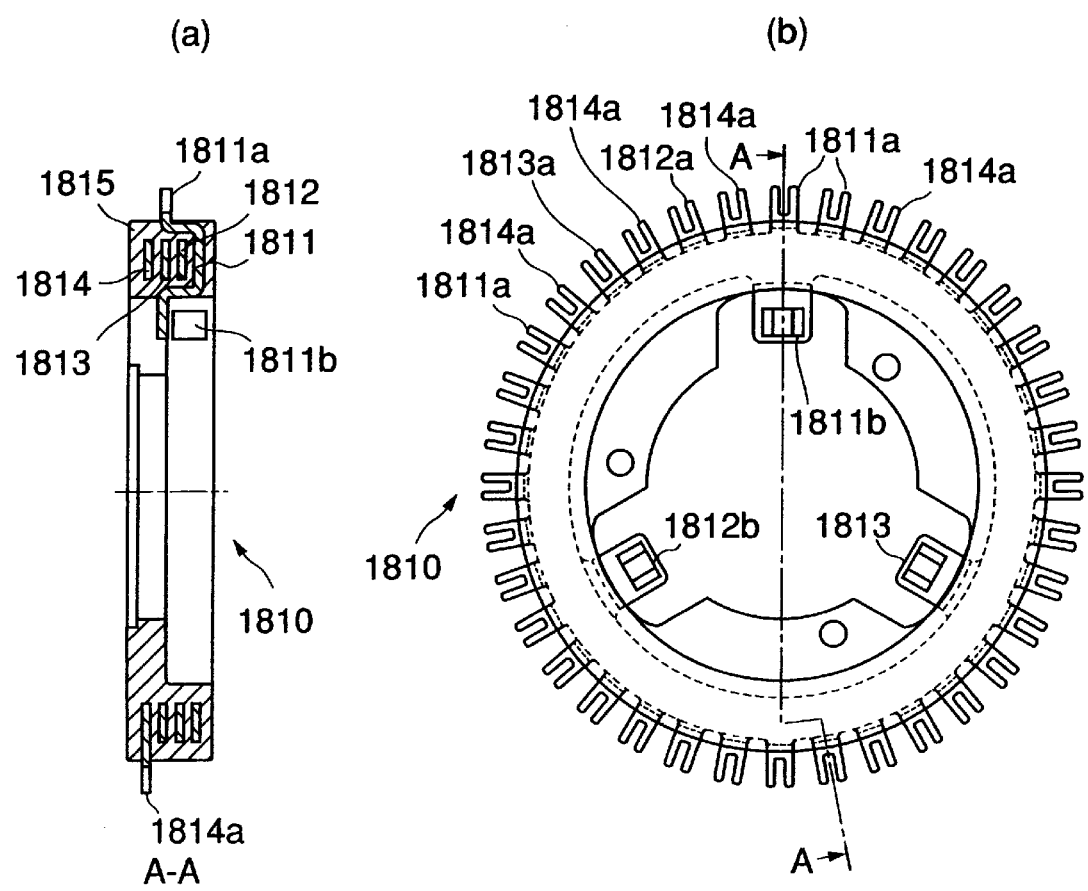
FIG. 36(a) is a sectional view of a terminal assembly 1810 of FIG. 33 taken at the line A—A in FIG. 36(b)
FIG. 36(b) is a front view of the terminal assembly 1810 of FIG. 33.
Figure 37:
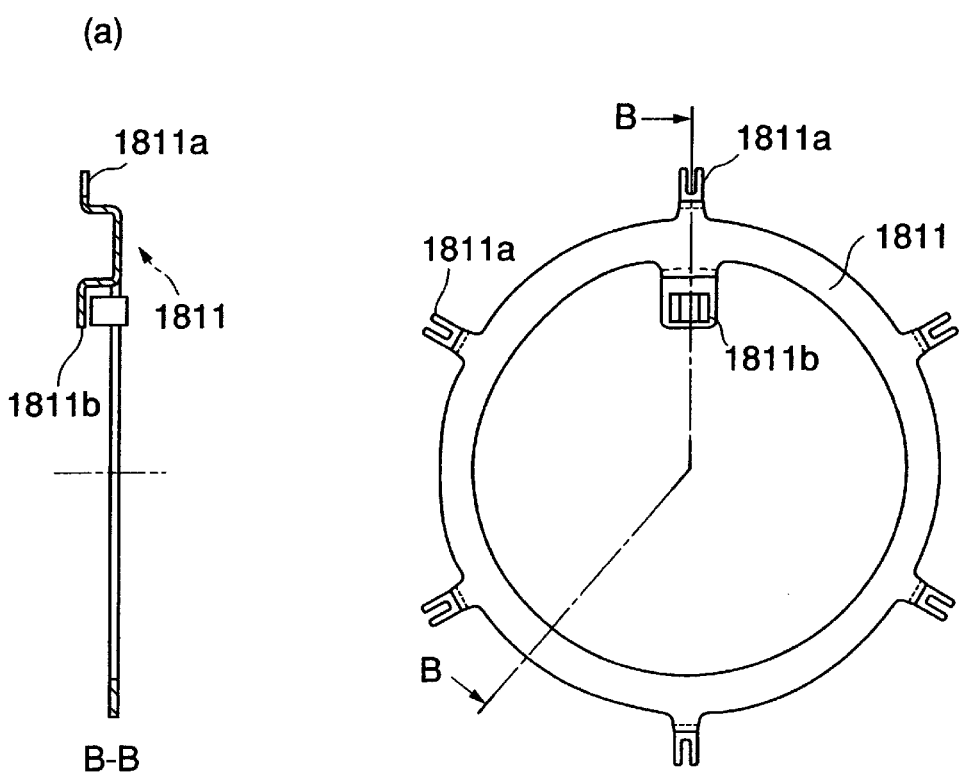
FIG. 37(a) is a sectional view of a conductor 1811 of FIG. 36 taken at the line B—B in FIG. 37(b)
FIG. 37(b) is a front view of the conductor 1811 of FIG. 36.
Figure 38:
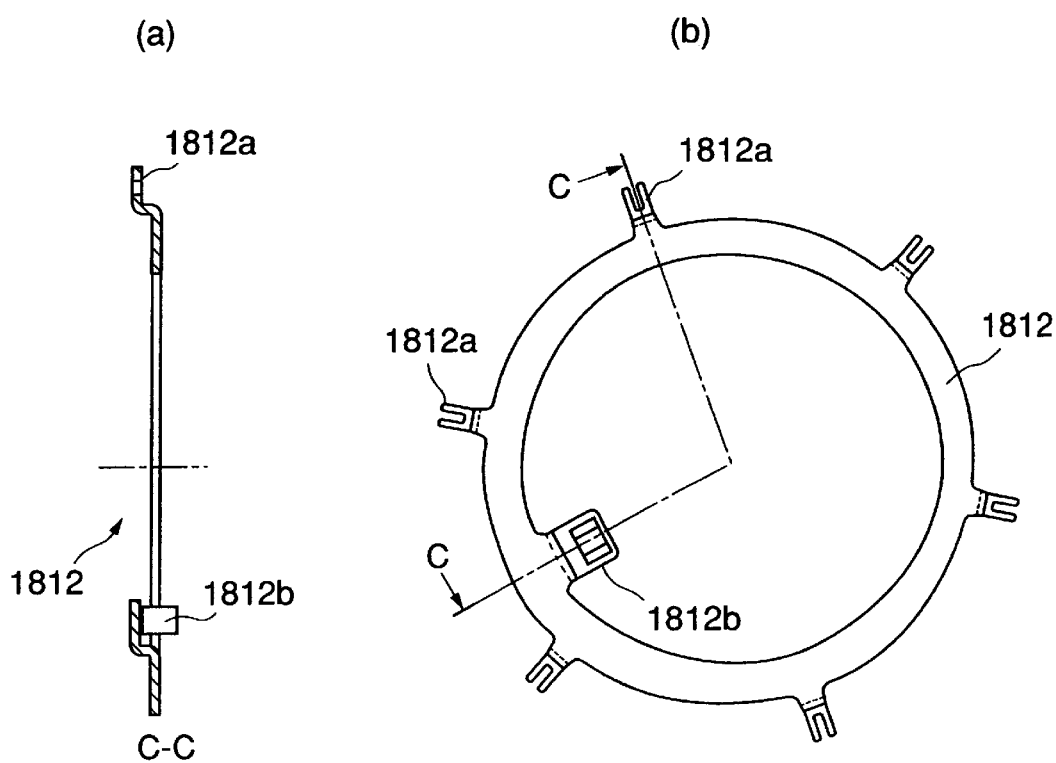
FIG. 38(a) is a sectional view of a conductor 1812 of FIG. 36 taken at the line C—C in FIG. 38(b)
FIG. 38(b) is a front view of the conductor 1812 of FIG. 36.
Figure 40:
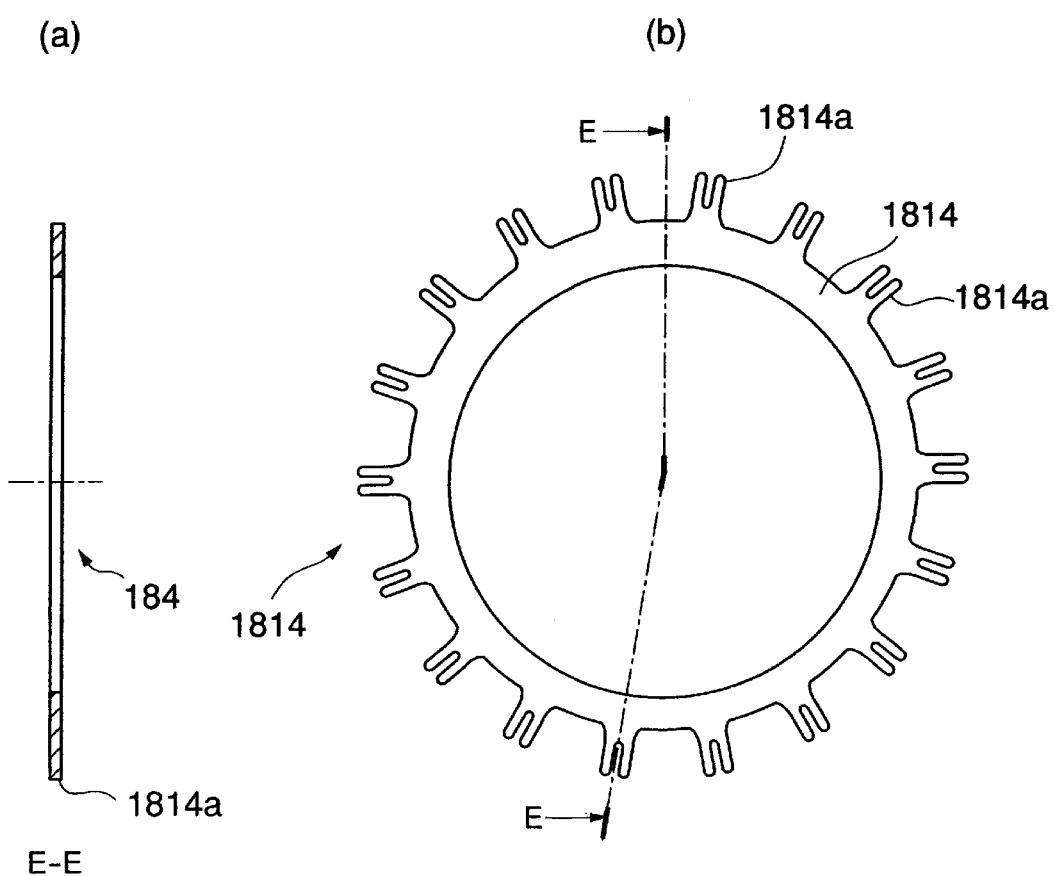
FIG. 40(a) is a sectional view of a conductor 1814 of FIG. 36 taken at the line E—E in FIG. 40(b)
FIG. 40(b) is a front view of the conductor 1814 of FIG. 36.

FIG. 35 shows the connection of the three-phase winding 1211: the teeth windings 1211a, 1211b, and 1211c (the rotor conductors in the present invention) of the respective phases which are separately wound around the rotor teeth 1214 are connected by soldering at the connection portion on the terminal assembly 1810 (see FIG. 33) such that they are arranged in parallel. Accordingly, in this embodiment, the winding of each phase of the three-phase winding 1211 is constituted by the parallel connection of a number of the foregoing teeth windings, the number corresponding to one third of the total number of the teeth.

As shown in FIG. 36 through FIG. 40, the terminal assembly 1810 is composed of: three conductors (annular conductors) 1811, 1812 and 1813 individually connected to the winding starts of the respective teeth windings 1211a, 1211b and 1211c; one conductor (annular conductor) 1814 connected to all winding ends of the respective teeth windings 1211a, 1211b and 1211c; and an electrical insulator (holder) 1815 which is a resin disc supporting the conductors 1811, 1812, 1813 and 1814.

The conductor 1811 is provided with terminals 1811a on the outer periphery, which terminals have grooves at the distal ends thereof to permit securing by soldering after crimping the ends of the teeth winding 1211a, and the terminals 1811a are connected with the winding starts of the teeth windings 1211a. The conductor 1811 is also equipped with a terminal 1811b on the inner periphery, which terminal has a groove at the distal end thereof. And the terminal 1811b is connected to the lead 1660. The ends of the teeth windings 1211a are inserted in the grooves of the terminals 1811a, then the grooves are crimped to mechanically fix them before final securing is performed by soldering.

Likewise, the conductor 1812 is equipped with terminals 1812a and 1812b, the terminals 1812a being connected to the winding starts of the teeth windings 1211b. Further likewise, the conductor 1813 is provided with terminals 1813a and 1813b, the terminals 1813a being connected to the winding starts of the teeth windings 1211c.

The conductor 1814 is also provided with terminals 1814a which have grooves at the distal ends thereof to enable securing by soldering after the coils are crimped. The terminals 1814a are respectively connected to the winding ends of the teeth windings 1211a, 1211b and 1211c of the three phases so as to provide electrical connection with the teeth windings 1211a, 1211b and 1211c of the three phases; they serve as the neutral points of three-phase star windings.

The terminals 1811a, 1811b and 1811c are arranged in order in the circumferential direction; these terminals 1811a, 1811b and 1811c are always disposed by being shifted in the axial direction in relation to its adjoining terminals so as to increase the creeping discharge voltage.

In the configuration of the 3-phase winding 1211, three rotor teeth 1214 are provided per two magnetic poles of the second rotor 1310 on the outer periphery of the rotor core 1212, and the respective rotor teeth 1214 are provided with the windings of x-phase, y-phase, and z-phase in sequence, so that the winding pitch is two-thirds magnetic pole pitch. According to the embodiment, the total length of the coil per phase is reduced to two thirds of that of the conventional coil winding structure, so that the resistance value is also reduced to two thirds thereof. Thus, the loss produced when the same current flows is reduced to tow thirds, reducing the rise in temperature of the 3-phase coil 1211. In the 3-phase winding 1211, the teeth windings are respectively wound on the rotor teeth 1214 in a concentrated fashion, then the rotor core 1212 having these teeth windings 1211a, 1211b and 1211c is secured by a tab tail 1214a, enabling a higher coil occupancy than the one in the conventional structure. Hence, a thicker conductor can be wound for the same winding specification; hence, the resistance value can be reduced, leading also to a reduced rise in temperature of the 3-phase winding 1211.

Figure 45:
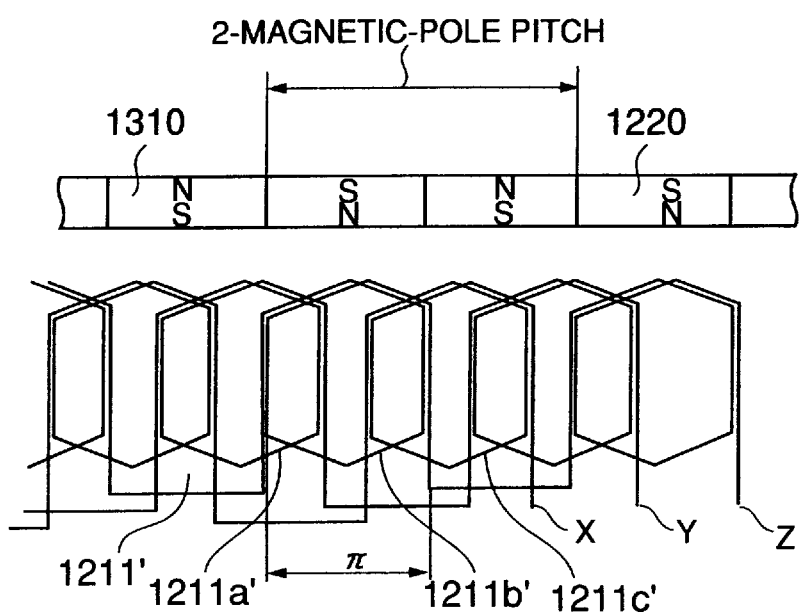
FIG. 45 is a connection diagram of a first rotor of the unit shown in FIG. 44.

In addition, as mentioned above, each of the teeth windings 1211a, 1211b and 1211c is respectively wound on the single rotor tooth 1214, so that tension can be applied to the windings with resultant improved resistance of the coils to centrifugal force. The comparison of the winding method with the conventional winding method is shown in FIG. 35 and FIG. 45; the winding method of the embodiment enables winding in blocks in the circumferential direction, whereas the conventional winding method produces the mutual laps of the respective phases, namely, the x-phase, y-phase, and z-phase, at the coil ends. The laps add to the mass of the coil ends, causing an increase in the centrifugal force applied to the coil ends. In contrast, the winding of this embodiment basically produces no laps, making it possible to control the increase in the centrifugal force.

Furthermore, as previously described, each of the teeth windings 1211a, 1211b and 1211c of the 3-phase winding 1211 is wound on the single rotor tooth 1214 in the concentrated fashion, then secured to the rotor core 1212 by the tab tail 1214a; the electrical connection is made on the terminal assembly 1810. The embodiment employs the terminal assembly 1810 to dramatically improve the ease of connection and reliability. The length of the lead wire at the connection can be reduced, so that the resistance of the connected portions to centrifugal force can be improved. Moreover, since the circumferentially adjoining terminal portions of the terminal assembly 1810 are shifted also in the axial direction, the creeping discharge distance is increased with consequent improved dielectric strength.

When attention is paid to the impedance of the 3-phase windings 1211, if the coil end structure according to this embodiment were not employed, then there would be a slight difference in the coil length and the magnetic circuit between the inner periphery and outer periphery of the first rotor 1210. As a result, the inductance or resistance frequently differs among the coils of the different phases of the 3-phase winding 1211, adversely affecting the vibration and noise of the rotary electric units. The winding method of this embodiment enables such unbalance to be significantly controlled.

Further, according to the embodiment, the bulge of the coil ends of the aforesaid 3-phase winding 1211 in the axial direction can be considerably reduced in comparison with that of the conventional motor armature coils. This makes it possible to greatly reduce the axial distance between both rotor frames 1331 and 1332 supporting the second rotor 1310 and the end surface of the second rotor 1310, permitting dramatically improved resistance to centrifugal force (high-speed rotation performance) and to vibration of the second rotor 1310.

(Modification)

A modification of the load driving unit in accordance with the invention will be described.

Figure 41:
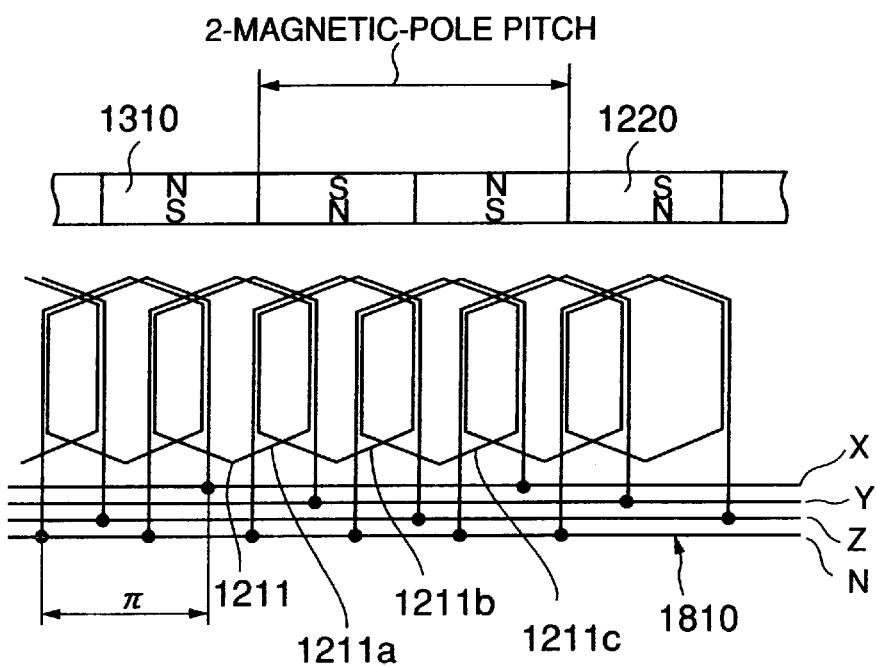
FIG. 41 is a wiring diagram illustrative of the wiring method of the three-phase winding 1211 in a modification of a load driving unit.

In the winding structure of embodiment described above, the coil of only one phase has been wound per tooth in the concentrated manner. It is also possible to apply the winding structure of the reference example illustrated in FIG. 44, wherein the coil of each phase of the 3-phase winding 1211 has a lap portion (the ends of the coils of the respective phases overlap with each other), by changing the series connection of the teeth windings to parallel connection. The parallel connection is shown in FIG. 41. The terminal assembly 1810 shown in the embodiment can be applied without adding any change thereto.

(Another Embodiment of the Load Driving Unit)

Another embodiment of the load driving unit will be described with reference to FIG. 42 and FIG. 43. The same reference numerals will be assigned to those composing elements which share the same functions with the composing elements of the embodiments described above.

Figure 43:
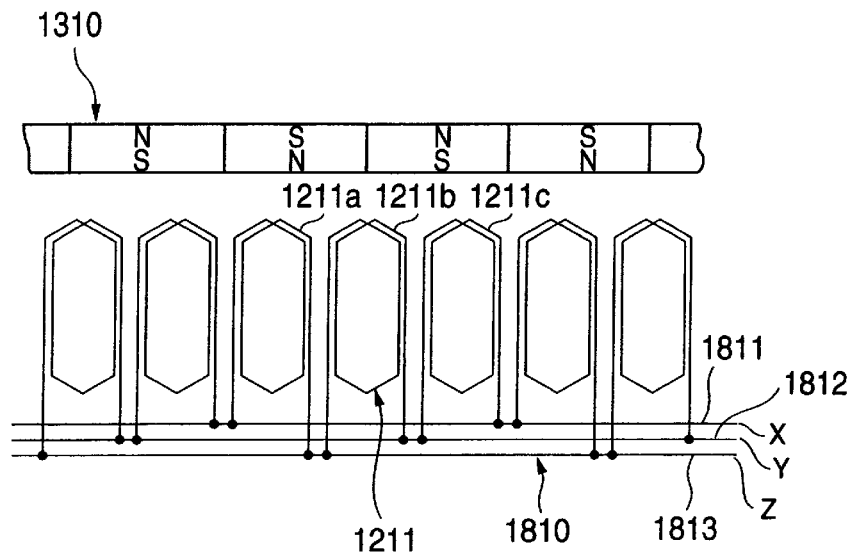
FIG. 43 is a wiring diagram of a delta connection employing the terminal of FIG. 42.
Figure 44:
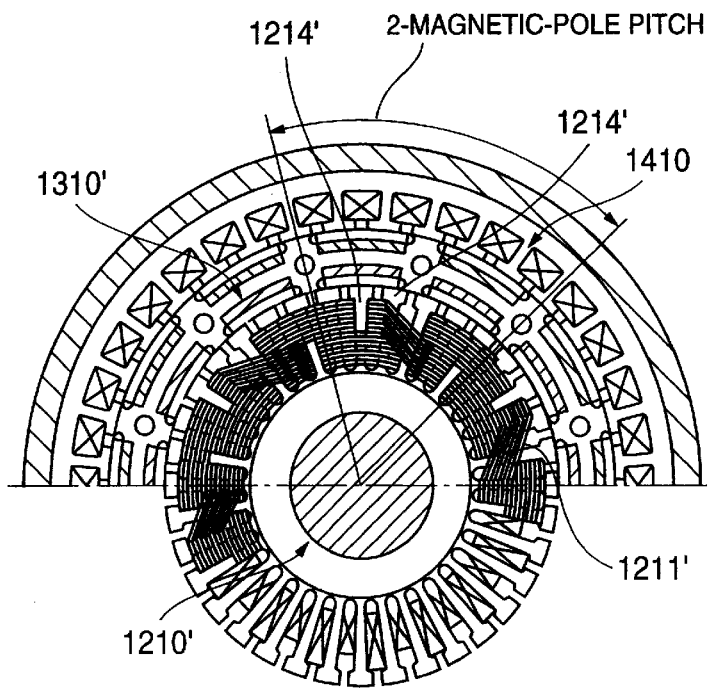
FIG. 44 is a radial sectional view illustrative of a load driving unit as a reference example.

The load driving unit of this embodiment is different from those in the embodiments described above in only one aspect that the winding 1211 has delta connection as shown in FIG. 43.

Figure 42:
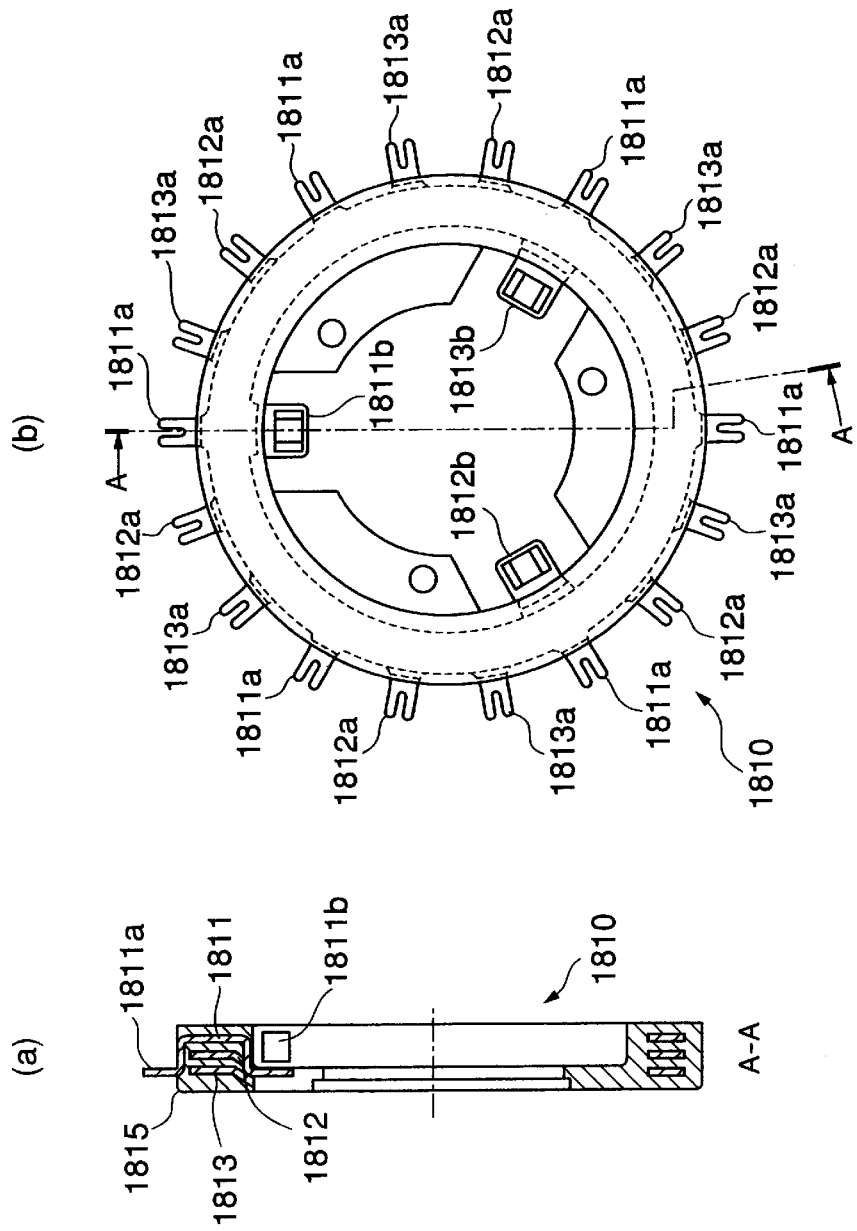
FIG. 42(a) shows another embodiment of the load driving unit; it is a sectional view of the terminal assembly 1810 taken at the line A—A in FIG. 42(b)
FIG. 42(b) is a front view of the terminal assembly 1810 shown in FIG. 42(a)

Thus, as illustrated in FIG. 42, only three conductors (annular conductors) 1811, 1812, and 1813 which are individually connected at the winding starts and ends of the teeth windings 1211a, 1211b, and 1211c are required, obviating the need for a conductor (annular conductor) 1814. As a result, a terminal 1814a (see FIG. 36) can be omitted, permitting doubled terminal pitch.

Figure 46:
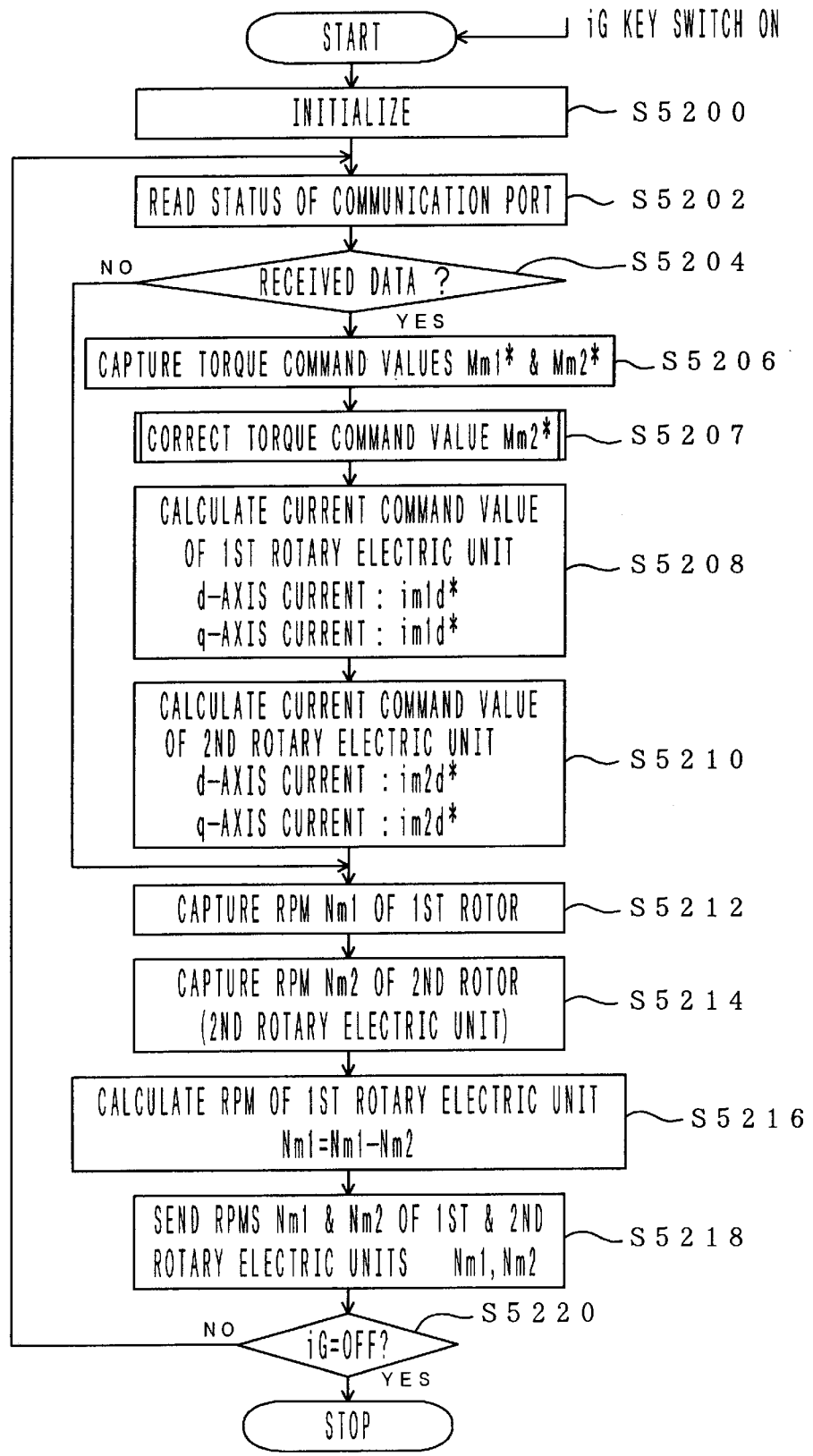
FIG. 46 is a flowchart illustrative of a main program of the conductor by an inverter.

Referring now to FIG. 46, an example of the modification of the main program for the inverter in the first embodiment will be explained. The flowchart of FIG. 46 is a modification of the flowchart of FIG. 11; it is different in that step S5207 has been provided between the step S5206 and step S5208 in FIG. 11. In step S5207, the second torque command value Mm2* is corrected according to the charge state of the electricity storing unit 15 (battery). In this case, the torque command value is corrected according to the flowchart shown in FIG. 47. More specifically, in FIG. 47, the torque command value Mm2* of the second rotary electric unit 2000 is first entered in step S6100A. In step S6102A, the value of the current (battery current) flowing in the electricity storing unit 15 is measured, then in step S6104A, the target current value (target battery current) of the electricity storing unit 15 is entered. And in step S6106A, the correction value of the second torque command value Mm2* is calculated so that the present battery current follows the target battery current (0 ampere in this embodiment) as the allowable level, and in the following step S6108A, the aforesaid calculated correction value is used to correct the second torque command value Mm2*. To give a specific example, if the current value of the electricity storing unit 15 is higher than the target battery current, then the second torque command value Mm2* is corrected in the negative direction, or if the current value of the electricity storing unit 15 is lower than the target battery current, then the second torque command value Mm2* is corrected in the positive direction.

After that, the system goes back to FIG. 46; as previously described in conjunction with FIG. 11, in step S5208, based on the first torque command value Mm1* stored in the previous step S5206, the d-axis current command value im1d* and the q-axis current command value im1q* which are the current components in the d-q axis coordinate system, the coordinates of which are established in the direction of the magnetic field of a publicly known rotor, not shown, and in the direction orthogonal thereto, are calculated as the command values of the current to be supplied to the respective phase windings of the first rotary electric unit 2000. At this time, a publicly known vector calculation is performed 9 according to the first torque command value Mm1*, the rpm Nm1 of the first rotary electric unit 2000 which has been calculated in the previous processing (the calculated value obtained in step S5216 to be discussed later), and the motor constants such as the inductance L and the primary resistance R of the first rotary electric unit 2000 stored in the ROM so as to determine the d-axis and q-axis current command values im1d* and im1q*.

In step S5210, based on the second torque command value Mm2* which has been corrected in the aforesaid step S5207, the d-axis current command value im2d* and the q-axis current command value im2q* which are the current components in the d-q axis coordinate system, the coordinates of which is established in the direction of the magnetic field of the publicly known rotor, not shown, and in the direction orthogonal thereto, are calculated as the command values of the current to be supplied to the respective phase windings of the second rotary electric unit 3000. The d-axis and q-axis current command values im2d* and im2q* are also calculated by the publicly known vector calculation.

Figure 47:
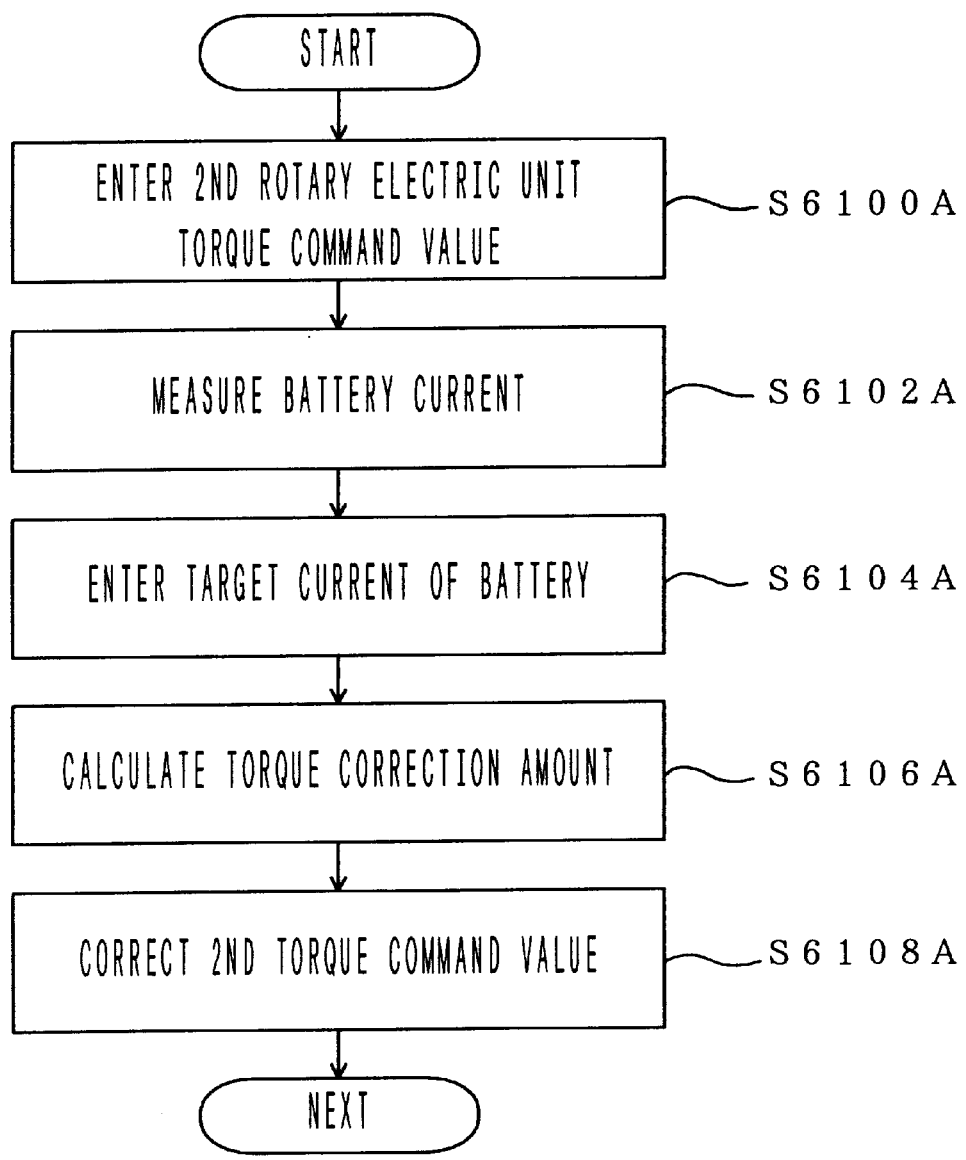
FIG. 47 is a flowchart illustrative of a correcting program of the torque command value by the inverter.

The modification shown in FIG. 46 and FIG. 47 provides the following advantages.

(a) In this modification, the current flowing to the electricity storing unit 15 is detected and the current value is employed as a parameter to set the torque command value Mm2* for the second rotary electric unit 3000. In this configuration, even when the output torques of the rotary electric units excessively change as in the transient travel of a vehicle, the current value (charge state) of the electricity storing unit 15 remains stable. The input and output of the electric power between the first and second rotary electric units 2000 and 3000 are also stable. This makes it possible to hold the input and output electric power of the electricity storing unit 15 in a balanced state, enabling the electricity storing unit 15 to be maintained in the normal state for an extended period of time. In other words, the deterioration or damage of the electricity storing unit 15 can be restrained.

(b) In this modification, the current value of the electricity storing unit 15 is employed as the parameter indicative of the charge state of the electricity storing unit 15; therefore, the advantages already described can be easily achieved.

(c) The configuration of the power transmitting means 12 of the modification permits the power transmitting means 12 to be made smaller and lighter; hence, the weight of the vehicle can be accordingly reduced, leading to higher system efficiency.

(d) Further, the control system of the modification outputs only required engine power according to the vehicle driving power demand value Pv* to transfer energy by the first and second rotary electric units 2000 and 3000 in the energy transmitting process. This minimizes the charging and discharging of the electricity storing unit 15, reducing the power drawn out of the electricity storing unit 15 during drive. Therefore, the electricity storing unit 15 can be made smaller, contributing to higher efficiency of the entire vehicle. In addition, since less power is drawn out of the electricity storing unit 15, the service life of a battery used as the electricity storing unit 15 can be extended.

The embodiments of the present invention can be implemented as follows in addition to the above.

The above embodiment is adapted to use the value of the current flowing to the electricity storing unit 15 as the parameter indicative of the charge state of the electricity storing unit 15; this may be modified as shown below.

* The terminal voltage of the electricity storing unit 15 is adopted as the parameter indicating the charge state of the electricity storing unit 15. In this case, a charge state detecting means is configured by a publicly known voltage detector. In step S5207 of FIG. 11 carried out by the inverter 14, the torque command value Mm2* of the second rotary electric unit 3000 is corrected so that the aforesaid voltage value reaches a predetermined tolerance (e.g. 288 volts of rated voltage).

* The electric power supplied by the electricity storing unit 15 is adopted as the parameter indicating the charge state of the electricity storing unit 15. In this case, a charge state detecting means is configured by a publicly known electric power detector. In step S5207 of FIG. 11 which is carried out by the inverter 14, the torque command value Mm2* of the second rotary electric unit 3000 is corrected so that the aforesaid electric power reaches a predetermined tolerance (e.g. 0 watt).

* The remaining capacity of the electricity storing unit 15 is adopted as the parameter indicating the charge state of the electricity storing unit. Incidentally, the remaining capacity is detected by a remaining capacity detector serving as the charge state detecting means and calculated by a publicly known method according to the current signal of the electricity storing unit 15 which is detected by a publicly known current sensor, the terminal voltage signal of the electricity storing unit 15 which is detected by a publicly known voltage sensor, and the temperature signal of the electricity storing unit 15 which is detected by a publicly known temperature sensor. And in step S5207 of FIG. 11 implemented by the inverter 14, the torque command value Mm2* of the second rotary electric unit 3000 is corrected so that the foregoing remaining capacity is within a predetermined permissible range (e.g. 60 to 80%).

* At least two of the terminal voltage, current value, electric power, and remaining capacity of the electricity storing unit 15 which are the parameters of the charge state described above may be combined, and the torque command value Mm2* of the second rotary electric unit 3000 may be corrected according to the charge state of the electricity storing unit 15 which is determined from the result given by the combination.

In the above embodiment, the basic value of the torque command value Mm2* of the second rotary electric unit 3000 is determined (step S5608 of FIG. 16), and this basic value has been corrected according to the charge state of the electricity storing unit 15 (step S5207 of FIG. 11); however, the configuration may alternatively be modified to carry out the calculation considering the charge state of the electricity storing unit 15 at the same time when the basic value of the torque command value Mm2* is determined. In such a case, the correction processing (setting processing) of the second torque command value Mm2* is carried out by the hybrid controller 16, and the hybrid controller 16 corresponds to the command data setting means.

Alternatively, the control target value (permissible level) of the voltage, current, electric power, or remaining capacity of the electricity storing unit 15 may be set so that it is variable. In such a case, the foregoing control target value is normally set to a state where the electricity storing unit 15 is almost fully charged or there is no input or output of electric power. The control target value is gradually changed so that deep discharge is performed from that state and then charge is gradually implemented, thereby securely preventing the deterioration of the electricity storing unit 15. To be more specific, for example, when the control target voltage for normal operation is set to a rated voltage (288 volts), the target value is lowered to approximately 75% thereof, then it is gradually raised to the rated voltage. Further, when the target remaining capacity for normal operation is set to, for example, 60 to 80%, the target value is lowered once to 30%, then it is gradually increased back to the original target value (60 to 80%). Such control target values may be changed about once every two to three months.

The above embodiment is adapted to correct or set the torque command value Mm2* for the second rotary electric unit 3000 in accordance with the charge state of the electricity storing unit 15. Alternatively, however, the engine rpm value Ne* (target rpm) may be corrected or set in accordance with the charge state of the electricity storing unit 15. In such a case, the processing for correcting the engine rpm command value Ne* may be added between, for example, step S5122 and step S5124 of FIG. 5. In this configuration, therefore, the engine controller 13 corresponds to the command data setting means. In this case, the parameter indicative of the charge state of the electricity storing unit 15 may be voltage, current, electric power, remaining capacity, or a combination of these.

The examples of the modifications of the P-range processing, the R-range processing, the N-range processing, and the D-range processing which have been described in conjunction with FIG. 17 through FIG. 20 in the first embodiment will now be described in conjunction with the flowcharts shown in FIG. 48 through FIG. 51. In FIG. 48 through FIG. 51, the processing for transient judgment and transient control has been added to the processing shown in FIG. 17 through FIG. 20; the additional processing will be explained. The transient judgment and transient control will be explained in detail by referring to FIG. 52 and FIG. 53.

Figure 17:
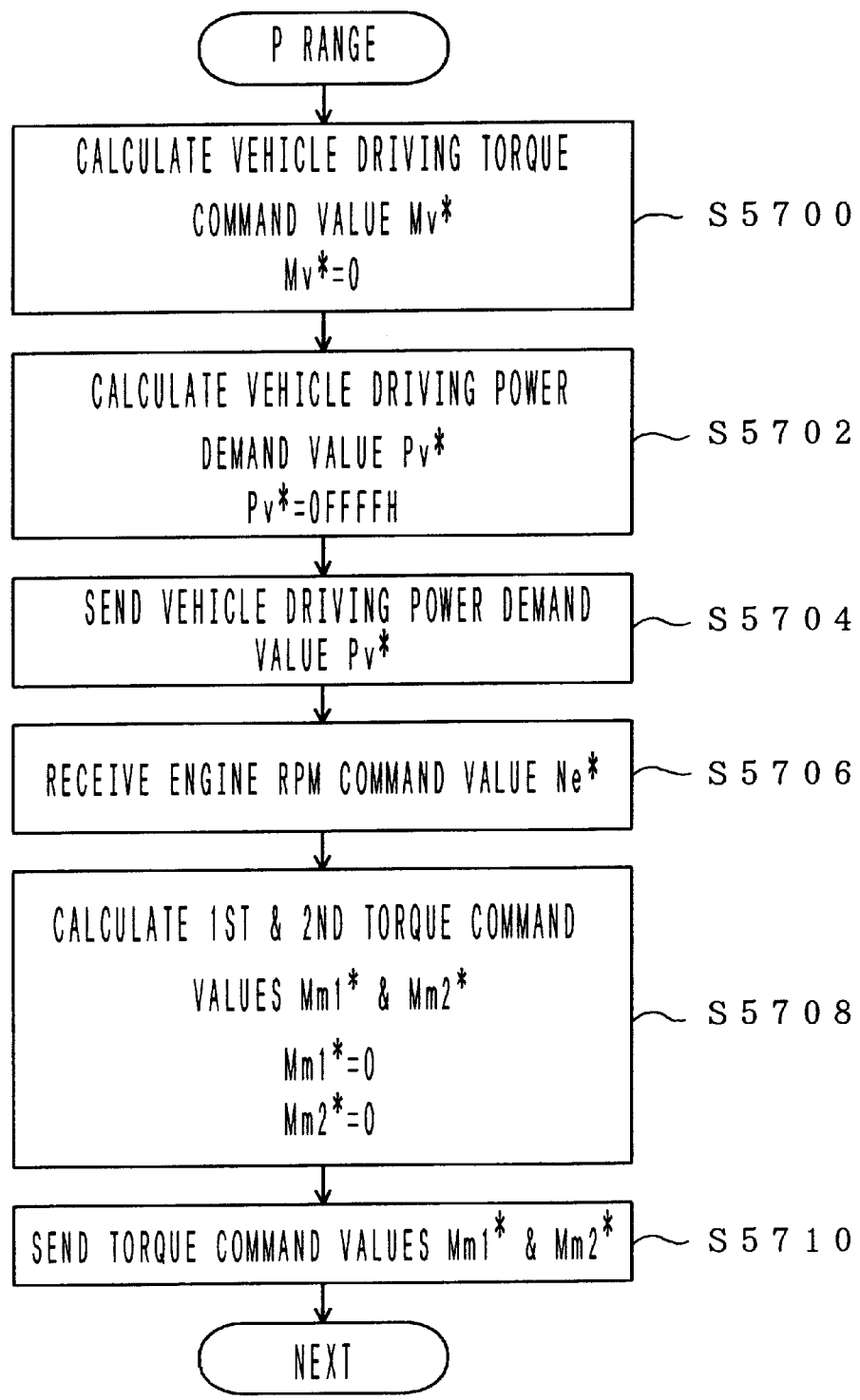
FIG. 17 is a flowchart illustrative of a P-range program of the hybrid controller 16.
Figure 48:
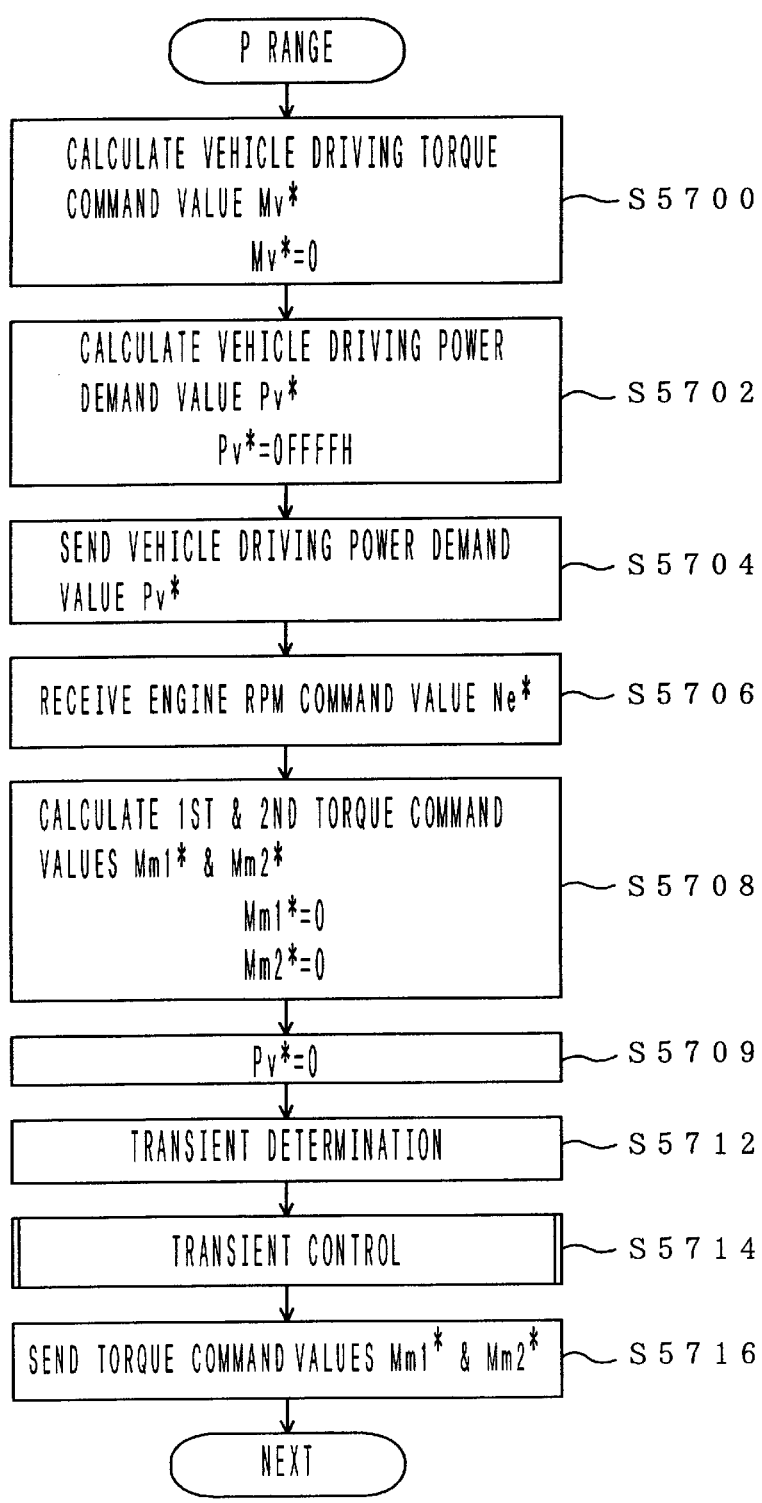
FIG. 48 is a flowchart of a modification example of the P-range program of the hybrid controller 16.

First, in FIG. 48 showing the flowchart for the P-range processing, steps S5709, S5712, and S5714 have been added to the steps shown in FIG. 17; step S5716 corresponds to step S5710 of FIG. 17.

In step S5709, the vehicle driving power demand value Pv* is cleared to "0" and in the following step S5712, the transient judgment of the vehicle is performed. This transient judgment is performed by calling up the transient judgment sub-routine shown in FIG. 52 which will be discussed later. After that, in step S5714, the transient control is conducted according to the judgment result given in the foregoing step S5712. This transient control is carried out by calling up the transient control sub-routine shown in FIG. 53 to be discussed later. In the subsequent step S5716, the first and second torque command values Mm1* and Mm2* are transmitted to the inverter 14 via the communication port built in the control unit 1630 and the communication section 1650.

The transient judgment sub-routine called up in the foregoing step S5712 will now be described in conjunction with the flowchart shown in FIG. 52. In the transient judgment routine of FIG. 52, first, the smoothing calculation of the vehicle driving power demand value Pv* is performed according to the following formula 24 in step S6100B:

$$Pv^*i=(C3 \cdot Pv^*i-1+Pv^*)/(C3+1) \quad \text{Formula 24}$$

where C3 denotes an amortization coefficient.

Further, in step S6102B, acceleration or deceleration amount ΔPv* of the vehicle is calculated according to formula 25 given below:

$$\Delta Pv^*=Pv^*-Pv^*i \quad \text{Formula 25}$$

When the calculated value of the acceleration or deceleration amount ΔPv* from the formula above is positive (+), it means that the vehicle is being accelerated; when the calculated value is negative (−), it means that the vehicle is being decelerated.

After that, in step S6104B, the system determines whether the acceleration or deceleration amount ΔPv* calculated in the aforesaid step S6102B is larger than a predetermined judgment value ΔPo; if it decides that ΔPv*>ΔPo, then it decides that the vehicle at that point is being accelerated and proceeds to step S6106B. In step S6106B, the system sets an acceleration flag fACC to "1" and clears a deceleration flag fDEC to "0." Further in the following step S6108B, the system clears a fuel cutoff flag fCUT to "0" before terminating the sub-routine.

If ΔPv*≦ΔPo and if the determination result in step S6104B is negative, then the system goes to step S6110B to determine whether the acceleration or deceleration amount ΔPv* calculated in the foregoing step S6102B is smaller than a predetermined judgment value −ΔPo, where "−ΔPo" is a negative value of the judgment value ΔPo employed in the foregoing step S6104B (however, the value may be changed to any value as long as it is negative). If ΔPv*<−ΔPo, then the system decides that the vehicle at that point is being decelerated and goes to step S6116B. In step S6116B, the system clears the acceleration flag fACC to "0" and sets a deceleration flag fDEC to "1." Further in the following step S6118B, the system sets the fuel cutoff flag fCUT to "1" before terminating the sub-routine.

If ΔPv*≧−ΔPo and if the determination result in step S6110B is negative, then the system goes to step S6112B. In this case, the system determines that the vehicle is being neither accelerated nor decelerated, that is, the vehicle is in a constant-speed state, and it clears both the acceleration flag fACC and the deceleration flag fDEC to "0" in step S6112B. Further in the following step S6114B, the system clears the fuel cutoff flag fCUT to "0" and terminates the sub-routine.

The transient control sub-routine in step S5714 for the P-range processing shown in FIG. 17 will now be described with reference to FIG. 53. In the drawing, first in step S6200A, the system determines whether the absolute value of the deviation of the actual engine rpm Ne from the engine rpm command value Ne* (|Ne*−Ne|) is a deviation ΔNe or less. If the determination result given in step S6200A is affirmative (if|Ne*−Ne|≦ΔNe), then the system decides that the engine 1 is running exactly in accordance with the engine rpm command value Ne* and immediately terminates the routine.

On the other hand, if the determination result given in step S6200A is negative (if|Ne*−Ne|>ΔNe), then the system proceeds to step S6202A and determines in the step S6202A whether the acceleration flag fACC has been set to "1," that is, whether the vehicle is being accelerated. If the acceleration flag fACC=1, then the determination result in step S6202A is affirmative; the system advances to step S6204A where it implements calculation indicated by formula 26:

$$Mm1^*=Mm1^*-\Delta M \quad \text{Formula 26}$$

In formula 26 given above, the first torque command value Mm1*, which is the torque command value of the first rotary electric unit 2000, is decreased by a predetermined corrective torque ΔM to make a correction.

Further, in step S6206A, the calculation indicated by the following formula 27 is implemented.

$$Mm2^*=Mm2^*+\Delta M \quad \text{Formula 27}$$

This means that in formula 27 given above, the second torque command value Mm2*, which is the torque command value of the second rotary electric unit 3000, is increased by the predetermined corrective torque ΔM to make a correction. After correcting the first and second torque command values Mm1* and Mm2*, the system terminates the transient control routine.

If the system decides in step S6202A that the acceleration flag fACC is "0," then it gives a negative determination result in step S6202A, and goes to step S6208A and determines in the step S6208A whether the deceleration flag fDEC has been set to "1," that is, whether the vehicle is being decelerated. If the deceleration flag fDEC=1, then the system gives an affirmative judgment result in step S6208A and proceeds to step S6210A. In step S6210A, the system sets "0FFFFH (hexadecimal)," which indicates that the vehicle is in the fuel cutoff state, for the vehicle driving power demand value Pv*, and it sends the Pv* value to the engine controller 13. Further, in step S6212A, the calculation shown by the following formula 28 is carried out:

$$Mm1^*=Mm1^*+\Delta M \quad \text{Formula 28}$$

Specifically, in the above formula 28, the first torque command value Mm1*, which is the torque command value of the first rotary electric unit 2000, is increased by the predetermined corrective torque ΔM to make a correction.

After that, the calculation indicated by the following formula 29 is implemented in step S6214A:

$$Mm2^* = Mm2^* - \Delta M \qquad \text{Formula 29}$$

This means that in formula 29 given above, the second torque command value Mm2*, which is the torque command value of the second rotary electric unit 3000, is decreased by the predetermined corrective torque ΔM to make a correction. After correcting the first and second torque command values Mm1* and Mm2*, the system terminates the transient control routine.

On the other hand, if the acceleration flag fACC=0 and the deceleration flag fDEC=0, and if the determination results given in steps S6202A and S6208A are both negative, then it means that the vehicle is running at constant speed; therefore, the first and second torque command values Mm1* and Mm2* are not corrected. The system immediately terminates the transient control routine after performing the flag judgment.

Figure 49:
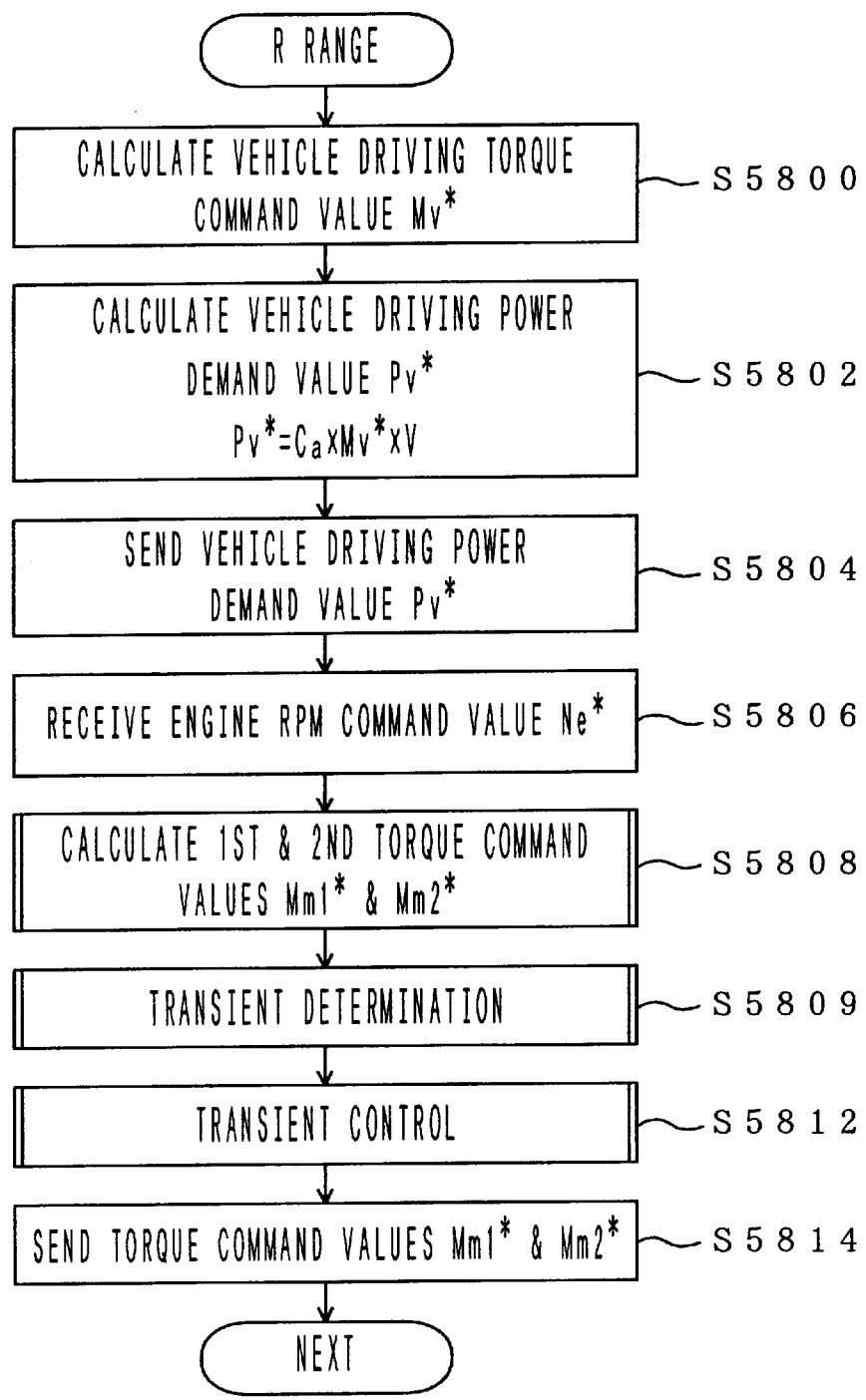
FIG. 49 is a flowchart of a modification example of the R-range program of the hybrid controller 16.

Referring now to FIG. 49 which shows the flowchart of the R-range processing, steps S5809 and S5812 have been added to the steps shown in FIG. 17; step S5914 corresponds to step S5810 of FIG. 17. In step S5809, the transient judgment is implemented. In the transient judgment, the sub-routine shown in FIG. 52 is called up as in the case of the P-range processing. Further, in step S5812, the transient control is conducted. In the transient control, the sub-routine shown in FIG. 53 is called up as in the case of the P-range processing. Lastly, in step S5814, the first and second torque command values Mm1* and Mm2* are sent to the inverter 14 via the communication port built in the control unit 1630 and the communication section 1650.

Figure 50:
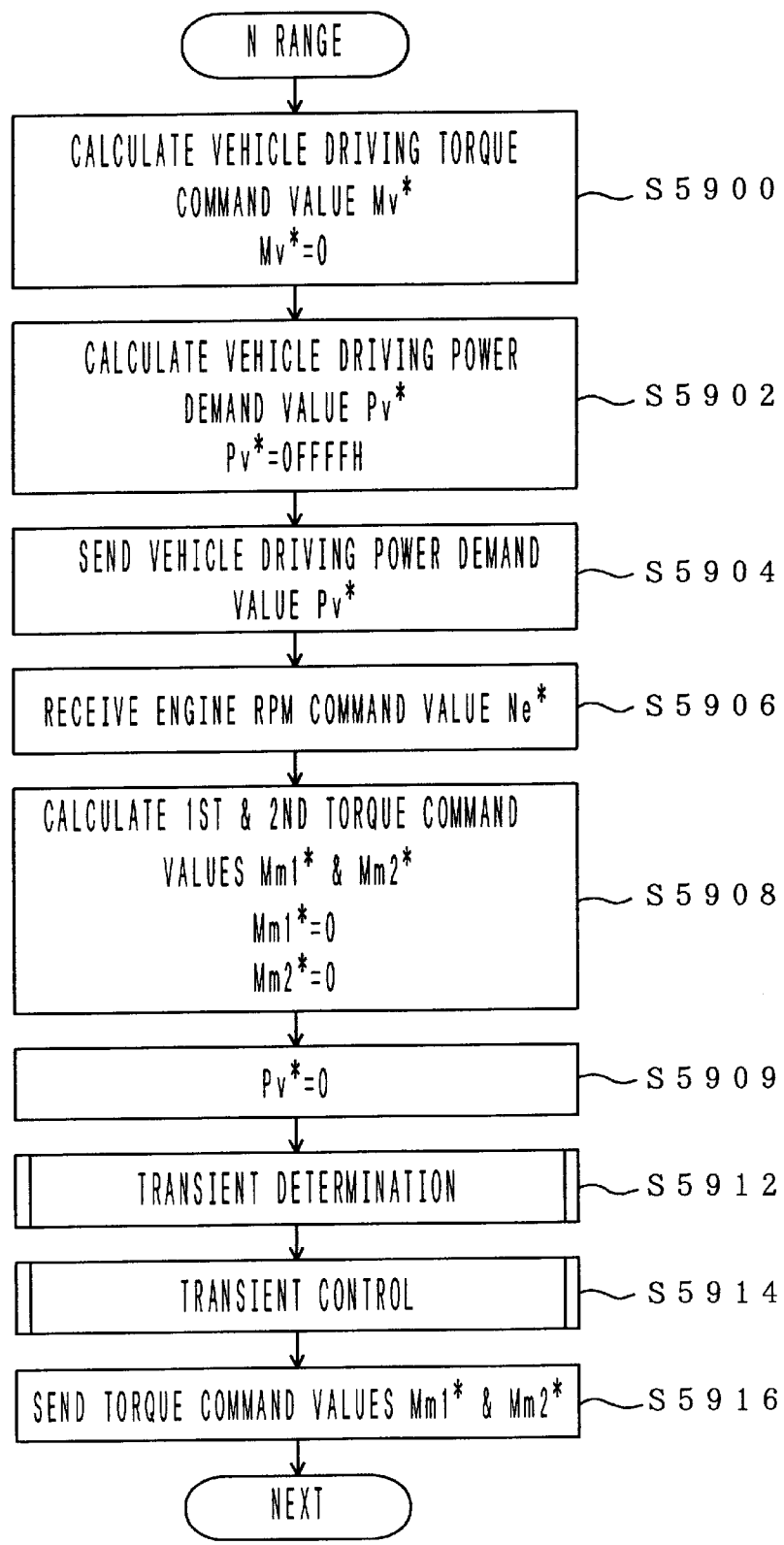
FIG. 50 is a flowchart of a modification example of the N-range program of the hybrid controller 16.

In FIG. 50 which shows the flowchart of the N-range processing, steps S5909, S5912 and S5914 have been added to the flowchart shown in FIG. 17; step S5916 corresponds to step S5910 of FIG. 17. In step S5909, the vehicle driving power demand value Pv* is cleared to "0." After that, in step S5912, the transient judgment is implemented. In the transient judgment, the sub-routine shown in FIG. 52 is called as in the case of the P-range processing or the R-range processing. Further, in step S5914, the transient control is conducted. In the transient control, the sub-routine shown in FIG. 53 is called up as in the case of the P-range processing or the R-range processing. Lastly, in step S5916, the first and second torque command values Mm1* and Mm2* are sent to the inverter 14 via the communication port built in the control unit 1630 and the communication section 1650.

Figure 51:
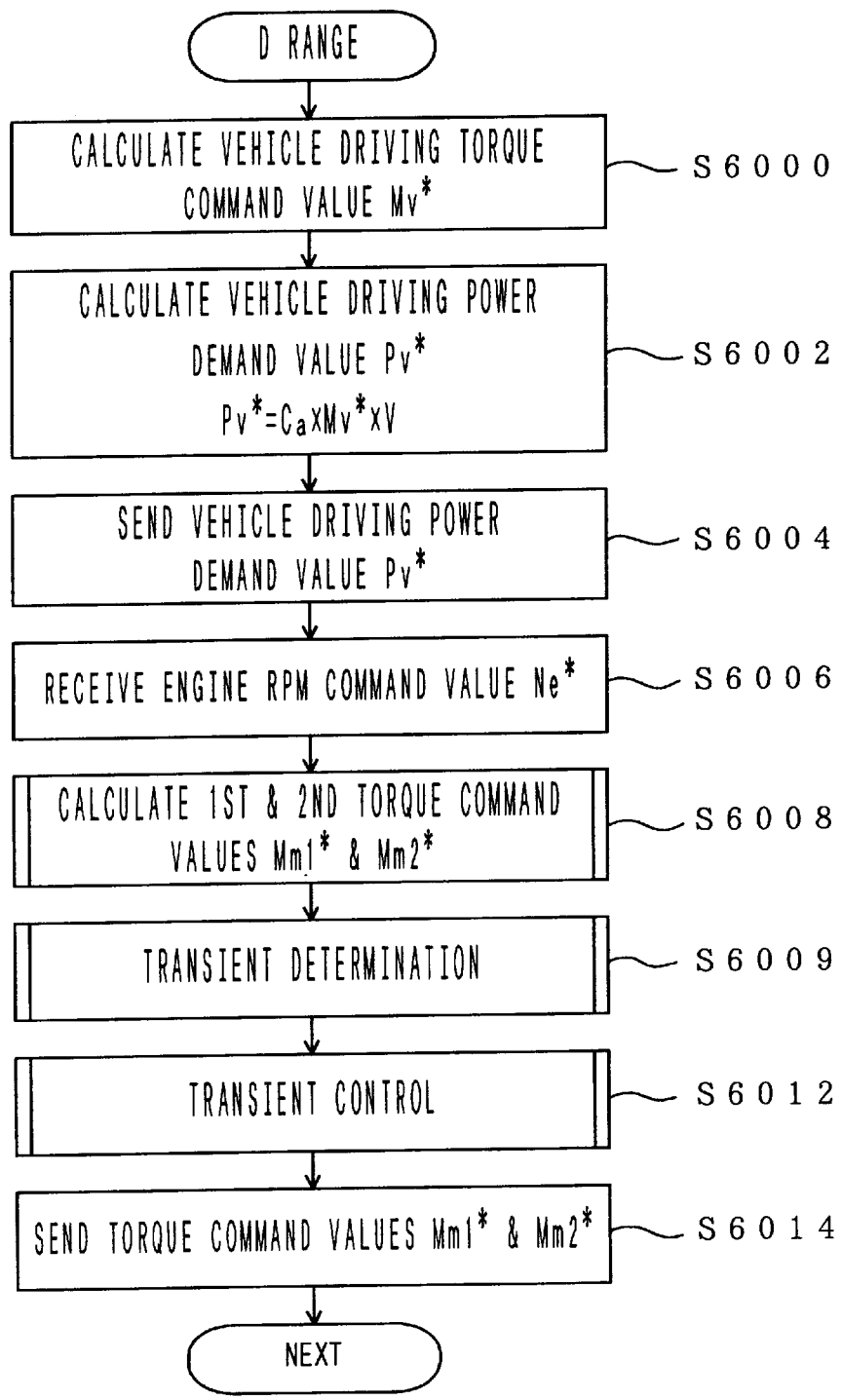
FIG. 51 is a flowchart of a modification example of the D-range program of the hybrid controller 16.

In FIG. 51 which shows the flowchart of the D-range processing, steps S6009 and S6012 have been added to the flowchart shown in FIG. 17; step S6014 corresponds to step S6010 of FIG. 17. In step S6009, the transient judgment is implemented. In the transient judgment, the sub-routine shown in FIG. 52 is called as in the case of the P-range processing, the R-range processing, or the N-range processing. Further, in step S6012, the transient control is conducted. In the transient control, the sub-routine shown in FIG. 53 is called up as in the case of the P-range processing, the R-range processing, or the N-range processing. Lastly, in step S6014, the first and second torque command values Mm1* and Mm2* are sent to the inverter 14 via the communication port built in the control unit 1630 and the communication section 1650.

Figure 52:
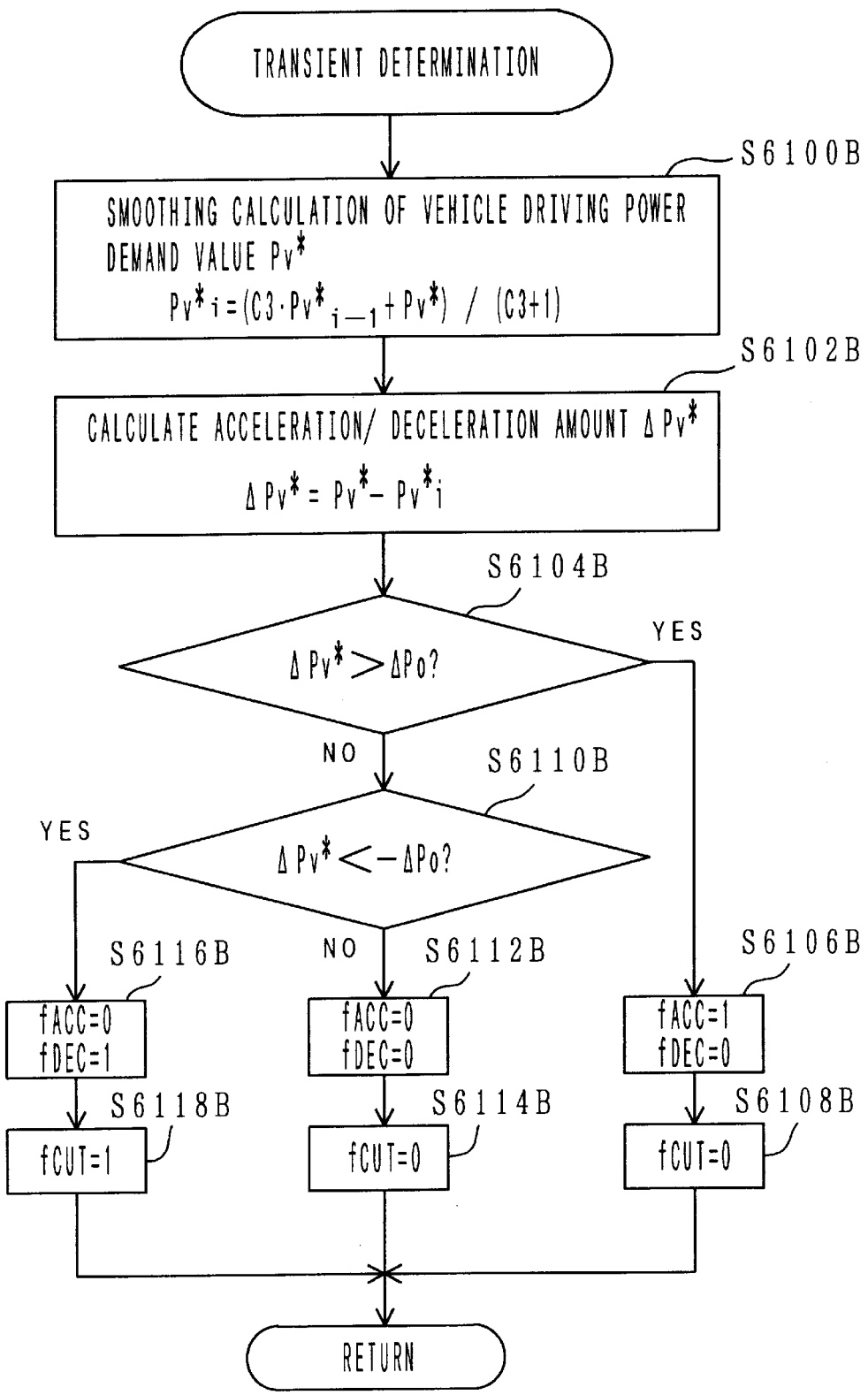
FIG. 52 is a flowchart illustrative of a transient determining program implemented by the hybrid controller.
Figure 53:
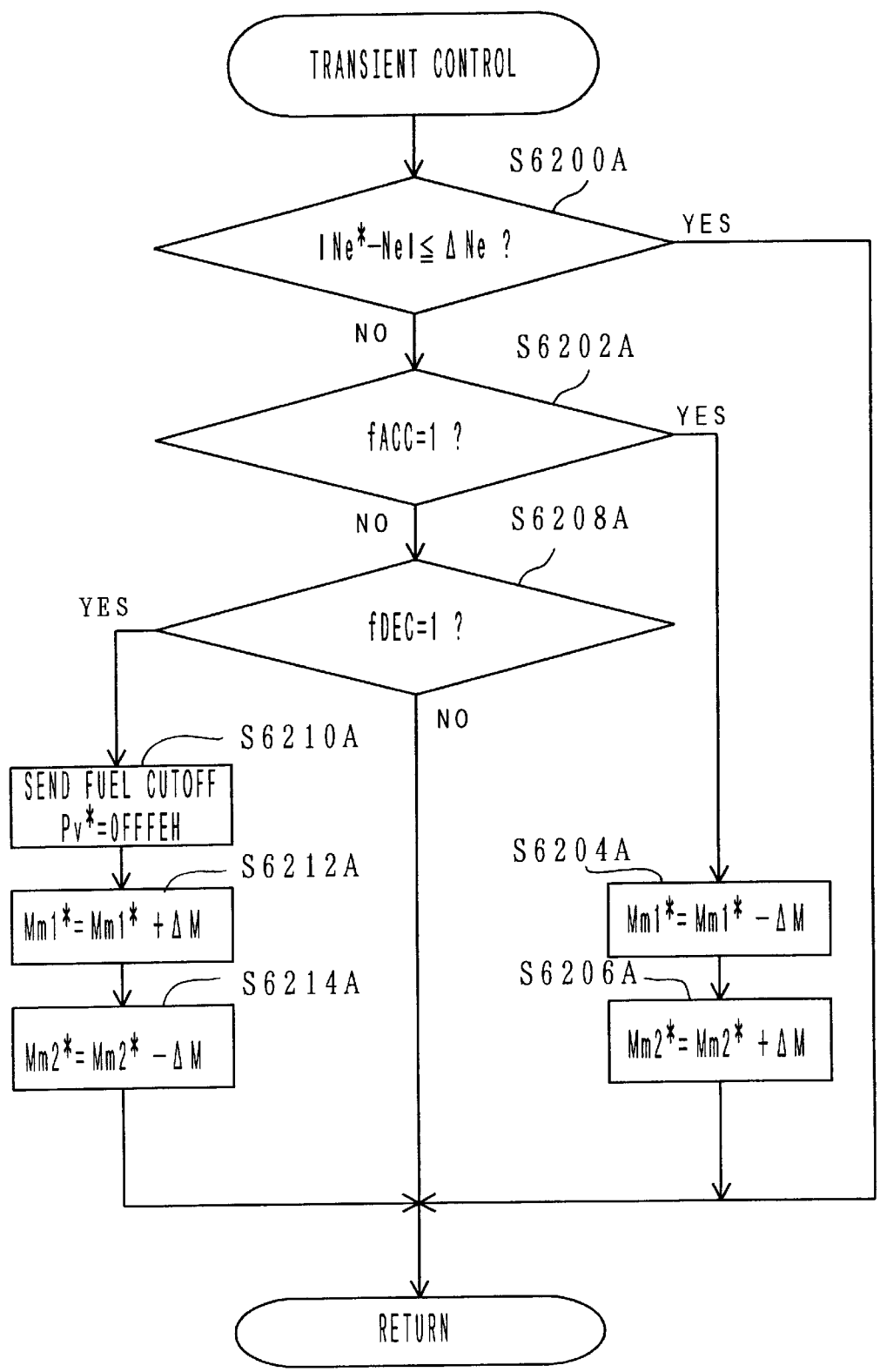
FIG. 53 is another flowchart illustrative of a transient determining program implemented by the hybrid controller.

Incidentally, in this embodiment, the program shown in FIG. 52 which is executed by the control unit 1630 of the hybrid controller 16 corresponds to the transient state detecting means described in the appended claims, and the program shown in FIG. 53 corresponds to the torque correcting means. The programs shown in FIG. 52 and FIG. 53 make up the fuel cutoff instructing means. Further, the control unit 1630 of the hybrid controller 16 (the programs of Figs, 15, 16, and 48 through 51) constitutes the torque control amount calculating means, and the control unit 1306 (the program of FIG. 5) of the engine controller 13 constitutes the target rpm calculating means.

The operation of the program for implementing the aforesaid transient judgment and transient control will now be described. In the hybrid controller 16, the sub-routine for the transient judgment shown in FIG. 52 is called up (step S6009 of FIG. 51); based on the acceleration or deceleration amount ΔPv* (=Pv*−Pv*i) which indicates the difference between the current vehicle driving power demand value Pv* and the smoothed value Pv*i thereof, various flags indicative of the transient state of the vehicle drive are set sequentially. More specifically, if the acceleration or deceleration amount ΔPv* increases in the positive direction (if ΔPv*>ΔPo), then the acceleration flag fACC is set to "1" (step S6106 of FIG. 52), and the information indicating that the vehicle is being accelerated is stored. In this case, the fuel cutoff flag fCUT is cleared to "0" (step S6108) to prevent the fuel cutoff from being implemented.

In the hybrid controller 16, the sub-routine for the transient control shown in FIG. 53 is called up (step S6012). In this case, under the acceleration state where, for example, the accelerator lift is increased 20% from the fully closed position, it is determined that the absolute value of the deviation of the current engine rpm Ne from the engine rpm command value Ne* in the transient control sub-routine is larger than a predetermined deviation ΔNe ("No" in step S6200A of FIG. 53), and it is also determined that the acceleration flag fACC stored in the transient judgment routine is "1" ("YES" in step S6202A). Then, the first torque command value Mm1* calculated in step S6008 in the D-range processing is decreased by the predetermined torque correction amount ΔM to make a correction, while the second torque command value Mm2* is increased by the predetermined torque correction amount ΔM to make a correction (steps S6204A and S6206A).

The first and second torque command values Mm1* and Mm2* thus corrected are transmitted to the inverter 14 (step s6014 of FIG. 51), and the inverter 14 controls the torques of the first and second rotary electric units 2000 and 3000 according to the corrected first and second torque command values Mm1* and Mm2*. At this time, when the inverter 14 controls the torque of the first rotary electric unit 2000 according to the first torque command value Mm1* (the corrected value), the engine 1 runs with the first rotary electric unit 2000 as the load thereof.

In such a case, the engine 1 runs at the engine output torque Me corresponding to the vehicle driving power demand value Pv*, while the first rotary electric unit 2000 runs at the torque command value Mm1*. The first torque command value Mm1* is smaller than the output torque Me of the engine 1; therefore, the load of the engine 1 becomes smaller, promoting the rise in rotational speed. When the engine speed increases and approaches the engine rpm command value Ne* (target value), the rpm deviation is eliminated ("YES" in step S6200A of FIG. 53). At this point, the correction based on the predetermined torque correction amount ΔM is no longer made on the first and second torque command values Mm1* and Mm2*. And the torque balanced with the torque generated by the engine 1 is generated at the first rotary electric unit 2000.

The operation performed when the accelerator pedal is released to decelerate during forward drive will now be described. When the accelerator lift ACC is decreased during deceleration, the vehicle driving torque command value Mv* and the vehicle driving power demand value Pv* are calculated to a decreasing value in accordance with the accelerator lift ACC (steps S6000 and S6002 of FIG. 51 carried out bythe hybrid controller 16). At this time, as previously described, the operating point at which the engine output is given with the highest efficiency is determined according to the vehicle driving power demand value Pv*, and the throttle actuator 6 is controlled according to the intake air volume adjusting amount TH by the throttle valve 5 (steps S5106, S5108, and S5122 of FIG. 5 implemented by the engine controller 13). Thus, the engine 1 generates the output in exact accordance with the vehicle driving power demand value Pv* (the intake air volume is optimally adjusted).

At the same time when the throttle valve 5 is controlled, the engine rpm command value Ne* is transmitted to the hybrid controller 16 (step S5124 of FIG. 5); the engine rpm command value Ne* takes a value which is smaller than the current engine rpm Ne since the accelerator lift ACC has decreased.

Based on the foregoing engine rpm command value Ne*, the first and second torque command values Mm1* and Mm2* which are the torque command values of the first and second rotary electric units 2000 and 3000, respectively, are calculated by the hybrid controller 16 (this calculation follows the program of FIG. 16 previously described).

In the hybrid controller 16, the transient judgment sub-routine shown in FIG. 52 is called up (step S6009 of FIG. 51), and various flags indicative of the transient state of the vehicle drive are set in sequence according to the acceleration or deceleration amount ΔPv* (=Pv*−Pv*i) which is the difference between the current vehicle driving power demand value Pv* and the smoothed value thereof Pv*i. More specifically, if the acceleration or deceleration amount ΔPv* is increased in the negative direction (ΔPv*<−ΔPo), then the deceleration flag fDEC is set to "1" (step S6106 of FIG. 52), and the information indicating that the vehicle is being decelerated is stored. In this case, the fuel cutoff flag fCUT is set to "1" (step S6108).

In the hybrid controller 16, the sub-routine for the transient control shown in FIG. 53 is called up (step S6012). In this case, under the deceleration state where the accelerator lift is decreased, it is determined that the absolute value of the deviation of the current engine rpm Ne from the engine rpm command value Ne* in the transient control sub-routine is larger than a predetermined deviation ΔNe ("NO" in step S6200A of FIG. 53), and it is also determined that the deceleration flag fDEC stored in the transient judgment routine is "1" ("YES" in step S6208A). And the vehicle driving power demand value Pv* (=0FFFEH) indicating that the fuel cutoff will be implemented is sent to the engine controller 13 (step S6210A). Also, the first torque command value Mm1* calculated in step S6008 in the D-range processing is increased by the predetermined torque correction amount ΔM to make a correction, while the second torque command value Mm2* is decreased by the predetermined torque correction amount ΔM to make a correction (steps S6212A and S6214A).

The first and second torque command values Mm1* and Mm2* thus corrected are transmitted to the inverter 14 (step S6014 of FIG. 51), and the inverter 14 controls the torques of the first and second rotary electric units 2000 and 3000 according to the corrected first and second torque command values Mm1* and Mm2*. At this time, the slowdown of the engine 1 is promoted since the fuel has been cut off, and since the first torque command value Mm1* is larger than the output torque Me of the engine 1, the load becomes heavier, thus promoting the slowdown of the engine 1. When the engine speed decreases and approaches the engine rpm command value Ne* (target value), the rpm deviation is eliminated ("YES" in step S6200A of FIG. 53). In this case, the instruction for the fuel cutoff is aborted and the correction by increasing or decreasing the first and second torque command values Mm1* and Mm2* is also aborted. And a torque balanced with the torque generated by the engine 1 is produced at the first rotary electric unit 2000. In the foregoing state, the first rotary electric unit 2000 works as a generator.

The embodiment in which the transient judgment and transient control have been added provides the following advantages:

(a) In this embodiment, the vehicle transient state corresponding to the acceleration or deceleration of a vehicle is detected, and the torque command values Mm1* and Mm2* for the first and second rotary electric units 2000 and 3000 have been corrected by increasing or decreasing them in accordance with the detection result of the foregoing transient state. Hence, even in the transient drive phase of the engine 1, the problems such as worsened emission or accidental drop in engine output can be solved. As a result, an engine output in exact accordance with the requirement can be obtained, fulfilling an object to improve the responsiveness of the engine 1.

(b) In this embodiment, the fuel to the engine 1 is cut off when decelerating the vehicle. This helps to further promote the drop in the rpm when the vehicle is decelerated, contributing to the improved responsiveness of the engine.

(c) Further in this embodiment, the vehicle driving power demand value Pv* indicative of the torque control amount and the engine rpm command value Ne* indicative of the target rpm are employed for determining the transient state of the vehicle. This enables accurate transient judgment for making corrections by increasing or decreasing the torque command values Mm1* and Mm2* for the first and second rotary electric units 2000 and 3000, thus permitting accurate corrections made by increasing or decreasing the torque command values Mm1* and Mm2* according to the detection result.

(d) Further in this embodiment, the hybrid controller (the second control unit) 16 instructs the engine controller (the first control unit) 13 to cut off the fuel to the engine 1, and the engine controller 13 implements the fuel cutoff according to the instruction. This enables the hybrid controller 16 to integrally control the fuel cutoff carried out by the engine controller 13. As a result, the cooperative operation of the engine 1 and the rotary electric units 2000 and 3000 can be secured, permitting accurate control of the engine output.

(e) Moreover, in this embodiment, the hybrid controller 16 makes the engine controller 13 cut off fuel according to the vehicle driving power demand value Pv* (torque control amount) which has been instructed by the hybrid controller 16 to the engine controller 13 when cutting off the fuel to the engine 1. This enables the hybrid controller 16 to integrally control the instructions to the engine controller 13 by the vehicle driving power demand value Pv*; hence, even if the engine 1 mounted on the vehicle is changed, only the engine controller 13 is influenced in control. This allows the engine control in the hybrid vehicle control system to be independent, leading to higher degree of freedom of the system configuration.

The embodiment of the present invention can also be implemented as described below in addition to the one explained above.

In the above embodiment, to decelerate the vehicle, the fuel to the engine 1 is cut off in addition to the corrections made by increasing or decreasing the torque command value supplied to the first and second rotary electric units 2000 and 3000. Alternatively, however, the fuel cutoff may be selectably carried out; in this case, whether the fuel cutoff should be carried out may be decided according to the vehicle transient state (e.g. the fuel cutoff is executed only in case of sudden deceleration).

To detect the transient drive state of the vehicle, the foregoing embodiment has been adapted to compare the acceleration or deceleration amount $\Delta Pv^*$ ($=Pv^*-Pv^*i$) based on the vehicle driving power demand value $Pv^*$ with the predetermined judgment value $\Delta Po$ to make a decision (steps S6104B and S6110B of FIG. 52) and also to judge the converging level of the deviation in the engine speed ($=Ne^*-Ne$) (step S6200A of FIG. 53). This system, however, may be modified. For instance, the transient drive state may be judged only by the acceleration or deceleration amount $\Delta Pv^*$ based on the vehicle driving power demand value $Pv^*$, or the vehicle driving torque command value $Mv^*$ may be employed in place of the vehicle driving power demand value $Pv^*$. In brief, any system may be used as long as the vehicle driving power demand value $Pv^*$ and the vehicle driving torque command value $Mv^*$ as the torque control amount, or the engine rpm command value $Ne^*$ as the target rpm is employed. More broadly, the transient drive state may be detected from the operating amount of the accelerator pedal or the operating amount of the brake pedal.

Furthermore, in the above embodiment, the first and second torque command values $Mm1^*$ and $Mm2^*$ have been increased or decreased only by the torque correction amount $\Delta M$ during the transient drive of the vehicle (see the transient control of FIG. 23); in such a system, however, the torque correction amount $\Delta M$ may be set such that it may be varied according to the level of the transient state. For example, a relatively large value may be set for the torque correction amount $\Delta M$ for sudden acceleration or deceleration, or a relatively small value may be set for the torque correction amount $\Delta M$ for a gentle acceleration or deceleration. Further alternatively, the value of the torque correction amount $\Delta M$ for the first and second torque command values $Mm1^*$ and $Mm2^*$ may be changed as necessary.

Figure 54:
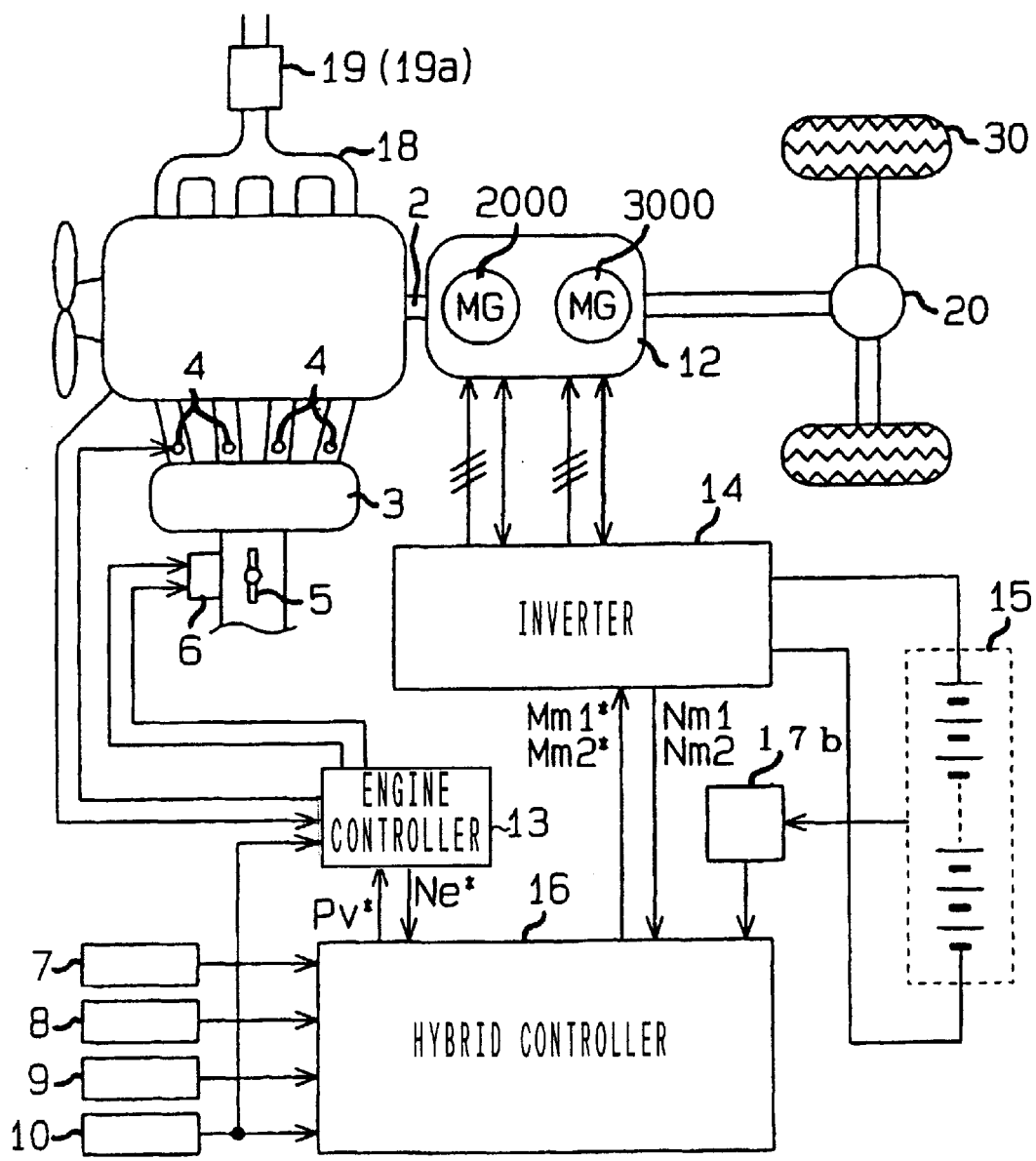
FIG. 54 is a general block diagram illustrative of the outline of a hybrid vehicle control system in another embodiment of the present invention.

Another embodiment of the present invention will now be described in conjunction with FIGS. 54, 55, 56, and 57. FIG. 54 shows the outline of the embodiment for a hybrid vehicle control system in accordance with the invention; the configuration of this embodiment differs from the one shown in FIG. 1 in that the merging section of an exhaust pipe 18 of the engine 1 is provided with a publicly known catalytic converter rhodium 19. A heater 19a which performs heating from the electric power supplied from the electricity storing unit 15 is attached to the catalytic converter rhodium 19. In the control system, a remaining capacity detector 17b serving as the charge state detecting means is provided between the inverter 14 and the electricity storing unit 15. The remaining capacity detector 17b calculates the remaining capacity SOC primarily according to the current signal of the electricity storing unit 15 which is detected by a publicly known current sensor, the terminal voltage signal of the electricity storing unit 15 which is detected by a publicly known voltage sensor, and the temperature signal of the electricity storing unit 15 which is detected by a publicly known temperature sensor, and it transmits the calculation result to the hybrid controller 16. The remaining capacity detector 17b in this embodiment detects the terminal voltage VB of the electricity storing unit 15 and sends the detecting result to the hybrid controller 16, in addition to calculating the remaining capacity SOC.

Figure 55:
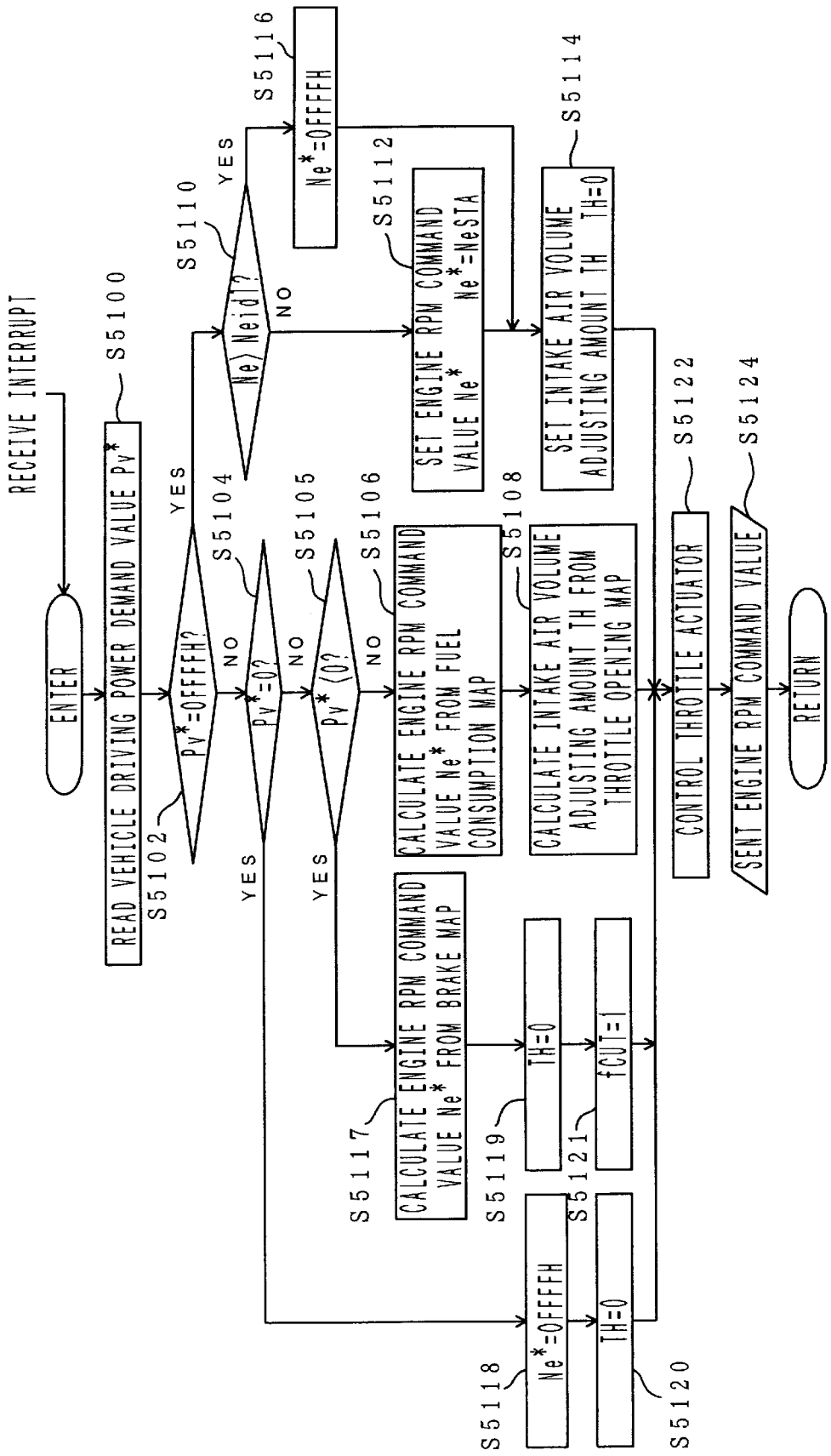
FIG. 55 is a flowchart illustrative of an interrupt program of the control carried out by the engine controller.
Figure 56:
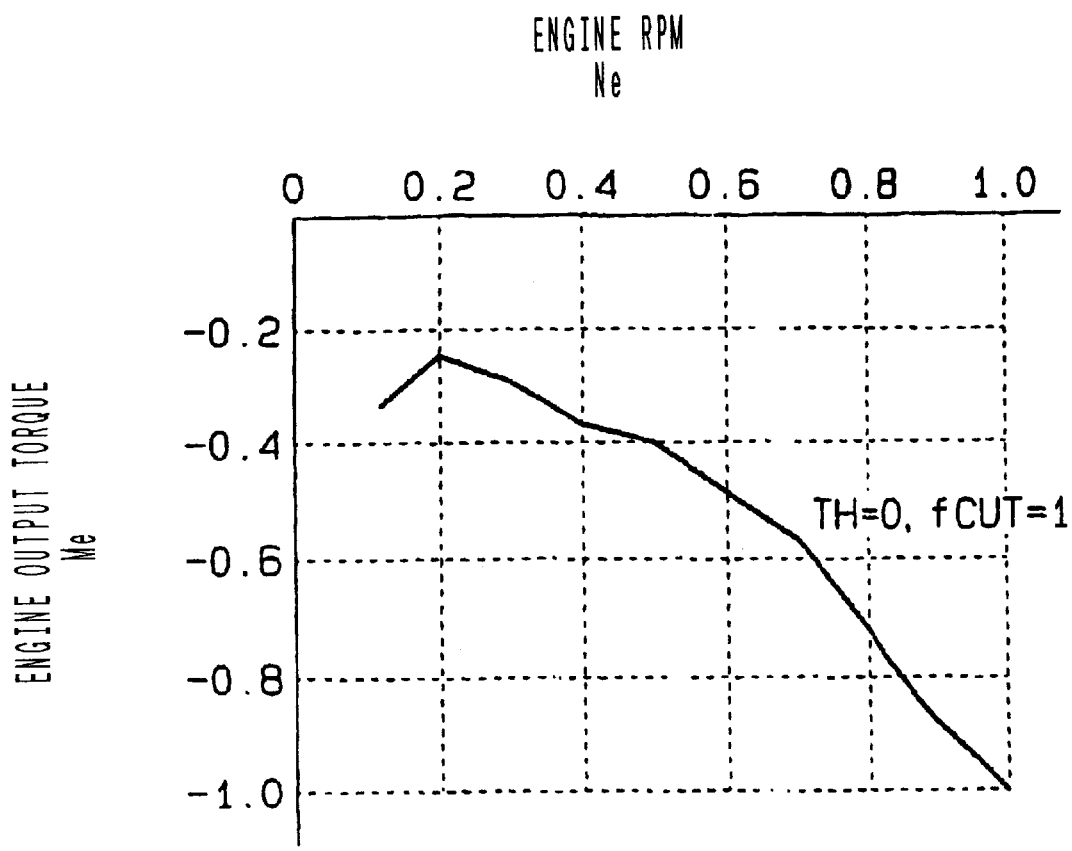
FIG. 56 is a characteristic chart illustrative of the engine operating point determined by the engine controller.

The operation of the embodiment will be described in conjunction with FIG. 55. FIG. 55 shows a modified example of the flowchart of FIG. 5 in the first embodiment; only the different part will be explained. If the system decides that $Pv^* \neq 0$ (if "NO") in step S5104, then it determines in the next step S5105 whether the vehicle driving power demand value $Pv^*$ is a negative value (minus value), and if it decides that the $Pv^*$ value is negative (if $Pv^*<0$), then it proceeds to step S5117. In step S5117, the system decides the operating point of the engine 1 according to the brake map of the engine 1 which has been stored in advance, and calculates the engine rpm command value $Ne^*$. In the brake map, the engine rpm $Ne$ having the engine output torque $Me$ at the time of fuel cutoff as the parameter has been stored in the form of a one-dimensional map according, for example, to the characteristics shown in FIG. 56. After that, in step S5119, the system sets the intake air volume adjusting amount TH to "0" (throttle opening $\theta TH=0$), and in step S5121, it sets the fuel cutoff flag fCUT to "1" before proceeding to step S5122. In such a case, according to the setting of the fuel cutoff flag fCUT, the fuel injection operation performed by the fuel injection solenoid valve 4 is stopped.

If the determination result in step S5105 is negative (if $Pv^*>0$), then the system goes to step S5106; in step S5106, the system decides the operating point of the engine 1 according to the fuel consumption map of the engine 1 which has been stored in advance, and it calculates the engine rpm command value $Ne^*$ according to the decided operating point.

After calculating the $Ne^*$ value and the TH value as mentioned above, it controls the throttle actuator 6 in step S5122 according to the intake air volume adjusting amount TH obtained in the afore said steps S5108, S5114, S5119, and S5120. In the following step S5124, the system sends the engine rpm command value $Ne^*$ obtained in the aforesaid steps S5106, S5112, S5116, S5117, and S5118 to the hybrid controller 16 via the communication circuit 1307 of FIG. 3. After completing the processing described above, the system goes back to the main program before the interrupt program was initiated.

The heater control of the catalytic converter rhodium 19 will now be described. The control unit 1630 of the hybrid controller 16 employs the chart shown in FIG. 57 to execute the heater control program of the catalytic converter rhodium 19. This program is adapted to be triggered by a timer interrupt at predetermined time intervals; after it is initiated, the system first judges in step S6100C whether the terminal voltage VB of the electricity storing unit 15 detected by the remaining capacity detector 17b shown in FIG. 54 exceeds a predetermined level (288 volts of the rated voltage in this embodiment), then in the following step S6102C, the system also determines whether the remaining capacity SOC of the electricity storing unit 15 detected by the remaining capacity detector 17b exceeds a predetermined level (70% in this embodiment). Alternatively, the determination processing of only step S6100C or S6102C may be implemented. Further in step S6104C, the system determines whether the vehicle driving power demand value $Pv^*$ is a negative value (minus value).

In this case, if the determination results given in steps S6100C to S6104C are all affirmative, then the system proceeds to step S6106C where it energizes and heats the heater 19a of the catalytic converter rhodium 19. In other words, the electric power is supplied from the electricity storing unit 15 to the heater 19a. Such a state means that the electricity storing unit 15 is almost fully charged and it also means that the vehicle is in a brake state because of Pv* <0 and that fuel cutoff is being performed (refer to the program of FIG. 55 executed by the aforesaid engine controller 13). The processing of energizing the heater 19a causes the excess energy, which is generated when the vehicle is braked, to be utilized for activating the catalytic converter rhodium 13.

If, on the other hand, any of the determination results given in the steps S6100C to S6104C is negative, then the system proceeds to step S6108C where it stops energizing and heating the heater 19a. For instance, if the heater is continued to be energized when the terminal voltage VB of the electricity storing unit 15 has dropped down below the predetermined level (288 volts) or the remaining capacity SOC has dropped below the predetermined level (70%), then the electricity storing unit 15 is placed in the discharge state against intention; hence, the energization of the heater is stopped in such a case. In addition, when the vehicle driving power demand value Pv* is switched to a positive value, it means that the brake of the vehicle has been released; therefore, the energization of the heater is also stopped in this case. Incidentally, the heater control program described above may basically be carried out when cutting off fuel with the vehicle in the brake state; hence, it may alternatively be determined whether the fuel cutoff flag fCUT operated in FIG. 55 has been set to "1" in place of the determination processing in step S6104C.

In this embodiment, the fuel injection controlling means is configured by the program of FIG. 4 executed by the engine controller 13; and a brake state detecting means (step S5105 in the same drawing) and a fuel injection operation means are configured by the program of FIG. 55. The program of FIG. 57 executed by the hybrid controller 16 constitutes the heater controlling means.

The program of FIG. 55 is initiated by a receive interrupt of the engine controller 13; the vehicle driving power demand value Pv* calculated by the hybrid controller 16 is read and stored in memory (step S5100). At this time, under such a traveling state of the vehicle, the determination results given in steps S5102 and S5104 of FIG. 55 are both negative, and it is determined in step S5105 whether the vehicle is in the acceleration state or the brake state according as whether the vehicle driving power demand value Pv* is positive or negative.

If it is determined that the vehicle driving power demand value Pv* is a positive value (Pv*>0) and the vehicle is in the acceleration state ("NO" in step S5105), then the processing of step S5106 is carried out.

While the vehicle is traveling, if it is determined that the vehicle driving power demand value Pv* is a negative value (Pv*<0) and the vehicle is being braked ("YES" in step S5105 of FIG. 55 implemented by the engine controller 13), then the processing of step S5117 and after shown in FIG. 55 is carried out. Specifically, the fuel injection to the engine 1 by the fuel injection solenoid 4 is stopped (fuel cutoff by step S5121) and the throttle opening target value θTH* is controlled to "0" (intake air volume adjusting amount TH=0) (step S5119). Further, the engine rpm command value Ne* for the engine 1 to output the vehicle driving power demand value Pv* is decided by searching the brake characteristic map shown in FIG. 56, and data stored in memory is updated.

When the throttle actuator 6 is fully closed by the aforesaid throttle opening target value θTH*=0 (step S5122), the engine 1 generates an output torque in exact accordance with the then vehicle driving power demand value Pv*. As soon as the output torque is produced by the engine 1, the engine rpm command value Ne* is received by the hybrid controller 16 (step S6006 of FIG. 20); the hybrid controller 16 calculates the first and second torque command values Mm1* and Mm2*, which are the torque command values of the first and second rotary electric units 2000 and 3000, according to the engine rpm command value Ne* (step S6008). Based on the calculated values of the first and second torque command values Mm1* and Mm2*, the torques of the first and second torque rotary electric units 2000 and 3000 are controlled by the inverter 14 as in the case where the vehicle driving power demand value Pv* is a positive value.

At this time, the fuel cutoff is being implemented at the engine 1; therefore, the first rotary electric unit 2000 is driven (electrically operated) with the engine 1 as a load. In such a case, when the first rotary electric unit 2000 is driving the engine 1, the first rotor 2010 and the second rotor 2310 (see FIG. 2) are acting on each other with the electromagnetic force Mm1; hence, when the engine 1 is driven, the reaction torque (electromagnetic force) Mm1 thereof is transmitted to the second rotor 2310 and also transmitted to the deceleration transmitter 4000.

On the other hand, the torque of the second rotary electric unit 3000 is controlled according to the second torque command value Mm2* calculated using the foregoing formula 6; therefore, a compound torque from the first torque command value Mm1* which is the torque command value of the first rotary electric unit 2000 and the second torque command value Mm2* which is the torque command value of the second rotary electric unit 3000 is applied to the second rotor 2310. This means that the same torque as the vehicle driving torque command value Mv* is transmitted to the second rotor 2310 and further transmitted to the deceleration transmitter 4000. Thus, the vehicle is driven in exact accordance with the vehicle driving torque command value Mv* (=Mm1*+Mm2*).

Figure 57:
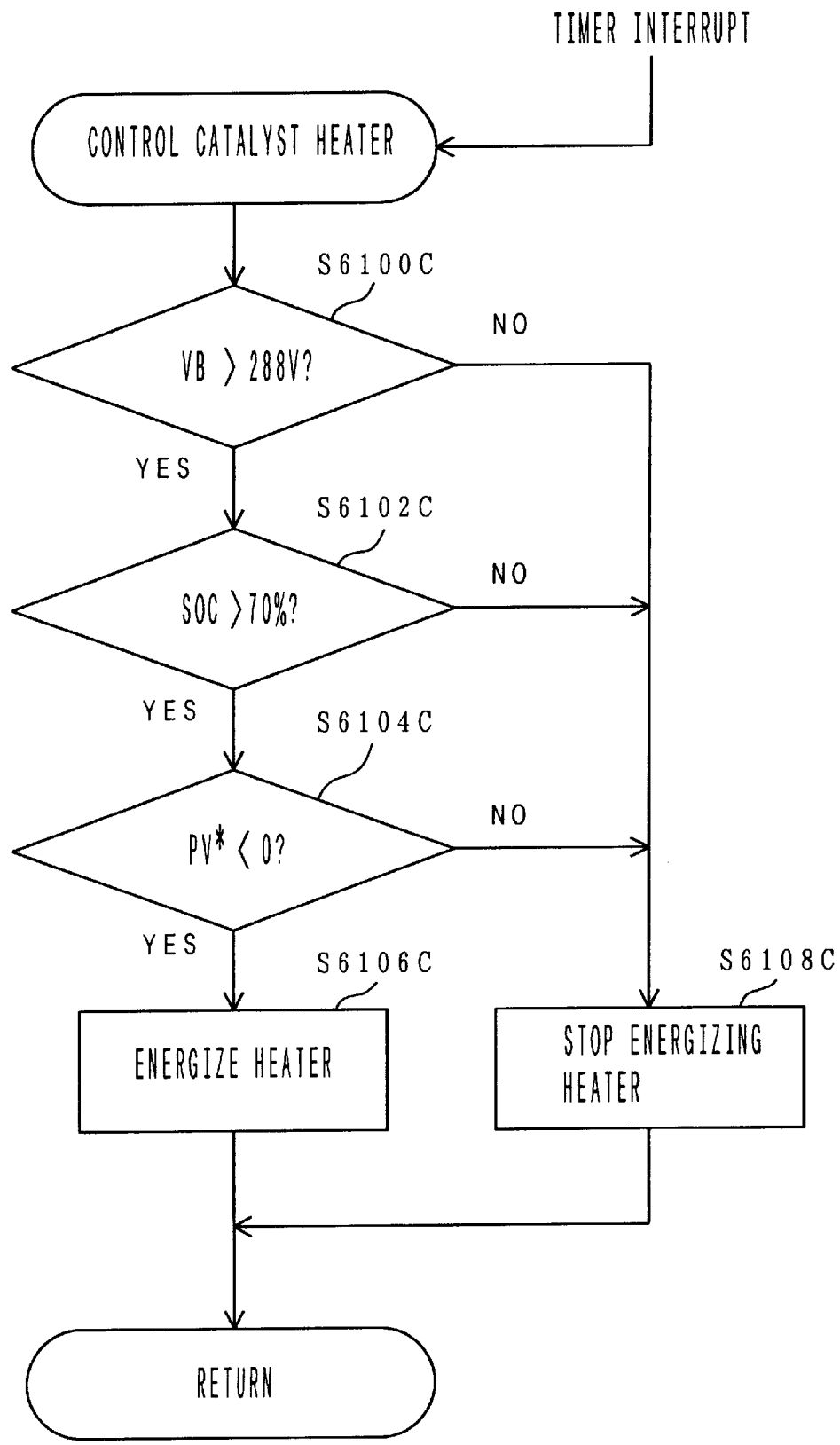
FIG. 57 is a flowchart illustrative of the heater control program of a catalyst by the hybrid controller.

During the brake state of the vehicle, the heater 19a of the catalytic converter rhodium 19 is energized by the program of FIG. 57 executed by the hybrid controller 16. more specifically, when the vehicle is being braked, the heater 19a is energized by the electric power supplied from the electricity storing unit 15, thus consuming the excess energy generated at that time.

This embodiment provides the following advantages:

(a) In this embodiment, it is determined that the vehicle is in the brake state when the vehicle driving power demand value Pv* (the torque control amount of the engine) is a negative value, and the fuel is cut off while the vehicle is being braked. This reduces the engine output torque, and the engine 1 becomes the load of the first and second rotary electric units 2000 and 3000, causing the excess energy 5 generated during the brake state of the vehicle to be consumed by the first and second rotary electric units 2000 and 3000. Thus, such problems as overcharge of the electricity storing unit 15 can be avoided, protecting the electricity storing unit 15. Moreover, the inertial energy of the vehicle during the brake is absorbed by the engine 1, so that the operating efficiency of the engine 1 can be improved, leading to advantages including improved fuel economy and reduced emission.

(b) Further in this embodiment, the heater 19a of the catalytic converter rhodium 19 is energized for heating by supplying electric power from the electricity storing unit 15 when cutting off fuel with the vehicle in the brake state. This allows the aforesaid excess energy to be utilized for energizing the heater. In this case, even if hot exhaust gas is not fed to the catalytic converter rhodium 19 due to the fuel cutoff, causing the activation of the catalyst 19 to deteriorate, the activation of the catalyst can be maintained by the energized heater and the worsening of emission can be restrained.

(c) In this embodiment, the heater 19a is energized and heated only when the charge state of the electricity storing unit 15 reaches a predetermined charge level. This makes it possible to obviate a problem in which more electric energy than necessary is drawn out of the electricity storing unit 15 with resultant insufficient traveling torque.

(d) Further, this embodiment is adapted to detect the charge state of the electricity storing unit 15 by detecting the terminal voltage VB of the electricity storing unit 15 and the remaining capacity SOC. Therefore, the charge state of the electricity storing unit 15 can be accurately grasped, allowing the advantages previously described to be achieved easily and accurately.

The embodiment of the present invention can be implemented as described below in addition to the one described above.

In the embodiment described above, when the vehicle e is braked, the fuel is cut off to reduce the engine output torque so as to cause the excess energy to be consumed by the first and second rotary electric units 2000 and 3000; this system, however, may be modified. For instance, when the vehicle is braked, the amount of fuel injected to the engine 1 is reduced thereby to cause the excess energy to be consumed by the first and second rotary electric units 2000 and 3000. This configuration makes it also possible to provide the advantages described previously.

As the torque control amount for determining the vehicle brake state, the vehicle driving torque command value Mv* may be used in place of the vehicle driving power demand value Pv*.

In the above embodiment, the heater of the catalytic converter rhodium 19 is energized in addition to the fuel cutoff (reduction of the injection amount) when the vehicle is braked; however, the processing for energizing the heater (the program of FIG. 57) may be omitted to simplify the configuration. Also for the purpose of simplifying the configuration, the processing for judging the charge state of the electricity storing unit 15 (steps S6100C and S6102C of FIG. 57) may be omitted.

In the embodiment described above, the catalytic converter rhodium 19 is employed as the catalyst provided in the engine 1; however, a lean NOx catalyst may be used instead.

Figure 58:
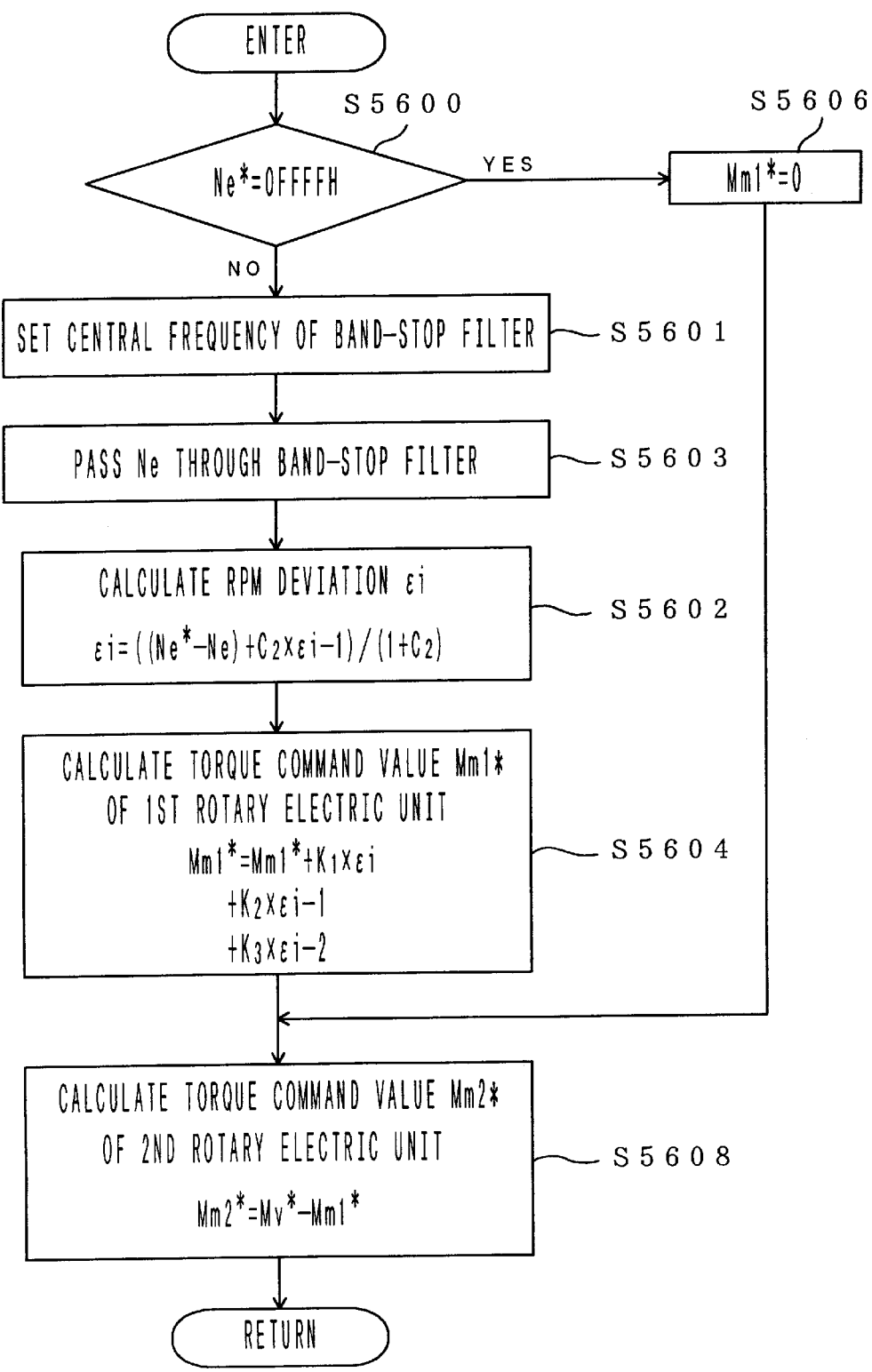
FIG. 58 is a flowchart illustrative of a sub-program by the hybrid controller in still another embodiment of the present invention.

Still another embodiment of the present invention will be explained in conjunction with FIG. 58. The flowchart of FIG. 58 is a modified example of the one shown in FIG. 16 in the first embodiment; only different points will be described. If the judgment result given in step S5600 is negative, then the system goes to step S5601 where it sets the central frequency of a band-stop filter (BSF) to the frequency of the torque ripple of the engine 1. The band-stop filter is composed as a well-known digital filter for removing a particular frequency component from an input signal. In this case, the central frequency of the band-stop filter is set such that it can be varied according to the engine rpm Ne (actual rpm) and also set to a constant multiple of the engine rpm Ne (a constant multiple based on the number of cylinders of the engine 1).

The current engine rpm Ne is the same rpms of the first rotor 2010 and the output shaft 2 of the engine 1 shown in FIG. 2. Accordingly, based on the rpms Nm1 and Nm2 of the first and second rotary electric units 2000 and 3000, respectively, received from the inverter 14, the current engine rpm Ne is calculated from the following formula 30.

$$Ne = Nm1 + Nm2 \qquad \text{Formula 30}$$

And in the subsequent step S5603, the engine rpm Ne is passed through the band-stop filter. The calculation processing of the band-stop filter removes the component corresponding to the engine torque ripple from the Ne signal. In other words, the frequency band related to the engine torque ripple on the engine rpm Ne is restricted.

The engine rpm command value Ne* in step S5124 of FIG. 5 will be greater than the current engine rpm Ne when, for example, the accelerator lift increases 20%.

In the calculation of the first torque command value Mm1* in step S5604 of FIG. 58, the value detected as the actual engine rpm Ne is subjected to the band-stop filter, so that the frequency band related to the engine torque ripple is restricted (step S5603). And the Mm1* value is calculated using the Ne value with the restricted frequency.

This embodiment provides the following advantages:

(a) In the embodiment, on the engine rpm Ne (actual rpm), a predetermined frequency band based on the torque ripple of the engine 1 is restricted by the band-stop filter, and the restricted engine rpm Ne is employed to calculate the torque command value Mm1* of the first rotary electric unit 2000. According to the aforesaid composition, a conventional problem in that the rotational variation component caused by the torque ripple (pulsation of power) of the engine 1 is transmitted to the axle 18A with resultant deteriorated driving comfort can be solved, and desired responsiveness and accuracy can be secured.

(b) The embodiment is adapted to change the central frequency of the band-stop filter according to the engine rpm Ne; hence, even if the engine rpm Ne increases or decreases, the rotational variation component due to the engine torque ripple can be properly removed.

(c) In the embodiment, the band-stop filter is configured so as to eliminate frequency components of a predetermined multiple of the H engine rpm Ne. This configuration makes it possible to further securely remove the rotational variation components due to the engine torque ripple.

(d) The actual engine rpm Ne is calculated based on the rpm measurement value Nm1 of the first rotary electric unit 2000 and the rpm measurement value Nm2 of the second rotary electric unit 3000. This enables the hybrid controller 16 serving as the center of the control system to integrally control the actual rpm of the engine 1, leading to improved general versatility of the system.

The embodiment of the present invention may be implemented as described below in addition to the above.

The frequency band of the engine rpm Ne may be restricted only if the engine rpm Ne (actual rpm) is a predetermined value or less (e.g. if Ne<1000 rpm). More specifically, the problem caused by the torque ripple of the engine 1 becomes more pronounced as the engine runs at lower speed as in idling. Hence, the calculation processing carried out by the hybrid controller 16 can be alleviated by restricting the frequency band of the engine rpm Ne only during a predetermined low-speed drive mode.

In the embodiment described above, the band-stop filter is composed of a digital filter in the hybrid controller 16 (control unit 1630). This, however, may be changed; a separate filter circuit may be provided (an analog filter is also acceptable). Alternatively, a high-pass filter (HPF) and a low-pass filter (LPF) which respectively have different cutoff frequencies may be combined to make up the band-stop filter serving as the band restricting means.

In the above embodiment, the central frequency of the band-stop filter is varied according to the Ne value; the central frequency, however, may be set as fixed data. Also, the Ne value captured by the engine controller 13 may be employed as the actual value (actual rpm) of the engine rpm Ne (refer to the flowchart of FIG. 4).

Yet another embodiment of the present invention will be described in conjunction with FIG. 59 through FIG. 65. In this embodiment, the output torque of the engine is controlled according to the vehicle drive information such as the information on the operation of the accelerator pedal, brake pedal, and shift lever, and the values of the torques to be generated by the first and second rotary electric units are controlled according to the torque control amount (vehicle driving power demand value Pv*, vehicle driving torque command value Mv*) in the foregoing control of the engine output torque and also according to the target rpm of the engine (engine rpm command value Ne*) corresponding to the engine characteristics. Further in this embodiment, the balance of the energy in the hybrid control system is calculated from first information on the electricity storing unit and second information on the first and second rotary electric units. Based on the calculated balance of the energy, it is determined whether there is any abnormal condition in the hybrid control system. The hybrid control system mainly includes, for example, the first and second rotary electric units, the inverter, the electricity storing unit, and the various controllers governing the hybrid control. The balance of the energy is obtained from various types of information on the electricity storing unit and the first and second rotary electric units.

Figure 59:
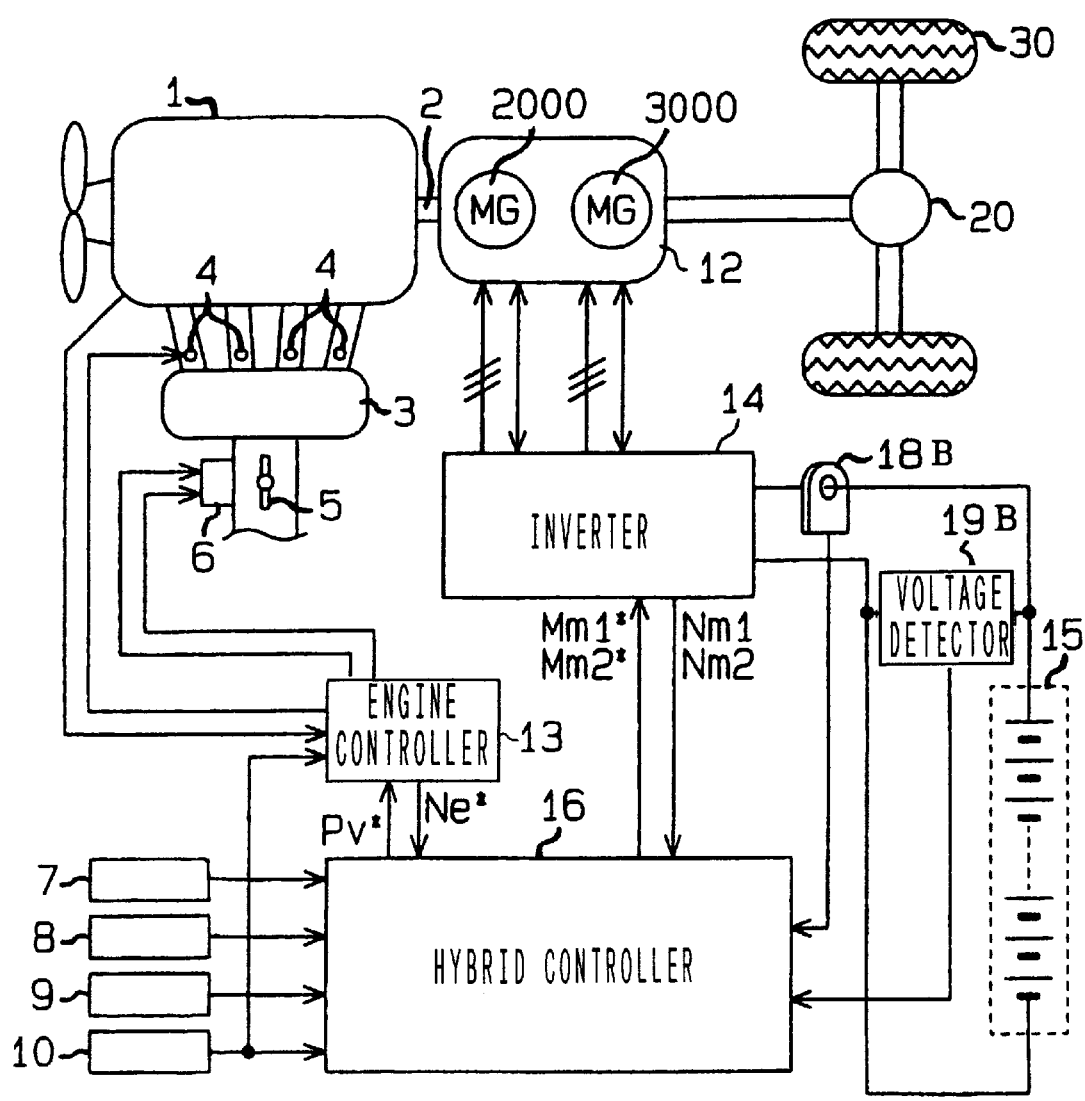
FIG. 59 is a general block diagram of yet another embodiment of the hybrid vehicle in accordance with the present invention.

FIG. 59 is a diagram showing a modified example of the first embodiment shown in FIG. 1. The modified example is different from the one shown in FIG. 1 in the following point: a publicly known current sensor 18B for measuring the current flowing to the electricity storing unit 15, and a publicly known voltage detector 19B for measuring the terminal voltage of the electricity storing unit 15 are connected to the hybrid controller 16, and the detection results given by these sensors, etc. are applied to the hybrid controller 16.

Figure 60:
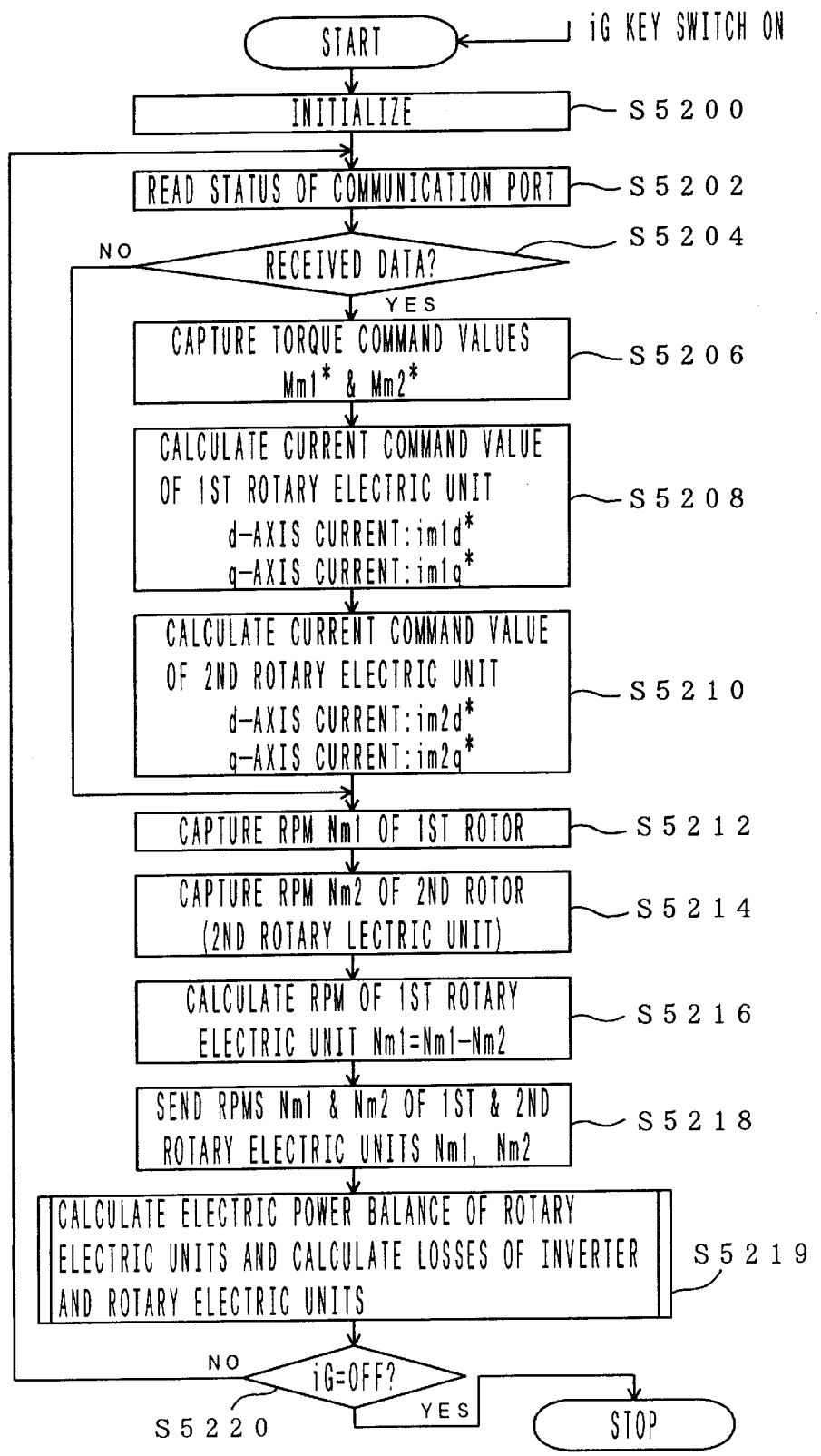
FIG. 60 is a flowchart illustrative of a main program of the control by the inverter.

The operation of this embodiment will be explained in conjunction with the flowchart shown in FIG. 60. FIG. 60 shows a modified example of the flowchart of FIG. 11 in the first embodiment; only the different aspect will be described.

In step S5219, an electric power balance Pm of the first and second rotary electric units 2000 and 3000 and a loss Pd1 and a loss Pd2 between the inverter and the rotary electric units 2000 and 3000, respectively. Further, in step S5222, the system determines whether the iG key switch of the vehicle has been turned OFF; if it decides that the key switch has not been turned OFF, then it goes back to step S5202, or if it decides that the key switch has been turned OFF, then it terminates the program.

The details of the processing in step S5219 of FIG. 60 will now be described with reference to the flowchart shown in FIG. 61.

Figure 61:
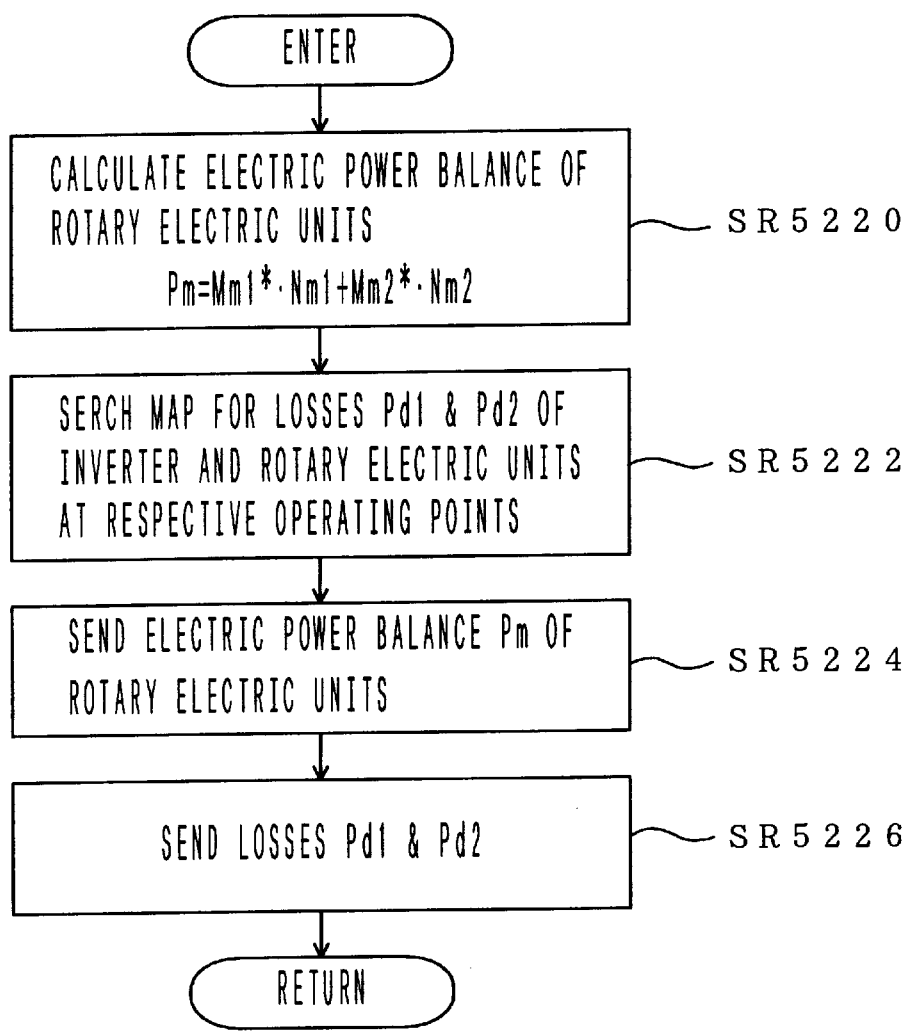
FIG. 61 is a flowchart illustrative of a sub-program for calculating the balance of the electric power of a rotary electric unit and the losses of the inverter and the rotary electric unit.

In FIG. 61, first in step SR5220, the electric power balance Pm of the first and second rotary electric units 2000 and 3000 is calculated using formula 31 given below according to the first and second torque command values Mm1* and Mm2* and rpms Nm1 and Nm2 at that point:

$$Pm = Mm1^* \cdot Nm1 + Mm2^* \cdot Nm2 \qquad \text{Formula 31}$$

Next, in step SR5222, a loss map, which has been stored in the table area of the ROM built in the control unit 1427, is searched to obtain the losses Pd1 and Pd2 between the inverter 14 and the rotary electric units 2000 and 3000, respectively. The loss map is provided in the form of a two-dimensional map of the respective rpms and torques.

After that, in step SR5224, the electric power balance Pm of the first and second rotary electric units 2000 and 3000 obtained in step SR5220 is sent to the hybrid controller 16. In the following step SR5226, the system sends the losses Pd1 and Pd2 obtained in step SR5222 to the hybrid controller 16, then it goes back to the main program.

Figure 13:
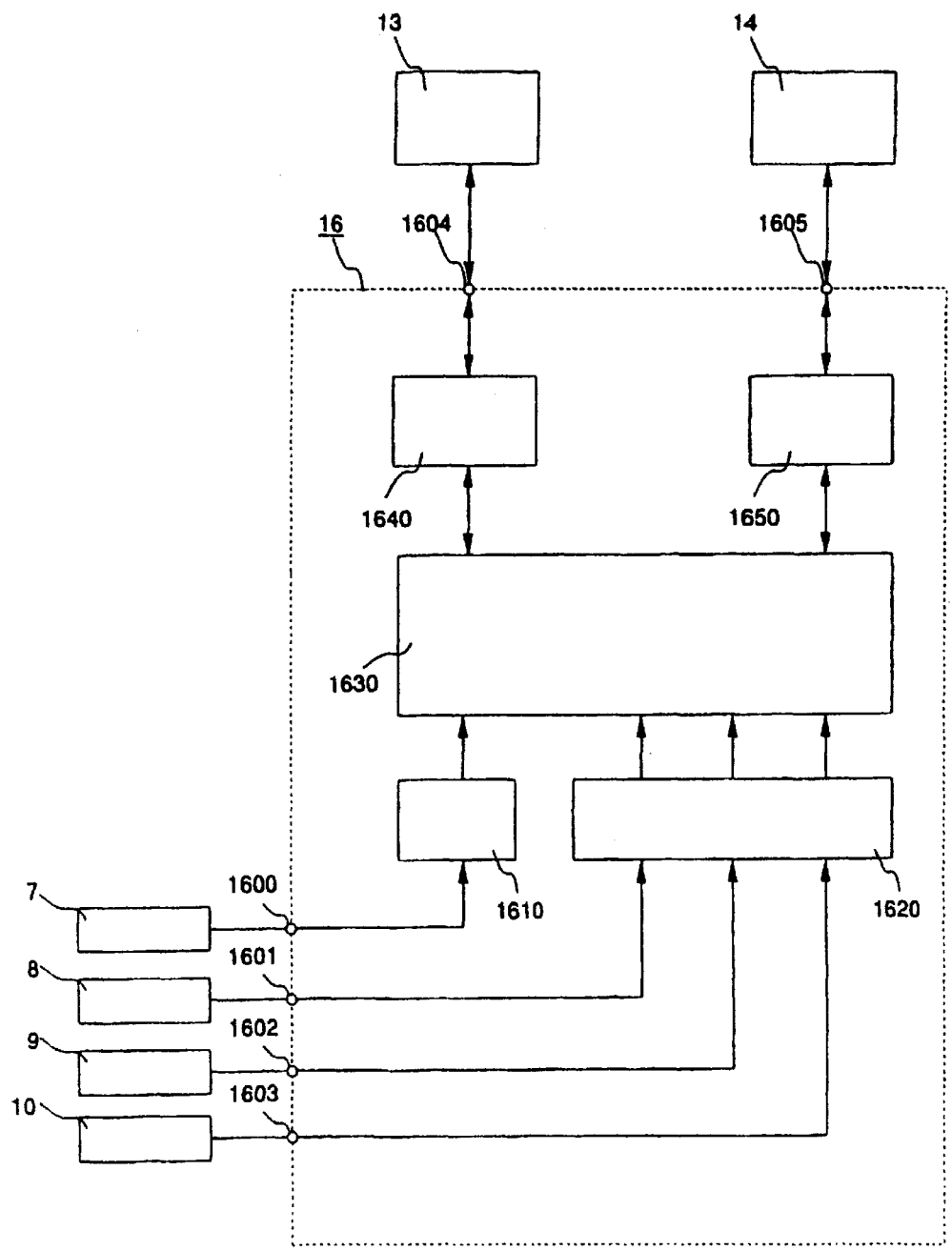
FIG. 13 is a block diagram of a hybrid controller 16 in the present invention.
Figure 62:
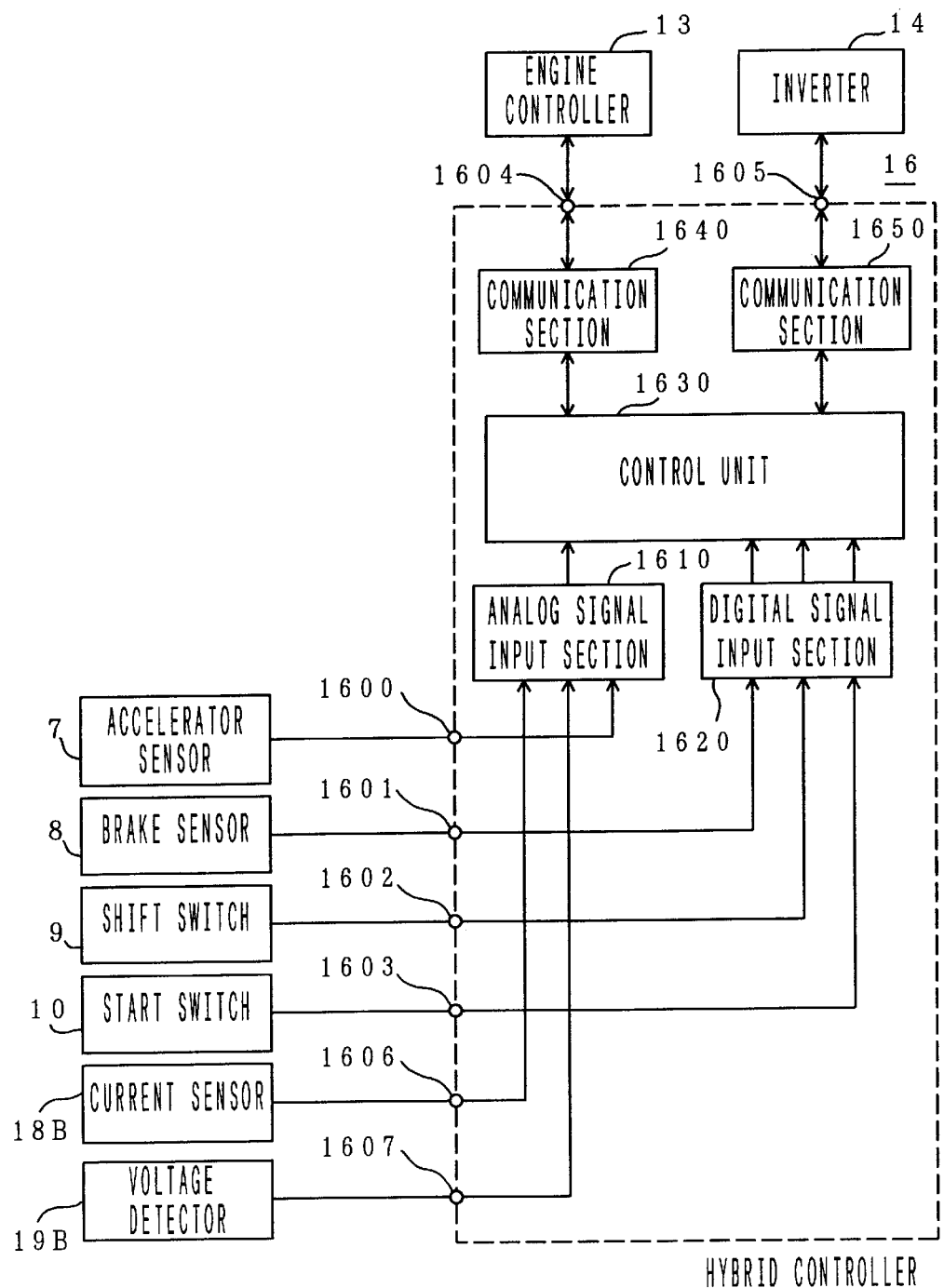
FIG. 62 is a block diagram illustrative of the configuration of the hybrid controller.

FIG. 62 shows a modified example of the one shown in FIG. 13 in the first embodiment. The modified example is different from the one shown in FIG. 13 in that the current sensor 18B is connected to an input terminal 1606 and the current signals of the electricity storing unit 15 are applied to the terminal 1606. Connected to the input terminal 1607 is the voltage detector 19B; the voltage signals of the electricity storing unit 15 are applied to the terminal 1607.

Figure 63:
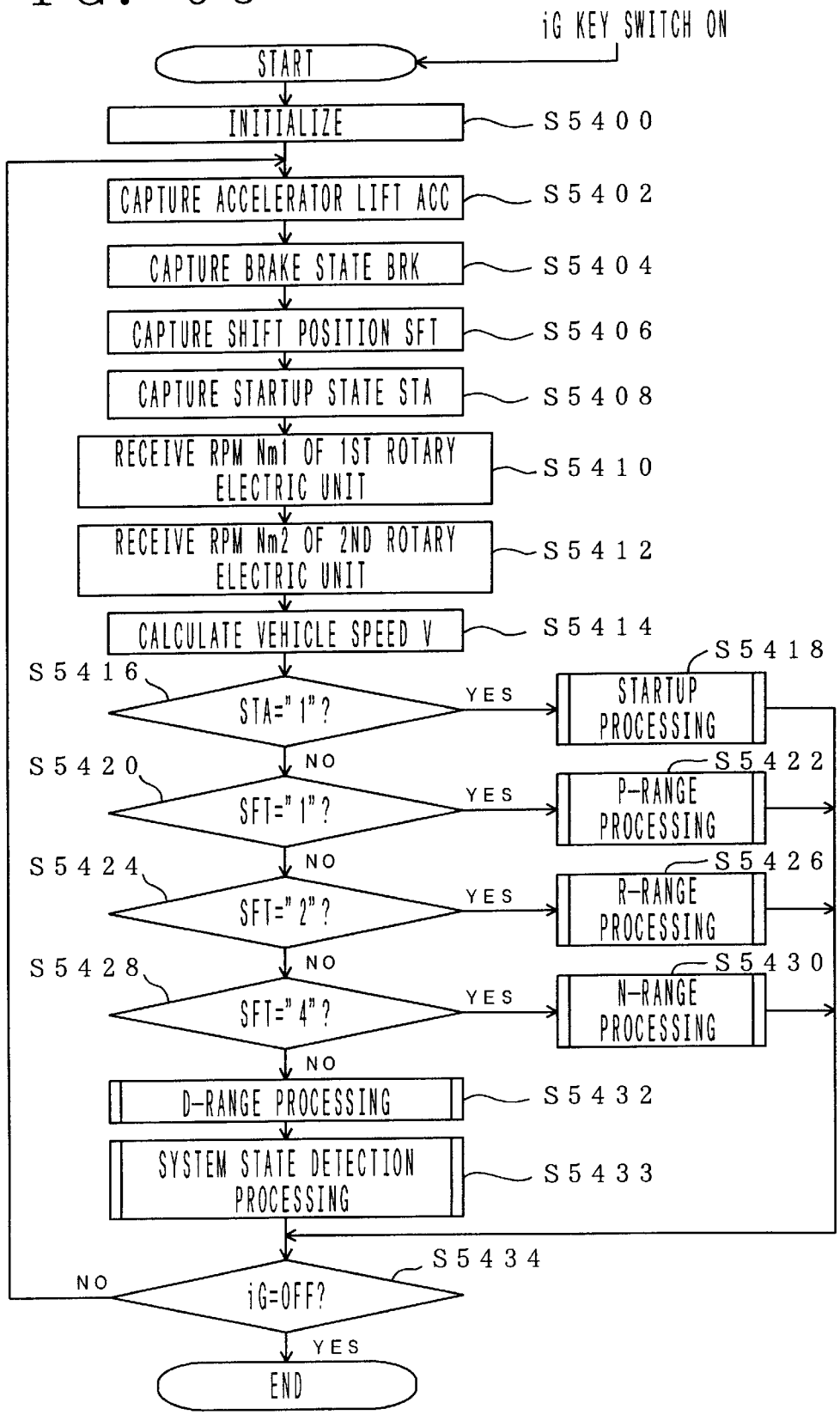
FIG. 63 is a flowchart illustrative of a main program of the control carried out by the hybrid controller.

The flowchart of FIG. 63 is a modified example of the one shown in FIG. 14 in the first embodiment. The modified example is different from the one shown in FIG. 14 in that the system proceeds to step S5433 after implementing the D-range processing in step S5432, and it carries out the processing for detecting the system state (the processing shown in FIG. 64), which will be discussed later, in step S5433.

The system state detecting processing of step S5433 in the program shown in FIG. 63 will now be described with reference to the flowchart of FIG. 64. In the system state detecting processing, first in step S6100D, the electric power (hereinafter referred to as "battery power Pb") moving in or out of the electricity storing unit (main battery) 15 is calculated, and the calculation result is stored in the variable area of the RAM built in the control unit 1630. The procedure for calculating the Pb value will be discussed later.

In step S6102D, the power balance Pm of the first and second rotary electric units 2000 and 3000 is received from the inverter 14 and stored in the variable area of the RAM built in the control unit. In the following step S6104D, absolute losses Pd1 and Pd2 between the inverter 14 and the first and second rotary electric units 2000 and 3000 are received from the inverter 14 and stored in the variable area of the RAM built in the control unit 1630.

After that, in step S6106D, an electric balance (deviation) Pdev of the entire system is determined based on the battery power Pb captured in step S6100D, the power balance Pm of the rotary electric units 2000 and 3000 captured in step S6102D, and the losses Pd1 and Pd2 captured in step S6104D, then the determined Pdev value is compared with a predetermined threshold value Const.1. More specifically, it is determined whether the following holds true:

$$|Pb - (Pm + Pd1 + Pd2)| < \text{Const.1}$$

where the left side of the above inequality corresponds to the Pdev value. The threshold value Const. 1 is a constant used for controlling the vehicle according to the measurement errors of various sensors including the current sensor 18B and the voltage detector 19B and the state of the system; the value thereof is preset.

If Pdev<Const.1 (if "YES" in step S6106D), then the CPU decides that the electric power balance of the entire system is appropriate, and it goes back to the main program of FIG. 63.

If Pdev≧Const.1 (if "NO" in step S6106D), then the system proceeds to step S6108D where it compares the Pdev value obtained in step S6106D with a predetermined threshold value Const.2 (where Const.2>Const.1). More specifically, it is determined whether the following holds true:

|Pb−(Pm+Pd1+Pd2)|<Const.2 where the threshold value Const.2 is just like the foregoing threshold value Const.1; it is a constant for controlling the vehicle according to the measurement errors of the sensors and the state of the system, and the value thereof is preset.

If Pdev <Const.2 (if "YES" in step S6108D), then the system gives an alarm indication and restricts the vehicle output in step S6112D, then goes back to the main program of FIG. 63. More specifically, the system decides that a major failure has taken place although no serious problem has occurred in the system, and limits primarily the electric power going in or out of the battery and the output torque of the second rotary electric unit 3000.

If Pdev≧Const.2 (if "NO" in step S6108D), then the system goes to step S6110D where it determines that the system has incurred a failure. In such a case, the system gives an alarm indication and carries out the processing to stop the vehicle. Then, the control program is terminated. In other words, the system decides that some serious failure has taken place in the control system and it stops the vehicle.

The sub-program of step S6100D in the program shown in FIG. 64 will now be described in conjunction with the flowchart of FIG. 65.

Figure 64:
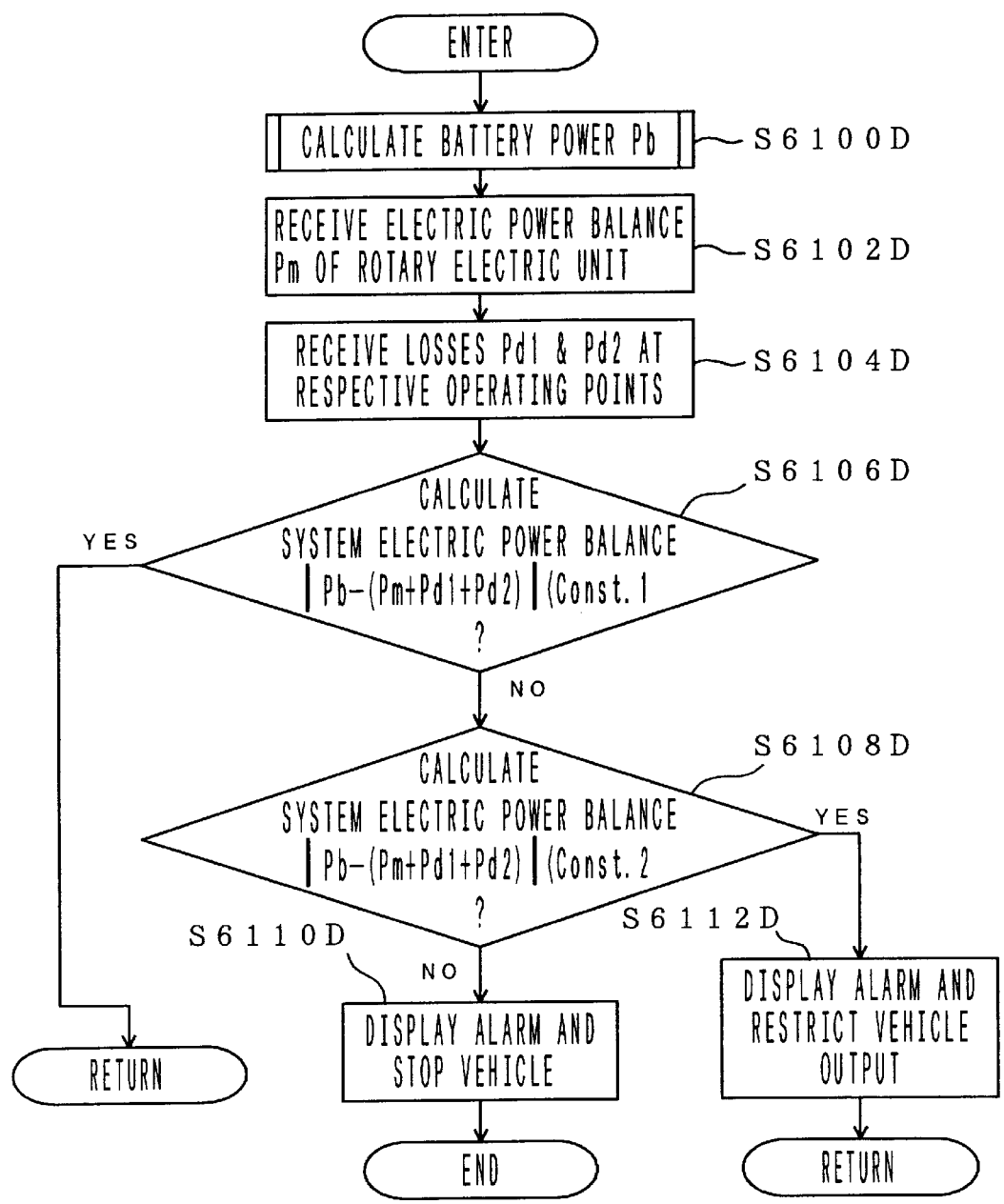
FIG. 64 is a flowchart illustrative of a system state detecting program implemented by the hybrid controller.
Figure 65:
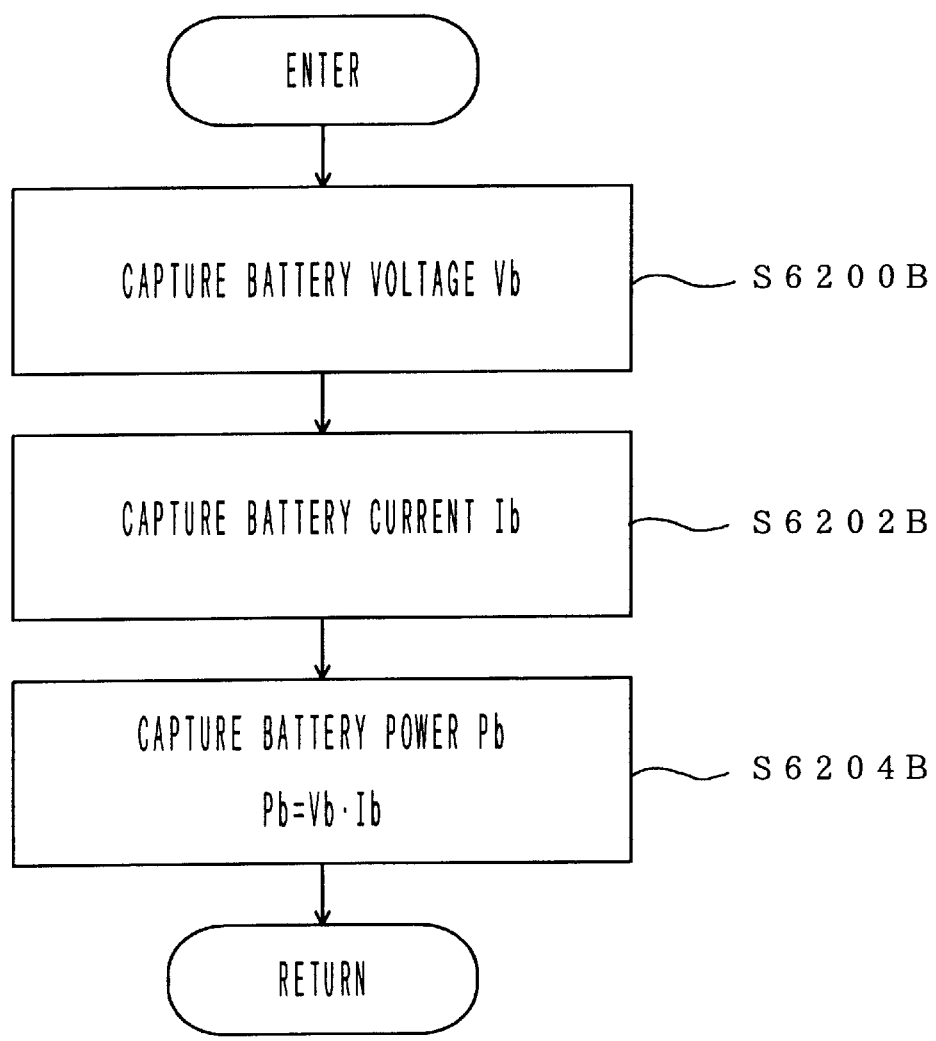
FIG. 65 is a flowchart illustrative of an arithmetic program of battery power.

In FIG. 65, first, battery voltage Vb is captured in step S6200B, and battery current Ib is captured in the subsequent step S6202B, and these Vb and Ib values are stored in the variable area of the RAM built in the control unit 1630. Further, in step S6204B, the system determines the battery power Pb according to the Vb and Ib values which have been captured (Pb=Vb·*Ib), then it goes back to the program of FIG. 64.

Incidentally, in this embodiment, the processing of FIG. 64 implemented by the control unit 1630 of the hybrid controller 16 corresponds to the energy balance calculating means and the failure judging means described in the appended claims. The battery power Pb handled in the processing shown in FIG. 64 corresponds to "the first information," and the electric power balance Pm corresponds to "the second information."

The system state detection in the operation of this embodiment will now be described. First, the electric power balance Pdev of the entire system is determined from the battery power Pb, the electric power balance Pm of the first and second rotary electric units 2000 and 3000, and the losses Pd1 and Pd2 of the inverter and the rotary electric units (formula 32 shown below):

Pdev=|Pb−(Pm+Pd1+Pd2)|    Formula 32

This Pdev value is compared with predetermined threshold values (steps S6106D and S6108D of FIG. 64). In this case, a plurality of threshold values are set to achieve vehicle control according to the measurement errors of various sensors including the current sensor 18B and the voltage detector 19B and the system state. To be more specific, two threshold values, namely, Const.1 and Const.2, are set; it is determined whether the control system state is in the normal mode, a vehicle output limit mode, or a vehicle stop mode according to the Pdev value.

[Normal mode]

If Pdev<Const.1 (if "YES" in step S6106D), it is determined that the system is normal and that the measurement errors of the sensors, etc. are within permissible ranges. In this case, the current vehicle output control is continued as it is.

[Vehicle output limit mode]

If Const.1≦Pdev<Const.2 (if "NO" in step S6106D and "YES" in step S6108D), it is determined that some minor failure is present although no serious failure has occurred in the control system. And an alarm is given to a passenger of the vehicle, the inflow or outflow of electric power to or from the battery is restricted, and the output torque of second rotary electric unit 3000 is restricted (step S6112D). It is determined that a failure has taken place in this mode if, for example, a sensor gain drops with a consequent detection error. In this case, the vehicle is pulled over or headed to a body shop, with vehicle output restricted.

[Vehicle stop mode]

If Pdev≧Const.2 (if "NO" in step S6108D), it is determined that the deviation of the electric power balance in the first and second rotary electric units 2000 and 3000 from the battery electric power Pb is excessive. Hence, it is regarded that some serious failure has happened in the control system, and the alarm is given to the passenger of the vehicle and the vehicle is stopped (step S6110D). For instance, if a sensor is disconnected or the first and second rotary electric units 2000 and 3000 lock, the electric power balance of the entire system is disturbed, then it is determined that a failure has taken place in this mode.

The embodiment described in detail above provides the following advantages.

(a) This embodiment is characterized in that the battery power Pb is compared with the electric power balance Pm of the rotary electric units 2000 and 3000, and the electric power balance Pdev of the entire system (the energy balance in the hybrid control system) is calculated according to the comparison result. Based on the calculated electric power balance Pdev, the presence of a failure in the system is determined. According to the configuration, even if the first and second rotary electric units 2000 and 3000, the engine 1, the inverter 14, or other should fail, this would be indicated by the calculation result of the electric power balance Pdev (energy balance) of the entire system. In other words, as long as the electric power balance Pdev takes a proper value in a permissible range, it is determined that the system is normally operating, while if the electric power balance Pdev does not take a proper value in the permissible range, then it is determined that a failure has occurred in the system. As a result, the system can be properly monitored according to the electric power balance Pdev of the entire system, thus making it possible to solve such problems as the overdischarge or overcharge of the electricity storing unit 15, a control failure of the engine 1 or the rotary electric units 2000 and 3000, and accidental acceleration of a vehicle.

(b) Also in this embodiment, the battery power Pb and the electric power balance Pm of the respective rotary electric units 2000 and 3000 have been employed as the first and second information for grasping the electric power balance Pdev of the entire system. This makes it possible to determine the electric power balance Pdev of the entire system more accurately and more easily, leading to higher reliability of the failure judgment. In addition, according to the above configuration, the reliability of the entire system can be improved even when the inverter 14 and the first and second rotary electric units 2000 and 3000 are constructed as a single-series control system.

The embodiment of the invention can be implemented as described below in addition to the above.

The torque command values Mm1* and Mm2* of the first and second rotary electric units 2000 and 3000 have been used to calculate the electric power balance Pm of the first and second rotary electric units 2000 and 3000 (step SR5220 of FIG. 61). This configuration can be modified, and the electric power balance Pm may be calculated by the approaches described in (1) through (3) shown below.

(1) An estimated torque value T calculated using the following formula 33 is employed to calculate the electric power balance Pm:

$$T = Pn^* \cdot \{\phi + (Ld-Lq) \cdot id\} \cdot iq \quad \text{Formula 33}$$

where Pn denotes the number of pairs of poles of the rotary electric units; φ denotes the effective magnetic flux of a permanent magnet; Ld and Lq denote the inductance values of the d-axis and q-axis of the rotary electric units; and id and iq indicate the current command values of the d-axis and q-axis of the rotary electric units at the time of d-q current control (where T, id, and iq are vector values). The estimated torque value T is calculated by the inverter 14 constituting the torque estimating means; and Pn, φ, Ld, 9 and Lq correspond to the constants of the rotary electric units.

Using the above formula 33, estimated torque values T1 and T2 of the rotary electric units 2000 and 3000, respectively, are determined; and the electric power balance Pm is calculated from the following formula 34 (where Nm1 and Nm2 are the rpms of the rotary electric units 2000 and 3000, respectively):

$$Pm = T1^* \text{ Nm1} + T2^* \text{ Nm2} \quad \text{Formula 34}$$

(2) In the inverter 14, the electric balance Pm is calculated from formula 35 by using the d-axis and q-axis command values of the inverter output voltages and output currents of two gate driving circuits 1418 and 1424, respectively.

$$Pm = V1d^* \cdot im1d^* + V1q^* \cdot im1q^* + \\ V2d^* \cdot im2d^* + V2q^* \cdot im2q^* \quad \text{Formula 35}$$

In other words, the Pm value is calculated by employing the vector values V1d*, V1q*, V2d*, V2q*, im1d*, im1q*, im2d*, and im2q* of the first and second rotary electric units 2000 and 3000.

(3) Torque sensors (torque detecting means) composed of strain gauges are provided on the output shafts of the first and second rotary electric units 2000 and 3000, and the electric power balance Pm is calculated from the detection results of the torque sensors. Any of the configurations described in (1) through (3) permits proper monitoring of the system. Moreover, the calculation results obtained by the foregoing techniques correspond to the drive information of the actual machine, so that the accuracy of monitoring the control system is improved.

In the foregoing embodiment, the electric power balance Pm is corrected by the losses Pd1 and Pd2 between the first and second rotary electric units 2000 and 3000 and the inverter 14, and based on the correction result, the electric power balance Pdev of the entire system (the energy balance of the hybrid control system) is determined; this configuration, however, may be modified. For instance, the electric power of the rotary electric units 2000 and 3000 may be corrected according to the efficiency in relation to the inverter 14, and the electric power balance Pdev of the entire system may be determined based on the correction result. The formulas shown below hold true when: the efficiencies at the time when the inverter 14 drives the rotary electric units 2000 and 3000 are denoted as η invl and η inv2, respectively; the efficiencies of the first and second rotary electric units 2000 and 3000 are denoted as η mgl and ηmg2; the electric powers of the rotary electric units obtained by the electric power formula for the rotary electric units are denoted as Pmg1 and Pmg2; and the correction electric power is denoted as Pcor.

Pcor=Pcor1+Pcor2
Pcor1=Pmg1/(ηinv1·ηmg1) (powering mode)
Pcor1=Pmg1·(ηinv1·ηmg1) (regenerating mode)
Pcor2=Pmg2/(ηinv2·ηmg2) (powering mode)
Pcor2=Pmg2·(ηinv2·ηmg2) (regenerating mode)

where ηinv1, ηinv2, ηmg1, and ηmg2 are searched by the efficiency map. The Pcor values calculated as shown above are used to judge the following in steps S6106D and S6108D of FIG. 64:

|Pb−Pcor|<Const.1 or

|Pb−Pcor|<Const.2

Based on the judgment result, it is determined whether the control system has incurred a failure (a failure of the hybrid control system).

Incidentally, the correction itself of the electric power balance Pm may not be made to simplify the calculation; in this case, the absolute value of the difference between the battery power Pb and the uncorrected electric power balance Pm is compared with the predetermined threshold values (Const.1 and Const.2), and the presence of a failure is determined according to the comparison result.

In the above embodiment, the two threshold values Const.1 and Const.2 have been used to determine the electric power balance Pdev of the entire system by the hybrid controller 16 (the processing of FIG. 64); this configuration, however, may be modified. For instance, a single threshold value may be set, and the vehicle output may be restricted so that only retreating travel is allowed if the electric power balance Pdev of the entire system exceeds the threshold value. Alternatively, three or more threshold values may be set to determine the degree of failure in terms of multiple levels (three levels or more). Based on the determined level of failure, the vehicle output is restricted in multiple levels. In this case, as more levels are set for the threshold value, more detailed vehicle control can be achieved.

As an alternative to determine the electric power balance Pdev of the entire system from the battery power Pb (the first information) and the electric power balance Pm (the second information) of the first and second rotary electric units 2000 and 3000, the ratio between the Pb value and the Pm value (=Pb/Pm) may be calculated and the obtained ratio may be compared with a predetermined threshold value to perform judgment.

In the above embodiment-, the processing of detecting the system state for constituting the failure detecting means (step S5433 of FIG. 63, and FIG. 64) has been implemented by the hybrid controller 16; this configuration, however, may be modified. For instance, a microcomputer for monitoring the system may be used, and the processing of detecting the system state may be carried out by the microcomputer.

Figure 66:
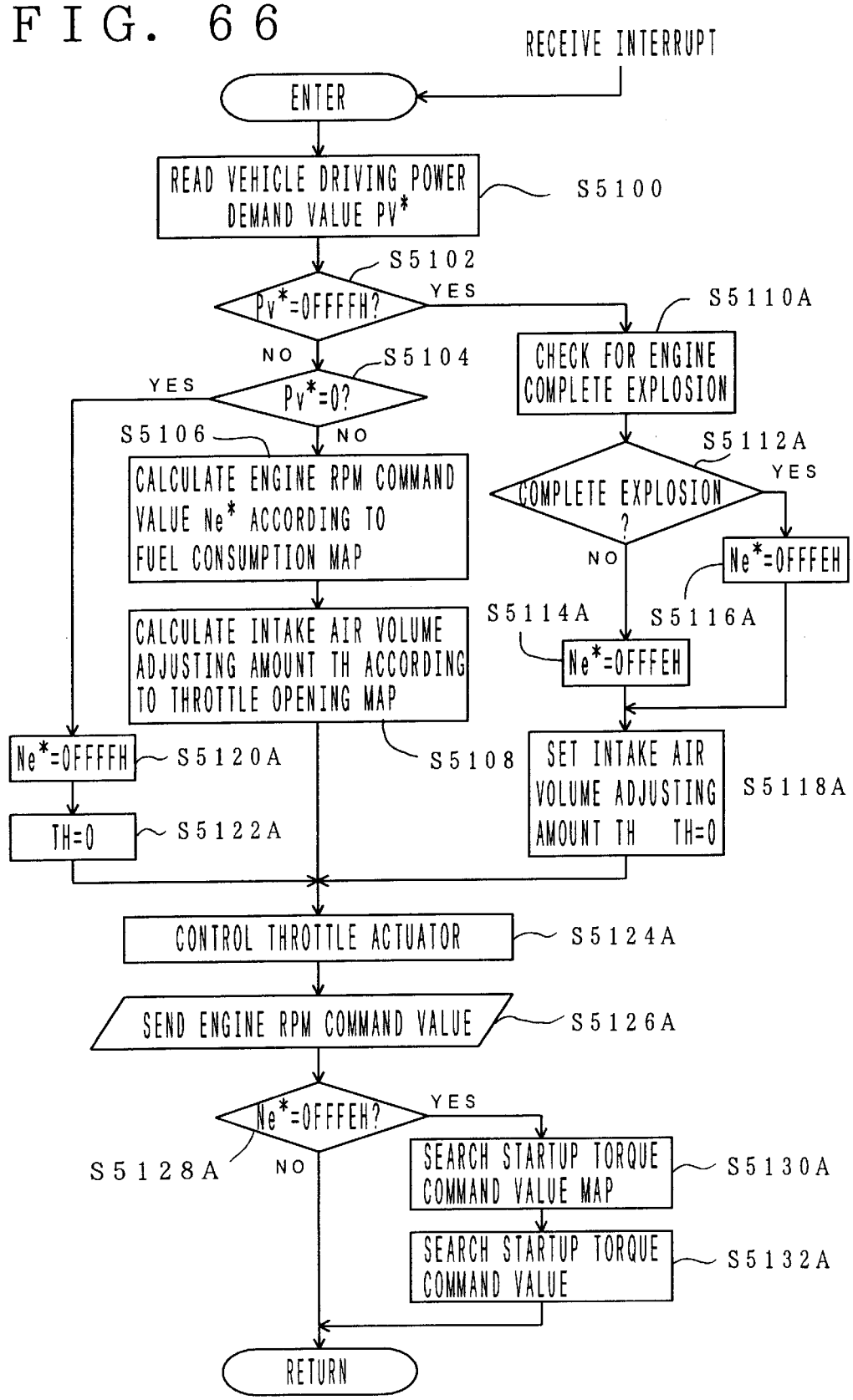
FIG. 66 is a flowchart illustrative of another example of the interrupt program of the control carried out by the engine controller.

A further embodiment of the present invention will now be described in conjunction with FIG. 66 through FIG. 71. FIG. 66 shows a flowchart which is a modified example of the flowchart of FIG. 5 in the first embodiment and which is different from the one shown in FIG. 15 as follows. If the determination result is "YES" in step S5102, then the system checks in step S5110A whether the engine 1 has reached a complete startup state (or a complete combustion and expansion state) at the engine startup. To be more specific, the system determines whether the complete startup has been achieved by checking whether, for example, the engine rpm Ne has exceeded a predetermined idling rpm Neidl (e.g. 600 rpm) or a predetermined time has elapsed from the moment the startup was initiated. In the subsequent step S5112A, the system decides whether complete startup has been achieved according to the check result given in step S5110A. At this time, if the system decides that complete startup has not been accomplished and the engine is not idling (if "NO" in step S5112A), then it proceeds to step S5114 where it sets the engine rpm command value Ne* for "0FFFEH" which is the information data for continuing the startup, and it further proceeds to step S5118A.

If the system decides that complete startup has been accomplished and the engine is idling (if "YES" in step S5112A), then it proceeds to step S5116A where it sets the engine rpm command value Ne* for "0FFFFH" which is the information data for completing the startup, and it further proceeds to step S5118A. In step S5118A, the system sets the throttle opening θTH to "0" to maintain the idling state at the engine startup, i.e. it sets the intake air volume adjusting amount TH handled by the throttle actuator 6 to "0," then it goes to step S5124A.

Further in the following step S5126A, the engine rpm command value Ne* obtained in the aforesaid steps S5106, S5114A, S5116A, and S5120A is sent to the hybrid controller 16 via the communication circuit 1307 of FIG. 3.

After that, in step S5128A, the system determines whether it is before the complete startup, i.e. whether it is in the middle of the startup, at the time of engine startup according to the data of the then engine rpm command value Ne*. To be more specific, the system decides whether Ne*=0FFFEH. If the system decides that Ne*=0FFFEH, then it determines that the startup is being implemented, and it gives an affirmative determination result in step S5128A before it proceeds to step S5130A. In step S5130A, the system calculates a startup torque command value Msta* by searching a map. In the next step S5132A, the startup torque command value Msta* is transmitted to the hybrid controller 16 via the communication circuit 1307 of FIG. 3.

If Ne* ≠0FFFEH, then the system determines that there has been complete startup at the engine startup, i.e. the startup has been completed, and gives a negative determination result in the aforesaid step S5128A. After carrying out the processing above, the system goes back to the main program before the interrupt program was initiated.

Figure 70:
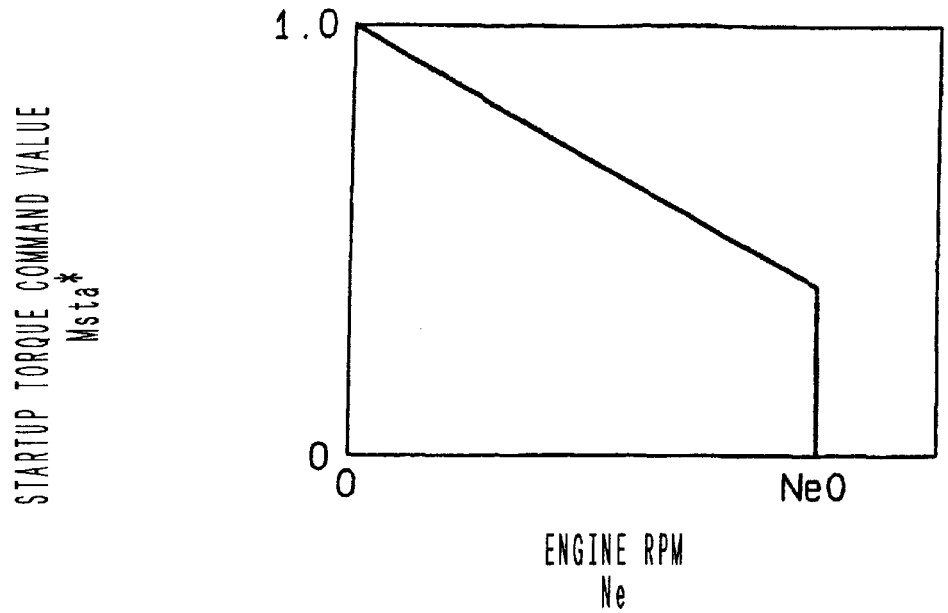
FIG. 70 is a characteristic chart of a starting torque command value determined by the engine controller.

The map search for the startup torque command value Msta* which is implemented in the step S5130A will be described with reference to FIG. 70. FIG. 70 shows the map indicative of the characteristics of the startup torque command value Msta* for the engine rpm Ne; as the engine rpm Ne increases, the startup torque command value Msta* decreases and reduces down to "0" at a predetermined engine rpm Ne0. The value of Ne0 is greater than the Neidl value for determining the aforesaid complete startup (e.g. Ne0=900 rpm); if the system does not judge that the complete startup has been accomplished even when Ne>Neidl, then the startup torque command value Msta* is restricted to "0" at the point where Ne=Ne0.

In short, in the step S5130A, the startup torque command value Msta* is searched according to the engine rpm Ne, which has been captured in step S5001 in the main program of FIG. 4, by referring to the map of FIG. 70. The values on the axis or ordinate of the characteristic shown in FIG. 70 are normalized by the maximum startup torque; however, the values proportional to torques are stored in the actual map.

In this embodiment, in FIG. 10, the control unit 1427 is able to turn the gate drivers 1418 and 1424 OFF according to the information of the first torque command value Mm1* (the torque command value of the first rotary electric unit 2000) and the second torque command value Mm2* (the torque command value of the second rotary electric unit 3000) which are received through the communication terminal 1411.

Figure 67:
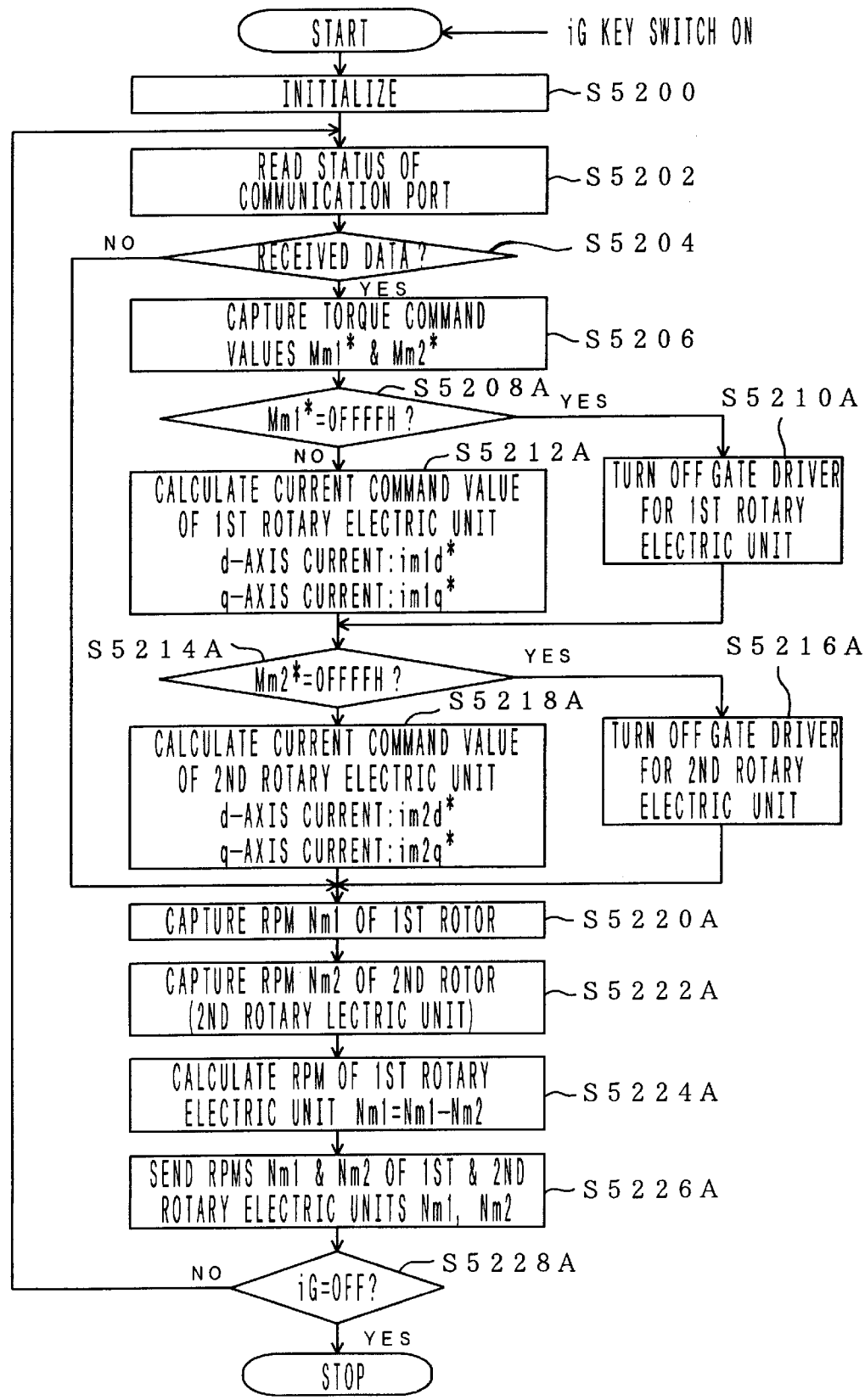
FIG. 67 is a flowchart illustrative of another example of the main program of the control carried out by the inverter.

The main program of the processing implemented by the inverter in this embodiment will be described in conjunction with the flowchart of FIG. 67. The flowchart of FIG. 67 differs from that of FIG. 14 in that the system determines in step S5208A after step S5206 whether the first torque command value Mm1* stored in the foregoing step S5206 is "0FFFFH." The data of Mm1*=0FFFFH means to cut OFF the supply of current to the first rotary electric unit 2000; the Mm1* value is set by the control program of the hybrid controller 16 which will be discussed later (the P-range program shown in FIG. 69 in this embodiment). Hence, if Mm1*=0FFFFH (if "YES" in step S5208A), then a shutdown signal is issued in step S5210A to turn the gate driver 1418 OFF.

If Mm1*≠0FFFFH (if "NO" in step S5208A), then the system proceeds to step S5212 where it calculates the d-axis current command value im1d* and the q-axis current command value im1q* as the command values of the currents to be supplied to the windings of the respective phases of the first rotary electric unit 2000 according to the first torque command value Mm1* stored in the foregoing step S5206.

Figure 69:
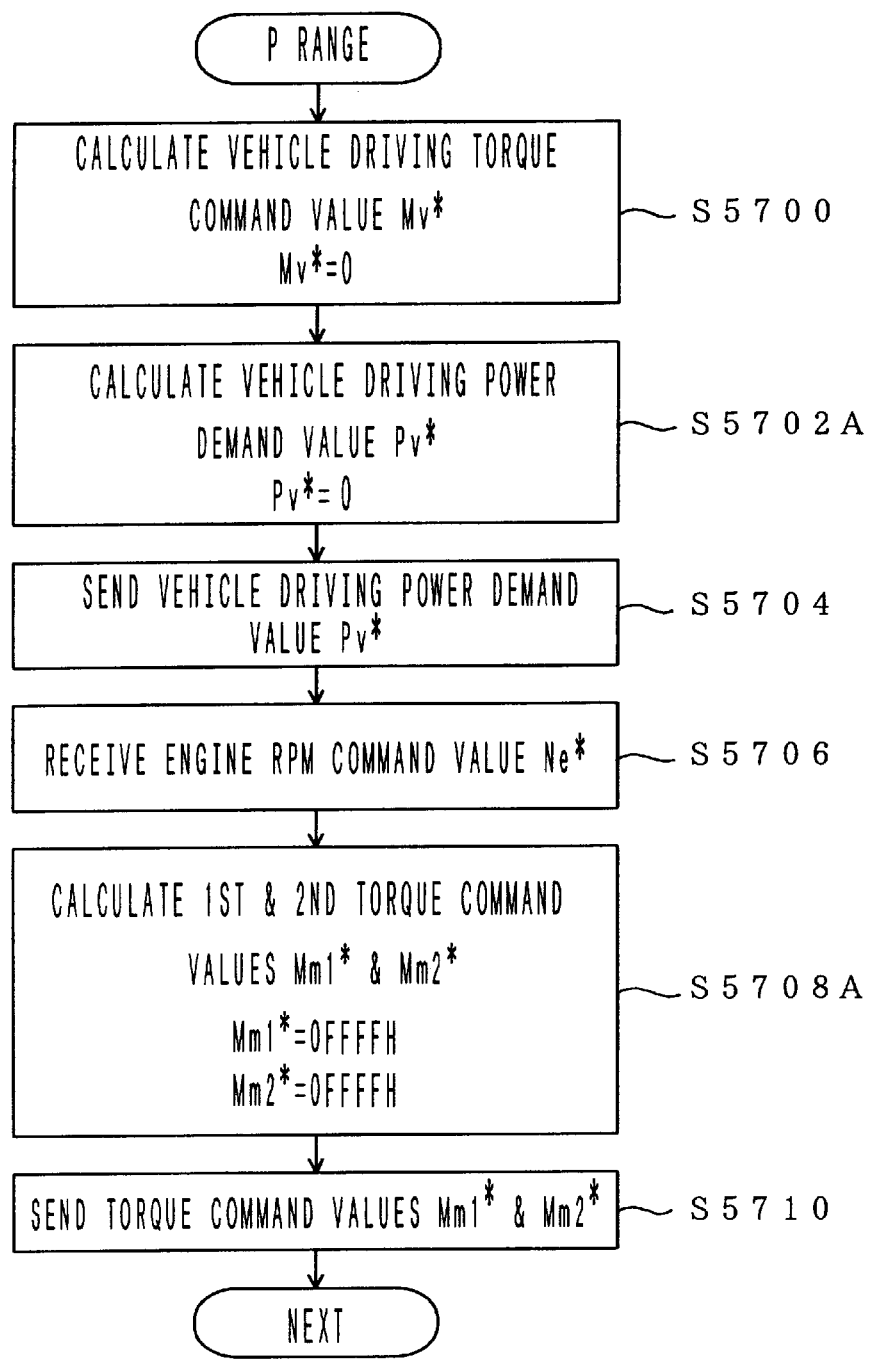
FIG. 69 is a flowchart illustrative of another example of the P-range program implemented by the hybrid controller.

Further, in step S5214A, the system determines whether the second torque command value Mm2* stored in the foregoing step S5206 is "0FFFFH." The data of Mm2*=0FFFFH means that the supply of current to the second rotary electric unit 3000 is cut OFF; the Mm2* value is set by the control program of the hybrid controller 16 to be discussed later (the P-range program shown in FIG. 69). Hence, if Mm2*=0FFFFH (if "YES" in step S5208A), then the shutdown signal is issued in step S5216A to turn the gate driver 1424 OFF.

If Mm2*≠0FFFFH (if "NO" in step S5214A), then the system proceeds to step S5218A where it calculates the d-axis current command value im2d* and the q-axis current command value im2q* as the command values of the currents to be supplied to the windings of the respective phases of the second rotary electric unit 3000 according to the second torque command value Mm2* stored in the foregoing step S5206.

After that, in step S5220A, the system captures the rpm Nm1 of the first rotor 2010, which is the information of the rotation of the first rotary electric unit 2000, from the signal processor 1425 and it stores the data in the built-in memory. In the subsequent step S5222A, the system captures the rpm Nm2 of the second rotor 2310, which is the information of the rotation of the second rotary electric unit 3000, from the signal processor 1426 and it stores the data in the built-in memory.

In step S5224A, the system recalculates the rpm Nm1 of the first rotary electric unit 2000 according to the above captured rpms Nm1 and Nm2. In other words, the first rotary electric unit 2000 includes the first rotor 2010 and the second rotor 2310, and the rpm Nm1 of the first rotor 2010 captured in step S5220A is the rpm based on the stator 3010; therefore, the rpm Nm1 of the first rotary electric unit 2000 is calculated from formula 1.

After that, in step S5226A, the rpm Nm1 of the first rotary electric unit 2000 calculated in the step S5224A and the rpm Nm2 of the second rotary electric unit 3000 captured in the step S5222A are sent to the hybrid controller 16 through the communication terminal 1411. Further, in step S5228A, the system determines whether the iG key switch of the vehicle has been turned OFF; if it decides that the key switch has not been turned OFF, then it goes back to step S5202, or if it decides that the key switch has been turned OFF, then it terminates the program.

Figure 68:
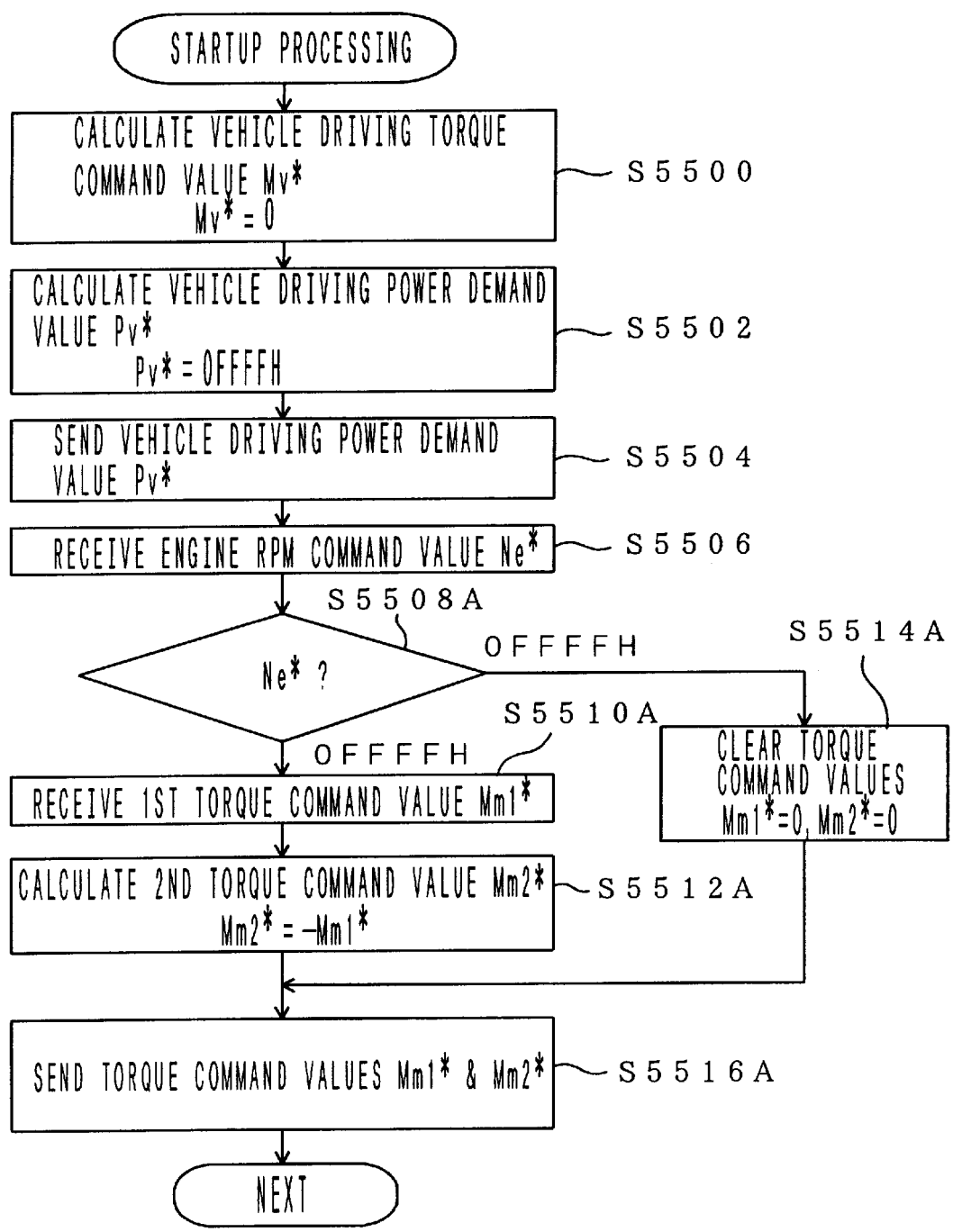
FIG. 68 is a flowchart illustrative of another example of the starting program implemented by the hybrid controller.

In this embodiment, the step S5418 of the startup processing of FIG. 14 in the first embodiment is implemented according to the flowchart of FIG. 68. The flowchart of FIG. 68 is a modified example of the one shown in FIG. 15; only the different point will be described. In step S5508A following step S5506, the system judges the received engine rpm command value Ne*; if the Ne* value is "0FFFFH (hexadecimal)" which indicates the completion of startup, then it proceeds to step S5514A. In the step S5514A, the system clears the first and second torque command values Mm1* and Mm2* to "0" and proceeds to step S5516A.

On the other hand, if the engine rpm command value Ne* judged in the step S5508A is "0FFFEH (hexadecimal)" which indicates that the startup is in process, then the system goes to step S5510A. In the step S5510A, the first torque command value Mm1* is received from the engine controller 13 through the communication section 1640. In this case, the data received as the first torque command value Mm1* becomes the startup torque command value Msta* which is searched in the map of FIG. 70 mentioned above. In the following step S5512A, the system calculates the second torque command value Mm2* according to formula 36 and proceeds to step S5516A:

$$Mm2^* = -Mm1^* \qquad \text{Formula 36}$$

In step S5516A, the first and second torque command values Mm1* and Mm2* (the torque command values of the first and second rotary electric units 2000 and 3000) are sent to the inverter 14 via the communication port built in the control unit 1630 and the communication section 1650.

The P-range processing (the processing for parking) in step S5422 in the program shown in FIG. 14 will now be described in conjunction with the flowchart of FIG. 69. In the P-range processing, first in step S5700, the system clears the vehicle driving torque command value Mv* to "0" and it clears the vehicle driving power demand value Pv* to "0" in the next step S5702A. After that, in step S5704A, the system sends the vehicle driving power demand value Pv* which has been set in the step S5702A to the engine controller 13.

Further, in step S5706, the engine rpm command value Ne* is received from the communication section 1640 via the communication terminal 1604 connected to the engine controller 13. In step S5708A, the system sets the data of "0FFFFH" in the first and second torque command values Mm1* and Mm2* which are the torque command values of the first and second rotary electric units 2000 and 3000, respectively. In this case, the data of "Mm1*, Mm2*= 0FFFFH" is used as the information to cut OFF the supply of current to the first or second rotary electric unit 2000 or 3000 (refer to the control program of FIG. 67 mentioned above).

After that, in step S5710, the system sends the first and second torque command values Mm1* and Mm2* to the inverter 14 via the communication port built in the control unit 1630 and the communication section 1650.

In the startup state of this embodiment, the rpms Nm1 and Nm2 captured in steps S5220A and S5222A are both "0"; therefore, the data "Nm1=0" and "Nm2=0" is sent to the hybrid controller 16 as the rpm information on the first and second rotary electric units 2000 and 3000 (step S5226A).

In the engine controller 13, when a receive interrupt occurs in the interrupt program of FIG. 66 mentioned above, the vehicle driving power demand value Pv* is received (step S5100). At this time, since the Pv* value is the data indicative of the engine startup state, the determination result given in step S5102 is affirmative, and the complete startup of the engine 1 is checked by, for example, the engine rpm Ne (steps S5110A and S5112A). The engine 1 is not running at the beginning of the startup of the engine 1; hence, it is determined that the startup has not been completed ("NO" in step S5112A), and the engine rpm command value Ne* is set to "0FFFEH" which is the information data for continuing the startup, and the intake air volume adjusting amount TH is set to "0" (steps S5114A and S5116A). The throttle actuator 6 is controlled to fully close the throttle valve 5 (step S5124A). Further, the engine rpm command value Ne* (=0FFFEH) is transmitted to the hybrid controller 16 (step S5126A), and an instruction is given to continue the startup.

In the state where the startup is in process, the startup torque command value Msta* for continuing the startup is searched in the map in the engine controller 13. At this time, since the engine rpm Ne at the beginning is in the vicinity of "0," the startup torque command value Msta* around the maximum value shown in FIG. 70 is set, and this set value is sent to the hybrid controller 16 (steps S5130A and S5132A).

In the hybrid controller 16, the engine rpm command value Ne* is received and it is judged from the information data of the Ne* value whether the startup has been completed (steps S5506 and S5508A of FIG. 68). If Ne*= 0FFFEH, then it is not determined that the startup has been completed; it is determined that the startup is being continued ("YES" in step S5508A). And the startup torque command value Msta* transmitted from the engine controller 13 is received as the first torque command value Mm1*, and the second torque command value Mm2* is calculated as shown below (steps S5510A and S5512A):

$$Mm2^* = -Mm1^*$$

The calculated first and second torque command values Mm1* and Mm2* are sent to the inverter 14 (step S5516A).

Thus, when the first and second torque command values Mm1* and Mm2* are transmitted to the inverter 14, the inverter 14 confirms the receipt of data ("YES" in step S5204 of FIG. 67), and the first and second torque command values Mm1* and Mm2* are captured and stored in memory (step S5206). If Mm1*≠0FFFFH ("NO" in step S5208A), then the d-axis and q-axis current command values im1d* and im1q* are calculated as the current command values for energizing the first rotary electric unit 2000 and the calculated values are stored in memory (step S5212A). If Mm2*≠0FFFFH ("NO" in step S5214A), then the d-axis and q-axis current command values im2d* and im2q* are calculated as the current command values for energizing the second rotary electric unit 3000 and the calculated values are stored in memory (step S5218A).

In the inverter 14, based on the calculated current command values im1d*, im1q*, im2d* and im2q*, the first and second rotary electric units 2000 and 3000 are controlled according to the program shown in FIG. 12. Further, the rpms Nm1 and Nm2 of the first and second rotary electric units 2000 and 3000 are calculated and the calculated Nm1 and Nm2 values are sent to the hybrid controller 16 (steps S5220A through S5226A).

Thus, the engine 1 is started by controlling the first and second rotary electric units 2000 and 3000, and as the engine rpm Ne increases, the startup torque command value Msta* searched in the map decreases. When the friction torque of the engine 1 matches the startup torque command value Msta*, the engine starts running; when the engine 1 starts to run on combustion, it is judged in the engine controller 13 that the startup has been completed ("YES" in step S5112A of FIG. 66). In other words, when, for example, the engine rpm Ne reaches a predetermined rpm (the idling rpm Neidl) and the condition of the complete startup holds, "Ne*= 0FFFFH" is set and the processing for setting the startup torque command value Msta* will not implemented thereafter (because Msta*=0). Incidentally, if it is determined that the engine rpm Ne has reached "Ne0" of FIG. 70 before "Ne*=0FFFFH" is set, then the startup torque command value Msta* is set to "0" according to the characteristics of FIG. 70 at that point.

Then, the "0FFFFH" is sent as the engine rpm command value Ne* to the hybrid controller 16. Upon receipt of the sent signal, in the hybrid controller 16, it is determined in step S5508A in FIG. 68 that Ne*=0FFFFH and the first and second torque command values Mm1* and Mm2* are set to "0" (step S5514A). Hence, under this condition, when the start switch of the iG key switch is turned OFF, the engine idles while the vehicle is maintained in the stop state.

Thus, the embodiment described in detail above provides the following advantages.

(a) In this embodiment, the startup torque command value Msta* based on the engine startup state is read and set as the first torque command value Mm1* at the beginning of the startup of the engine 1, and the second torque command value Mm2* is set such that the sum of this value and the first torque command value Mm1* is "0" (Mm1*+Mm2*= 0). This makes it possible to maintain a good torque balance between the engine 1 and the first and second rotary electric units 2000 and 3000 at the engine startup, thus permitting stable behavior of the vehicle. As a result, such problems with a conventional system, in which the torque of the first rotating electric unit (the first motor) 2000 acts as a reaction force to the driving shaft of the vehicle, causing the vehicle to go forward or reverse, or the engine rpm increases excessively before the startup of the engine 1 is completed, can be solved. In this embodiment, the engine startup state corresponds to the engine rpm before the startup is completed.

(b) In this embodiment, a characteristic value which decreases as the engine rpm Ne increases has been imparted as the startup torque command value Msta*. Hence, the overshoot of the engine rpm Ne at the time of engine startup can be controlled, enabling improved startup comfort. Moreover, no energy than necessary is used at the time of engine startup, resulting in higher coefficient of use of energy.

In the above embodiment, the characteristic shown in FIG. 70 has been given as the startup torque command value Msta*. This may, however, be modified; the characteristic of FIG. 70 shows linear decrease the engine rpm Ne increases, while the characteristic may alternatively exhibit nonlinear decrease. Alternatively, the characteristic may be set so that the startup torque command value Msta* may be simply decreased without restricting the startup torque command value Msta* to "0" at Ne=Ne0.

Figure 71:
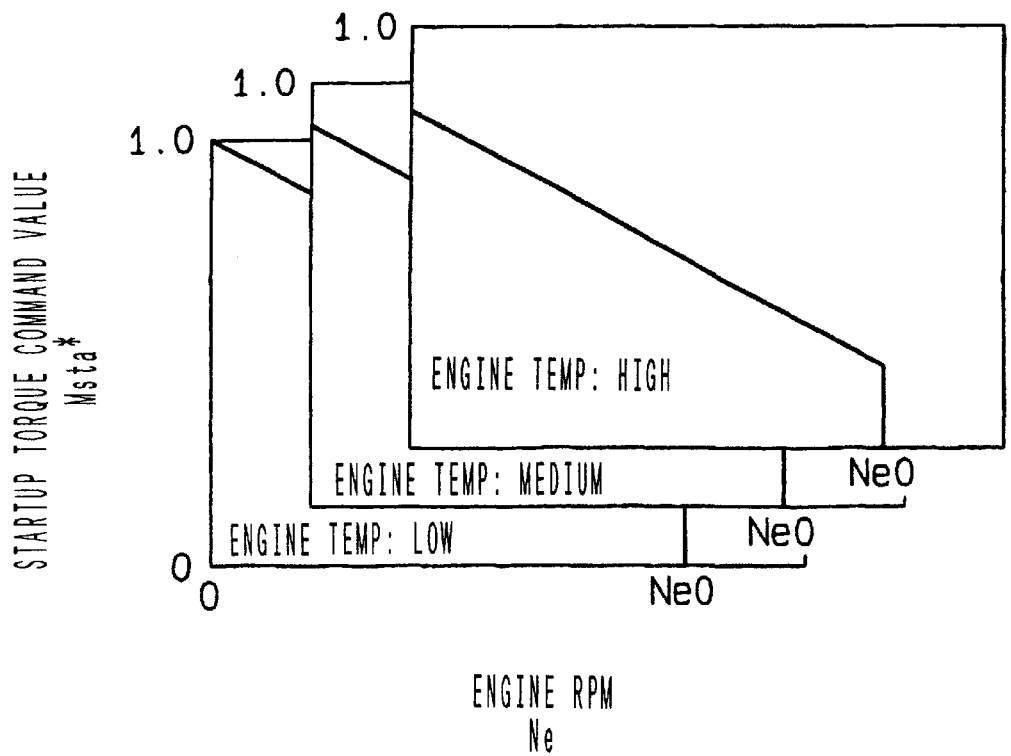
FIG. 71 is another characteristic chart of a starting torque command value determined by the engine controller.

Further, the engine temperature may be added as a parameter to the map characteristic of the startup torque command value Msta*. As shown in FIG. 71, for example, a plurality of characteristics of the startup torque command value Msta* are prepared for different engine temperatures. In this case, a characteristic may be provided in which the startup torque command value Msta* decreases as the engine temperature rises, or the gradient of the decrease in the Msta* may be changed for different engine temperatures. Such configurations allow the engine 1 to be properly started even when a great and unexpected friction torque is applied at cold start or the like of the engine 1. In addition, good condition can be maintained also during the warm-up process of the engine 1. As the temperature information on the engine 1, the temperature of the engine cooling water or the temperature of the wall surface of a cylinder may be employed.

Yet another embodiment of the present invention will now be described in conjunction with FIGS. 59, 72 through 78. This embodiment has been modified over the previous embodiment, the configuration of which is shown in FIG. 59; hence, the schematic configuration of this embodiment will be first described with reference to FIG. 59. The hybrid controller 16 receives the output signal of the voltage 40 detector 19 for detecting the voltage of the electricity storing unit 15, and the output signal of the current sensor 18B for detecting the current going out of the electricity storing unit 15. The voltage detection result, i.e. the terminal voltage signal (VB) of the electricity storing unit 15, and the current detection result, i.e. a current signal (IB) going in and out of the electricity storing unit 15, are supplied to the hybrid controller 16. Also, the detection result given by a publicly known temperature sensor, not shown, i.e. a temperature signal (TB) of the electricity storing unit 15 is supplied to the hybrid controller 16.

Figure 72:
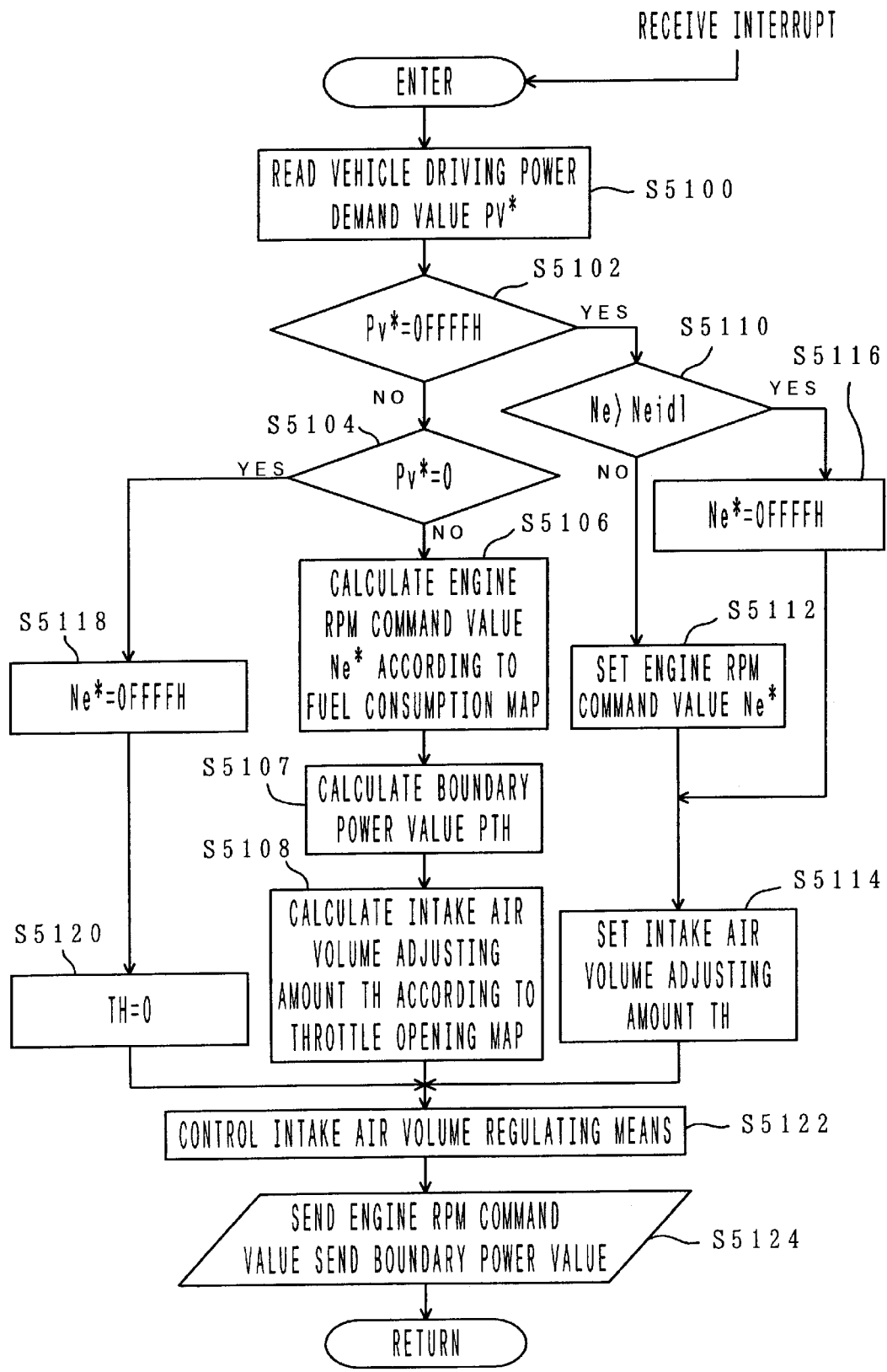
FIG. 72 is a flowchart illustrative of the interrupt program of the control carried out by the engine controller.

The flowchart of FIG. 72 is a modified example of the interrupt control of FIG. 5 in the first embodiment; it differs from the one shown in FIG. 5 in the following point. In step S5106, the operating point of the engine 1 is decided according to the fuel consumption map of the engine 1 which has been stored beforehand, and the engine rpm command value Ne* is calculated according to the decided operating point; however, stored in the fuel consumption map is the data of the fuel consumption (g/kwh) of the engine 1 which uses the engine output torque Me and the engine rpm Ne as the parameters according to the characteristic shown, for example, in FIG. 73. More specifically, once the engine output torque command value Me* is decided, the engine operating point at which the best fuel economy is obtained (e.g. point C in FIG. 73) is determined, and the rpm corresponding to this operating point is calculated as the engine rpm command value Ne*.

Figure 73:
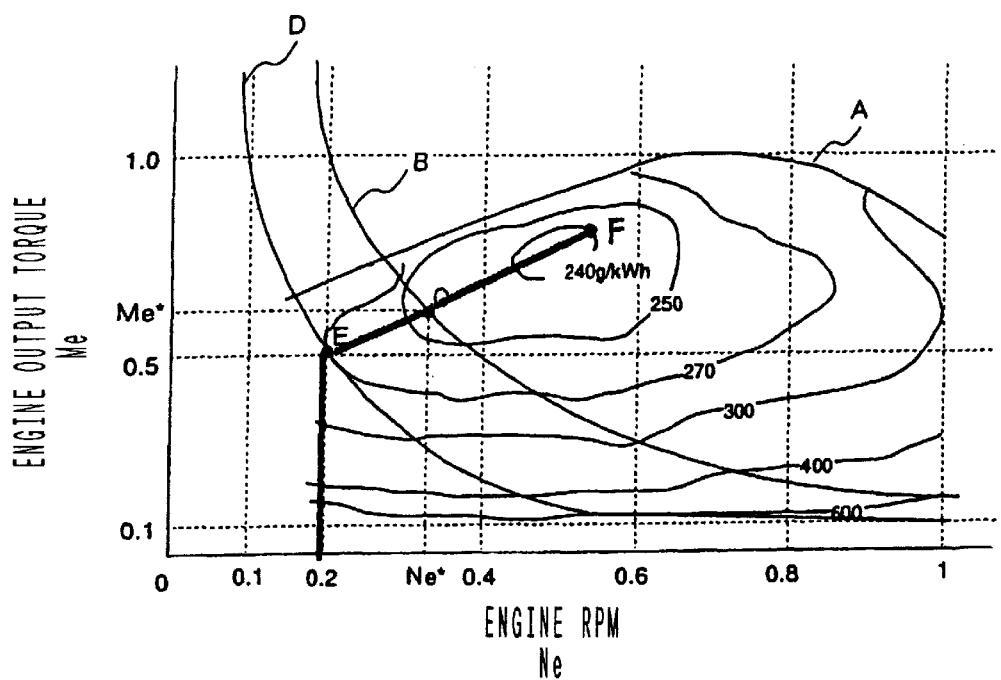
FIG. 73 is a characteristic chart illustrative of the engine operating point determined by an engine controller.

Further, in step S5107, based on the fuel consumption map of the engine 1 shown in FIG. 73, a boundary curve D of a power zone of good fuel economy (high efficiency zone) and a power zone of poor fuel economy (low efficiency zone) is calculated, and a boundary power value PTH is calculated from this boundary curve D. Once a boundary value μe separating the zone of the good fuel economy and the zone of the poor fuel economy is decided, the engine operating point at which the output of the engine 1 is the minimum (e.g. point E in FIG. 73) is obtained, and "equivalent power curve" passing the obtained operating point E can be obtained as the boundary curve D. Based on the obtained equivalent power curve (boundary curve D), the boundary power value PTH corresponding to the boundary value μe of the fuel consumption can be determined. The boundary value μe of the fuel consumption is a preset value; it is, for example, 270 g/kwh in FIG. 73.

Figure 75:
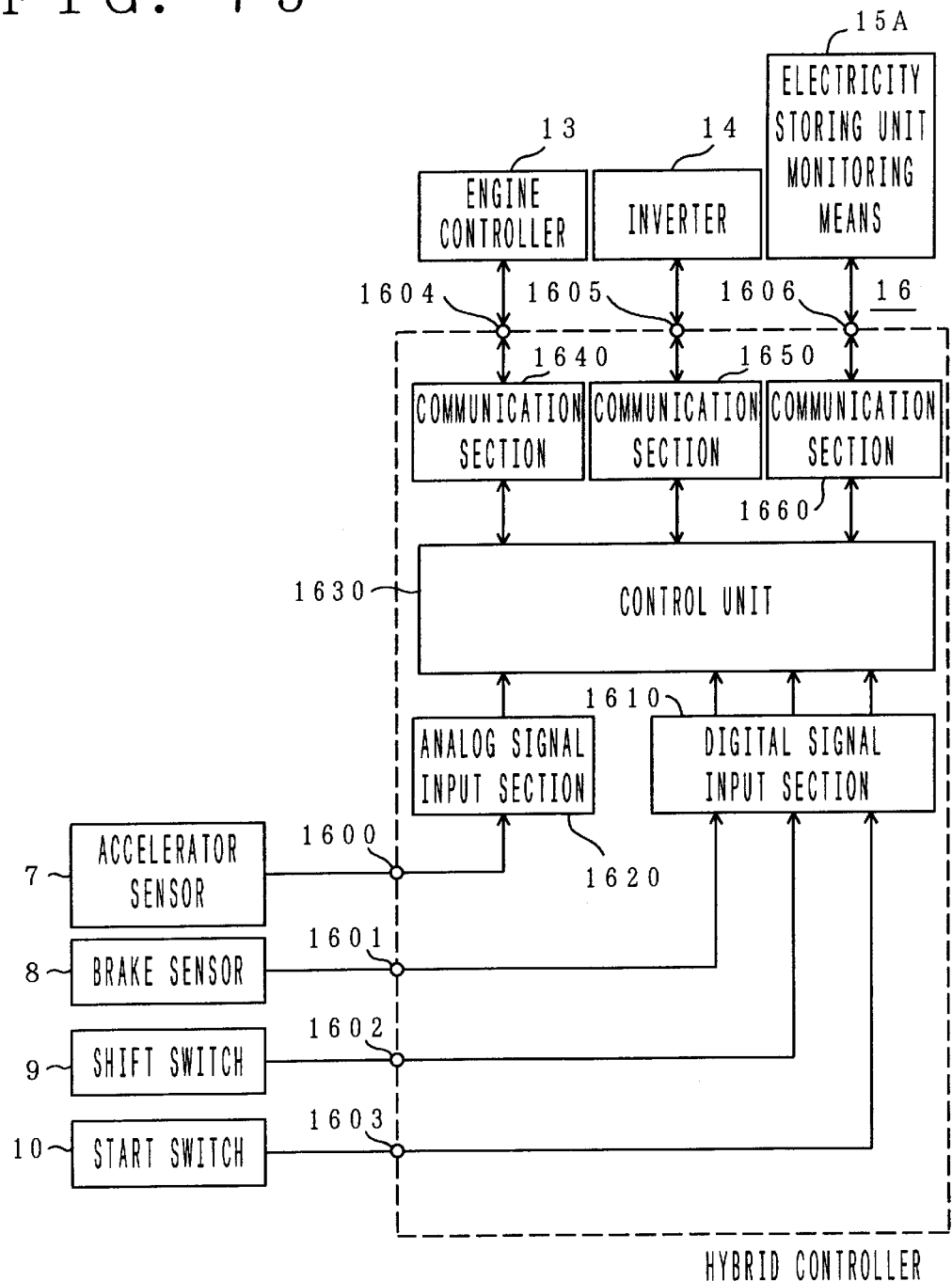
FIG. 75 is a block diagram showing the configuration of the hybrid controller.

FIG. 75 shows the hybrid controller in this embodiment which is different from the one shown in FIG. 13 in the first embodiment as follows: a communication section 1660 which shares the same configuration as the communication section 1640 or 1650 is provided between the control unit 1630 and the communication terminal 1606. The communication terminal 1606 is connected to an electricity storing unit monitoring means 15A. The electricity storing unit monitoring means 15A is a generic term for the voltage detector 19B, the current sensor 18B, and the temperature sensor, not shown, mentioned above. The voltage signal (VB) of the electricity storing unit 15, the current signal (IB), and the temperature signal (TB) are supplied to the hybrid controller 16.

Figure 76:
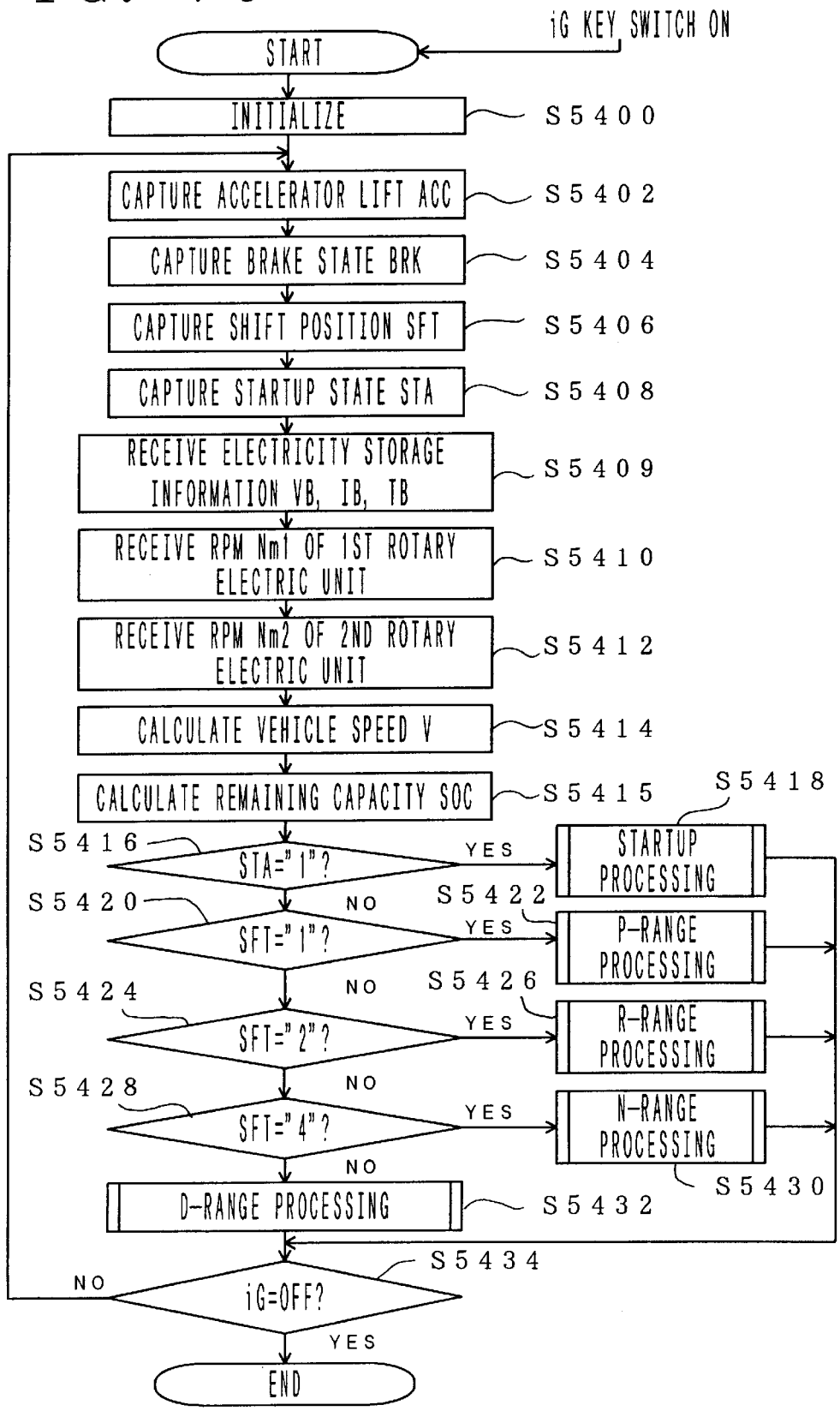
FIG. 76 is a flowchart illustrative of the main program of the control carried out by the hybrid controller.

FIG. 76 shows the flowchart which has been modified for this embodiment from the one shown in FIG. 14 which shows the main program in the hybrid controller in the first embodiment; the point different from the one shown in FIG. 14 will be described. In FIG. 76, new steps S5409 and S5415 have been added. In step S5409, various types of electricity storage information including the terminal voltage VB of the electricity storing unit 15, the current IB flowing in and out of the electricity storing unit 15, and the temperature TB of the electricity storing unit 15 are received from the electricity storing unit monitoring means 15A via the communication section 1660.

In step S5415, the remaining capacity (the amount of stored electricity) SOC of the electricity storing unit 15 is calculated by a publicly known method mainly from the terminal voltage VB, the current IB, and the temperature TB of the electricity storing unit 15 which have been captured in the foregoing step S5409. The remaining capacity SOC is determined by correcting the value, which has been obtained, for example, by performing time integration of the current IB flowing in and out of the electricity storing unit 15, primarily by the terminal voltage VB and the temperature TB. In this case, the remaining capacity SOC may be replaced by the terminal voltage VB.

Figure 77:
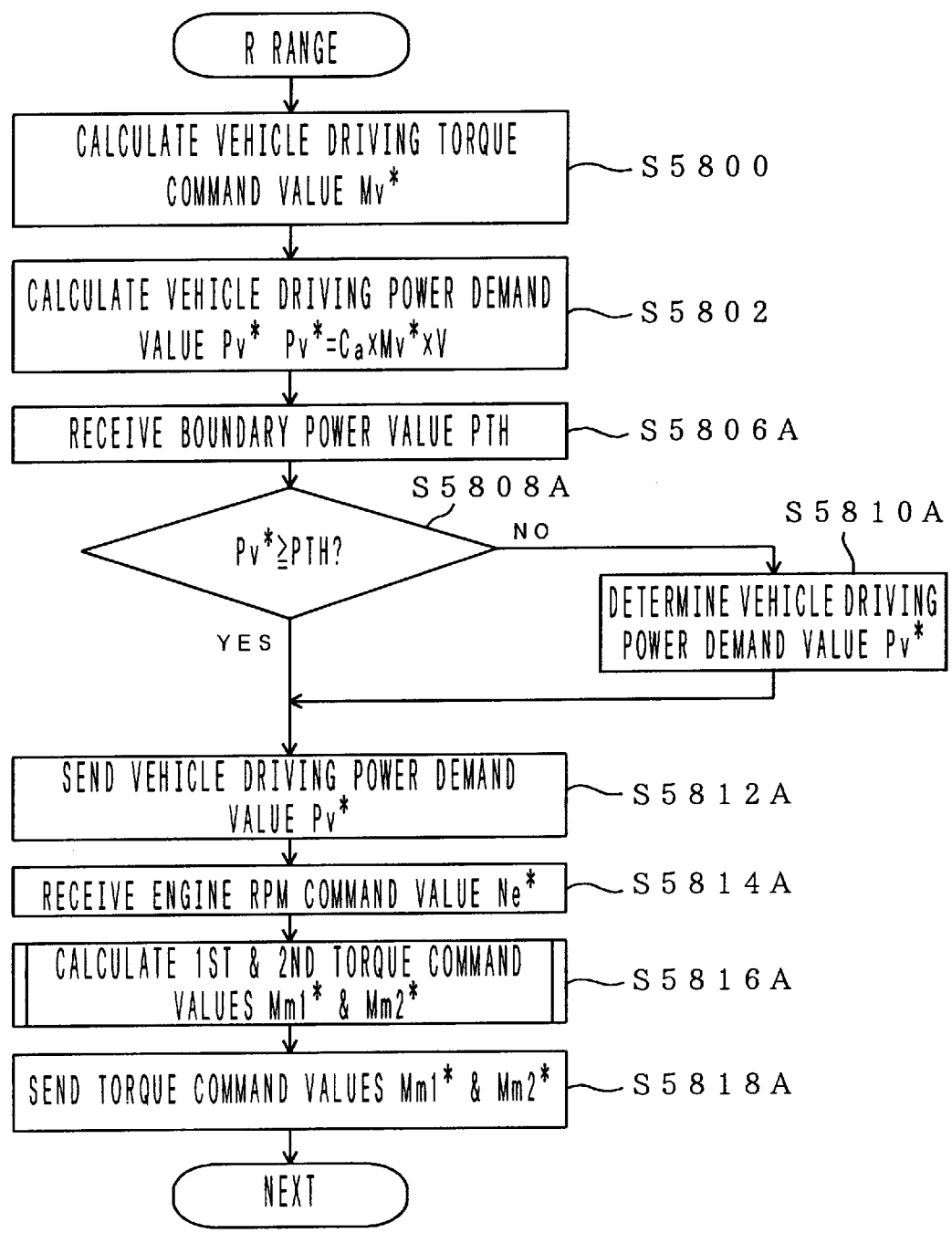
FIG. 77 is a flowchart illustrative of the R-range program implemented the hybrid controller.

FIG. 77 shows the flowchart illustrative of the R-range processing in this embodiment; it differs from that of FIG. 18 in the first embodiment in the following point: in step S5806A following step S5802, the boundary power value PTH is received via the communication port connected to the engine controller 13. The boundary power value PTH is the value calculated in step S5107A of FIG. 72; it is determined based on the boundary curve (curve D of FIG. 73) between the high efficiency zone and the low efficiency zone of the engine 1 as previously described. In step S5808A, the vehicle driving power demand value Pv* is compared with the boundary power value PTH to determine whether the following holds true:

$$Pv^* \geq PTH$$

If it is determined that Pv*≧PTH holds true, that is, the vehicle driving power demand value Pv* is sufficiently large and the engine 1 is running in the high efficiency zone, then the system proceeds directly to step S5812A.

Figure 74:
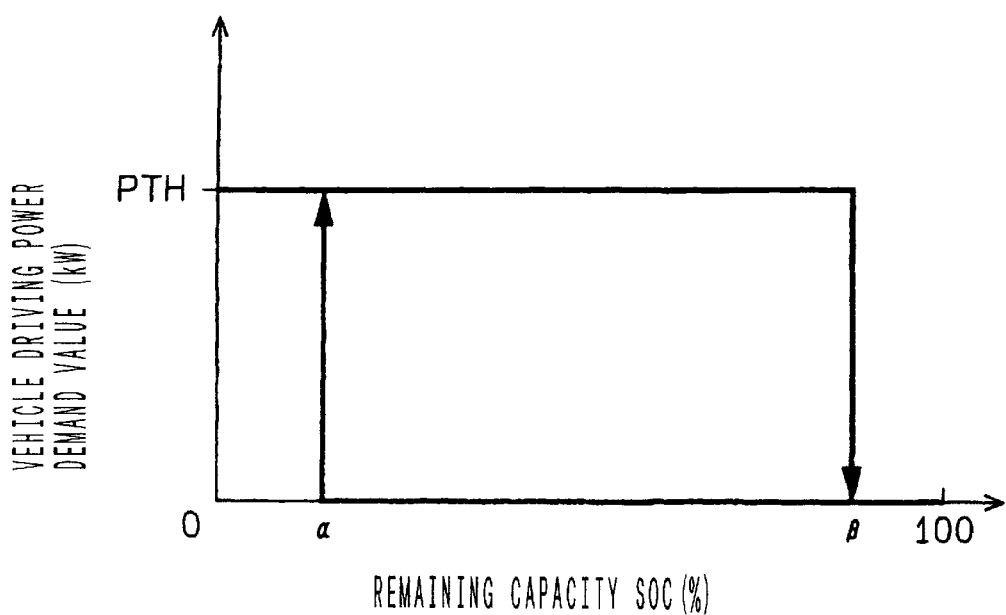
FIG. 74 is a chart illustrative of the hysteresis characteristic of the vehicle driving power demand value determined by a hybrid controller.

On the other hand, if it is determined that Pv*<PTH, that is, the vehicle driving power demand value Pv* is small and the engine 1 is running in the low efficiency zone, then the system proceeds to step S5810A. In step S5810A, the vehicle driving power demand value Pv* is calculated according to the characteristics shown in FIG. 74. FIG. 74 shows a hysteresis characteristic in which the system sets the vehicle driving power demand value Pv* to "0" and stops the engine 1 when the remaining capacity SOC (%) of the electricity storing unit 15 reaches an upper limit value β at the time of charging, while the system sets the vehicle driving power demand value Pv* to the boundary power value PTH and drives the engine 1 when the remaining capacity SOC reaches a lower limit value α at the time of discharging.

To give a brief description of a specific operation, a "charge mode flag" indicating that the electricity storing unit 15 is in the process of charging, and a "discharge mode flag" indicating that the electricity storing unit is in the process of discharging are prepared (not shown) are prepared. If the charge mode flag=1, then Pv*=PTH; if the discharge mode flag=1, then Pv*=0. The hysteresis characteristic shown in FIG. 74 can be accomplished by such a flag operation.

Then, in step S5812A, the vehicle driving power demand value Pv* calculated in the aforesaid step S5802 or step S5810A is sent to the engine controller 13. In the following step S5814A, the engine rpm command value Ne* is received through the communication port connected to the engine controller 13. Further, in step S5816A, the first and second torque command values Mm1* and Mm2* which are the torque command values of the first and second rotary electric units 2000 and 3000 are calculated. This calculation is performed by calling up the sub-routine of FIG. 16 as in the case of the startup processing (the routine of FIG. 80 described above). Lastly, in step S5818A, the first and second torque command values Mm1* and Mm2* are transmitted to the inverter 14 via the communication port built in the control unit 1630 and the communication section 1650.

Figure 78:
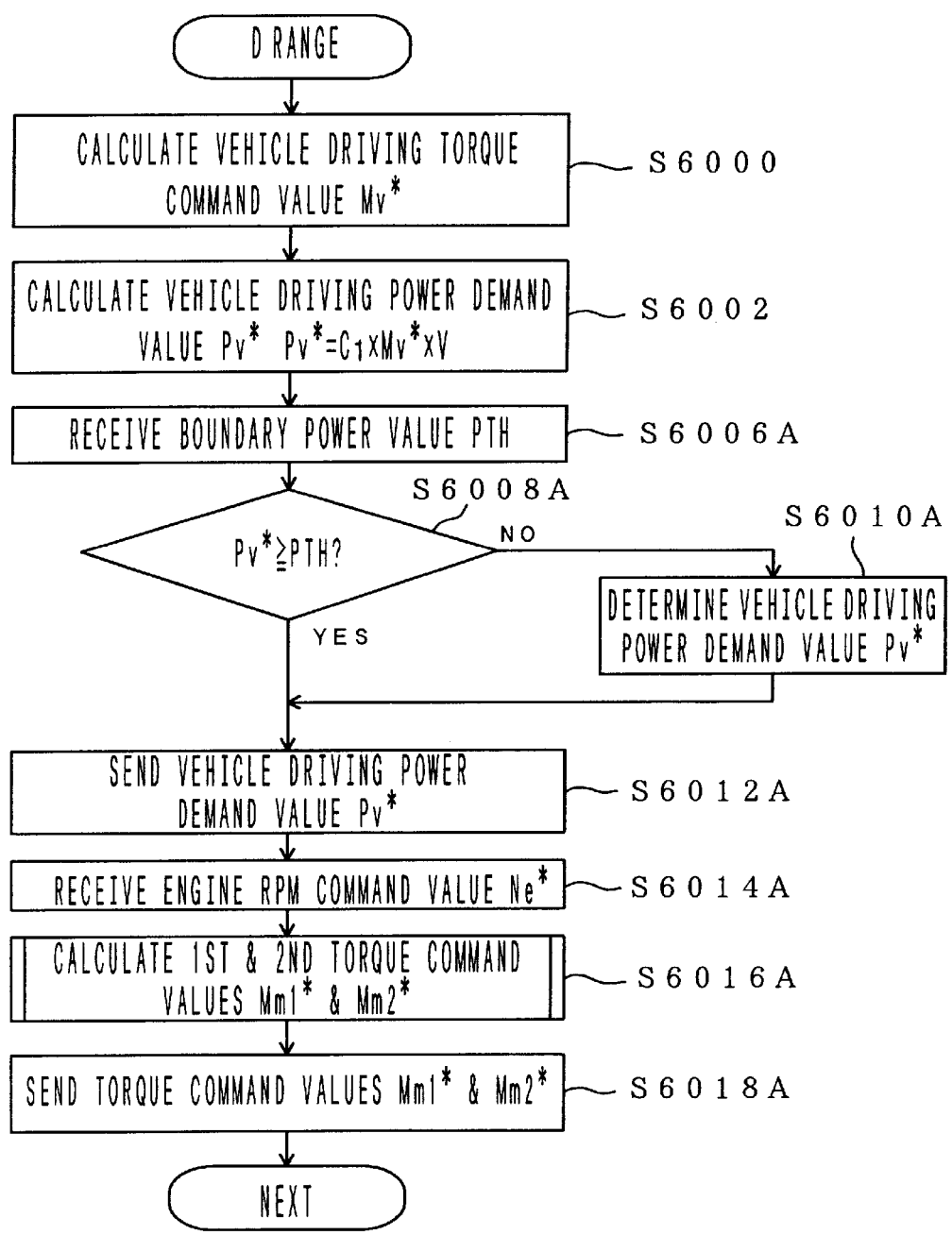
FIG. 78 is a flowchart illustrative of the D-range program implemented by the hybrid controller.

FIG. 78 is a flowchart illustrating the D-range processing in this embodiment; the flowchart is different from that of FIG. 20 in the first embodiment in the following point. In step S6006A after step S6002, the boundary power value PTH is received via the communication port connected to the engine controller 13. The boundary power value PTH is the value calculated in step S5107 of FIG. 72; it is determined based on the boundary curve separating the high efficiency zone and the low efficiency zone of the engine 1 as previously mentioned. In step S6008A, the vehicle driving power demand value Pv* is compared with the boundary power value PTH to determine whether the following holds true:

$$Pv^* \geq PTH$$

If it is determined that Pv* >PTH holds true, that is, the vehicle driving power demand value Pv* is sufficiently large and the engine 1 is running in the high efficiency zone, then the system proceeds directly to step S6012A.

On the other hand, if it is determined that Pv*<PTH, that is, the vehicle driving power demand value Pv* is small and the engine 1 is running in the low efficiency zone, then the system proceeds to step S6010A. In step S6010A, the vehicle driving power demand value Pv* is calculated according to FIG. 74 as previously mentioned. According to FIG. 74, when the remaining capacity SOC (%) of the electricity storing unit 15 is almost fully charged, the system sets the vehicle driving power demand value Pv* to "0" and stops the engine 1, while it sets the vehicle driving power demand value Pv* to the boundary power value PTH and drives the engine 1 when the remaining capacity Soc is placed in the discharge state.

Subsequently, in step S6012A, the vehicle driving power demand value Pv* calculated in the aforesaid step S6002 or step S6010A is sent to the engine controller 13. In step S6014A, the engine rpm command value Ne* is received through the communication port connected to the engine controller 13. Further, in step S6016A, the first and second torque command values Mm1* and Mm2* which are the torque command values of the first and second rotary electric units 2000 and 3000 are calculated. This calculation is carried out by calling up the sub-routine of FIG. 16 as in the case of the startup processing and the R-range processing (the foregoing routines of FIG. 80 and FIG. 77). Lastly, in step S6018, the first and second torque command values Mm1* and Mm2* are sent to the inverter 14 via the communication port built in the control unit 1630 and the communication section 1650.

Incidentally, in this embodiment, the processing of step S5810A of FIG. 77 and step S6010A of FIG. 78 implemented by the control unit 1630 of the hybrid controller 16 corresponds to the torque control amount restricting means described in the appended claims. Further, in the processing of step S5810A of FIG. 77 and step S6010A of FIG. 78, the processing for restricting the vehicle driving power demand value Pv* by the boundary power value PTH corresponds to a "first restriction" and the processing for setting the vehicle driving power demand value Pv* to "10" corresponds to a "second restriction." In addition, the processing of step S5415 of FIG. 76 corresponds to the state amount calculating means, and the remaining capacity SOC calculated by the processing corresponds to the state amount of the electricity storing unit 15.

Studying the forward drive mode in this embodiment, when the vehicle starts and the vehicle speed V is produced, the vehicle driving power demand value Pv* calculated in step S6002 is no longer "0" in the program shown in FIG. 78. In this case, in the engine controller 13, the engine characteristic map shown in FIG. 73 is searched to calculate the boundary power value PTH (point E in the drawing) from the boundary curve D separating the power zone of the good fuel economy (high efficiency zone) and the power zone of the poor fuel economy (low efficiency zone), and the calculation result is used to update the data stored in memory (step S5107 of FIG. 72).

In the hybrid controller 16, the remaining capacity SOC is calculated based on the stored electricity information (VB, IB, and TB) of the electricity storing unit 15 (step S5415 of FIG. 76). Further, the boundary power value PTH is captured from the engine controller 13; if "Pv*<PTH," then the vehicle driving power demand value Pv* is set to "0" or to the boundary power value PTH, at which the engine efficiency is high, in order to prevent the engine 1 from running in the low efficiency zone where the cooling loss is high and the fuel economy is poor (steps S6006A through S6010A of FIG. 78). The power demand value Pv* is sent to the engine controller 13 (step S6012A).

In short, if the Pv* value is smaller than the boundary power value PTH, then it is determined that the zone is the one where the fuel economy of the engine 1 worsens. When Pv* is set to zero (Pv*=0), the operation of the engine 1 is stopped and the vehicle is driven by controlling the supply of current to the first rotary electric unit 2000. On the other hand, if the remaining capacity SOC of the electricity storing unit 15 decreases and Pv* is set to PTH (Pv*=PTH), the first rotary electric unit 2000 (or the second rotary electric unit 3000) generates electric power from the excess power which corresponds to the difference between the engine power and the vehicle traveling power, and the electric energy corresponding to the excess power is stored in the electricity storing unit 15. At this time, the vehicle travels on the torque generated by the first or second rotary electric unit 2000 or 3000 while storing electricity in the electricity storing unit 15.

This embodiment described in detail above provides the following advantages.

(a) The embodiment is characterized in that the vehicle driving power demand value Pv* as the torque control amount is restricted by the predetermined lower limit value (the boundary power value PTH) according to the engine output characteristics shown in FIG. 73. Thus, the vehicle driving power demand value Pv* is limited by the boundary power value PTH so as to enable the engine 1 to run in the zone of a relatively high fuel consumption rate. As a result, even when driving at low power as in the case of, for example, idling or driving through an urban area, the engine 1 can be operated in the high efficiency zone, thus permitting improved fuel economy.

(b) In this embodiment, when the vehicle driving power demand value Pv* falls below the boundary power value PTH, the first restriction wherein the Pv* value is restricted by the PTH value or the second restriction wherein the Pv* value is set to "0" is selectably carried out. Thus, carrying out the processing to set the Pv* to zero (Pv*=0) as necessary makes it possible to control the power generation by the engine 1 to a required minimum, so that fuel is not consumed during idling or travel through an urban area, leading to further improve fuel economy.

(c) In this embodiment, if it is determined that the remaining capacity SOC of the electricity storing unit 15 is relatively small and that the unit 15 need to be charged, then the Pv* value is restricted by the PTH value, and if the discharge of the electricity storing unit 15 is allowed, the Pv* value is set to "0" (refer to FIG. 74). This enables the electricity storing unit 15 to be charged or discharged as necessary, thus permitting stable accumulation of electricity in the electricity storing unit 15.

(d) Further in this embodiment, according to the characteristics of FIG. 74, the vehicle driving power demand value Pv* is controlled by the hysteresis characteristic based on the remaining capacity SOC. Hence, such an inconvenience, where the engine 1 is repeatedly turned ON and OFF frequently with resultant deteriorated derivability, can * be obviated, thus enabling smooth vehicle drive to be achieved.

The embodiment of the present invention may be implemented as described below in addition to the one explained above.

In the aforesaid embodiment, when the vehicle driving power demand value Pv* falls below the boundary power value PTH, the Pv* value is restricted by the PTH value (the first restriction); however, this configuration may be modified. The vehicle driving power demand value Pv* may alternatively be restricted by a value in the high efficiency zone rather than "PTH"; for example, a guard value (a predetermined lower limit value) may be set on the straight line which connects point E and point F of FIG. 73. In this case, the guard value set on the straight line connecting point E and point F of FIG. 73 may be changed as necessary according to the vehicle traveling condition. Other alternative may be used as long as the vehicle driving power demand value Pv* is restricted by a predetermined lower limit value based on fuel consumption characteristic so as to prevent the engine 1 from running in the zone of poor fuel economy.

In the above embodiment, the Pv* value is set to "0" to stop the operation of the engine 1 when the vehicle driving power demand value Pv* falls below the boundary power value PTH and when the electricity storing unit 15 is in the charge mode; this configuration, however, may be modified. For instance, the engine 1 may be stopped by cutting off the supply of fuel to the engine 1, or the fuel cutoff processing may be combined with the processing for setting the Pv* value to zero (Pv*=0).

Further alternatively, excessive repetition of ON and OFF of the engine 1 may be restrained by adding a logic fordisabling engine start until a predetermined time elapses afterthe engine 1 is stopped or a logic for disabling engine stop until a predetermined time elapses after the engine 1 is started.

Figure 79:
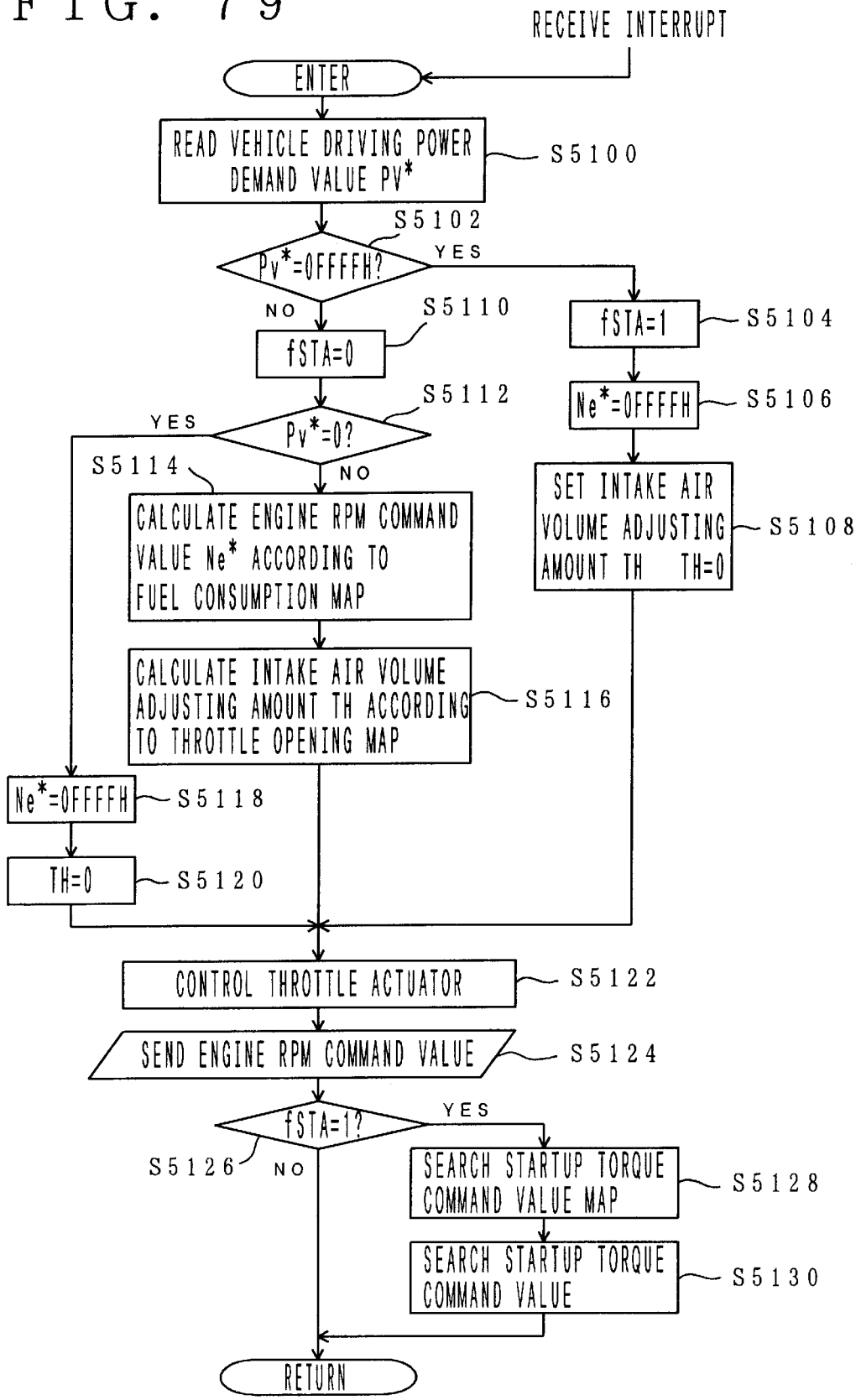
FIG. 79 is a flowchart illustrative of an interrupt program of the control carried out by the engine controller.

Another embodiment of the present invention will now be described in conjunction with FIGS. 79 to 82. The program shown in FIG. 79 is an interrupt program executed by a control unit 1306 in an engine controller 13; it is initiated when a communication circuit 1307 of FIG. 3 receives communication data. In FIG. 79, first in step S5100, a vehicle driving power demand value Pv* is read in from a hybrid controller 16 via the communication circuit 1307 and a communication terminal 1313 shown in FIG. 3. In the next step S5102, it is determined whether the engine is being started up, according to the vehicle driving power demand value Pv* sent from the hybrid controller 16. To be more specific, it is determined whether the Pv* value is a hexadecimal "0FFFFH." If Pv*=0FFFFH, then the system decides that the engine is being started up and proceeds to step S5104. In this case, the Pv* data "0FFFFH" is employed as the information data indicating that the engine is being started up.

In step S5104, "1" is set at a flag fSTA indicative of the startup state of an engine 1, and the flag information is stored. Incidentally, fSTA=1 indicates that the engine 1 is currently in the process of startup, and fSTA=0 indicates that the engine 1 is not in the process of startup (the startup has been completed).

Further in the next step S5106, "0FFFFH" is set at the engine rpm command value Ne*. This means to fully close a throttle valve 5 of the engine 1. In the subsequent step S5108, throttle opening θTH is set to "0" to maintain the idling state at the time of engine startup, that is, intake air volume adjusting amount TH handled by a throttle actuator 6 is set to "0," then the system goes to step S5122.

On the other hand, if it is determined that Pv*≠0FFFFH in the foregoing step S5102 (if "NO" in the step), then the system decides that the engine is not in the process of startup and proceeds to step S5110. In step S5110, the system clears the flag fSTA indicative of the startup state of the engine 1 to "0" and stores the flag information.

Further, in step S5112, the system determines whether the vehicle driving power demand value Pv* is "0"; if Pv*=0 (if YES), then it proceeds to step S5118 wherein it sets the data "0FFFFH" for the engine rpm command value Ne*. In the subsequent step S5120, the system sets the intake air volume adjusting amount TH to "0" (throttle opening θTH=0) before proceeding to step S5122.

If Pv*≠(if NO) in step S5112, then the system decides the operating point of the engine 1 according to the fuel consumption map of the engine 1, which has been stored beforehand, in the next step S5114, and calculates the engine rpm command value Ne* according to the operating point. The fuel consumption map has been stored in the form of a two-dimensional map which shows the fuel consumption rate (g/kWh) of the engine 1, with an engine output torque Me and the engine rpm Ne being the parameters, according to the characteristics shown in FIG. 8. Specifically, once the engine output torque Me* is decided, the engine operating point at which the best fuel economy is obtained (e.g. point C in FIG. 8), and the rpm corresponding to the operating point is calculated as the engine rpm command value Ne*.

Further, in the subsequent step S5116, the throttle opening θTH for the foregoing engine operating point is determined according to the throttle opening map, and the intake air volume adjusting amount TH of the throttle actuator 6 is calculated according to the map value. The throttle opening map is prepared according to, for example, the characteristics of the engine shown in FIG. 9. In FIG. 9, the engine rpm Ne on the axis of abscissa is normalized at the maximum rpm of the engine 1, while the engine output torque Me on the axis of ordinate is normalized at the maximum output torque of the engine 1. The data of the throttle opening θTH has been stored in the throttle opening map in the form of a two-dimensional map, with an engine output torque Me and the engine rpm Ne being the parameters thereof. Hence, in step S5116, based on the engine rpm command value Ne* and the engine output torque command value Me* calculated in step S5114, a target throttle opening value θTH* is determined and the intake air volume adjusting amount TH is calculated from the target throttle opening value θTH*. The target throttle opening value θTH* is converted to the intake air volume adjusting amount TH according to the characteristic of the throttle (the characteristic of the throttle actuator 6) which has been determined and stored in advance.

After calculating the Ne* value and the TH value as described above, in step S5122, the throttle actuator 6 is controlled according to the intake air volume adjusting amount TH determined in the foregoing steps S5108, S5116, and S5120. Further, in the next step S5124, the engine rpm command value Ne* determined in the foregoing steps S5106, S5114, and S5118 is transmitted to the hybrid controller 16 via the communication circuit 1307 of FIG. 3.

After that, in step S5126, it is determined from the flag fSTA whether the engine 1 is in the process of startup. If the flag fSTA is "1," then the system regards that the engine is being started up and gives an affirmative determination result in the step S5126 before proceeding to step S5128. In step S5128, a startup torque command value Msta* is calculated by searching a map. In the next step S5130, the startup torque command value Msta* is sent to the hybrid controller 16 via the communication circuit 1307 of FIG. 3.

If the flag fSTA is not "1" (if fSTA=0), then the system regards that the startup of the engine 1 has been completed and gives a negative determination result in the foregoing step S5126. After carrying out the processing described above, the system goes back to the main program before the interrupt program was initiated.

Figure 81:
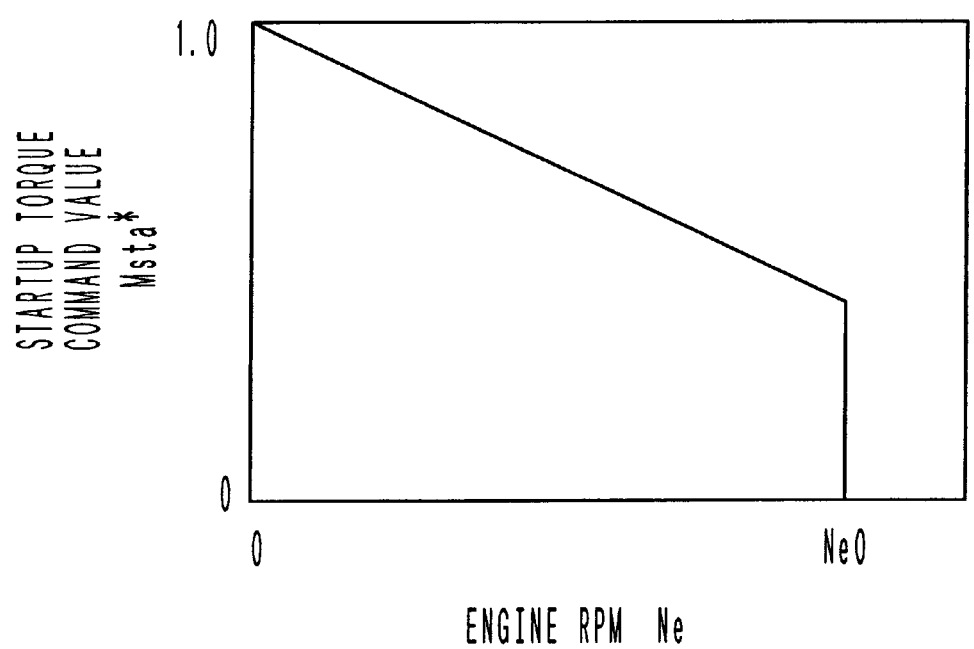
FIG. 81 is a characteristic chart illustrative of a vehicle driving torque command value determined by the hybrid controller.

The map search for the startup torque command value Msta* which is implemented in the step S5128 will be described with reference to FIG. 81. FIG. 22 shows the map indicative of the characteristics of the startup torque command value Msta* for the engine rpm Ne; as the engine rpm Ne increases, the startup torque command value Msta* gradually decreases and reduces down to "0" at a predetermined engine rpm Ne0. In short, in the step S5128, the startup torque command value Msta* is searched according to the engine rpm Ne, which has been captured in step S5001 in the main program of FIG. 4, by referring to the map of FIG. 81. The values on the axis or ordinate of the characteristic shown in FIG. 81 are normalized by the maximum startup torque; however, the values proportional to torques are stored in the actual map.

The engine startup processing of step S5418 in the program shown in FIG. 14 will now be described in conjunction with the flowchart of FIG. 80. In the engine startup processing, first in step S5500, it is determined whether the flag fSTA indicative of the startup state has been set to "1" (as previously mentioned, fSTA=1 indicates that the engine is in the process of startup). If fSTA=1, then the system gives an affirmative determination result in step S5500 and directly proceeds to step S5506.

On the other hand, if fSTA=0, then the system gives a negative determination result in step S5500 and proceeds to step S5502 wherein it sets the flag fSTA to "1" to store that the engine is in the process of startup. In the following step S5504, the system initializes the flag fFIRE which indicates whether complete explosion has taken place in the engine 1 to "0" to get ready for determining whether complete explosion has occurred in the engine.

In the next step S5506, the system clears the vehicle driving torque command value Mv* to "0" and in the subsequent step S5508, it sets "0FFFFH (hexadecimal)" as the vehicle driving power demand value Pv*. In the following step S5510, the system outputs the vehicle driving power demand value Pv* which has been set in the foregoing step S5508 to a communication section 1640 so as to send it to the engine controller 13. Further, in step S5512, the engine rpm command value Ne* is received from the communication section 1640 via a communication terminal 1604 connected to the engine controller 13.

After that, in step S5514, the system determines whether the foregoing received engine rpm command value Ne* is "0FFFFH (hexadecimal)"; if Ne*=0FFFFH, then the system proceeds to step S5516. If Ne*=0FFFFH, then the system determines that the throttle valve 5 of the engine 1 has been controlled by the engine controller 13 so that it is fully closed, and it sets a flag fIDL, which indicates that the engine 1 is in the idling state, to "1." If Ne*≠0FFFFH in the aforesaid step S5514, then the system proceeds to step S5518 wherein it clears the flag fIDL to "0."

In the next step S5520, a first torque command value Mm1* is received from the engine controller 13 via the communication section 1640. At this time, the data received as the first torque command value Mm1* provides the startup torque command value Msta* searched in the map of FIG. 81.

In the next step S5522, the complete explosion in the engine 1 is determined. The determination of the complete explosion of the engine 1 is implemented by calling up the sub-program of FIG. 82 which will be discussed later.

After determining the complete explosion in the engine 1, the system judges in step S5524 whether the complete explosion has taken place in the engine 1 from the status of the flag fFIRE. In this case, the system regards that the complete explosion has occurred in the engine 1 if fFIRE=1, and it clears both first and second torque command values Mm1* and Mm2* to "0" in step S5526, then it also clears the flag fSTA indicative of the engine startup state to "0" in the subsequent step S5528.

On the other hand, if fFIRE=0 in the foregoing step S5524, then the system decides that the complete explosion has not taken place in the engine 1, and calculates the second torque command value Mm2* according to formula (3) in step S5530:

$$Mm2^* = -Mm1^* \qquad (3)$$

Lastly, in step S5532, the system sends the first and second torque command values Mm1* and Mm2* (the torque command values of first and second rotary electric units 2000 and 3000) to an inverter 14 via a communication port built in a control unit 1630 and a communication section 1650.

The complete explosion determination processing, which is a sub-program of FIG. 80, will now be described in conjunction with FIG. 82. In the complete explosion determination processing of FIG. 82, first in step S6100, the status of a flag fPSTA is determined. The flag fPSTA indicates whether the complete explosion is being determined at the time of engine startup; fPSTA=1 indicates that the complete explosion is being determined, while FPSTA=0 indicates that the startup is in process rather than the complete explosion is in process.

If fPSTA=1 in step S6100, then the system proceeds directly to step S6104; or if fPSTA=0, then the system initializes a counter N to a predetermined value in step S6102 before proceeding to step S6104.

In step S6104, the system compares the first torque command value Mm1* received from the engine controller 13 with a predetermined complete explosion judgment torque Ms0. If the first torque command value Mm1* is the complete explosion judgment torque Ms0 or larger (if Mm1*>Ms0), then the system proceeds to step S6106; if the first torque command value Mm1* is smaller than the complete explosion judgment torque Ms0 (if Mm1*<Ms0), then the system proceeds to step S6110.

When the first torque command value Mm1* is larger than the complete explosion judgment torque Ms0, it means that the first torque command value Mm1* at the engine startup has reached a startup torque command value exceeding the friction torque of the engine 1. Conversely, when the first torque command value Mm1* is smaller than the complete explosion judgment torque Ms0, it means that the engine 1 is already outputting a torque which exceeds or equals to the friction torque due to the combustion in the engine 1. Therefore, if Mm1*<Ms0, then the startup torque is not required, so that the first torque command value Mm1* given as the startup torque command value is small.

If Mm1*≧Ms0 and a negative determination result is given in step S6104, then the system clears the flag FPSTA to "0" in step S6106. In other words, the system stores that the complete explosion determination has been cleared and the startup is in process. In the following step S6108, the system clears the flag fFIRE to "0" and stores that the complete explosion has not taken place, then goes back to the original program of FIG. 80.

On the other hand, if Mm1*<Ms0 and an affirmative determination result is given in step S6104, then the system decrements the value on the counter N only by "1" in step S6110 and sets the flag fPSTA to "1" in the following step S6112. In other words, the system stores that the complete explosion determination is in process.

In the subsequent step S6114, the system determines whether the value on the counter N is "0". If N≠0 (if YES), then the system clears the flag fFIRE to "0" in step S6116; or if N=0 (if NO), then the system sets the flag SFIRE to "1" in step S6118. After operating the flag fFIRE, the system returns to the original program of FIG. 80.

Figure 80:
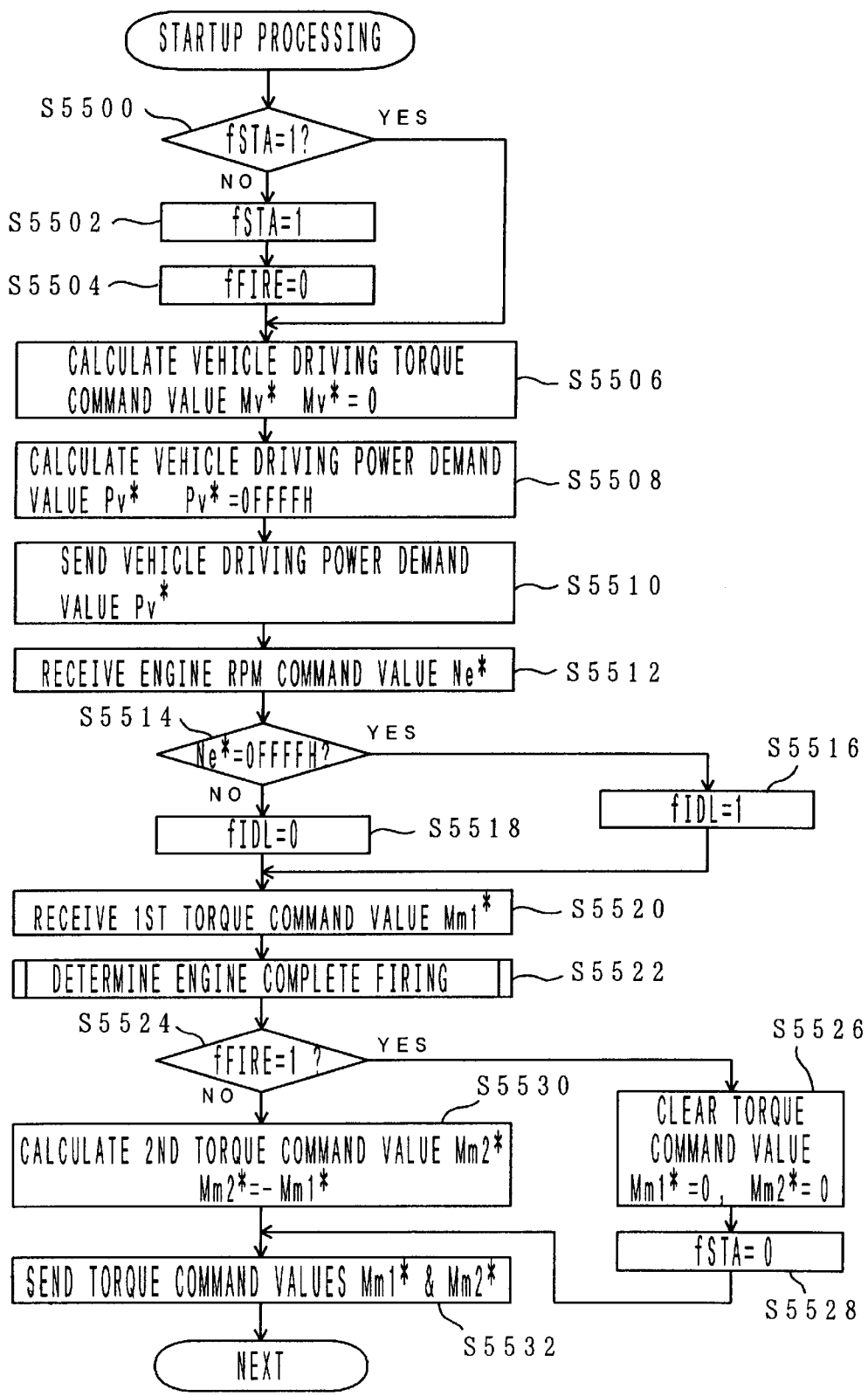
FIG. 80 is a flowchart illustrative of a starting program of the hybrid controller.

Incidentally, in this embodiment, the processing of FIG. 80 implemented by the control unit 1630 of the hybrid controller 16 corresponds to the startup controlling means described in the claims; and the processing of step S5522 of FIG. 80 (the processing of FIG. 82) corresponds to the complete explosion determining means.

The operation of this embodiment having the configuration described above will now be described by classifying it into: (a) Startup state, (b) Forward drive state, and (c) Reverse drive state.

(a) Startup State

First, the startup state will be explained. First, when an iG key switch, not shown, is turned ON, power is supplied from a 12-V(volt) accessory battery, not shown, to the engine controller 13, the inverter 14, and the hybrid controller 16. This initiates various programs stored in the respective ROMs of the control unit 1306 in the engine controller 13, a control unit 1427 in the inverter 14, and the control unit 1630 in the hybrid controller 16.

The operation of the engine controller 13 at the beginning of the startup will be explained with reference to the program of FIG. 4. In such a case, since the engine 1 is not running and therefore no air is taken in, so that intake air volume Q and intake air volume Qo per revolution calculated at that point will be both "0" (steps S5002 and S5006 of FIG. 4). Therefore, injection time TAU will be only invalid injection time Tv (steps S5010 and S5011), so that even if the injection signal TAU is issued, no fuel will be supplied to the engine 1 (step S5014) and the engine 1 stays at rest.

In the inverter 14, the program shown in FIG. 11 is initiated when the iG key switch is turned ON. First, the first and second torque command values Mm1*, Mm2* and current command values im1d*, im2d*, im1q*, and im2q* are initialized to zero (step S5200 of FIG. 11). Immediately after the iG key switch is turned ON, there will be no communication with external equipment (NO in step S5204); hence, the processing from step S5206 to step S5218 will not be implemented. In this case, the torques of the first and second rotary electric units 2000 and 3000 in the torque control carried out according to the flowchart of FIG. 12 will be "0". Further, rpms Nm1 and Nm2 captured in steps S5220 and S5222 of FIG. 11 are also "0"; therefore, the data "Nm1=0" and "Nm2=0" is sent as the rpm information on the first and second rotary electric units 2000 and 3000 to the hybrid controller 16 (step S5226).

On the other hand, in the hybrid controller 16, the program of FIG. 14 is initiated when the iG key switch is turned ON. The moment a start switch 10 is turned ON after the iG key switch is turned ON, a startup state STA is switched from "0" to "1" and the startup state STA is captured (step S5408 of FIG. 14). At this point, the engine 1 is not running and the first and second rotary electric units 2000 and 3000 are not running, either; therefore, the rpms Nm1 and Nm2 of the first and second rotary electric units 2000 and 3000 which are received from the inverter 14 are both "0" (steps S5410 and S5412).

In this case, if the startup state STA is switched to "1" (YES in step S5416), then the startup processing is implemented (step S5418). In this startup processing, the vehicle driving torque command value Mv* is set to "0" and the vehicle driving power demand value Pv* is set to "0FFFFH (hexadecimal)" and they are sent to the engine controller 13 in the program of FIG. 80 (steps S5506 through S5510). As previously mentioned, the data "0FFFFH" is the information indicative of the startup state of the engine 1; it is not the absolute value of the vehicle driving power demand value itself.

In the engine controller 13, when the receive interrupt occurs in the program of FIG. 79, the vehicle driving power demand value Pv* is received (step S5100). At this time, since the Pv* value is the data indicating the engine startup state, a positive determination result is given in step S5102 and flag information fSTA=1 is stored (step S5104). Further, the engine rpm command value Ne* is set to "0FFFEH" and the intake air volume adjusting amount TH is set to "0" (steps S5106 and S5108). The information Ne*=0FFFFH is sent as the data, which indicates that the preparation for engine startup has been completed, to the hybrid controller 16 (step S5124). The throttle actuator 6 is controlled to fully close the throttle valve 5 (step S5122).

Further, in the engine controller 13, the startup torque command value Msta* is searched in a map according to the engine rpm command value Ne. At this time, since the engine 1 is at rest immediately after the startup (Ne=0), the maximum value in the map of FIG. 81 is set as the startup torque command value Msta* and this set value is sent to the hybrid controller 16 (steps S5128 and S5130).

In the hybrid controller 16, the engine rpm command value Ne* is received, and the system finds that the throttle valve 5 is fully closed from the information data of the Ne* value and sets the flag fIDL to "1" (steps S5512 through S5516 of FIG. 80). The startup torque command value Msta* sent from the engine controller 13 is received as the first torque command value Mm1* and stored in memory (step S5520).

Figure 82:
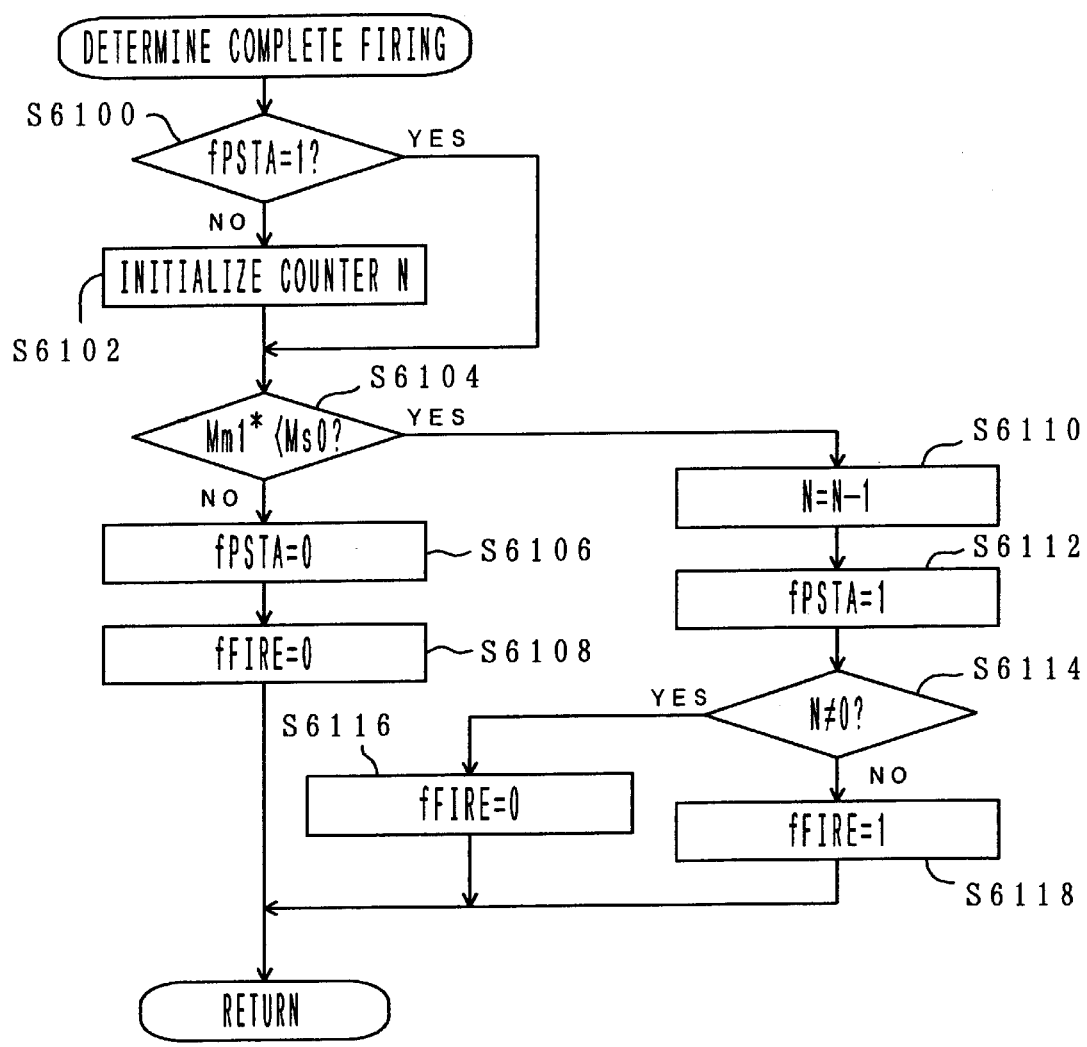
FIG. 82 is a flowchart illustrative of a sub program of complete explosion of the hybrid controller.

In the hybrid controller 16, after the receipt of the first torque command value Mm1*, the complete explosion determination is carried out according to the Mm1* value (step S5522, the processing of FIG. 82). In such a case, as previously described, since the startup torque command value Msta* immediately after the startup is the maximum value and larger than the complete explosion determination torque Ms0 (NO in step S6104 of FIG. 82), it is determined that the complete explosion has not taken place in the engine 1 (fFIRE=0 is set). Hence, in the hybrid controller 16, the sign of the startup torque command value Msta* received from the engine controller 13 is reversed, and this value is determined as the second torque command value Mm2* (step S5530 of FIG. 80, formula (3)). The first and second torque command values Mm1* and Mm2* obtained as described above are sent in sequence to the inverter 14 (step S5532).

When the first and second torque command values Mm1* and Mm2* are sent to the inverter 14, the inverter 14 verifies that the data has been received (YES in step S5204 of FIG. 11), and the first and second torque command values Mm1* and Mm2* are captured and stored in memory (step S5206). If Mm1*≠0FFFFH (NO in step S5208), then d-axis and q-axis current command values im1d* and im1q* are calculated as the current command values to be supplied to the first rotary electric unit 2000; the calculated values are stored in memory (step S5212). If Mm2*≠0FFFFH (NO in step S5214), then d-axis and q-axis current command values im2d* and im2q* are calculated as the current command values to be supplied to the second rotary electric unit 3000; the calculated values are stored in memory (step S5218).

Based on these calculated current command values im1d*, im1q*, im2d*, and im2q*, the first and second rotary electric units 2000 and 3000 are controlled in the inverter 14 according to the program shown in FIG. 12. Further, the rpms Nm1 and Nm2 of the first and second rotary electric units 2000 and 3000, respectively, are calculated, and the Nm1 and Nm2 values are sent to the hybrid controller 16 (steps S5220 through S5226).

Thus, the engine 1 is started up by controlling the first and second rotary electric units 2000 and 3000, and the startup torque command value Msta* obtained by searching the map gradually decreases as the engine rpm Ne increases. The moment the friction torque of the engine 1 matches the startup torque command value Msta*, the engine 1 starts rotating. When the engine 1 runs on combustion, the first torque command value Mm1* (=startup torque command value Msta*) becomes smaller than the complete explosion determination torque Ms0 (YES in step S6104 of FIG. 82), and it is determined that the complete explosion has been occurred when the value on the counter N reaches "0." Specifically, the flag fFIRE is set to "1" (step S6118).

Thereafter, an affirmative determination result is given in step S5524 of FIG. 80 every time, and the first and second torque command values Mm1* and Mm2* are set to "0" (step S5526). Since the flag fSTA is cleared to "0" (step S5528), the startup torque command value Msta* will not be set according to the map of FIG. 81 (NO in step S5126 of FIG. 79) after the complete explosion. Hence, when the start switch of the iG key switch is turned OFF, the engine runs in the idling state and the vehicle is held at rest. Incidentally, if it is determined that the engine rpm Ne has reached "Ne0"

of FIG. 81 before fSTA is cleared to "0," then the startup torque command value Msta* is set to "0" at that point according to the characteristics of FIG. 81.

The embodiment described in detail above provides the following advantages:

(a) In the control system for a hybrid vehicle according to this embodiment, the rpm of the first rotary electric unit 2000 is controlled in accordance with the engine rpm command value Ne* (target rpm). This makes it possible to maintain the operation of the engine 1 at an engine operating point, where the best fuel economy and emission control is obtained, according to the characteristics of the engine, thus permitting highly efficient engine operation. Moreover, in the configuration, the vehicle driving torque is the sum of the torque generated at the first rotary electric unit 2000 and the torque generated at the second rotary electric unit 3000; it is properly controlled based on vehicular drive information. At this time, the torque generated at the first rotary electric unit 2000 is balanced with the output torque of the engine 1, and the output torque of the engine 1 is electromagnetically transmitted as a part of the vehicle driving torque. This allows highly efficient energy transmission to be achieved.

(b) The embodiment is characterized in that the drive of the first rotary electric unit 2000 is controlled according to the startup torque command value Msta* which is decided by the engine rpm Ne and which decreases as the rpm Ne increases at the time of starting up the engine. Further, it is determined that complete explosion has taken place in the engine 1 when the startup torque command value Msta* is lower than the complete explosion judgment torque Ms0 which is the complete explosion judgment value.

In other words, the embodiment is characteristic in that the startup torque command value Msta* decreases as the engine rpm Ne increases; driving the first rotary electric unit 2000 according to the Msta* value allows the combustion startup state of the engine 1 to be sequentially reflected in the Msta* value. Hence, recognizing that the Msta* value is below the predetermined complete explosion judgment value permits the complete explosion in the engine 1 to be accurately determined, resulting in improved smoothness of the startup of the engine 1. Furthermore, the engine 1 can be started up by a minimum of energy. As a result, the complete explosion of the engine 1 can be accurately determined at the time of starting up the hybrid vehicle, which employs a power transmitting means 12 composed of the first and second rotary electric units 2000 and 3000, so as to ensure efficient engine startup.

(c) It is determined that complete explosion has taken place when the state, wherein the startup torque command value Msta* is below the complete explosion judgment torque Ms0, has continued for a predetermined time (the time on the counter N). This enables further accurate determination of the complete explosion in the engine 1.

(d) The startup torque command value Msta* is read and set as the first torque command value Mm1* at the beginning of the startup of the engine 1, and the second torque command value Mm2* is set such that the sum thereof and the set first torque command value Mm1* becomes "0" (Mm1*+Mm2*=0). In this case, it is possible to maintain good torque balance between the engine 1 and the first and second rotary electric units 2000 and 3000, respectively, at the time of engine startup, enabling stable vehicle behavior. As a result, such an inconvenience, in which the torque of the first rotary electric unit (first motor) 2000 acts as a reaction force on the driving shaft of the vehicle to cause the vehicle to move forward or backward or the engine rpm to go up excessively at the startup completion of the engine 1, can be controlled.

(e) As the startup torque command value Msta*, the characteristic value which decreases as the engine rpm Ne increases has been given. This makes it possible to control the overshoot of the engine rpm Ne at the engine startup, leading to further smoother startup. Furthermore, no energy than necessary is used to start up the engine with resultant improved use of energy.

(f) The configuration of the power transmitting means 12 in this embodiment allows the power transmitting means 12 to be made smaller and lighter; hence, the vehicle can be made lighter, permitting higher system efficiency.

(g) Moreover, in this control system, only a required amount of engine power is output according to the vehicle driving power demand value Pv*, and the energy is transferred at the first and second rotary electric units 2000 and 3000 in the process of energy transmission. Hence, the charging and discharging of an electricity storing unit 15 is minimized, so that electricity drawn out of the electricity storing unit 15 while the vehicle is traveling is reduced. This allows the electricity storing unit 15 to be made smaller and the efficiency of the entire vehicle will be improved. Furthermore, when a battery is used for the electricity storing unit 15, the service life of the battery will be extended since the electricity drawn out of the electricity storing unit 15 is reduced.

(h) In addition, an automobile equipped with the control system for a hybrid vehicle according to this embodiment can be provided as a breakthrough fuel-efficient automobile compared with those automobiles that are extensively used today.

The embodiment of the present invention can be implemented as follows in addition to the above.

In the foregoing embodiment, the first and second torque command values Mm1* and Mm2* have been set such that the sum of the respective torque command values Mm1* and Mm2* becomes "0" at the beginning of the startup of the engine 1; however, this configuration may be modified. For instance, the first and second torque command values Mm1* and Mm2* may alternatively be set so that the absolute value of the sum of the respective torque command values Mm1* and Mm2* becomes a predetermined value or less in the vicinity of "0". In this case also, the engine 1 is started up without generating vehicle driving force by restricting the absolute value of the sum of the respective torque command values Mm1* and Mm2*.

In the foregoing embodiment, the characteristic shown in FIG. 81 has been imparted for the startup torque command value Msta*; however, this may be modified. Specifically, the characteristic of FIG. 81 shows linear decrease as the engine rpm Ne increases, while the characteristic may alternatively exhibit nonlinear decrease. Further alternatively, the characteristic may be set so that the startup torque command value Msta* simply decreases without restricting the startup torque command value Msta* to "0" at Ne=Ne0.

Further, the engine temperature may be added as a parameter to the map characteristic of the startup torque command value Msta*. For example, a plurality of characteristics of the startup torque command value Msta* are prepared for different engine temperatures to provide a characteristic in which the startup torque command value Msta* decreases as the engine temperature rises, or the gradient of the decrease in the Msta* is changed for different engine temperatures. Such a configuration allows the engine 1 to be properly started even when a great, unexpected friction torque is applied at cold start or the like of the engine 1. In addition, good condition can be maintained also during the warm-up process of the engine 1. As the temperature information on the engine 1, the temperature of the engine cooling water or the temperature of the wall surface of a cylinder may be employed.

What is claimed is:

1. A controller for a hybrid vehicle having:
    an internal-combustion engine having a combustion chamber;
    an engine controller for controlling intake air volume regulating means for regulating the volume of air to be drawn into said combustion chamber, and an electronically controlled fuel injection unit which controls fuel injection amount, respectively;
    power converting means which is connected to said engine and which has a first rotary electric unit for deciding the rpm of the engine and a second rotary electric unit for deciding the driving force of a vehicle;
    an inverter which drives said first and second rotary electric units; and
    electricity storing means electrically connected to said inverter;
    said controller for a hybrid vehicle comprising:
    vehicle driving power demand value calculating means which calculates a vehicle driving torque command value of said hybrid vehicle according to the operational information on at least an accelerator pedal or a brake pedal and a shift lever, and calculates a vehicle driving power demand value based on the calculated vehicle driving torque command value and the vehicle speed of the hybrid vehicle;
    engine rpm command value calculating means which calculates an engine rpm command value from said calculated vehicle driving power demand value according to the characteristics of said engine stored in advance; and
    torque controlling means which calculates a first torque command value for said first rotary electric unit according to said engine rpm command value and the information related to said engine rpm and calculates a second torque command value for said second rotary electric unit according to the first torque command value and said vehicle driving torque command value, performs the output of said first and second torque command values to said inverter, and controls the torques of said first and second rotary electric units according to said first and second torque command values.

2. A controller for a hybrid vehicle according to claim 1, wherein: said power converting means comprises a housing, relatively rotatable first and second rotors which are placed in said housing and which transmit a torque from said engine to a load output, and a stator secured to said housing; said second rotor comprises a first magnetic circuit which performs mutual electromagnetic action by rotary drive relative to said first rotor and a second magnetic circuit which performs mutual electromagnetic action by rotary drive relative to said stator; said first rotor is provided with a first coil which makes it possible to control, by energization, the relative angular velocity and the torque with respect to said second rotor so as to constitute a first rotary electric unit together with said first magnetic circuit, and said stator is provided with a second coil which makes it possible to control, by energization, the relative velocity and the torque with respect to said second rotor so as to constitute a second rotary electric unit together with said second magnetic circuit; either said first rotor or said second rotor is joined to said engine and rotationally driven as said engine is driven, while the other rotor is joined to said load output; said first rotor and second rotor, and stator are disposed concentrically; said second rotor is disposed inside said stator, while said first rotor is disposed inside said second rotor, a magnetic pole of said second rotor being composed of a permanent magnet; and an input shaft coupled to said engine in said first rotor and said second rotor and an output shaft coupled to the load output are disposed on the same side of said housing.

3. A controller for a hybrid vehicle according to claim 1, further comprising:
    charge state detecting means for detecting the charge state of said electricity storing means; and
    command data setting means for setting a torque command value for said second rotary electric unit or a target rpm of said engine, using said charge state of said electricity storing means as a parameter.

4. A controller for a hybrid vehicle according to claim 3, wherein:
    said charge state detecting means detects the voltage, current, power, or remaining capacity of said electricity storing unit; and
    said command data setting means sets the torque command value of said second rotary electric unit such that the voltage, current, power, or remaining capacity of said electricity storing unit remains constant or stays in a predetermined permissible range.

5. A controller for a hybrid vehicle according to claim 3, wherein:
    said charge state detecting means detects the voltage, current, power, or remaining capacity of said electricity storing unit; and
    said command data setting means sets the target rpm of said engine such that the voltage, current, power, or remaining capacity of said electricity storing unit remains constant or stays in a predetermined permissible range.

6. A controller for a hybrid vehicle according to claim 3, comprising means for variably setting the control target value of the voltage, current, power, or remaining capacity of said electricity storing unit.

7. A controller for a hybrid vehicle according to claim 1, further comprising fuel injection operating means for decreasing or stopping the fuel injection to the engine by said fuel injection controlling means when the vehicle is braked.

8. A controller for a hybrid vehicle according to claim 7, wherein an exhaust pipe of said engine is provided with a catalyst and a heater is attached to said catalyst;
    said controller for a hybrid vehicle comprising heater controlling means for energizing said heater to heat it by supplying electric power from said electricity storing unit when reducing or stopping the fuel injection by said fuel injection operating means.

9. A controller for a hybrid vehicle according to claim 8, comprising:
    charge state detecting means for detecting the charge state of said electricity storing unit;
    wherein said heater controlling means energizes and heats said heater when only the charge state of said electricity storing unit reaches a predetermined charge level.

10. A controller for a hybrid vehicle according to claim 9, wherein said charge state detecting means detects the voltage or the remaining capacity or said electricity storing unit.

11. A controller for a hybrid vehicle according to claim 1, further comprising startup torque value setting means which sets a startup torque value, which is matched to an engine startup state, for said first torque command value at the beginning of the startup of said engine, and which also sets said second torque command value so that the absolute value of the sum of the second torque command value and the set first torque command value is a predetermined value or less.

12. A controller for a hybrid vehicle according to claim 11, wherein the startup torque value set by said startup torque value setting means is a characteristic value which decreases as said engine rpm increases.

13. A controller for a hybrid vehicle according to claim 12, wherein the startup torque value set by said startup torque value setting means is a characteristic value which decreases as said engine temperature increases.

14. A controller for a hybrid vehicle according to claim 11, comprising a first control unit which conducts fuel injection control based primarily on engine operation state, and a second control unit which issues a command on the engine torque control amount to said first control unit and also controls the drive of said inverter;

wherein, at the beginning of the startup of said engine, said first control unit calculates the startup torque value of said first rotary electric unit according to the engine startup state, and said second control unit captures said calculation result given by the first control unit and sets the value as a first torque command value and also sets said second torque command value such that the absolute value of the sum of the second torque command value and said first torque command value is a predetermined value or less.

15. A controller for a hybrid vehicle according to claim 1, comprising torque control amount restricting means which restricts the torque control amount by a predetermined lower limit value according to an engine output characteristic which has the output torque and rpm of said engine as parameters thereof.

16. A controller for a hybrid vehicle according to claim 15, wherein the lower limit value for restricting said torque control amount is set as the value of boundary of a high efficiency zone and a low efficiency zone of the engine.

17. A controller for a hybrid vehicle according to claim 15 or claim 16, wherein said torque control amount restricting means selectively implements a first restriction for limiting said torque control amount by the lower limit value or a second restriction for setting the torque control amount to "0" if the torque control amount is lower than said predetermined lower limit value.

18. A controller for a hybrid vehicle according to claim 17, comprising state amount calculating means for calculating the state amount which corresponds to the electricity storage state of said electricity storing unit, wherein said torque control amount restricting means carries out said first restriction if it determines that the electricity storing unit need to be charged according to said state amount, or it carries out said second restriction if the discharge of the electricity storing unit is allowed according to said state amount.

19. A controller for a hybrid vehicle according to claim 18, wherein said torque control amount restricting means controls the torque control amount according to a hysteresis characteristic in which it continues said first restriction until said electricity storing unit is almost fully charged, or it continues said second restriction until the state amount of said electricity storing unit reduces to a predetermined level when the electricity storing unit has reached the almost fully charged state and the discharge is permitted.

20. A control system for a hybrid vehicle provided at least with a hybrid engine composed of an engine which is equipped at least with intake air volume regulating means which is provided on an inlet pipe to open and close a throttle valve which adjusts the volume of air drawn into a combustion chamber, and an electronically controlled fuel injection unit; a power converting means which includes at least a first rotary electric unit for deciding the rpm of the engine and a second rotary electric unit for deciding the driving force of a vehicle and which is connected to the output shaft of said engine; and electricity storing means;

said control system for a hybrid vehicle comprising:

an engine controller which controls said intake air volume regulating means and electronically controlled fuel injection unit, an inverter which drives said respective rotary electric units, and a hybrid controller which controls said hybrid system;

wherein said hybrid controller calculates a vehicle driving torque command value of said hybrid vehicle according to the operational information on at least an accelerator pedal or a brake pedal and a shift lever, calculates a vehicle driving power demand value based on the vehicle driving torque command value and the vehicle speed of the hybrid vehicle, and performs the output of the vehicle driving power demand value to said engine controller;

said engine controller calculates an engine rpm command value based on said vehicle driving power demand value and the characteristics of said engine stored in advance, calculates the regulating amount of said intake air volume regulating means, controls said intake air volume regulating means according to the regulating amount, controls said electronically controlled fuel injection unit according to the intake air volume decided by the control of at least the intake air volume regulating means, and performs the output of said engine rpm command value to said hybrid controller;

said hybrid controller calculates a first torque command value for said first rotary electric unit according to said engine rpm command value and the information related to the rpm of said engine and calculates a second torque command value for said second rotary electric unit according to said first torque command value and said vehicle driving torque command value, and performs the output of said first and second torque command values to said inverter; and said inverter controls the torques of said first and second rotary electric units according to said first and second torque command values.

21. A controller or system for a hybrid vehicle according to any one of claims 1 to 20, further comprising charge state detecting means for detecting the charge state of said electricity storing means; wherein said hybrid controller increases or decreases at least said vehicle driving torque command value, said power demand value, or said engine rpm command value to make a correction according to the charge state information on the electricity storing means supplied by the charge state detecting means.

22. A control system for a hybrid vehicle according to claim 20, further comprising voltage detecting means for detecting the voltage of said electricity storing means; wherein said hybrid controller increases or decreases at least said vehicle driving torque command value, said power demand value, or said internal-combustion engine rpm command to make a correction in order to maintain said electricity storing means at a predetermined voltage at all times according to the voltage of the electricity storing means detected by the voltage detecting means.

23. A control system for a hybrid vehicle according to claim 22, wherein said predetermined voltage is the voltage in a fully charged state or in an almost fully charged state of said electricity storing unit.

24. A control system for a hybrid vehicle according to claim 22, wherein said predetermined voltage is increased or decreased to make a correction according to the temperature of said electricity storing unit or the temperature in the vicinity thereof.

25. A controller for a hybrid vehicle having:
an engine including a combustion chamber;
an engine controller for controlling intake air volume regulating means which regulates the volume of air to be drawn into said combustion chamber, and an electronically controlled fuel injection device which controls fuel injection amount, respectively;
power converting means which is connected to said engine and which has a first rotary electric unit for deciding the rpm of the engine and a second rotary electric unit for deciding the driving force of a vehicle;
an inverter which drives said first and second rotary electric units; and
electricity storing means electrically connected to said inverter;
said controller for a hybrid vehicle comprising:
vehicle driving torque command value calculating means which calculates a vehicle driving torque command value of said hybrid vehicle according to the operational information on at least an accelerator pedal or a brake pedal and a shift lever;
engine rpm command value calculating means which calculates an engine rpm command value from said calculated vehicle driving torque command value; and
torque controlling means which calculates a first torque command value for said first rotary electric unit according to said engine rpm command value and the information related to the rpm of said engine and calculates a second torque command value for said second rotary electric unit according to said first torque command value and said vehicle driving torque command value, performs the output of said first and second torque command values to said inverter, and controls the torques of said first and second rotary electric units according to said first and second torque command values;
wherein, when the rpm of said first rotary electric unit is in the vicinity of zero, the first torque command value to said first rotary electric unit is changed to cause a slight change in the rpm of said first rotary electric unit via said inverter.

26. A controller for a hybrid vehicle according to claim 25, wherein the torque resulting from the change of the first torque command value supplied to said first rotary electric unit is compensated for by said second rotary electric unit.

27. A controller for a hybrid vehicle according to claim 25, further comprising: torque calculating means for calculating the torque resulting from the change of the first torque command value supplied to said first rotary electric unit; and second torque command value determining means for determining the second torque command value supplied to said second rotary electric unit in order to cancel the torque calculated by the torque calculating means.

28. A controller for a hybrid vehicle according to claim 27, wherein said torque calculating means calculates said torque from the inertia connected to said first rotary electric unit and the change in the rpm of the first rotary electric unit.

29. A controller for a hybrid vehicle according to claim 27, wherein said torque calculating means calculates said torque from the change in the current value of said first rotary electric unit.

30. A controller for a hybrid vehicle according to claim 27, wherein said torque calculating means calculates said torque from the compensation amount based on the rpm feedback from said first rotary electric unit.

31. A controller for a hybrid vehicle having:
an engine including a combustion chamber;
an engine controller for controlling intake air volume regulating means which regulates the volume of air to be drawn into said combustion chamber, and an electronically controlled fuel injection unit which controls fuel injection amount, respectively;
power converting means which is connected to said engine and which has a first rotary electric unit for deciding the rpm of the engine and a second rotary electric unit for deciding the driving force of a vehicle;
an inverter which drives said first and second rotary electric units; and
electricity storing means electrically connected to said inverter;
said controller for a hybrid vehicle comprising:
vehicle driving torque command value calculating means which calculates a vehicle driving torque command value of said hybrid vehicle according to the operational information on at least an accelerator pedal or a brake pedal and a shift lever and the vehicle speed of the hybrid vehicle;
vehicle driving power demand value calculating means which calculates the vehicle driving power demand value according to said calculated vehicle driving torque command value and the vehicle speed;
engine rpm command value calculating means which calculates an engine rpm command value from said calculated vehicle driving power demand value; and
torque controlling means which calculates a first torque command value for said first rotary electric unit according to said engine rpm command value and the information related to the rpm of said engine and calculates a second torque command value for said second rotary electric unit according to the first torque command value and said vehicle driving torque command value, performs the output of said first and second torque command values to said inverter, and controls the torques of said first and second rotary electric units according to said first and second torque command values;
wherein, when the rpm of said first rotary electric unit is in the vicinity of zero, the first torque command value to said first rotary electric unit is changed to cause a slight change in the rpm of said first rotary electric unit via said inverter.

32. A controller for a hybrid vehicle having:
an engine including a combustion chamber;
an engine controller for controlling intake air volume regulating means which regulates the volume of air to be drawn into said combustion chamber, and an electronically controlled fuel injection device which controls fuel injection amount, respectively;
power converting means which is connected to said engine and which has a first rotary electric unit for deciding the rpm of the engine and a second rotary electric unit for deciding the driving force of a vehicle;

an inverter which drives said first and second rotary electric units; and electricity storing means electrically connected to said inverter;

said controller for a hybrid vehicle comprising:

vehicle driving torque command value calculating means which calculates a vehicle driving torque command value of said hybrid vehicle according to the operational information on at least an accelerator pedal or a brake pedal and a shift lever and the vehicle speed of the hybrid vehicle;

vehicle driving power demand value calculating means which calculates the vehicle driving power demand value according to said calculated vehicle driving torque command value and the vehicle speed;

engine rpm command value calculating means which calculates an engine rpm command value from said calculated vehicle driving power demand value; and torque controlling means which calculates a first torque command value for said first rotary electric unit according to said engine rpm command value and the information related to the rpm of said engine and calculates a second torque command value for said second rotary electric unit according to the first torque command value and said vehicle driving torque command value, performs the output of said first and second torque command values to said inverter, and controls the torques of said first and second rotary electric units according to said first and second torque command values;

wherein, when said shift lever has been selected to a reverse state, said engine is set to an idle state, said first torque command value is set to zero, and said second command value is set to said vehicle driving torque command value.

33. A controller for a hybrid vehicle according to claim 32, further including remaining capacity detecting means for detecting the remaining capacity of said electricity storing unit;

wherein, if the remaining capacity of said electricity storing unit falls to a predetermined value or lower, then said hybrid controller corrects said vehicle driving power demand value or said vehicle driving torque command value or said engine rpm command value to at least maintain said remaining capacity.

34. A controller for a hybrid vehicle applied to a hybrid vehicle provided with an engine, power converting means which is connected to the engine and which includes a first rotary electric unit for deciding engine rpm and a second rotary electric unit for deciding the driving force of the vehicle, an inverter for driving said first and second rotary electric units, and an electricity storing unit electrically connected to the inverter;

wherein the output torque of said engine is controlled according to vehicular drive information, and the torque values for said first and second rotary electric units are controlled according to the torque control amount and the target rpm of said engine corresponding to the characteristics of said engine;

said controller for a hybrid vehicle comprising:

transient state detecting means for detecting a vehicle transient state corresponding to the acceleration or deceleration of the vehicle; and torque correcting means which corrects the torque command value for said first rotary electric unit by decreasing it and also corrects the torque command value for said second rotary electric unit by increasing it if the vehicle is being accelerated, while it corrects the torque command value for said first rotary electric unit by increasing it and also corrects the torque command value for said second rotary electric unit by decreasing it if the vehicle is being decelerated, according to a detection result of said transient state.

35. A controller for a hybrid vehicle according to claim 34, comprising:

fuel injection controlling means for controlling the fuel injection to said engine; and fuel cutoff command means for stopping the fuel injecting operation by said fuel injection controlling means when the vehicle is being decelerated.

36. A controller for a hybrid vehicle according to claim 34 or 35, comprising torque control amount calculating means for calculating the torque control amount based on vehicular drive information;

wherein said transient state detecting means detects that the vehicle is being accelerated if said calculated torque control amount exceeds a predetermined judgment value and shifts to an increase, while it detects that the vehicle is being decelerated if said calculated torque control amount exceeds the judgment value and shifts to a decrease.

37. A controller for a hybrid vehicle according to claim 36, wherein said torque control amount calculating means calculates the vehicle driving torque command value of said hybrid vehicle according to the operational information of at least an accelerator pedal or brake pedal and a shift lever and also calculates the vehicle driving power demand value according to the calculated vehicle driving torque command value and the vehicle speed of the hybrid vehicle, and provides the vehicle driving torque command value or the vehicle driving power demand value as said torque control amount.

38. A controller for a hybrid vehicle according to claim 34 or claim 35, comprising:

target rpm calculating means for calculating the target rpm of said engine according to the vehicle drive state, the torque value of said first rotary electric unit being controlled according to the difference between the calculated target rpm of the engine and an actual engine rpm;

wherein said transient state detecting means detects that the vehicle is being accelerated if said calculated target rpm of the engine exceeds a predetermined judgment value and shifts to an increase, while it detects that the vehicle is being decelerated if said calculated target rpm of the engine exceeds the judgment value and shifts to a decrease.

39. A controller for a hybrid vehicle according to claim 34, comprising:

a first control unit which carries out the fuel injection control including the cutoff of fuel to said engine, and a second control unit which issues a command on torque control amount to said first control unit and which also controls the drive of said inverter;

wherein said second control unit commands said first control unit to cut off the fuel to the engine, and said first control unit implements the cutoff of the fuel in response to said command.

40. A controller for a hybrid vehicle according to claim 34, comprising:

a first control unit which carried out the fuel injection control including the cut off of fuel to said engine, and a second control unit which issues a command on torque control amount to said first control unit and which also controls the drive of said inverter;

wherein said first control unit implements the cutoff of fuel to the engine according to the torque control amount instructed by said second control unit to said first control unit at the time of cutting off the fuel to the engine.

41. A controller for a hybrid vehicle applied to a hybrid vehicle provided with an engine, power converting means which is connected to the engine and which includes a first rotary electric unit for deciding engine rpm and a second rotary electric unit for deciding the driving force of the vehicle, an inverter for driving said first and second rotary electric units, and an electricity storing unit electrically connected to the inverter;

wherein the output torque of said engine is controlled according to vehicular drive information, and the torque values for said first and second rotary electric units are controlled according to the torque control amount of the engine and the target rpm of the engine corresponding to the characteristics of the engine;

said controller for a hybrid vehicle comprising:

band restricting means which captures an actual value of engine rpm and restricts a predetermined frequency band based on the torque ripple of said engine on the captured actual rpm; and torque command value calculating means for calculating the torque command value of said first rotary electric unit by employing said restricted actual rpm.

42. A controller for a hybrid vehicle according to claim 41, wherein said band restricting means is constituted by a band-stop filter which removes the frequency component of the torque ripple of said engine from the actual value of the engine rpm.

43. A controller for a hybrid vehicle according to claim 42, wherein the central frequency of said band-stop filter is changed according to the actual value of the engine rpm.

44. A controller for a hybrid vehicle according to claim 42, wherein said band-stop filter is configured so as to remove the frequency components of a predetermined multiple of the engine rpm.

45. A controller for a hybrid vehicle according to claim 41, wherein said band restricting means restricts the frequency band of the engine rpm only when the actual value of the engine rpm is a predetermined value or less.

46. A controller for a hybrid vehicle according to claim 41, wherein the actual value of said engine rpm is calculated based on the rpm measurement of said first rotary electric unit and the rpm measurement of said second rotary electric unit.

47. A controller for a hybrid vehicle applied to a hybrid vehicle provided with an engine, power converting means which is connected to the engine and which includes a first rotary electric unit for deciding engine rpm and a second rotary electric unit for deciding the driving force of the vehicle, an inverter for driving said first and second rotary electric units, and an electricity storing unit electrically connected to the inverter;

wherein the output torque of said engine is controlled according to vehicular drive information, the torque command values for said first and second rotary electric units are calculated according to the torque control amount of the engine and the target rpm of the engine corresponding to the characteristics of the engine, and the respective rotary electric units are controlled by the calculated torque command values;

said controller for a hybrid vehicle comprising:

energy balance calculating means for calculating the energy balance in a hybrid control system from first information on said electricity storing unit and second information on said first and second rotary electric units; and failure determining means for determining the presence of a failure in said hybrid control system according to said calculated energy balance.

48. A controller for a hybrid vehicle according to claim 47, wherein said energy balance calculating means comprising:

means for calculating the electric power moving in and out of said electricity storing unit as the first information;

means for calculating the electric power balance in said first and second rotary electric units as the second information; and means for comparing the electric power moving in and out of said electricity storing unit with the electric power balance of said rotary electric units.

49. A controller for a hybrid vehicle according to claim 48, wherein the electric power balance in said first and second rotary electric units is calculated from said torque command values and rpms of the respective rotary electric units.

50. A controller for a hybrid vehicle according to claim 48, wherein the electric power balance in said first and second rotary electric units is calculated from the output torque values and rpms of the respective rotary electric units obtained from torque detecting means or torque estimating means.

51. A controller for a hybrid vehicle according to claim 50, wherein said torque estimating means estimates the output torque values of the respective rotary electric units from the currents and rotary electric unit constants of said first and second rotary electric units.

52. A controller for a hybrid vehicle according to claim 48, wherein the electric power balance in said first and second rotary electric units is calculated from the currents and voltages of the respective rotary electric units.

53. A controller for a hybrid vehicle according to claim 48, wherein the electric power balance of the respective rotary electric units is corrected according to the efficiency of said first and second rotary electric units and said inverter.

54. A controller for a hybrid vehicle according to claim 48, wherein the electric power balance of the respective rotary electric units is corrected according to the losses of said first and second rotary electric units and said inverter.

55. A controller for a hybrid vehicle according to claim 47, wherein the output of the vehicle is restricted or stopped if said failure determining means has determined that a failure has occurred in the hybrid control system.

56. A controller for a hybrid vehicle applied to a hybrid vehicle which is provided with an engine, power converting means which is connected to said engine and which includes a first rotary electric unit for deciding engine rpm and a second rotary electric unit for deciding the driving force of said vehicle, an inverter for driving said first and second rotary electric units, and an electricity storing unit electrically connected to said inverter;

wherein the output torque of said engine is controlled according to vehicular drive information, the torque command values for said first and second rotary electric units are calculated according to the torque control amount of said engine and the target rpm of said engine corresponding to the characteristics of said engine, and said respective rotary electric units are controlled according to said calculated torque command values;

said controller for a hybrid vehicle comprising:

startup controlling means for controlling the drive of said first rotary electric unit according to a startup torque command value which is determined based on engine rpm at the time of startup of said engine and which decreases as said rpm increases; and complete explosion determining means which determines that the complete explosion in said engine has occurred if said startup torque command value is smaller than a predetermined complete explosion judgment value.

57. A controller for a hybrid vehicle according to claim 56, wherein said complete explosion determining means determines that complete explosion has occurred if a state in which said startup torque command value stays below said predetermined completion explosion judgment value has continued for a predetermined time.

58. A controller for a hybrid vehicle according to claim 56 or claim 57, comprising means for setting the torque command value for said second rotary electric unit such that the absolute value of the sum of said torque command value and the startup torque command value used by said startup controlling means is a predetermined value or less.

\* \* \* \* \*